US008140399B1

(12) United States Patent
Goel

(10) Patent No.: US 8,140,399 B1
(45) Date of Patent: Mar. 20, 2012

(54) SYSTEM FOR CONCURRENT OPTIMIZATION OF BUSINESS ECONOMICS AND CUSTOMER VALUE

(76) Inventor: Sachin Goel, Walpole, MA (US)

( * ) Notice: Subject to any disclaimer, the term of this patent is extended or adjusted under 35 U.S.C. 154(b) by 774 days.

(21) Appl. No.: 11/981,812

(22) Filed: Oct. 31, 2007

Related U.S. Application Data

(63) Continuation-in-part of application No. 11/474,115, filed on Jun. 23, 2006, now Pat. No. 7,472,080, which is a continuation-in-part of application No. 10/973,802, filed on Oct. 25, 2004, now Pat. No. 7,418,409.

(60) Provisional application No. 60/514,248, filed on Oct. 24, 2003.

(51) Int. Cl.
*G06Q 30/00* (2006.01)
*G06F 17/30* (2006.01)

(52) U.S. Cl. ............... 705/26.1; 705/5; 705/6; 705/27.1

(58) Field of Classification Search .................. 705/5–6, 705/26–27, 26.1–27.2
See application file for complete search history.

(56) References Cited

U.S. PATENT DOCUMENTS

| | | |
|---|---|---|
| 4,775,936 A | 10/1988 | Jung |
| 4,931,932 A | 6/1990 | Dalnekoff et al. |
| 5,237,499 A | 8/1993 | Garback |
| 5,627,973 A | 5/1997 | Armstrong et al. |
| 5,765,142 A | 6/1998 | Allred et al. |
| 5,797,127 A | 8/1998 | Walker et al. |
| 5,890,133 A | 3/1999 | Ernst |
| 5,897,620 A * | 4/1999 | Walker et al. ................ 705/5 |
| 5,962,829 A | 10/1999 | Yoshinaga |
| 5,963,910 A | 10/1999 | Ulwick |
| 6,014,647 A | 1/2000 | Nizzari et al. |
| 6,041,308 A | 3/2000 | Walker et al. |
| 6,107,932 A | 8/2000 | Walker et al. |
| 6,115,691 A | 9/2000 | Ulwick |
| 6,119,094 A | 9/2000 | Lynch et al. |
| 6,119,933 A | 9/2000 | Wong et al. |
| 6,161,051 A | 12/2000 | Hafemann et al. |

(Continued)

FOREIGN PATENT DOCUMENTS

GB 2366403 A 3/2002

(Continued)

OTHER PUBLICATIONS www.expedia.com Jun. 5, 2001.*

(Continued)

*Primary Examiner* — Will Allen
(74) *Attorney, Agent, or Firm* — Wolf, Greenfield & Sacks, P.C.

(57) ABSTRACT

A computer-implemented system and method to provide options on products to enhance customers' experience. A computer-implemented service is operated that delivers to a customer an option to utilize up to n of m selected products, where n is less than or equal to m. Information is recorded in a data store, pertaining to said option. In addition, a system is operated to define each of the n Chosen Products, whereby after each of the n Chosen Products is defined, the customer can utilize said Chosen Product. The information pertaining to said defined products is recorded in a data store. A computer-implemented system and method to award two or more confirmed products to a customer, where in said customer is allowed to utilize fewer than the awarded products.

36 Claims, 75 Drawing Sheets

U.S. PATENT DOCUMENTS

| | | | |
|---|---|---|---|
| 6,236,977 B1 | 5/2001 | Verba et al. | |
| 6,263,315 B1 | 7/2001 | Talluri | |
| 6,295,521 B1 | 9/2001 | DeMarcken et al. | |
| 6,304,850 B1 | 10/2001 | Keller et al. | |
| 6,307,572 B1 | 10/2001 | DeMarcken et al. | |
| 6,314,361 B1 | 11/2001 | Yu et al. | |
| 6,377,932 B1 | 4/2002 | DeMarcken | |
| 6,442,537 B1 | 8/2002 | Karch | |
| 6,477,520 B1 | 11/2002 | Malaviya et al. | |
| 6,496,568 B1 | 12/2002 | Nelson | |
| 6,567,786 B1 | 5/2003 | Bibelnieks et al. | |
| 6,721,714 B1 | 4/2004 | Baiada et al. | |
| 6,757,689 B2 | 6/2004 | Battas | |
| 6,760,632 B1 | 7/2004 | Heching et al. | |
| 6,778,660 B2 | 8/2004 | Fromm | |
| 6,850,901 B1 | 2/2005 | Hunter et al. | |
| 6,895,381 B1 | 5/2005 | Selby | |
| 6,974,079 B1 | 12/2005 | Strothmann et al. | |
| 7,050,987 B2 | 5/2006 | Lettovsky et al. | |
| 7,069,309 B1 | 6/2006 | Dodrill et al. | |
| 7,249,062 B2 | 7/2007 | Norins et al. | |
| 7,340,403 B1 | 3/2008 | DeMarcken | |
| 7,418,409 B1 * | 8/2008 | Goel | 705/26 |
| 7,424,449 B2 * | 9/2008 | Goel | 705/26 |
| 7,472,080 B2 * | 12/2008 | Goel | 705/26 |
| 2001/0034686 A1 | 10/2001 | Eder | |
| 2001/0037243 A1 | 11/2001 | Rouston et al. | |
| 2001/0051885 A1 | 12/2001 | Nardulli et al. | |
| 2002/0059283 A1 | 5/2002 | Shapiro et al. | |
| 2002/0065696 A1 | 5/2002 | Hack et al. | |
| 2002/0065699 A1 | 5/2002 | Talluri | |
| 2002/0095328 A1 | 7/2002 | Swart et al. | |
| 2002/0128922 A1 * | 9/2002 | Joao | 705/26 |
| 2002/0194117 A1 | 12/2002 | Nabe et al. | |
| 2002/0198775 A1 | 12/2002 | Ryan | |
| 2003/0033155 A1 | 2/2003 | Peerson et al. | |
| 2003/0036928 A1 * | 2/2003 | Kenigsberg et al. | 705/5 |
| 2003/0046130 A1 | 3/2003 | Golightly et al. | |
| 2003/0050846 A1 | 3/2003 | Rodon | |
| 2003/0055689 A1 | 3/2003 | Block et al. | |
| 2003/0065581 A1 | 4/2003 | Takada | |
| 2003/0069780 A1 | 4/2003 | Hailwood et al. | |
| 2003/0074239 A1 | 4/2003 | Hoffman et al. | |
| 2003/0074247 A1 | 4/2003 | Dick et al. | |
| 2003/0074249 A1 | 4/2003 | Hoffman et al. | |
| 2003/0074250 A1 | 4/2003 | Burk | |
| 2003/0074262 A1 | 4/2003 | Hoffman et al. | |
| 2003/0074263 A1 | 4/2003 | Hoffman et al. | |
| 2003/0074264 A1 | 4/2003 | Hoffman | |
| 2003/0074281 A1 | 4/2003 | Hoffman et al. | |
| 2003/0074285 A1 | 4/2003 | Hoffman et al. | |
| 2003/0074355 A1 | 4/2003 | Menninger et al. | |
| 2003/0074360 A1 | 4/2003 | Chen et al. | |
| 2003/0078787 A1 | 4/2003 | Hoffman et al. | |
| 2003/0078818 A1 | 4/2003 | Hoffman et al. | |
| 2003/0078827 A1 | 4/2003 | Hoffman | |
| 2003/0078845 A1 | 4/2003 | Hoffman et al. | |
| 2003/0078846 A1 | 4/2003 | Burk et al. | |
| 2003/0078860 A1 | 4/2003 | Hoffman et al. | |
| 2003/0078861 A1 | 4/2003 | Hoffman et al. | |
| 2003/0144867 A1 | 7/2003 | Campbell et al. | |
| 2003/0158771 A1 | 8/2003 | Shen et al. | |
| 2003/0187685 A1 | 10/2003 | Bakker | |
| 2004/0015386 A1 | 1/2004 | Abe et al. | |
| 2004/0039613 A1 | 2/2004 | Maycotte et al. | |
| 2004/0039614 A1 | 2/2004 | Maycotte et al. | |
| 2004/0073496 A1 | 4/2004 | Cohen | |
| 2004/0083113 A1 | 4/2004 | Cao et al. | |
| 2004/0158536 A1 | 8/2004 | Kowal et al. | |
| 2004/0172319 A1 | 9/2004 | Eder | |
| 2004/0230451 A1 | 11/2004 | Figa | |
| 2004/0267580 A1 | 12/2004 | Becker | |
| 2005/0033616 A1 | 2/2005 | Vavul et al. | |
| 2005/0071245 A1 | 3/2005 | Norins et al. | |
| 2005/0097000 A1 | 5/2005 | Freishtat et al. | |
| 2005/0216317 A1 | 9/2005 | Medellin et al. | |
| 2006/0106655 A1 | 5/2006 | Lettovsky et al. | |

FOREIGN PATENT DOCUMENTS

| | | |
|---|---|---|
| WO | WO 0073930 A2 | 12/2000 |
| WO | WO 0073957 A2 | 12/2000 |
| WO | WO 0073958 A2 | 12/2000 |
| WO | WO 01/18722 A1 | 3/2001 |
| WO | WO 0133473 A2 | 5/2001 |
| WO | WO 0157771 A1 | 8/2001 |
| WO | WO 02079901 A2 | 10/2002 |
| WO | WO 03019448 A2 | 3/2003 |
| WO | WO 03/02994 A2 | 4/2003 |
| WO | WO 03/054760 A2 | 7/2003 |
| WO | WO 03102867 A1 | 12/2003 |
| WO | WO 2004/036364 A2 | 4/2004 |

OTHER PUBLICATIONS

"US Airways: US Airways and United Airlines take next step in code-share agreement; Reciprocal airport lounge access and interline e-ticketing". M2 Presswire. Coventry: Oct 15, 2002. p. 1.*

Chatwin, "Multiperiod Airline Overbooking With a Single Fare Class," *Operations Research*, 46:6, 805-819p (1998).

Chatwin, "Optimal dynamic pricing of perishable products with stochastic demand and a finite set of prices," *Elsevir Science B. V.—European Journal of Operational Research*; 125, 149-174 (2000).

Compton, "Many Possibilities, One Price," *Customer Relationship Management*,8:8, 16-17 (2004).

Elmaghraby, "Dynamic Pricing in the Presence of Inventory Considerations: Research Overview, Current Practices and Future Directions," *Management Science*, 49:10, 1287-1309 (2003).

Grant, E., "A New Twist in Airline Travel: Surcharges Debut for Certain Ticket Types," *Travel Agent*, 293(11):135(1) Jan. 25, 1999 (recovered from Dialog on Dec. 6, 2008).

Ha et al., "Problem-Focused Incremental Elicitation of Multi-Attribute Utility Models," http://www.cs.uwm.edu/~vu/papers/uai97.pdf, 1-8.

Margulius, "Priced to sell . . . to you," Infoworld San Mataeo, 24:7, 47-48 http://www.infoworld.com/archives/emailPrint.jsp (2002).

Rios-Insua et al., Sensitivity Analysis in an Additive Multi-Attribute Utility Decision Support System, http://www.ciemat.es/convocatorias/eventos/samo2001/esp-riosinsua.pdf, 1-1.

Roth, et al., "Multi-Attribute Utility Analysis" http://msll.mit.edu/maua_paper.pdf, 1-16.

"Booked on the 6.40, the 7.00, the 7.45 . . . " Financial Times (FT) Mar. 8, 1999 p. 15 (recovered from Dialog on Dec. 6, 2008).

www.expedia.com May 19, 2001. Obtained on Sep. 26, 2007 from www.Archive.org.

PCT/IB07/03761, International Search Report and Written Opinion, Feb. 4, 2009.

* cited by examiner

Fig: 13C
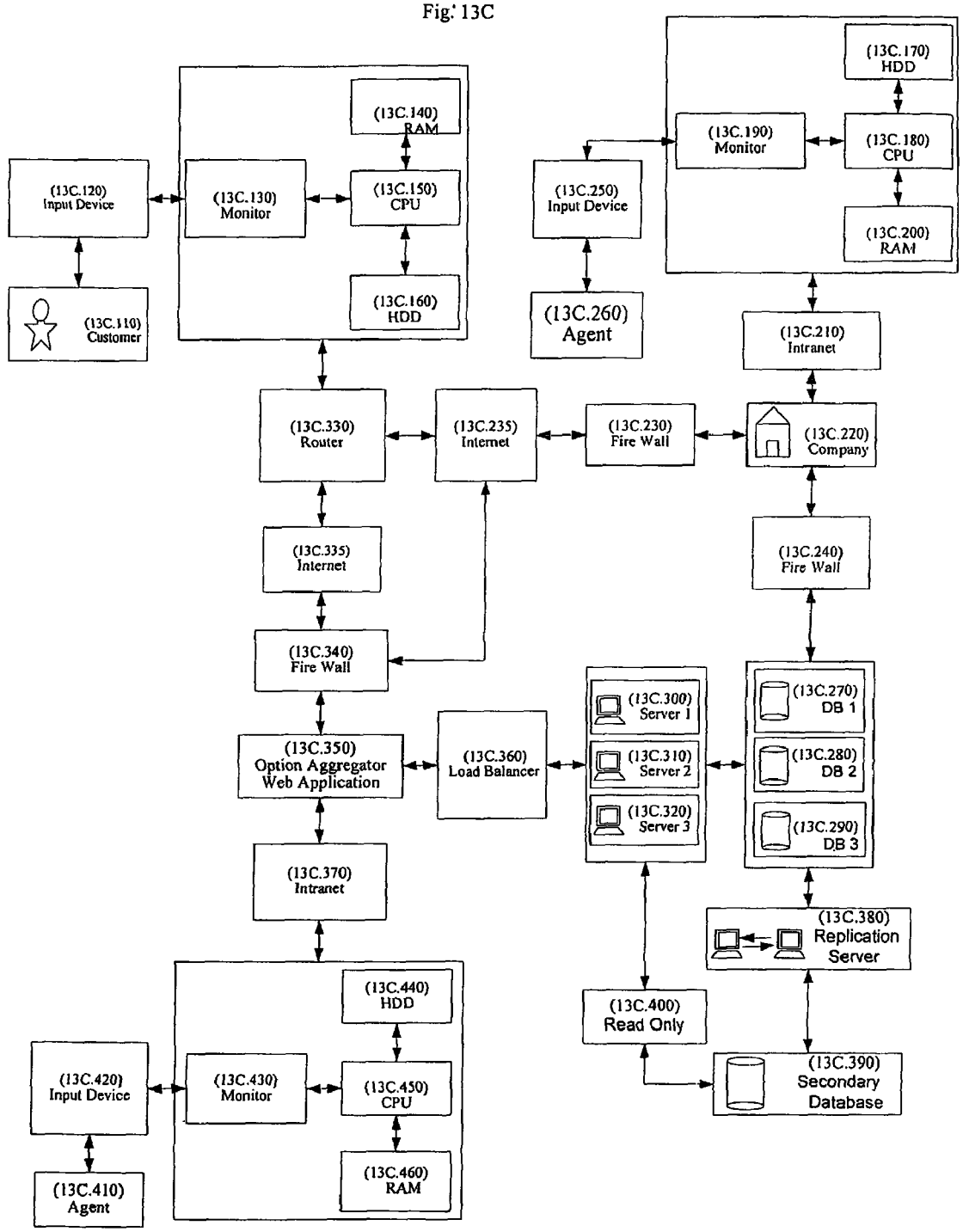

Fig. 17

| (17.100) | Product | P1 | |
|---|---|---|---|
| XYZ Company | | | |
| Product P1 | | Utilization Date | 23rd May |

| (17.200) | Product | P2 | |
|---|---|---|---|
| XYZ Company | | | |
| Product P2 | | Utilization Date | 24th May |

(17.300)  (1)  (2)

| | (1) | (2) |
|---|---|---|
| (1) | Product Purchase Date Time | 14th April 5:24 pm |
| (2) | APO Purchase Date Time | 14th April 5:27 pm |
| (3) | Product Price Paid | $500 |
| (4) | APO Price Paid | $45 |

Fig. 18

(18.100)
    Default Product    P1
    Notify Deadline    7 DTU (of P1)
    Exercise Price:    None
    Default Exercise Price    None (18.200)
    Default Product    P1
    Default Exercise Price    $20
    Notify Deadline    7 DTU (of P1)

|     | (1) Chosen Product | (2) Exercise Price |
|-----|--------------------|--------------------|
| (2) | P1                 | $10                |
| (3) | P2                 | $20                |

(18.300)
    Default Product    P1
    Default Exercise Price    $40

|     |                         | (1) | (2) | (3) | (4) | (5) |
|-----|-------------------------|-----|-----|-----|-----|-----|
| (1) | Notify Deadline (DTU of P1) |     | 30  | 7   | 3   | 1   |
| (2) | Exercise Price          |     | $0  | $20 | $30 | $40 |

(18.400)
    Default Product    P2
    Default Exercise Price    $50

|     |                          |     | (1) | (2) | (3) | (4) | (5) |
|-----|--------------------------|-----|-----|-----|-----|-----|-----|
| (1) | Notify Deadline (DTU of P1) |  |     | 30  | 7   | 3   | 1   |
| (2) | Exercise price as a      | P1  |     | $0  | $20 | $30 | $40 |
| (3) | function of Chosen Product | P2 |     | $10 | $25 | $35 | $50 |

Fig. 29

| (29.100) | Room | | R1 |
| --- | --- | --- | --- |
| Check-in | Check-out | | Room |
| 23rd May | 25th May | | Guest Room |
| 5:00pm | 12:00pm | | |

| (29.200) | Room | | R2 |
| --- | --- | --- | --- |
| Departs | Arrives | | Room |
| 26th May | 28th May | | Guest Room |
| 5:00pm | 12:00pm | | |

*(29.300) (1)*          *(2)*

| | | |
| --- | --- | --- |
| (1) | Room Reservation Date Time | 15th May 5:24 pm |
| (2) | ARO Purchase Date Time | 15th May 5:27 pm |
| (3) | Room Price Paid | $250 |
| (4) | ARO Price Paid | $25 |

Fig. 30

(30.100)
Default Room            R1
Notify Deadline         3 DTC (of R1)
Exercise Price:         None
Default Exercise Price  None (30.200)
Default Room            R1
Default Exercise Price  $10
Notify Deadline         3 DTC (of R1)

|     | (1) Chosen Room | (2) Exercise Price |
| --- | --- | --- |
| (1) | | |
| (2) | R1 | $10 |
| (3) | R2 | $20 |

(30.300)
Default Room            R1
Default Exercise Price  $20

|     | (1) | (2) | (3) | (4) | (5) |
| --- | --- | --- | --- | --- | --- |
| (1) | Notify Deadline (DTC of R1) | 5 | 3 | 2 | 1 |
| (2) | Exercise Price | $0 | $5 | $10 | $20 |

Fig. 32

Room Product (32.100)

Original Reservation

| XYZ Resort | | |
|---|---|---|
| T square | | |
| New York City | | |
| | | Original |
| Check-in | Thu, Dec 7 | Special Preferences |
| Check-out | Sun, Dec 10 | Non-Smoking |
| Room Description | Guest Room | Meeting Room |

(32.200)

ARO Reservation

| XYZ Resort | | |
|---|---|---|
| T square | | |
| New York City | | |
| | | ARO |
| Check-in | Thu, Dec 7 | Special Preferences |
| Check-out | Sun, Dec 10 | Non-Smoking |
| Room Description | Guest Room | Saturday Night Show |

Fig. 33

Room Set (33.100)

Original Reservation

| XYZ Resort | | |
|---|---|---|
| T square | | |
| New York City | | |
| | | |
| Check-in | Thu, Dec 7 | Special Preferences |
| Check-out | Sun, Dec 10 | Smoking |
| Room Description | Guest Room | Saturday Night Show |

(33.200)

ARO Reservation

| XYZ Resort | | |
|---|---|---|
| Near airport | | |
| New York City | | |
| | | |
| Check-in | Fri, Dec 8 | Special Preferences |
| Check-out | Mon, Dec 11 | Non-Smoking |
| Room Description | Business Suite | Meeting Room |

Fig. 34

ARO Reservations

Alternate Room Option          Upgrade Room Option          Flexibility Reward Option
Know More     Buy ARO          Know More    Buy URO         Know More     Buy FRO Your Reservation
                                                           Reservation Details

| Original Reservation | | |
|---|---|---|
| XYZ International | | |
| abc downtown street | | |
| New York | | |
| Check-in Date | Fri, Dec 8 | Special Preferences |
| Check-out Date | Mon, Dec 11 | Non-Smoking |
| Room Description | Guest Room | Saturday Night Show |

Fig. 35

ARO Reservations

Your Reservation

Reservation Details

| Original Reservation | | | Enter Inputs to Search ARO Reservations | |
|---|---|---|---|---|
| | | | Search By | Landmark |
| XYZ International | | | City | New York |
| abc downtown street | | | Check-in Date | 7 Dec |
| New York | | | Check-out Date | 10 Dec |
| Check-in Date | Fri, Dec 8 | Special Preferences | Landmark | T-Squire |
| Check-out Date | Mon, Dec 11 | Non-Smoking | +/- days | +/- 0 days |
| Room Description | Guest Room | Saturday Night Show | Room Type | Bussiness |

( Search ARO Rooms )

Fig. 36

ARO Reservations

Your Reservation

<u>Reservation Details</u>

| Original Reservation | | | Modify your ARO Search | |
|---|---|---|---|---|
| XYZ International<br>abc downtown street<br>New York | | | Search By | Landmark |
| | | | City | New York |
| Check-In Date | Fri, Dec 8 | Special Preferences | Check-in Date | 7 Dec |
| Check-out Date | Mon, Dec 11 | Non-Smoking | Check-out Date | 10 Dec |
| Room Description | Guest Room | Saturday Night Show | Landmark | T-Squire |
| | | | +/- days | +/- 0 days |
| | | | Room Type | Business |

( Search ARO Rooms )

Select ARO Reservation

| ARO Reservation | | | ARO Notify Deadline/ARO Price | | | | |
|---|---|---|---|---|---|---|---|
| XYZ Royal Presidency<br>T square<br>New York City | | | Dec 2<br>3:00pm<br>$10<br>Select | Dec 5<br>4:00pm<br>$25<br>Select | Dec 7<br>12:00pm<br>$35<br>Select | Dec 7<br>ARO Room<br>Check-in | Dec 8<br>Original Room<br>Check-in |
| Check-In Date | Thu, Dec 7 | Special Preferences | | | | | |
| Check-out Date | Sun, Dec 10 | Non-Smoking | | | | | |
| Room Description | Business Suite | Saturday Night Show | | | | | |
| XYZ Residence Inn<br>Near T square<br>New York City | | | | | Dec 6<br>12:00pm<br>$30<br>Select | Dec 7<br>ARO Room<br>Check-in | Dec 8<br>Original Room<br>Check-in |
| Check-In Date | Thu, Dec 7 | Special Preferences | | | | | |
| Check-out Date | Sun, Dec 10 | Non-Smoking | | | | | |
| Room Description | Business Suite | Saturday Night Show | | | | | |
| XYZ Luxury Villas<br>Opp. T square<br>New York City | | | | Dec 3<br>4:00pm<br>$10<br>Select | Dec 6<br>9:00am<br>$25<br>Select | Dec 7<br>ARO Room<br>Check-in | Dec 8<br>Original Room<br>Check-in |
| Check-In Date | Thu, Dec 7 | Special Preferences | | | | | |
| Check-out Date | Sun, Dec 10 | Non-Smoking | | | | | |
| Room Description | Business Suite | Saturday Night Show | | | | | |

Fig. 37

ARO Reservations

Your Reservation

Reservation Details

| Original Reservation | | | ARO Summary | |
|---|---|---|---|---|
| XYZ International<br>abc downtown street<br>New York | | | Choose your Final Room by:<br>4:00pm Tue, Dec 5 | |
| Check-in Date | Fri, Dec 8 | Special Preferences | ARO Price<br>$25 | |
| Check-out Date | Mon, Dec 11 | Non-Smoking | | |
| Room Description | Guest Room | Saturday Night Show | If you don't choose, your Chosen Reservation will be:<br>[ Original Reservation ▼ ] | |
| ARO Reservation | | | | |
| XYZ Royal Presidency<br>T square<br>New York City | | | ( Add more ARO Rooms ) | |
| Check-In Date | Thu, Dec 7 | Special Preferences | [ Edit ARO Price/Deadline ] | |
| Check-out Date | Sun, Dec 10 | Non-Smoking | | |
| Room Description | Business Suite | Saturday Night Show | ( Remove ARO Room ) | |

( Save & Purchase )

Fig. 79

(79.100) Flight        F1

| Departs | Arrives | Flight | Cabin |
|---|---|---|---|
| BOS | ATL | Alpha 661 | Coach |
| 23rd May | 23rd May | 0 Stops | |
| 2:00am | 5:00pm | | |

(79.200) Flight        F2

| Departs | Arrives | Flight | Cabin |
|---|---|---|---|
| BOS | ATL | Alpha 427 | Coach |
| 25th May | 25th May | 0 Stops | |
| 4:30pm | 7:30pm | | |

(79.300)

| | (1) | (2) |
|---|---|---|
| (1) | Ticket Purchase Date Time | 14th April 5:24 pm |
| (2) | AFO Purchase Date Time | 14th April 5:27 pm |
| (3) | Ticket Price Paid | $500 |
| (4) | AFO Price Paid | $45 |

Fig. 80

(80.100)
- Default Flight: F1
- Notify Deadline: 7 DTD (of F1)
- Exercise Price: None
- Default Exercise Price: None (80.200)
- Default Flight: F1
- Default Exercise Price: $20
- Notify Deadline: 7 DTD (of F1)

|     | (1) Chosen Flight | (2) Exercise Price |
|-----|-------------------|--------------------|
| (1) |                   |                    |
| (2) | F1                | $10                |
| (3) | F2                | $20                |

(80.300)
- Default Flight: F1
- Default Exercise Price: $40

|     | (1)                       | (2) | (3) | (4) | (5) |
|-----|---------------------------|-----|-----|-----|-----|
| (1) | Notify Deadline (DTD of F1) | 30  | 7   | 3   | 1   |
| (2) | Exercise Price            | $0  | $20 | $30 | $40 |

(80.400)
- Default Flight: F2
- Default Exercise Price: $50

|     | (1)                           |     | (2) | (3) | (4) | (5) |
|-----|-------------------------------|-----|-----|-----|-----|-----|
| (1) | Notify Deadline (DTD of F1)   |     | 30  | 7   | 3   | 1   |
| (2) | Exercise price as a           | F1  | $0  | $20 | $30 | $40 |
| (3) | function of Chosen Flight     | F2  | $10 | $25 | $35 | $50 |

Fig. 82

AFO Itinerary 1 (82.100)

Onward journey

| Flight | Departs | Arrives |
|---|---|---|
| Alpha993 Coach(U) | BOS 02 May 8:55am | ATL 02 May 11:57am |
| Alpha998 Coach(U) | ATL 02 May 1:00pm | LAX 02 May 3:07pm |

Return journey

| Flight | Departs | Arrives |
|---|---|---|
| Alpha893 Coach(U) | LAX 06 May 8:55am | BOS 06 May 12:15pm |

AFO Itinerary 2 (82.200)

Onward journey

| Flight | Departs | Arrives |
|---|---|---|
| Alpha963 Coach(U) | BOS 04 May 8:55am | ATL 04 May 11:57am |
| Alpha969 Coach(U) | ATL 04 May 2:00pm | LAX 04 May 4:07pm |

Return journey

| Flight | Departs | Arrives |
|---|---|---|
| Alpha793 Coach(U) | LAX 07 May 9:55am | BOS 07 May 1:15pm |

Fig. 83

Onward journey (83.100)

| (A13.110) Initial Flight Segment | Flight | Departs | Arrives |
|---|---|---|---|
| | Alpha567 Coach(U) | BOS 02 May 8:55am | ATL 02 May 11:57am |
| | Alpha678 Coach(U) | ATL 02 May 1:00pm | LAX 02 May 3:07pm |

| (A13.120) Option Flight Segment | Flight | Departs | Arrives |
|---|---|---|---|
| | Alpha123 Coach(U) | BOS 03 May 8:55am | LAX 03 May 12:07pm |

Return journey (83.200)

| (A13.210) Initial Flight Segment | Flight | Departs | Arrives |
|---|---|---|---|
| | Alpha233 Coach(U) | LAX 06 May 8:55am | BOS 06 May 6:15pm |

Fig. 84

Onward journey (84.100)

Leg 1

| (A14.110) Initial Flight Leg | Flight | Departs | Arrives |
|---|---|---|---|
| | Alpha493 Coach(U) | BOS 02 May 8:55am | ATL 02 May 11:57am |

Leg 2 (84.200)

| (A14.210) Initial Flight Leg | Flight | Departs | Arrives |
|---|---|---|---|
| | Alpha398 Coach(U) | ATL 02 May 1:00pm | LAX 02 May 3:07pm |

| (A14.220) Option Flight Leg | Flight | Departs | Arrives |
|---|---|---|---|
| | Alpha253 Coach(U) | ATL 02 May 6:00pm | LAX 02 May 8:07pm |

Return journey (84.300)

Leg 1

| (A14.310) Initial Flight Leg | Flight | Departs | Arrives |
|---|---|---|---|
| | Alpha343 Coach(U) | LAX 06 May 8:55am | BOS 06 May 6:15pm |

Fig. 85

Itinerary Summary

Alternate Flight Option  
Know More    Buy AFO

Upgrade Ticket Option  
Know More    Buy UTO

Smooth Travel Service  
Know More    Buy STS

Your Itinerary

Onward Journey

|  | Flight | Departs | Arrives |
|---|---|---|---|
| Original Flight | Alpha 993 Coach(U) | BOS 8:55am May 2 | ORD 11:57am May 2 |
|  | Alpha 892 Coach(U) | ORD 1:00pm May 2 | ATL 3:07pm May 2 |

Return Journey

|  | Flight | Departs | Arrives |
|---|---|---|---|
| Original Flight | Alpha 964 Coach(U) | ATL 9:55am May 7 | ORD 11:50am May 7 |
|  | Alpha 857 Coach(U) | ORD 1:00pm May 7 | BOS 4:07pm May 7 |

Fig. 86

AFO Reservation

Your Itinerary

Search · Select AFO · Payment · Confirm

Onward Journey

| | Flight | Departs | Arrives |
|---|---|---|---|
| Original Flight | Alpha 993 Coach(U) | BOS 8:55am May 2 | ORD 11:57am May 2 |
| | Alpha 892 Coach(U) | ORD 1:00pm May 2 | ATL 3:07pm May 2 |

Enter inputs to Search for AFO Flights

| | |
|---|---|
| From | BOS |
| To | ATL |
| Departs on | May ▼  1 ▼ |
| Depart Time | Morning ▼ |
| +/- days | +/- 0 days ▼ |
| Stops | 1 ▼ |

( Search AFO Flights )

Return Journey

| | Flight | Departs | Arrives |
|---|---|---|---|
| Original Flight | Alpha 964 Coach(U) | ATL 9:55am May 7 | ORD 11:50am May 7 |
| | Alpha 857 Coach(U) | ORD 1:00pm May 7 | BOS 4:07pm May 7 |

Click here to Get AFO Flight for Return Journey

Fig. 87
AFO Reservation

Your Itinerary

Search  Select AFO  Payment  Confirm

Onward Journey

| | Flight | Departs | Arrives | Enter inputs to Search for AFO Flights | |
|---|---|---|---|---|---|
| Original Flight | Alpha 993 Coach(U) | BOS 8:55am May 2 | ORD 11:57am May 2 | From | BOS |
| | | | | To | ATL |
| | | | | Departs on | May ▾  1 ▾ |
| | Alpha 892 Coach(U) | ORD 1:00pm May 2 | ATL 3:07pm May 2 | Depart Time | Morning ▾ |
| | | | | +/- days | +/- 0 days ▾ |
| | | | | Stops | 1 ▾ |

( Search AFO Flights )

Return Journey

| | Flight | Departs | Arrives | |
|---|---|---|---|---|
| Original Flight | Alpha 964 Coach(U) | ATL 9:55am May 7 | ORD 11:50am May 7 | Click here to Get AFO Flight for Return Journey |
| | Alpha 857 Coach(U) | ORD 1:00pm May 7 | BOS 4:07pm May 7 | |

Select AFO Flight for Onward Journey

*price per person includes taxes and fees

| AFO Flight | Departs | Arrives | AFO Notify Deadline/AFO Price | | | |
|---|---|---|---|---|---|---|
| Alpha 674/625 Stop 1 | 9:00am 1 May BOS | 3:07pm 1 May ATL | April 28 6:00pm $25 Select | April 30 11:00pm $50 Select | May1 9:00am AFO Flight Departs | May1 8:55am Original Flight Departs |
| Alpha 443 Nonstop | 10:00am 1 May BOS | 1:00pm 1 May ATL | April 28 6:00pm $25 Select | April 30 8:00pm $45 Select | May1 10:00am AFO Flight Departs | May1 8:55am Original Flight Departs |
| Alpha 333/369 Stop 1 | 11:00am 1 May BOS | 7:05pm 1 May ATL | April 28 6:00pm $30 Select | April 28 8:00pm $40 Select | May1 11:00am AFO Flight Departs | May1 8:55am Original Flight Departs |

Fig. 88

AFO Reservation

Search  ıSelect AFO  Payment  Confirm

Your Itinerary (Includes AFO Flight on Onward Journey)

Onward Journey                                                                    See Details

| | Flight | Departs | Arrives | AFO Summary |
|---|---|---|---|---|
| Original Flight | Alpha 993 Coach(U) | BOS 8:55am May 2 | ORD 11:57am May 2 | Select your final Flight by: Apr 30 11:00am |
| | Alpha 892 Coach(U) | ORD 1:00pm May 2 | ATL 3:07pm May 2 | AFO Price $50 |
| | | | | If you don't select, your chosen flight will be: [ Original Flight ▼ ] |
| AFO Flight | Alpha 674 Coach(U) | BOS 9:00am May 1 | ORD 11:57am May 1 | ( Change AFO Flight ) |
| | Alpha 625 Coach(U) | ORD 1:00pm May 1 | ATL 3:07pm May 1 | [Edit AFO Deadline/Price] ( Remove AFO Flight ) |

Return Journey

| | Flight | Departs | Arrives | Enter Inputs to Search for AFO Flight | |
|---|---|---|---|---|---|
| Original Flight | Alpha 964 Coach(U) | ATL 9:55am May 7 | ORD 11:50am May 7 | From To Departs on | [ATL] [BOS] [May ▼] [7 ▼] |
| | Alpha 857 Coach(U) | ORD 1:00pm May 7 | BOS 4:07pm May 7 | Depart Time +/- days Stops | [Morning ▼] [+/- 0 days▼] [1 ▼] |
| | | | | ( Search AFO Flights ) | |

( Save & Purchase )

Crucial Economic Factors

- Incremental Revenue generation
- Uncertainty of future demands.
- Fixed and variable costs
- Loss due to future demand shortages
- Customer dissatisfaction over time consuming search/utilization processes
- Inventory optimization with knowledge of future demands.
- Need to develop competitive advantage
- Customer Attrition Rate (96.200)

Customer: Value Elements

- Need for recurring product utilization
- Hassles in the process of purchasing product time and again (96.300)

Company Economic Factors

- Incremental Revenue generation
- Uncertainty of future demands.
- Fixed and variable costs
- Loss due to future demand shortages
- Inventory optimization with knowledge of future demands.
- Need to develop competitive advantage
- Customer Attrition Rate (96.400)
Value Element: Cyclic Need for Product Utilization

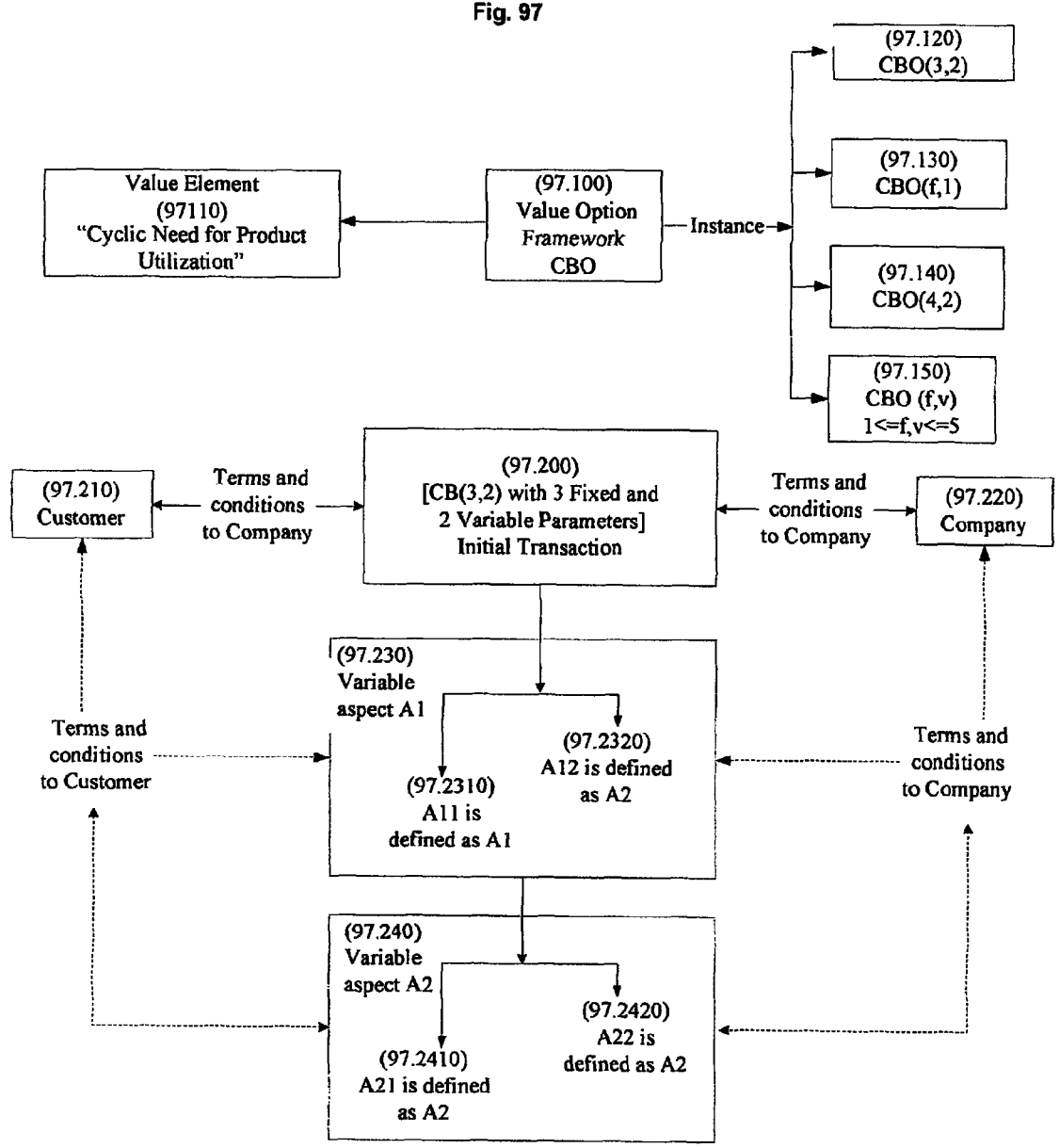

SYSTEM FOR CONCURRENT OPTIMIZATION OF BUSINESS ECONOMICS AND CUSTOMER VALUE

CROSS-REFERENCE TO RELATED APPLICATIONS AND PRIORITY CLAIM

This application is a continuation-in-part, and claims the benefit under 35 USC 120, of U.S. patent application Ser. No. 11/506,451, filed Aug. 18, 2006, which is a continuation-in-part of 11/474,115, filed Jun. 23, 2006, which is a continuation-in-part of U.S. patent application Ser. No. 10/973,802 filed Oct. 24, 2004 and titled "System For Concurrent Optimization Of Business Economics And Customer Value Satisfaction," and which, in turn, claims the benefit, under 35 USC 119(e) of prior provisional patent application Ser. No. 60/514,248, filed Oct. 24, 2003, titled "Real-Time Optimization Across Integrated Customer Preferences and Company Economics Through Formulation of Value Options That Maximize Value of Both Customer and Company," all of which are incorporated by reference. This application is also a continuation-in-part and claims the benefit under 35 USC 120, of each of international applications PCT/US2007/018290, PCT/US2007/014654 and PCT/US2007/014653, both filed Jun. 23, 2007 and incorporated by reference herein.

FIELD OF INVENTION

This invention relates to a system and method for matching customer preferences with vendor products and services in any industry, and then dynamically managing the on-demand and optimally customized delivery of such business services or products. More particularly, it relates to methods and systems for customizing and optimizing a company's products and services to individual customers in way that concurrently enhances customer value and overall business performance.

BACKGROUND

Historically, "companies" (a term defined below) and their customers often have done business across a gap, so to speak. Product or service offerings by a company and the customers' desired product or service do not fully match. In part, this gap is a manifestation of the facts that (1) companies have an incomplete grasp of customer needs, their relative preferences and the pricing utilities customers attach to those preferences (which utilities, equating to the customer's willingness to pay, are dynamic) and (2) a company's costs, profits and inventory (which may control what it can offer on a timely basis) are also dynamic. However, it is also in major part a manifestation of the lack of information technology tools, which can close the gap. To collect dynamic customer and company data and then employ those dynamic data to close the gap is a complex technical problem.

Generally, the customer is treated as an individual and sales terms are customized only when the cost of negotiation is justified—for very large transactions. Many products and services, though, represent complex, multi-faceted offerings and customers weigh their preferences for product features differently at different times. A customer might care more about cost one day and more about availability or delivery time or warranty if queried a few days or weeks later, to use some basic trade-offs as examples. Generally, a company's product comprises many value elements, (explained later) all of which are bundled together to be sold as a single product. But, not every customer values all the aspects of a product equally or needs all. Every customer places a different value (which may be a function of time and situation) on each aspect of a product. With features bundled together in a product, companies end up either incurring costs to sell something to a customer that he does want or lose a customer because the extra undesired value elements forced the product price too high for the customer.

The underlying problem is both that customer demands are incompletely understood and that such demands can change quickly, whereas a company's productive capacity or service often does not have the same dynamic time frame and is supported by a relatively fixed (in the short term) capacity and supply chain.

Consider a situation that affects an interaction between the customer and the company. While buying products, many times, customers are unsure of their exact needs or expect their needs to change (after purchase and/or before they utilize the product). In such cases, customers may prefer to have flexibility to alter their purchases to accommodate their needs. In several industries, customers have to select and confirm the products at the time of purchase. Some industries do allow customers to return or change their purchased orders and/or its features within a defined time frame and with or without penalties. For industries where products sold are of high value and/or perishable nature, change penalties are quite high or changes are not allowed. For example, airline ticket booking, hotel reservation, car rental, automobile sales, special events, real estate and so forth.

In the airline industry, customers usually buy tickets one to four weeks in advance (of the premeditated travel date) and are often unsure of their exact travel plans at the time of purchase. But, customers may not want to wait until the last minute (or till they determine their exact plans) to book flights as the flights may become unaffordable or unavailable as the departure date approaches. So, customers try to make the purchase decisions based on their best estimate of travel plans, and hope that their reservations would match their eventual travel needs. Such guess work often creates problems, as needs change and customers end up with bookings at variance with their desires.

On the other side of the screen, often, companies face unequal supply-demand proposition for their products. For many products, the supply keeps ahead of the demand even after all sorts of advertisements and marketing strategies. Companies are not able to efficiently utilize the surplus supply (especially in case of products and/or services that are perishable or prone to quick obsolescence), causing millions of dollars in lost opportunity and costs. Continuing with the airline example, most US airlines experience an average load factor of about 80% or only about 80% of the seats get used. The rest 20% seals fly empty and contribute almost nothing (if any) to the incoming revenue. A significant portion of this surplus capacity could be used to satisfy the un-fulfilled flexibility needs of at least some customers, who may have wanted to alter their bookings to include one or more flight that had a surplus capacity. However, today, travelers who want to change their flights are unable, hesitant or unhappy to do so because of efforts required, change fees, higher fares, unavailability of desired flights (or fares) or any combination of such factors. A good chunk of these customers would be willing to pay more (as per their needs) to get desired seats. But the entire change process creates an embarrassing situation for a customer and seldom drives a satisfactory experience. This represents a mismatch in customers' needs and airline's offering. In a nutshell, airline has perishable seats that customers desire but the current system does not allow the customer to get that seat at a price that would benefit both.

From the above discussion, it is clear that the surplus capacity of the company may be mapped or utilized to satisfy customers' desire or preference for flexibility. In the context of the airline industry, the surplus capacity in flights may be mapped or utilized to satisfy customers' desire for travel flexibility. But so far, there is no existing system and method, which can allow a company to accomplish this optimally.

Today, airlines do not have any mechanism to allow such flexibility or changes in customer tickets at an individual level at conditions that would optimally satisfy both the parties. Instead, airlines try to deal with all such customers in a rather mechanistic way (or one cancellation/change policy) leading to unsatisfied customer demand and unused airline capacity. Besides the airline industry, there are several other industries (as mentioned above) that either do not allow flexibility or follow processes that involve high costs and/or demand significant efforts on the customer's end.

What is needed is a mechanism that allows customers to satisfy their need for flexibility at terms that concurrently benefit at least two of companies, their customers and any other entity. Indeed, there is no system or method available that can be applied to all the above industries, and many more, and help companies to match the availability of their products to their customers' preferences, let alone while concurrently maximizing the benefits to at least two of the company, its customers and any other entity involved in the transaction.

A technology platform (i.e., system) and methodology thus are needed for customizing, in an optimal way, a match between a company's cost and ability to provide flexibility to customers in buying products/services with the individual customers' relative preferences and utilities. In the airline industry example, a technology platform (i.e., system) and methodology thus are needed for customizing, in an optimal way, a match between an airline's cost and ability to provide travel flexibility to customers with the individual customer's preferences and utilities for travel flexibility.

More particularly, a system and methodology are needed which support optimal customization of service offerings in the airline and similar industries. If such a match could be made, both company and customer would benefit. The customer would be more satisfied and the company (both in short term and long term) will be more profitable. A win-win scenario is created rather than a zero sum game.

SUMMARY

In response to recognition of this need, shown herein a system and method that allows businesses to determine their customers' preferences (implicitly or explicitly, in advance or in quasi-real-time) and to dynamically integrate these preferences with internal company economics to concurrently maximize value for both customers (i.e., their purchase utilities) and the company (i.e., its profitability).

A framework of systems and methods are shown that allows businesses to determine their customers' preferences (implicitly or explicitly, in advance or in quasi-real-time) for flexibility in purchasing products and to dynamically integrate these preferences with internal company operations to concurrently maximize value for at least two of the customers (individually or as a group, their purchase utilities), the company (i.e., its profitability) and any other entity involved.

In general, it is an aspect of the system and method that a business determines a customer's preferences (flexibilities and associated relative utilities) in great detail and in real-time or quasi-real-time from direct inquiries (explicitly) and/or past interaction (implicitly), before or while engaging in a sales transaction. When a sales transaction is executed, those preferences are then integrated with internal company operations and economics (costs, capacities, constraints, inventories, etc.). Values are then determined for product or service options to be offered to the customer based on integrated (i.e., aggregated) customer preferences and company economics. On one hand, these value options allow companies to reward or charge customers for their flexibilities with respect to preferences. On the other hand, these value options enable companies to maximize their revenues and/or profitability by unbundling their products and services, and best matching the offerings with a customer's expressed preference/cost tradeoffs. Since the customer gets something matching more closely his or her preferences than a "one size fits all" or small, fixed choice approach, customer purchase utility is increased and the customer is pleased to receive a product or service tailored to the customer's preferences. A company may charge for the purchase of some product options. So, customers pay for options made available to them and the company does not have to invest in offering everyone features that only a minority of customers want.

Accordingly, there is shown a system and method for collecting such customer preference information and pricing corresponding options and presenting options to the customer, receiving customer choices, and completing a sale. The collection steps may be implemented over the global Internet and its World Wide Web. However, other communication media may be used, as well, for all or part of the system or steps. For example, customer information may be taken over the phone or in person or via any other means. And a sale can similarly be completed by telephone or in person.

The system and method may also provide after-sale follow-up and implement execution of option terms purchased by the customer. An engine may be provided for this purpose. The engine may be a processor(s) that is programmed to execute a suitable event response algorithm. Each procedure for event response (related to a purchased option) may be custom programmed to implement the desired operations of the company or there may be provided a library of procedures generally applicable to an industry. The library procedures may be used by the company with or without customization. The detection of the contingency triggering the procedure may in some instances be made automatic, as by interconnection with the company's information management systems, or it may be externally or manually supplied.

The APO VOF can concurrently create benefits for at least two of the company, the customers and any other entity involved or any combination thereof. One aspect of the invention comprises a computer-implemented system and method for a company to provide options on products where in a computer-implemented service is operated that provides a data store containing data representing, with respect to at least one product, at least one option offered by a company and operating a computer-implemented system that delivers to a customer an option to utilize up to n of m selected products, where n is less than m. Information pertaining to said option is recorded in a data store. In addition, a system and method performed, is operated to define each of the n Chosen Products, whereby after each of the n Chosen Products is defined, the customer can utilize said Chosen Product. The information pertaining to said defined products is recorded in a data store. The system and method for a company to award two or more confirmed products to a customer, where in said customer is allowed to utilize fewer than the awarded products. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of invention relates to a system and method for implementation of APO VOF in conjunction with other VOFs. The grouping may enhance customers' experience, and may comprise of operating a system that delivers a first option to at least a "first customer" to utilize up to n of m selected products for said first customer, where n is less than or equal to m; operating a system that delivers a second option to at least a "second customer" to utilize up to k of p selected products, where k is less than or equal to p; recording the information pertaining to said options in a data store; operating a system to define each of the k Chosen Products, whereby after each of the k Chosen Products is defined, said "second customer" can utilize said Chosen Product; operating a system wherein a company defines t Chosen Product(s) for said "first customer" after each of said k Chosen Products is defined, wherein after each of said t products is defined, said first customer can utilize said defined product, where t is less than or equal to n and recording the information pertaining to said defined products in a data store. The system may contain one or more data processors and these data processors may or may not be the same. In one implementation of the invention said company may include more than one entity. It is another aspect of the invention that the company may not be the seller of any of said products. In another implementation, the company may not be the seller of any of said options. In yet another implementation, the company may offer at least one of said options. In above invention, the company may operate at least one of said systems. However, it is possible that at least one entity other than said company operates at least one of said systems. The systems for first and second options may operate independently. The systems for first and second options may also operate in conjunction with each other. The above mentioned acts may be performed for a multiplicity of at least one of said first or second customers and further includes combining together at least one of each of said first and second customers to formulate at least one group with at least one complementary set of options. After delivery of any of said first or second options, at least one of said m or p products may be available for use by the company. At least one of said m or p products may also be available for use by an entity other than said company. The company or an entity other than said company may define, at one or more times, at least one of said k Chosen Products. The second customer may also define, at one or more times, at least one of said k Chosen Products. The company or an entity other than said company may select, at one or more times, at least one of said m or p products. However, the first customer may select, one or more times, at least one of said m products and/or the second customer may select, one or more times, at least one of said p products. At least one of the company or an entity other than said company delivers to at least one of said first or second customers, at one or more times, one or more terms and conditions associated with the first or second options, respectively. It is also possible that the company may receive from at least one of the first or second customers, at one or more times, an indication of one or more terms and conditions associated with said first or second options, respectively. In another implementation, said first or second customers may be same. In yet another implementation, none of the options may include a notification deadline condition. However, in another implementation, at least one of said options may include at least one notification deadline condition. The notification deadline condition may be different for said first and second options. The company may allocate at least one product to at least one entity other than said company, and said entity delivers at least one of said first or second options on at least one of said allocated products. It is another aspect of the invention that at least one of said n or k Chosen Products may include at least one product other than said m or p products, respectively. No payment transaction may be executed between the company and any of said first or second customer in connection with the option and the selected products. In another implementation of the invention, however, at least one payment transaction may be executed between the company and at least one of said first or second customer and said payment transaction may include a soft value. In some implementations of the invention, at least one of said m or k products may be released for reuse by the company. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention comprises a computer-implemented system and method for a company to define customer preferences whereby a data store is provided including relevant information regarding products; operating a computer-implemented system that defines customer preferences regarding at least utilizing up to n of m selected products, where n is less than m and recording the information pertaining to said preferences in a data store. The system may contain one or more data processors and these data processors may or may not be the same. A computer-implemented system is operated that enables use of said preferences to concurrently optimize value for customers and company. The preferences may be utilized in delivering at least one option to a customer to utilize up to n of m selected products, where n is less than m and operating a system to define each of said n Chosen Products, whereby after each of said n Chosen Products is defined by the company, the customer can utilize said Chosen Product and recording the information pertaining to at least one of said option or said defined products in a data store. The preferences may be defined implicitly. The preferences may be also be defined explicitly by either of the customer or the company or both. The preferences may be taken at any time during the purchase of the product, prior to and/or after the product has been purchased. The optimization of value may be for at least one customer other than the customers whose preferences are received. The concurrent optimization may include optimization of value for at least two of the customers, a company providing said options and at least one entity other than the company providing said options. Said preferences may include one or more preferences. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

In yet another aspect of the invention, a computer-implemented system and method for a company to provide options on products wherein a computer-implemented service allows a customer to receive an option to utilize each of the m selected products including at least one practically constrained product, where m is greater than or equal to 2, said m products are selected in the course of related transaction(s); it will not be possible for the customer to utilize all said m products due to said practical constraints and recording the information pertaining to said option in a data store, is dealt with. The practical constraints may include the timing constraints and/or the location constraints. The system may contain one or more data processors and these data processors may or may not be the same. The related transaction may be at least one transaction. Said related transaction may also include a monetary value. The customer may not be able to utilize at least one product due to practical constraints. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention comprises of a computer-implemented system and method for a company to provide options on products wherein a computer-implemented service allows a customer to receive an option to utilize up to n of m selected products, where is greater than or equal to 2 and n is less than m and recording the information pertaining to said option in a data store; operating a system, whereby the company may allow the customer to utilize all the m products provided specified conditions are satisfied, said conditions including that the products are received in the course of related transaction(s) and there is at least one payment transaction between the company and the customer related to said products wherein such payment is made after said option has been granted. The information is recorded pertaining to said m products in a data store. The system may contain one or more data processors and these data processors may or may not be the same. The customer may select said m products together. The customer may also select the products prior to utilizing the penultimate product. The company may reserve the right to limit the customer to n products on a stated notification date. The customer may select said m products together. The payment transaction may comprise one or more transactions apart from the initial interaction if said customer utilizes all the awarded products. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

One more aspect of the invention comprises a computer-implemented system and method for a company to provide options on products wherein a computer-implemented service allows a customer to receive an option to utilize up to n of m selected products, provided specified conditions are satisfied, said conditions including that the company may notify the customer, on a stated notification date, that the customer is limited to utilize n out of said m products, wherein n is less than m and recording the information pertaining to said option in a data store; operating a system to define each of said n products, whereby after each of said n products is defined, the customer has the right to utilize said defined product. The information is recorded pertaining to said defined products in a data store. The system may contain one or more data processors and these data processors may or may not be the same. The company may allow the customer to define said n products on or before a stated date. The company may also reserve the right to take back any m minus n products after the stated date. The company may also limit the customer to n products once the customer expresses his/her preference for said n products. Said on a stated notification date includes on and before the stated notification date. However, said on a stated notification date may also include on and after the stated notification date. The company may or may not limit the customer to said n products on the notification date. In case the company limits the customer, said limitation is on at least one product. However, in some other implementations, the company and/or an entity other than the company may not limit the customer to said n products on the notification date. There may be at least one notification date and the customer and/or the company may determine said notification date. The company may notify the customer on or before a notification date. However, the company may also notify the customer after a notification date. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

In the above mentioned different aspects of the invention and in other aspects of the invention not mentioned above, company may be a seller of at least said product. In another implementation of the APO VOF the company may not be a seller of said product. The system may contain one or more data processors and these data processors may or may not be the same. Delivering said option may occur in relation to a customer purchasing at least one product. In another aspect of the invention, the product purchase may be for a product other than a product for which an option is delivered. Said delivery of option may be an electronic delivery of option. Delivering a said option may occur in relation to a customer purchasing at least one product other than the product for which an option is delivered. After delivery of said option, at least one of said m products may be available for use by the company. At least one of said m products may be available for use by an entity other than said company. Said m products may be selected in at least one transaction. The company may include more than one entity. The company may select at least one of said m products for the customer. In another aspect of the invention, at least one of said m products may be from more than one company. The n products (mentioned above) may be defined in at least one transaction and said n products may be defined after the option is delivered to the customer. The n Chosen Products may include at least one product other than said m products. Said m and/or n products may be redefined by the company, the customer, an entity other than the company and/or any combination thereof. Similarly, value of in and/or n may be redefined by the company, the customer, an entity other than the company and/or any combination thereof. In another implementation of the invention, at least one of said m products is released for reuse by the company. The Released Product may be utilized to generate revenue or other value without reusing said Released Product.

It is another aspect of the invention that in the system and method of this invention, at least one of the company or an entity other than said company may deliver to the customer, at one or more times, one or more terms and conditions associated with the option. Another aspect of the invention may include that the company may receive from the customer, at one or more times, an indication of one or more terms and conditions associated with the option. The company may define, at one or more times, one or more of the n Chosen Products. The customer may also define, at one or more times, one or more of the n Chosen Products. The company may identify to the customer at least one eligible product for the option and allows the customer to select at least one of said m products from the eligible products.

In some implementations, there may be no payment transaction executed between the company and the customer in connection with the option and the selected products. However, in another implementation, at least one payment transaction may be executed between the company and the customer and said payment transaction may include a soft value. In some implementations, the option may not include a notification deadline condition. However, in some other implementations of the APO VOF, the option may include at least one notification deadline condition. If the customer, company, an entity other than the company and/or any combination thereof fails to satisfy a stated notification deadline condition, at least one of said m products may be defined as the Chosen Product. The customer may receive the option included in the Product Price that does not separately identify a price for the inclusion of said option within the total Product Price.

It is another aspect of the invention that in the system and method of this invention, the company may allocate at least one product to at least one entity other than said company, and said entity delivers said option on at least one of said allocated products. In another case, the company may have allocated one or more products to another entity apart from said company, and said entity may sell back at least one allocated product to said company or to at least one entity other than the company or both. The entity other than said company may deliver the option on at least one of said allocated products. The allocation of products may include at least one condition requiring return of one or more products.

In one or more implementations of the APO VOF, the above said systems may be same and at least one company may operate at least one of said systems. The customer may interact with the service via at least one web site and/or the customer may interact with the system assisted by at least one operator. The customer may also interact with another entity operating the system other than the company. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

APO VOF may be implemented in any industry, for example, let us consider the airline industry. One of the implementations of the invention in the airline industry comprises a computer-implemented system and method for an airline to provide options on flights where in a computer-implemented service is operated that provides a data store containing data representing, with respect to at least one flight, at least one option offered by an airline and operating a computer-implemented system that delivers to a customer an option to utilize up to n of m selected flights, where n is less than m. Information is recorded in a data store, pertaining to said option. In addition, a system is operated to define each of the n Chosen Flights, whereby after each of the n Chosen Plights is defined, the customer can utilize said Chosen Flight. The information pertaining to said defined flights is recorded in a data store. The system may contain one or more data processors and these data processors may or may not be the same. The method for an airline to award two or more confirmed flights to a customer, where in said customer is allowed to utilize fewer than the awarded flights. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another example of implementation of APO VOF in the airline industry, this system and method may comprise of operating a system that delivers a first option to at least a "first customer" to utilize up to n of m selected flights for said first customer, where n is less than or equal to m; operating a system that delivers a second option to at least a "second customer" to utilize up to k of p selected flights, where k is less than or equal to p; recording the information pertaining to said options in a data store; operating a system to define each of the k Chosen Flights, whereby after each of the k Chosen Flights is defined, said "second customer" can utilize said Chosen Flight; operating a system wherein an airline defines t Chosen Flight(s) for said "first customer" after each of said k Chosen Flights is defined, wherein after each of said t flights is defined, said first customer can utilize said defined flight, where t is less than or equal to n and recording the information pertaining to said defined flights in a data store. The system may contain one or more data processors and these data processors may or may not be the same. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

In all the cases and aspects of the invention mentioned herein, the company may be, for example, an airline, a hotel, a car rental company, travel company and the product may, for example, correspond to a flight, a room, a Car and a Travel Package, respectively. The APO VOF may be implemented in any industry including, but not limited to, the airline, hotel, car rental, travel, media entertainment, cruise, real estate, financial services, automobile sales, computer and other retail sales. Another aspect of the invention is that one or more aspects or elements or examples mentioned herein of the invention may be combined in one or more ways to utilize the invention.

Also shown are a number of novel systems generated by the disclosed methodology, and related algorithms which may be implemented on the disclosed platform or any other suitable platform, thus constituting new methods and systems. Only a few value option frameworks (VOFs) and their associated methods and systems for delivery of these VOFs are presented in detail, as those skilled in the art will readily appreciate how to implement other VOFs from these teachings. Other features and advantages of the invention will be apparent from the following description and the appended claims, and those skilled in the art will appreciate that the various elements and limitations shown herein may be combined in ways other than those shown in the specifically illustrated examples, which are not intended to be limiting. The disclosure is intended to convey that the inventors contemplate and intend to protect these various combinations and permutations of the elements which are shown, as though each of the arrangements of elements were specifically depicted.

BRIEF DESCRIPTION OF THE DRAWING

FIG. 13C is a diagrammatic illustration of one of the network system to implement the system;

FIG. 17 is a diagrammatic representation of APO Products and Initial Transaction associated with an example of APO (2, 1) instance:

FIG. 18 is a diagrammatic representation of various scenarios depicting different terms and conditions associated with an example of APO (2, 1) instance;

FIG. 29 is a diagrammatic representation of ARO Rooms and Initial Transaction associated with an example of ARO (2, 1) instance;

FIG. 30 is a diagrammatic representation of various scenarios depicting different terms and conditions associated with an example of ARO (2, 1) instance;

FIG. 32 is a diagrammatic representation of ARO implementation at the Room Product Level;

FIG. 33 is a diagrammatic representation of ARO implementation at the Room Set Level;

FIGS. 34, 35, 36 and 37 are simulated screen shots of four web screens illustrating how Initial Interaction between a hotel and a customer may take place in the ARO VOF:

FIG. 44 to FIG. 75 intentionally left blank;

FIG. 79 is a diagrammatic representation of AFO Flights and Initial Transaction associated with an example of AFO (2, 1) instance;

FIG. 80 is a diagrammatic representation of various scenarios depicting different terms and conditions associated with an example of AFO (2, 1) instance;

FIG. 82 is a diagrammatic representation of AFO implementation at the Itinerary Level;

FIG. 83 is a diagrammatic representation of AFO implementation at the Segment Level;

FIG. 84 is a diagrammatic representation of AFO implementation at the Leg level;

FIGS. 85, 86, 87 and 88 are simulated screen shots of four web screens illustrating how Initial Interaction between an airline and a customer may take place in the AFO VOF;

FIG. 96 is a diagrammatic illustration of company economic factors and mapping between customer dynamics and company economic factors;

FIG. 97 is a partially-diagrammatic, partially-flow diagram representing the structure for creating a CBO Value Option Framework;

DETAILED DESCRIPTION

Figure 1:
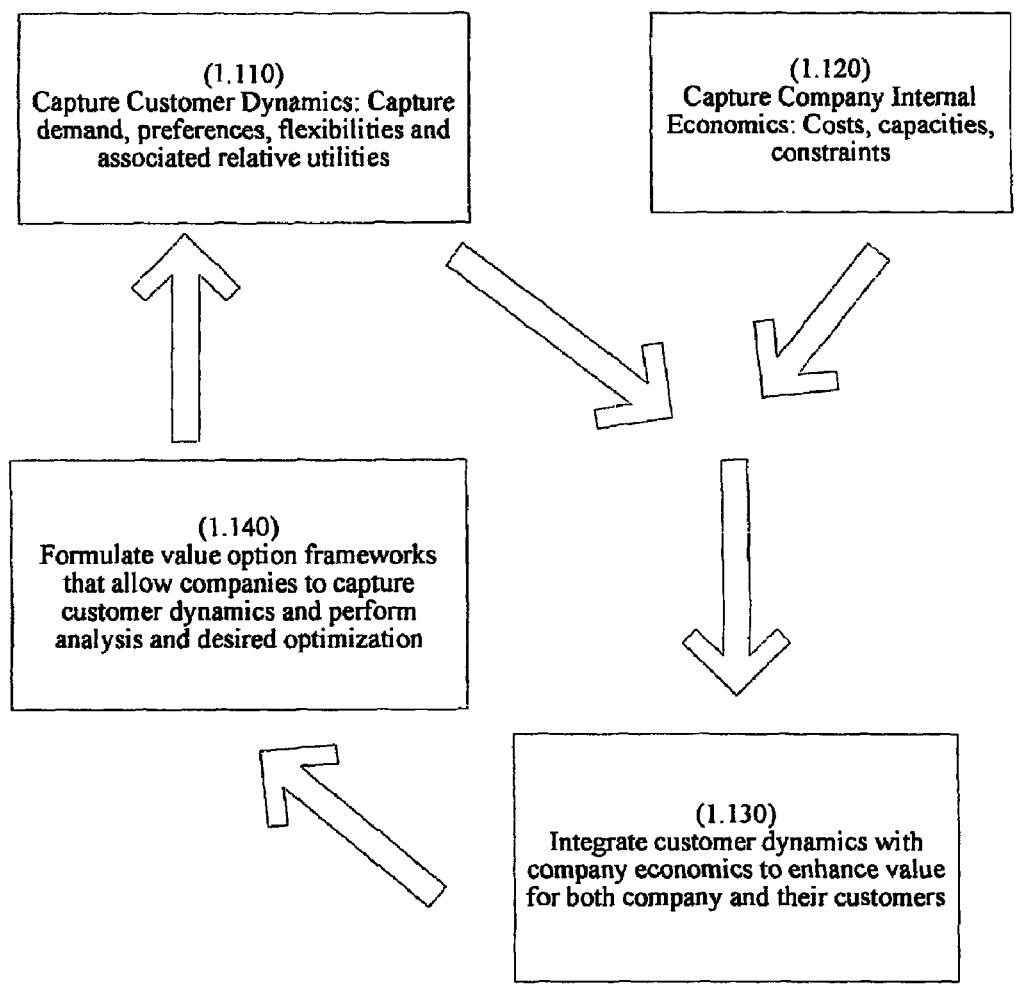
FIG. 1 is a diagrammatic illustration, in a high-level flow chart, of a method of achieving the optionally customized sale of products.

Selected illustrative embodiments according to the invention will now be described in detail, as the inventive concepts are further amplified and explicated. These embodiments are presented by way of examples only. In the following description, numerous specific details are set forth in order to provide enough context to convey a thorough understanding of the invention and of these embodiments. It will be apparent, however, to one skilled in the art, that the invention may be practiced without some or all of these specific details. In other instances, well-known features and/or process steps have not been described in detail in order to not unnecessarily obscure the invention. One should not confuse the invention with the examples used to illustrate and explain the invention. The features and advantages of the invention may be better understood with reference to the drawings and discussions that follow.

The terms and definitions given below are needed to understand the following sections. Some of the key terms used in the description have been put in italics to enhance the readability.

The method and system taught herein connect customers directly to a manufacturer or service provider and the rest of the supply chain, herein referred to as "channel partners." The term "manufacturer" is intended to include vendors of services as well as vendor of goods. Hereafter, the manufacturer and channel partners will be collectively referred to as a "company" or "companies" and all of those terms will be appreciated to include sole proprietorships, partnerships, corporations, option aggregators or any other legal entity or combination thereof. The term "entity" includes the singular and plural and will include individual(s), group of individuals, company, companies, sole proprietorships, partnerships, corporations or any other legal entity or combination or consortium thereof.

The term "Option Aggregator" or "Option Aggregators" or "OA" may include, but is not limited to, a company, a group and/or consortium of companies, more than one entity, any entity formed by company(s) (whether or not solely for this purpose), any other entity or any combination thereof that offers options on its own products and/or other company products.

The term "airline" or "airlines" includes, but is not limited to, an airline, an airline's business partner, an entity which deals with an airline or an airline's business partner, a travel agent, an Option Aggregator and any entity forming a part of the chain of commerce related to airline and/or travel industry, or any combination of any two or more of the above.

The term "hotel" or "hotels" includes, but is not limited to, hotel, apartment hotel, bed and breakfast, capsule hotel, caravanserai, casa particular, flophouse, choultry, garden hotels, condo-hotel, holiday cottage, hostel, ice hotel, trailer home, roadhouse, ryokan, turbaza, boarding house, bungalow, condominium, dharamshalas, dormitory, inn, resorts, a group or chain of hotels, a hotel's business partner, an entity which deals with a hotel or a hotel's business partner, a travel agent, an Option Aggregator, any entity forming a part of the chain of commerce related to hotel and/or travel industry, or any combination of any two or more of the above. A hotel may be referred to as an entity that provides space for hire.

The term "car rental company" or "car rental companies" includes, but is not limited to, a car rental company, a group of car rental companies, a car rental company's business partner, an entity which deals with a car rental company or a car rental company's business partner, a travel agent, an Option Aggregator, any entity forming a part of the chain of commerce related to car rental industry and/or travel industry, or any combination of any two or more of the above.

The term "travel company" or "travel companies" includes, but is not limited to, any entity forming a part of the chain of commerce related to the travel industry, a company, a group of companies, a travel company's business partner, an entity which deals with a travel company or a travel company's business partner, a travel agent, an Option Aggregator, or any combination of any two or more of the above.

The term "Product" refers to a product or service provided by a manufacturer or an entity. The term "Products" or "Product" may also refer to "Product Set" or "Product Sets" or "Product Order" or "Product Orders" or any combination thereof as and when the context requires and are used interchangeably. The term "customer" here implies an entity buying or entering into a contract to buy a company's product or service. The term "optimize" is not intended to require achievement of a mathematical minimum or maximum, but to refer to improvement and/or enhancement.

The term "flight" refers to a single flight, a group of flights, flights with zero or more stops or any combination of the above. The term "Flights" or "Flight" may also sometime refer to one or more seats on said flight(s), when the context requires. The terms "flight" and "seat" are interchangeable as the context requires. The term "Flight" or "Flights" may also refer to a Flight Leg, a Flight Segment, an Itinerary, any combination of two or more flights or any combination of the above, when the context requires.

The term "Room" or "Rooms" in context of the hotel industry refers to a single room, a room with zero or more facilities and/or services, only facilities or services offered by the hotel. A room may be referred to as a given space for a given duration of time and for a given set of one or more associated services or characteristics or any combination thereof. In the context of the hotel industry, the term "Room" and "seat" are interchangeable, as and when the context requires. For example, one may refer to a reserved seat for a show in a hotel as a reserved room.

The term "Car" or "Cars" refers to any means of transportation including, but not limited to, cars, vans, mini-vans, buses, trucks, trailers, pick-up trucks, scooters, motor cycles, bikes, trains, trams, boats, ships, steamers, jets, helicopters and so on, any variation or model of said means of transportation and/or services, equipments associated with it or any combination(s) thereof, for a given time unit.

The term "Travel Package" or "Travel Packages" or "Package" or "Packages" refers to combination of one or more services related to travel including, but not limited to, transportation, accommodation, various facilities and so forth. Transportation may include, but is not limited to, travel by flight, train, bus, car, cruise, boat, steamer and so forth. "Accommodation" may include, but is not limited to, stay in hotel or any location and services associated with it. Said "various facilities" may include, but are not limited to, sight seeing, city tours, river-rafting, mountaineering, para-gliding, food and so forth.

The term "Itinerary" refers to a list of flights included in a single travel trip of a customer. An Itinerary may comprise one or more "Segments" (defined below). An Itinerary can be a one-way trip (one Segment), a round-trip (two Segments) or a multi-city trip (two or more Segments). A round-trip Itinerary has two Segments back and forth between two places (e.g., a trip from A to B and then back from B to A). A One-Way Itinerary has only one Segment (such as travel from A to B). A Multi-City Itinerary refers to an Itinerary with two or more Segments across two or more places (e.g., a trip from A to B and then from B to C).

The term "Flight Segment" (or "Segment", in short) refers to a part of an Itinerary between a customer's intended origin and destination. A Segment may comprise one or more "Flight Legs". The term "Flight Leg" (or "Leg", in short) is the most fundamental unit of an Itinerary and is defined by a single takeoff and landing of a flight. In a round-trip Itinerary (A to B and B to A), there may be 2 Flight Legs from A to B (customer flies from A to C and then C to B, two connecting flights), and similarly two Flight Legs from B to A (customer flies from B to D and then D to A, two connecting flights). When a customer flies from A to B and the plane takes a stop in between at C, it is still considered to be two Flight Legs (A-to-C and C-to-B) even though the customer may/may not change planes between A and B and/or an airline may or may not use the same flight number to refer to the entire Segment from A to B.

The term "Product Price" of a Product (in reference to one or more VOFs) refers to the price a company would charge for a Product in the absence of implementation of said VOFs on said product. In the context of the airline industry, the term "Ticket Price" (in reference to one or more VOFs) refers to the price that an airline would charge in the absence of implementation of said VOFs on said flight. In the context of the hotel industry, the term "Room Price" of a room (in reference to one or more VOFs) refers to the price that a hotel would charge for a room in the absence of implementation of said VOFs on said room. In the context of the car rental industry, the term "Car Rental Price" of a car (in reference to one or more VOFs) refers to the price that a car rental company would charge for a car in the absence of implementation of said VOFs on said car. In the context of the travel industry, the term "Travel Package Price" of a travel package (in reference to one or more VOFs) refers to the price that a travel company would charge for a travel package in the absence of implementation of said VOFs on said travel package.

The term "transaction" here implies to do, to carry or to conduct an agreement or exchange. The exchange may or may not involve a price in terms of monetary or non-monetary value from customer side. The parties participating in the transaction may have obligation(s) from various terms and conditions. In other words, transaction may also imply an action or activity involving two or more parties that reciprocally affect or influence each other.

In the context of an airline industry, the term "schedule" refers to the characteristics of a flight including, but not limited to, airline related parameters, departure/arrival parameters, service and other miscellaneous parameters. The airline related parameters may include, but are not limited to, operating carrier entity (i.e, the airline that operates the flight), marketing carrier (an airline that sells the flight), any other carrier or intra/inter-carrier flight groups associated with the flight or any combination of the above. The departure/arrival parameters may include, but are not limited to, an airport and its location (city, state, country), date and time, seasonality, weather and other operational conditions, number of stops/connections, and so forth. The service and other miscellaneous parameters may include, but are not limited to, type of aircraft, flight duration, in-flight or other services such as number of cabins, types of seats, meal selection, check-in and luggage options, airport lounges and other facilities, and so forth.

The term "schedule" in the context of car rental industry, refers to the characteristics of a car including, but not limited to, car rental company related parameters, pick-up/drop-off times, service and other miscellaneous parameters. The car rental company related parameters may include, but are not limited to, operating car rental company entity (i.e. the car rental company that operates the car), owner of the car, marketing car rental company (a car rental company that rents out the car), any other car rental company or intra/inter-car rental company groups associated with the car rental or any combination of the above. The pick-up/drop-off parameters may include, but are not limited to, a pick-up/drop-off location (area or street, landmark, city, state, country), date and time, seasonality and other operational conditions, and so forth. The service and other miscellaneous parameters may include, but are limited to, type of car, car rental duration, or other services, car rental company services such as insurance, additional driver, child seats, and other equipments, and so forth.

The term "schedule" in context of a travel package refers to the characteristics of a travel package including, but not limited to, travel company related parameters, start/end date time, service and other miscellaneous parameters including travel company related parameters. The travel company related parameters may include, but are not limited to, operating travel company (i.e. the travel company that operates the package), marketing travel company (a travel company that sells the travel package), any other travel company or intra/inter-travel company groups associated with the package or any combination of the above. The start/end parameters may include, but are not limited to, a destination location (area or street, landmark, city, state, country), date and time, seasonality, weather and other operational conditions, and so forth. The service and other miscellaneous parameters may include, but are not limited to, type of flight, car, room, cruise, travel duration, or other services, travel company services such as insurance, flight services, car special equipments, hotel services, cruise services, other facilities, and so forth.

The term "related transactions" here refers to one or more transactions that are related to each other. In a Value Option Framework, the successful interaction between the participants may happen through a number of transactions in sequence, where each of the transactions in the sequence may (or may not) depend upon the outcome of the previous transaction, and this may create a chain of "related transactions". However, at least one transaction in a set of related transactions must be related to all the other transactions. The connection or reference between the transactions may be direct or indirect and/or implicit or explicit. The related transactions may be contingent to each other or rely or require the aid of the other to support. The transactions may be fully and/or partly related to each other to be construed as related transactions. For example, the price of a transaction may be modified if the customer has already bought a product in a previous transaction, which makes the two transaction related to each other. In another example, the customer is given availability in a flight since he or she has already purchased a ticket in another flight; which makes both the transactions related to each other. For the transactions to be called as related transactions, some dependency and/or nexus between the transactions has to be established. The transactions may become related transaction in one or more transactions. Related transaction may include, but is not limited to, a transaction with monetary value, a transaction without monetary value and so forth.

The term "utilize" or "utilization" or "utilizing" includes, but is not limited to, putting to use, without limitation, a product or any of the possible combinations of the possible constituents of a product, any possible attached feature of a product, information, a process, preferences. It may also include, without limitation, to use, reuse of any product, consumption of one or more products, allocation of one or more products to other entity, relinquishing right to use one or more products, for selecting one or more other products on behalf of one or more earlier selected products.

The term "default" here implies a situation or condition that turns up in the absence of active intervention from the users in a contract. In such situation, a particular setting or value (termed "Default Settings" or "Default Value") for one/more exchange variables is/are assigned automatically. These Default Settings/Default Values remain in effect unless intervened.

The term "payment" here implies the act of paying or the state of being paid. The term "payment" here implies an amount of money or any other consideration paid at a given time or which has been received in the past but for which the benefit of the same is realized now, may be in part or in totality. "Payment" may also refer to a transfer of something of value to compensate for products or services that have been, or will be, received. Payment may be made in cash, on credit or any other consideration. The payment may have monetary or non-monetary (soft) value. The payment can be from company and/or any other entity to customer or from customer to company and/or any other entity or both.

The term "significant period of time" here implies a time period that is large enough with respect to the total utility time for the customer that it may affect the behavior of a transaction.

The term "anytime" or "any other time" here refers to any point of time that lies between a time period starting from the initial interaction of a customer with an airline (for any ticket purchase or any other event) for a particular journey and ending when said customer completes said journey and/or any other journey related to said journey.

The term "selected" or "select" or "selects" refers to, without limitation, selecting, selecting and purchasing, purchasing, defining, choosing, expressing a preference or any combination thereof. The term "receiving" or "receives" here refers to, without limitation, purchasing, utilizing, receiving for free, receiving without requirement of a physical delivery or any combination thereof. In some situations, said terms (related to "select") may also refer to, without limitation, receiving, purchasing or any combination thereof (including any grammatical forms of these terms such as noun, adjective, verb etc.). Said terms (related to "select") are used interchangeably as and when the context requires.

The phrase "selecting a Product" for option purposes includes selecting one or more products within the same or a different product level (or a section or compartment) within the same product category. In the context of the airline industry, the phrase "selecting a flight" for option purposes includes selecting one or more seats within the same or a different cabin (or a section or compartment) within the same flight. In the context of the hotel industry, the phrase "selecting a Room" for option purposes includes, but not limited to, selecting one or more rooms within the same or a different hotel or any combination thereof. In the context of a car rental company, the phrase "selecting a Car" or "renting a Car" or "purchasing a Car" for option purposes includes, but not limited to, selecting one or more cars or car types or equipments associated with the car from the same or a different car rental company or any combination thereof. In context of travel industry, the phrase "selecting a Travel Package" for option purposes includes, but not limited to, selecting one or more travel packages within the same or a different travel company or any combination thereof.

The terms "Set" and "Product Set" refers to a collection of Products and are used interchangeably. A Set may have one or more Products. In the airline industry context, a Flight Segment is equivalent to a Set and each Leg within a Segment is equivalent to a Product. A Segment may comprise one or more Flight Legs (Products). In the hotel industry context, a Room Set is equivalent to a Set and each Room Product within a Room Set is equivalent to a Product. A Room Set may comprise one or more Room Products. In context of car rental industry, a Car Set is equivalent to a Set and each Car Product within a Car Set is equivalent to a Car Product. A Car Set may comprise one or more Car Products. In contest of travel industry, a Travel Package Set is equivalent to a Set and each Travel Package Product within a Travel Package Set is equivalent to a Product. A Travel Package Set may comprise one or more Travel Package Products. A company may (or may not)

impose a restriction that all the Products of a Set must be used together unless a change is made to the Order.

The term "Order" may comprise one or more Sets, where each Set may comprise one or more Products. In the context of the airline industry, an Itinerary is equivalent to an Order. In context of hotel industry, a Room Order is equivalent to an Order. In context of car rental industry, a Car Order is equivalent to an Order. In context of travel industry, a Travel Package Order is equivalent to an Order.

The term "Initial Product Set" (or IPS, in short) refers to a Set purchased by a customer. For example, in the airline industry context, the term Initial Flight Segment (defined below) is equivalent to IPS. The term "Initial Flight Segment" (or IFS, in short) refers to a flight Segment purchased by a customer. For example, consider an itinerary with two Segments, A to B and B to A. Each of the two segments is referred to as IFS. In context of hotel industry, "Initial Room Set" is equivalent to IPS. The term "Initial Room Set" (or IRS, in short) refers to a Room Set purchased by a customer. In context of car rental industry, "Initial Car Set" is equivalent to IPS. The term "Initial Car Set" (or ICS, in short) refers to a Car Set purchased by a customer. In context of travel industry, "Initial Travel Package Set" is equivalent to IPS. The term "Initial Travel Package Set" (or ITS, in short) refers to a Travel Package Set purchased by a customer.

The term "Option Product Set" (or OPS, in short) refers to a Set received by the customer as part of an APO. In the airline industry context, OFS is equivalent to OPS. The term "Option Flight Segment" (or OFS, in short) refers to a flight Segment selected as part of an APO option on a given IFS in the context of the airline industry. There can be one or more OFS for a specific IFS. In the hotel industry context, ORS is equivalent to OPS. The term "Option Room Set" (or ORS, in short) refers to a Room Set selected as part of an ARO option on a given IRS in the context of the hotel industry. There can be one or more ORS for a specific IRS. In the car rental industry context, OCS is equivalent to OPS. The term "Option Car Set" (or OCS, in short) refers to a Car Set selected as part of an ACO option on a given ICS in the context of the car rental industry. There can be one or more OCS for a specific ICS. In the travel industry context, OTS is equivalent to OPS. The term "Option Travel Package Set" (or OTS, in short) refers to a Travel Package Set selected as part of an ATO option on a given ITS in the context of the travel industry. There can be one or more OTS for a specific ITS.

As used herein, the term "processor" includes, without limitation, any one or more devices for processing information. Specifically, a processor may include a distributed processing mechanism. Without limitation, a processor may include hardware, software, or combinations thereof; general purpose digital computing elements and special purpose digital computing elements and likewise included. A single processor may perform numerous functions and may be considered a separate processor when implementing each function. The terms "database" and "data store" may have been used interchangeably as and when the context requires and both may refer to any form of storing the data, including but not limited to, storing the data in a structured form, storing the data in an unstructured form and so forth.

General Method Description: Kernel

Referring now to FIG. 1, there is shown a high-level flowchart style diagram of a method to achieve the optimally customized sale of products or services to "close the gap." It involves the following steps or acts: In Act 1.110, certain inputs are captured, including customer dynamics and important value segments, their demand, preferences, flexibilities and associated relative utilities. Company economics and important economic factors such as, for example, costs, capacities and constraints are captured in Act 1.120. The customer information from Act 1.110 and the company economics from Act 1.120 are then in Act 1.130, "integrated" in a way that will permit optimization of value for both the company (e.g., its profitability) and customers (e.g., their individual and collective purchase utilities). In Act 1.140, value options are formulated that permit the capturing of individual customer preferences in a way that can be used in the optimal customization of the sale process illustrated. These same steps can be used in one or more permutations or combinations or iteratively.

At a high level, the system is operated and the method of FIG. 1 is executed to (1) to dynamically interact with the customers to determine detailed customer demand for the product and options, (2) receive a real-time assessment of company economics, i.e., capacities, constraints, and costs, (3) optimize across demands and preferences of all customers, and company economics, and (4) formulate value options for customers.

To take advantage of this system, a company has to obtain information about customer demand and preferences before (and/or during) a purchase, in a structured manner that can be easily understood and translated into satisfaction for customers and also can be used to optimize internal operations for companies. This data can then be integrated with the company's internal resources and capacities to enhance and improve its operations. A company can "optimally customize" its products and processes to enhance the value for customers, while simultaneously maximizing its business profitability. Customers also benefit from the fact that they spend less time researching products, can be assured that their priorities are known in case of change or contingency events occurring, can enhance their purchased products/services and get more perceived value for their purchase price. A company may develop reward/insurance incentive programs with its customers that permit optimization of company operations, using one or more reward or payment programs in a way that increases the company's internal profitability as well as satisfies customer preferences.

Figure 2:
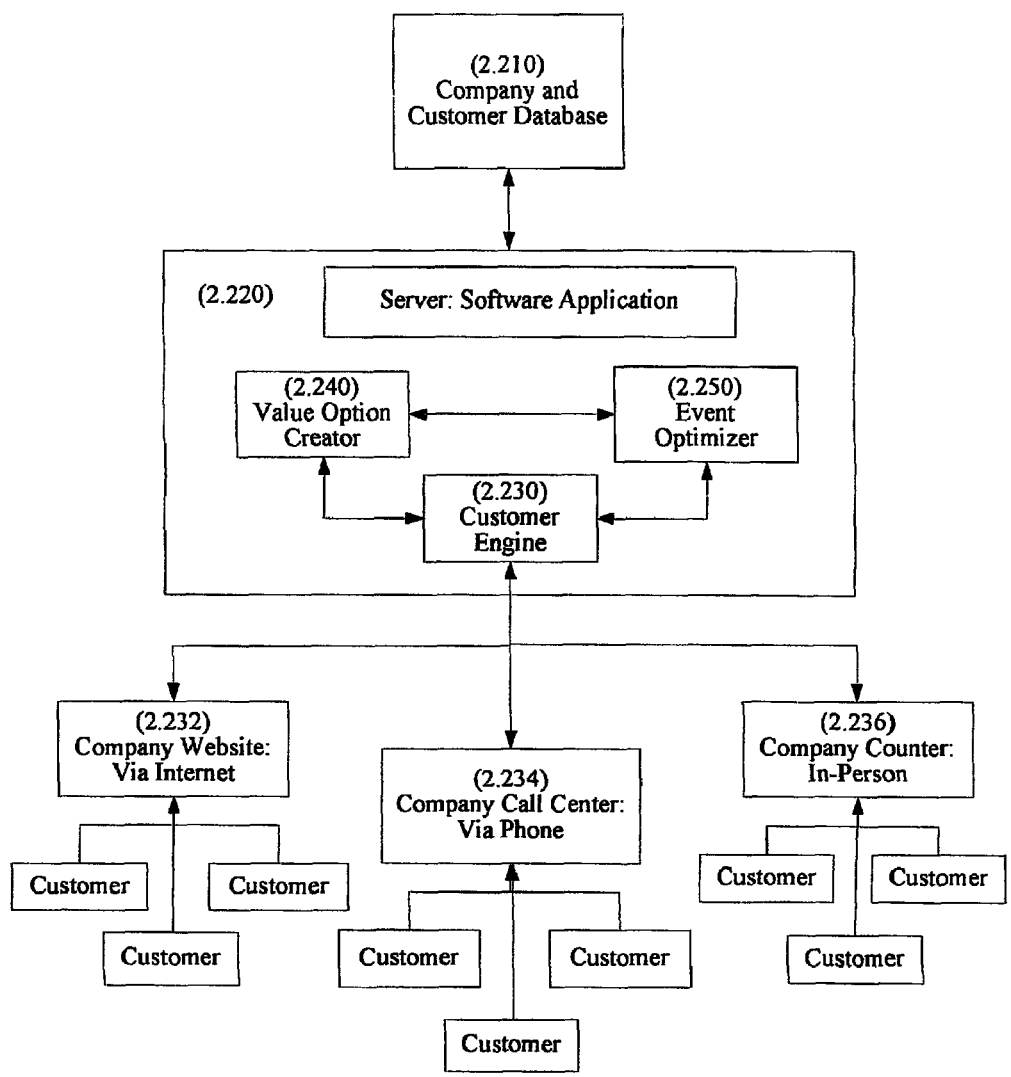
FIG. 2 is a block diagram of a system for practicing the discussed method.

At a high level, a block diagram of a typical system for implementing this methodology is shown in FIG. 2. The data for driving the system, from both the customer side and the company side, is stored in a data store (or database) shown in Box 2.210 (or multiple data stores or databases), which may be of any suitable database design and may be a commercially available database product configured for this application. The "heart" of the system is a platform, typically one or more servers, shown in Box 2.220, which provides the processing capability to implement three modules, shown in Boxes 2.230, 2.240 and 2.250. The Customer Engine module (shown in Box 2.230) controls the interlacing with the customer via whatever media are selected by the company. For example, the company may use one or more of a web site (shown in Box 2.232), a call center (shown in Box 2.234) and/or live customer service "counter" personnel (shown in Box 2.236) (e.g., at a point-of-sale location). The Value Option Creator module (shown in Box 2.240) is a software program(s) that performs the functions of allowing a company to design, create and configure different value option frameworks and corresponding value options that can be offered to customer to capture their needs and preferences in detail and in a way that can be used to optimize across company operations. The Event Optimizer module (shown in Box 2.250) comprises a program or programs that (a) monitor company business performance and provide information about business data (such as available capacities, costs, sales, inventory and so forth) as well as other relevant factors that may vary from installation to installation; and (b) monitor for the occurrence of events related to the value options which customers have bought, and which then execute pre-designed protocols when a related event occurs (e.g., a re-booking algorithm is activated when a flight cancellation event occurs).

Process to Use the New System and Method in an Industry

The following sections describe in detail how this system and method may be used in any particular industry. Industries and companies best suited to use and benefit from the invention are those with large number of customers and wherein those customers would have varied utilities for aspects of a product offering, especially if those aspects were unbundled and some made optional.

To get maximum benefit from the herein disclosed system and method requires the use of human judgment. It should be emphasized, therefore, that there is shown a "platform" technology and a variety of non-exhaustive ways of using the platform. Those who make use of this platform in their companies will make decisions and exercise their judgment so that each instantiation or practice is likely to be unique, at least to a degree. In addition to disclosing the platform, via the given examples we also disclose certain instantiations of the system and method which themselves are believed to have value but the system and method are not intended to be limited to these instantiations except as they may be expressly claimed.

Using the discussed system and method in any industry involves a two-staged approach. The selection of an industry is assumed. The industry provides a context. Starting in FIG. 3, in the first stage of the method, a set of value options frameworks (to be associated with a company's offerings) is created. It is immaterial, for the current discussion, how one obtains the information used to construct a value option framework. Implicitly or explicitly, a value option framework reflects some sort of analysis of customer dynamics and company economics. Thus, to construct a value option framework for a particular type of transaction, one needs to arrive (however one chooses) at a list of components the customer may select when buying a product, and their prices. For example, in a simple case there may be delivery options and warranty options and maybe training options. Each option is assigned a price, whether statically, quasi-statically, or dynamically. Static pricing is assigned at very infrequent intervals. Dynamic pricing (determined by an algorithm invoked by the Event Optimizer is assigned either on an on-demand basis for a particular transaction or at frequent intervals so as to yield pricing based on near (i.e., quasi) real time company performance data. Quasi-static pricing would be somewhere between the former two situations, such as pricing done quarterly or monthly based on then-current information about the company. Pricing may involve running financial analysis based on known data to optimally set the conditions and pricing in the value option framework associated with the company offerings.

Figure 11:
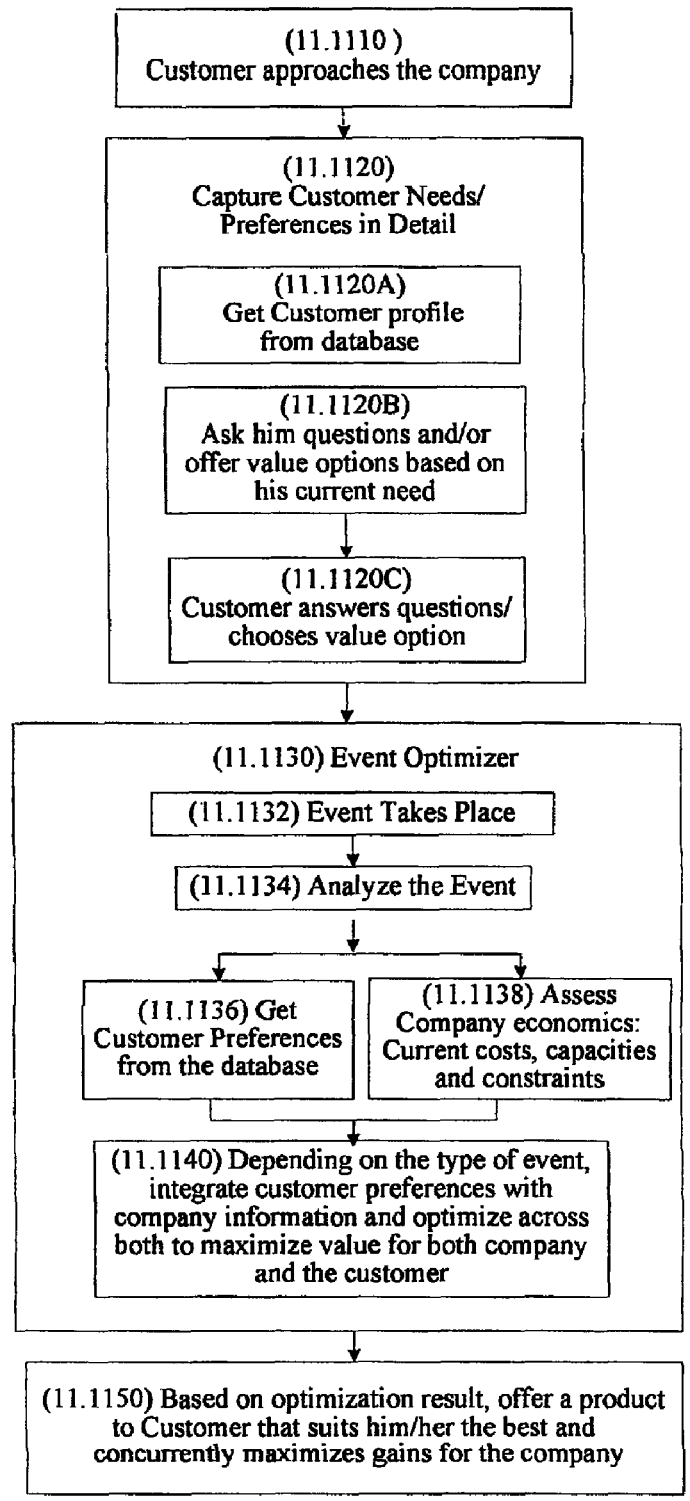
FIG. 11 is a flow chart of a process to implement value options framework.

The second stage, as depicted in FIG. 11, involves a detailed interaction with the customer who has approached the company (Act 11.1110). Approaching the company may involve accessing a web site or calling a call center or any other way of commencing a transaction. The interaction (Act 11.1120) occurs in a structured format to capture the customer's expressed needs, preferences, flexibilities and relative utilities. As a preliminary matter, it is possible the customer may previously have registered a profile containing default selections of needs, preferences, etc. So, the data store or database 2.210 is interrogated to determine whether a profile exists and, if so, to retrieve it (Act 11.1120A). The customer is presented with questions and/or value options (Act 11.1120B) and in response he/she supplies answers and select options that suit him/her (Act 11.1120C).

The second Act in the second stage is executed by the Event Optimizer module 2.250. A summary of the algorithmic flow of the Event Optimizer presented in Box 11.1130. The Event Optimizer is alerted to, or detects, the occurrence of an event (shown in Box 11.1132 and 11.1134) for which an event-response procedure (program) has been pre-stored. Each event-response procedure is designed by the company to effect selected action(s) in response to detection of its corresponding event. Depending on the nature of the event, an event-response procedure may invoke an optimization algorithm (shown in Box 11.1140), assess the company operations (possibly in real time) and analyze, across company operations (shown in Box 11.1138) and customer information (shown in Box 11.1136), potential results to determine results that concurrently maximize the benefits for the company and the customer. The optimization may or may not modify the company product offerings to better suit the customer while simultaneously maximizing the company operations (shown in Box 11.1150). Both of the stages and the steps involved will now be discussed in detail.

First Stage: Formulation of Value Option Framework

Figure 3:
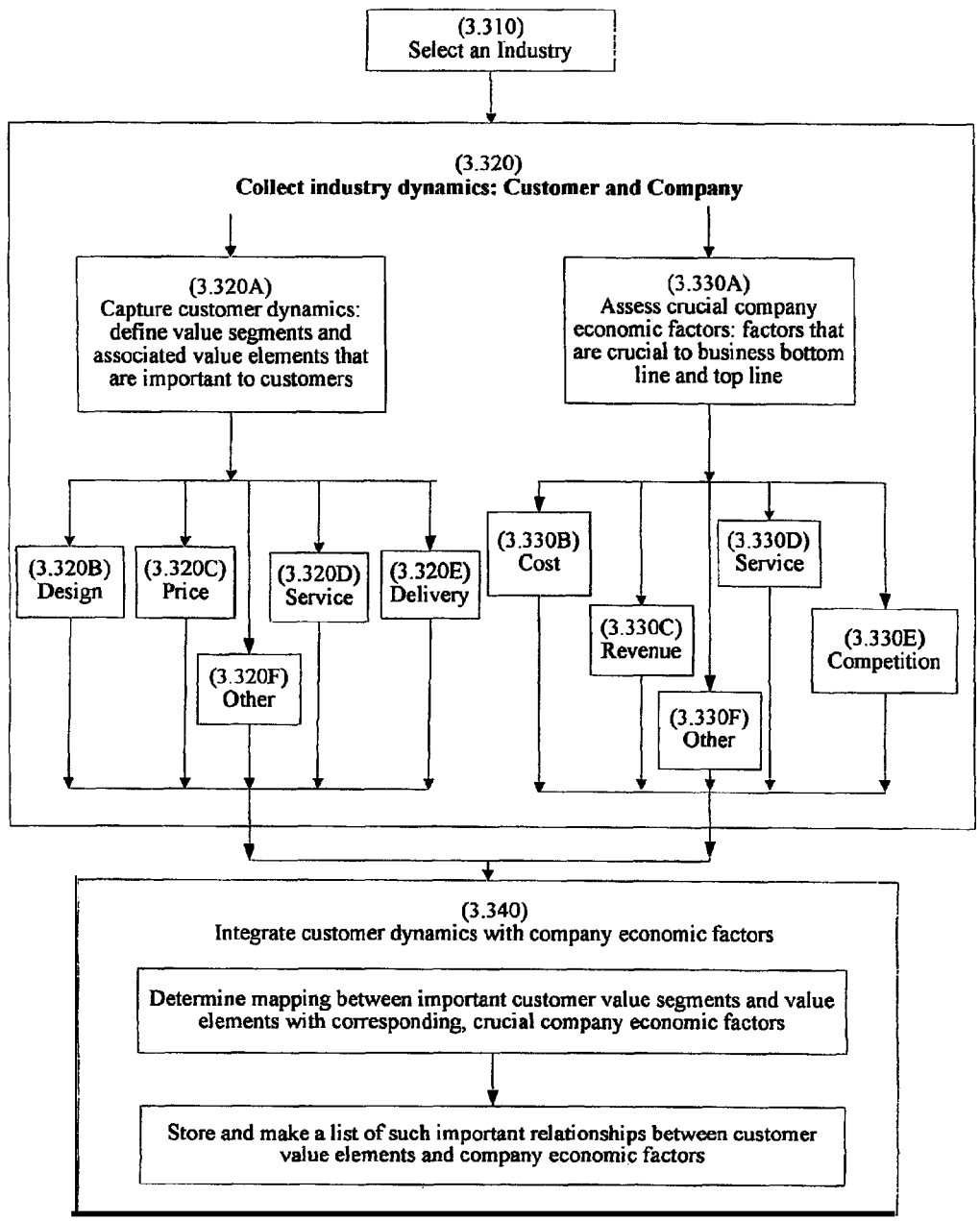
FIG. 3 is a flow chart of a method to create a value options framework showing collection of industry and customer dynamics.

Turning to FIG. 3, it will be assumed that the inventive method and system are to be adapted to a particular industry or company. One may develop a generic instance for an industry or particularize it to an individual company. Some considerations will inherently be generic to an industry. Thus, to formulate a value option framework, one begins by selecting the industry. Act 3.310. Next, the customer and company dynamics are captured. Act 3.320. To capture customer dynamics, one needs to understand the value segments and value elements that are important for the customer. To assess company dynamics, one needs to assess the economic factors that are crucial to the company's profitability and performance.

(1) Capturing Customer Dynamics—Act 3.320A

Figure 4:
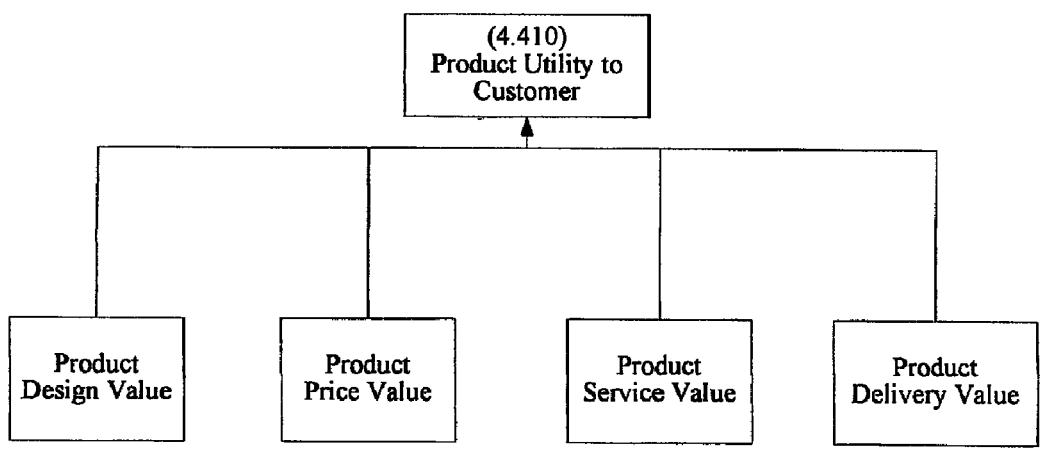
FIGS. 4 and 5 are diagrammatic illustrations of the relationship between overall product utility and contributions as perceived by a customer.
Figure 5:
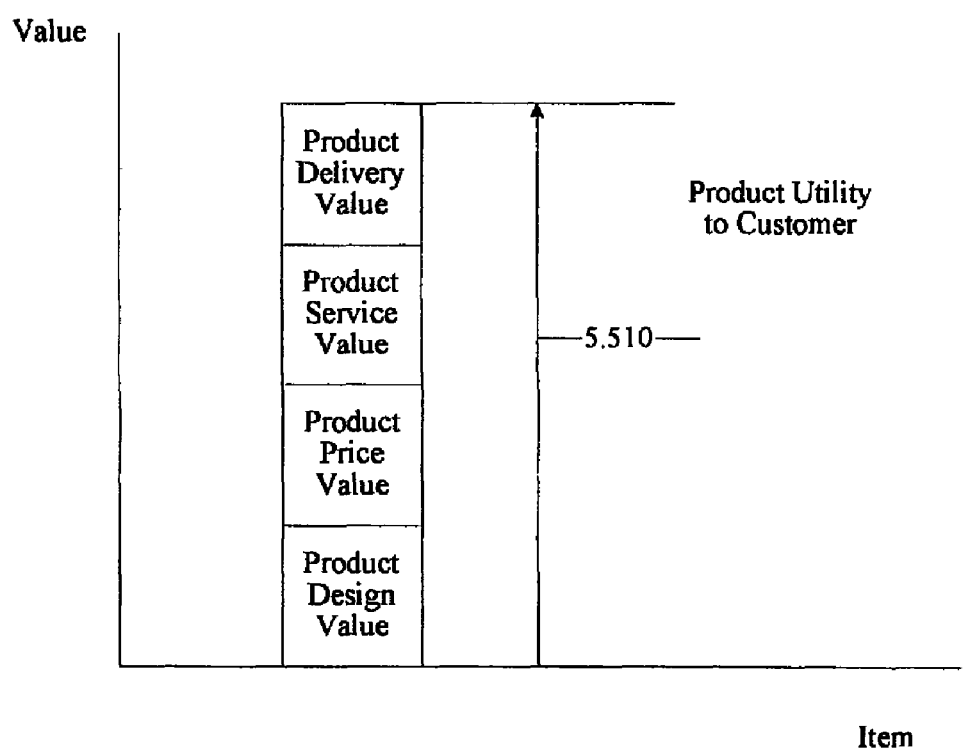
Figure 6:
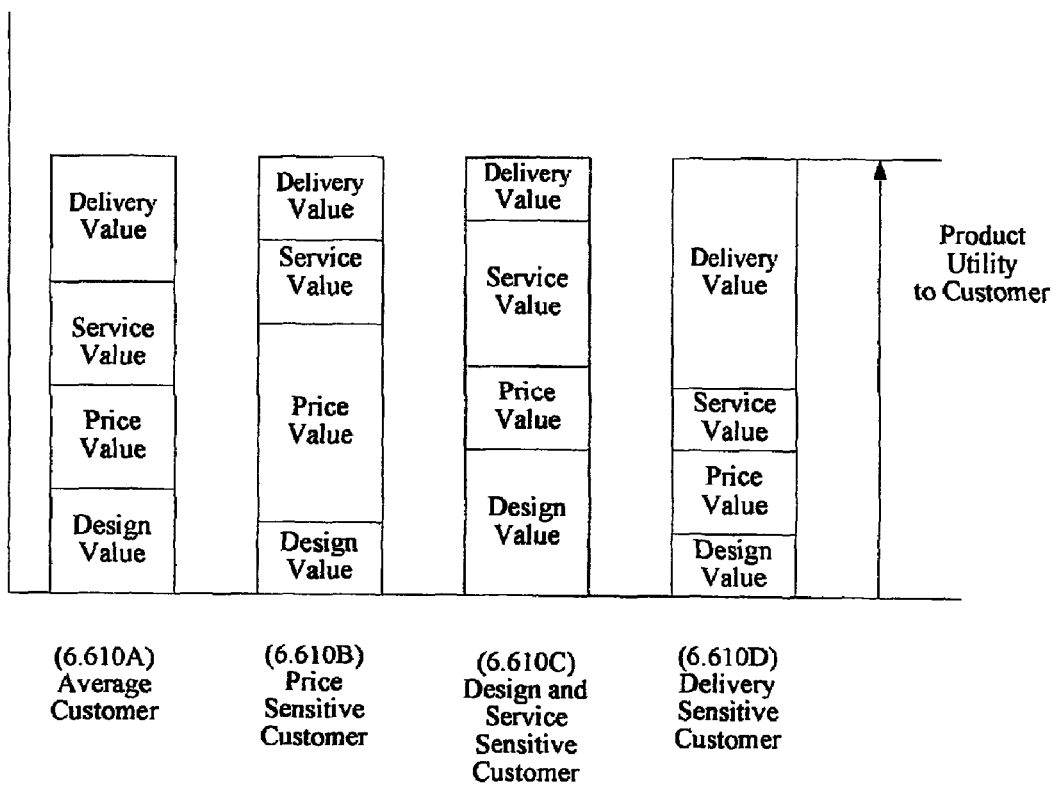
FIG. 6 is a diagrammatic illustration of the perceived utilities of a product by four customers.

A customer derives certain utility by purchasing a particular product. The purchase utility value, typically, can be separated into many value segments. Customers value these segments (which include core qualities of the offering as well as options and contingent options i.e., options dependent on options) from the perspective of what is important to the customer through the whole buying and usage experience, starting from, searching for a product, placing a particular order and using the product throughout its lifecycle. To go further, it will be helpful to define two terms: value segment and value element. A "value element" is a distinct aspect/characteristic of a product's buying and usage experience that may affect the utility of the product to the customer. A "value segment" is a particular category of such value elements. While value segments may vary from industry to industry and will have to be selected by the individual or team that implements a particular instance of this system and method, for many industries, the four most important value segments are (a) product design value, (b) product delivery value. (c) product price value, and (d) service value. See boxes 3.320B to 3.320E. These value elements are shown in FIGS. 4 and 5, which are simply alternative views of the same information and will be discussed below. It should be noted, however, that these value segments are just provided for illustration purposes. Industries that can benefit from the system and method of the invention may have more or fewer than the listed value segments and/or a different list of value segments. Each value segment may have one or more value elements. Further, the actual number of value elements in each value segment may vary with the industry, the level of detail in the business model, and even the customers. The system implementer can choose the number of value elements in each value segment.
Total Value for Customers:

A customer derives unique value from each value segment; the total utility value of the product to a customer (shown in FIGS. 4 and 5) is the combination of values derived from each of the value segments. A customer would benefit the most if the total expected value of his/her utility were maximized. Another important aspect to note is that every customer also has an acceptable range (e.g., equals, exceeds, or disappoints, minimum or maximum) for each individual parameter value. Even if a particular product has high overall value, a customer may not desire the product if it scores below the minimum level (i.e., low enough to reject the product) for any one or more of the value segments or value element. A company may use any method for calculating utility.
Concept of Tiered Value Perception:

Different customers may derive different utility from different aspects of the same product. As shown in FIG. 6, four different customers 610A-610D may compute to the same (total) overall utility even though they assign different utility values to each of the value segments. For example, a human resource manager, who has scheduled interviews with candidates, would value the timely ticket to his destination much more than a vacationer, who may be flexible. Consequently, the company needs, in some way, to define and learn about these value parameters for individual customers, along with relative preferences and utilities associated with each parameter. This will be illustrated below using the previously listed value segments. A web-based questionnaire is one excellent way to collect this information. The collected information is then stored in a customer profile or Itinerary in a data store or database, such as database 2.210.

(a) Product Design Value

The "product design" segment refers to the value elements relating to the design features and characteristics of a product that the customer actually buys. Each customer places his or her own values on these different design value elements.

(b) Product Delivery Value

The "product delivery" segment refers to the value elements relating delivery or time-frame related aspects like, for example, lead-time and delivery schedule from the time the customer places an order. Again, each customer may place his or her own values on each of these value elements. The company collects detailed information on the product delivery needs of the customers.

(c) Product Price Value

The "product price" segment refers to the groups of value elements related to the price a customer pays to buy/use a product. Value elements in this segment may include total product price, delivery costs, warranty or after-sales service costs, and any other relevant costs incurred by the customer in buying and using the product. Some times, addition of all these price elements is also termed total cost of ownership (TCO). A customer derives maximum price value by paying the most desired price for a product. Any price paid either lower or higher than the desired price may change the value the customer gets from the price of the product. The company collects information on the product price needs of the customers.

(d) Service Value

The "service value" segment refers to a group of value elements related to the service a customer receives from pre-sales and post-sales services offered by the company to facilitate the use of the products sold. Pre-sales services include services provided by a company to help its customers decide and choose products based on their requirements. Post-sales or after-sales service refers to the warranty, product support, maintenance support and other relevant activities that may help a customer to use the product effectively. A customer will derive maximum service value from a product if the services provided by the company completely match or exceed those desired by the customer. The company utilizing the invention collects information not only on the service needs of its customers, but also on customer preferences on different possible events that might occur during or after the purchase.
Summary of Capturing Customer Dynamics:

Based on the method described above, the first Act for a company is to establish the value segments and value elements it will present to the customer for the customer's decision. It may establish these value segments and value elements in any way it chooses. A company may want to use market research or other mechanisms to analyze the value segments and value elements that are important to customers. An industry expert may choose to avoid such research and, instead to rely on experience.

(2) Assessment of Company Economics:

The next Act in the first stage, as shown in FIG. 3, is to assess the crucial economic factors that affect the bottom-line and top-line of the company, Act 3.330A. For example, these factors may include but are not limited to revenues, fixed costs, inventory, available and scheduled capacity, constraints on product availability and total and marginal values for current direct and indirect product (and/or services) costs. For illustration purposes only, FIG. 3 shows the grouping of such factors into five major categories 3.330B-F, including costs, revenue, service, competition and other.

It might be beneficial if a company utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information). Certainly that is not always required and would not be required in an industry where there is little change in cost elements over a significant time interval.

(3) Integration of Customer Dynamics with Company Economic Factors:

A third Act, shown in Box 340 of FIG. 3, is to take the information collected from the previous two steps, analyze this data and find important value segments and elements that directly affect the crucial economic factors for the company. This operation involves creating a mapping between company factors and customer value segments, to establish direct and indirect relationships between the two.

Figure 8:
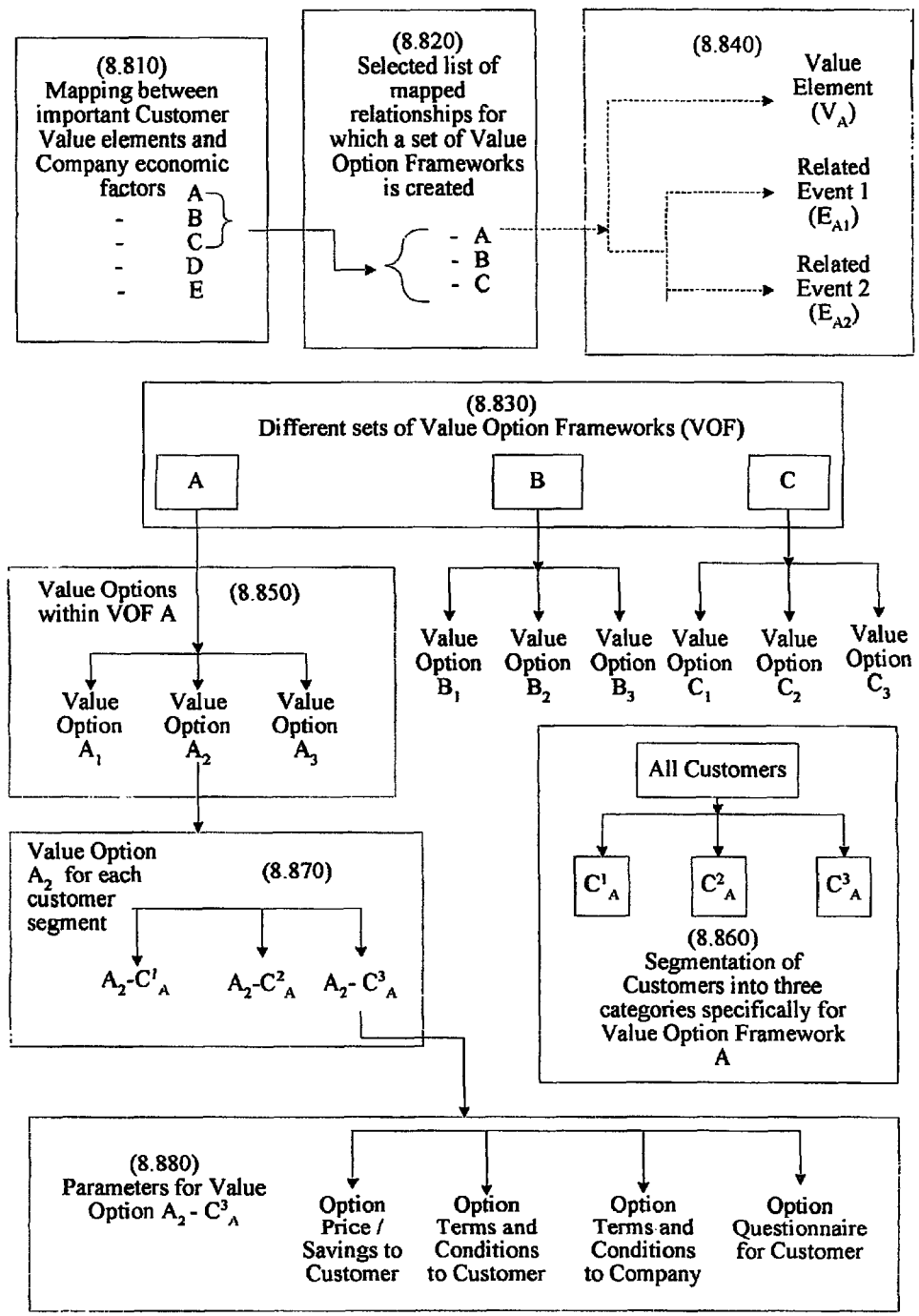
FIG. 8 is a partially-diagrammatic, partially-flow diagram representing the steps of a process for creating a value option framework.

(4) Formation of Value Options Framework:

The formation of a value options framework involves certain steps illustrated in FIG. 8. The value option framework is formed around important mapped value elements, allowing capture of detailed individual, customer-level data expressing needs, preferences, flexibilities and relative utilities so as to positively impact the company operations, while simultaneously enhancing the overall product utility for the customer. A value option framework (VOF) must allow the company to capture a customer's demand, preferences, flexibilities and relative utilities at an individual level in a format that can allow that information to be used to produce a cost savings or revenue enhancement for company operations while concurrently enhancing customer utility. The structure of a value option framework is defined in detail later.

The process to create a value option framework is shown in greater detail in FIG. 8. In Act 8.810, the process starts from that list. From this list, the company may select a list of mapped value elements which fulfill the criteria listed above, Act 8.820, and a value option framework is built around those value elements. One could build a value option framework around almost every mapped relationship, so the decision criteria to choose or reject any such relationship is simply pragmatics. It is probably to be desired to limit the number of relationships to keep the value option framework manageable, computationally and otherwise. In FIG. 8, there are three VOFs shown at 8.830, namely A, B and C. The number of value option frameworks shown is for illustration purposes only and could be fewer or more, depending on factors such as the industry selected and user discretion. As explained in detail later, each value option framework is related to a corresponding value element and one or more related event(s). For illustration purpose, in the Box 8.840, value option framework A is related to a value element $V_A$ and two related events, $E_{A1}$ and $E_{A2}$. In most situations, after the initial interaction between the customer and company related to a particular value element, one or more related events (or a series of events) would take place. The structure of a value option framework is defined below in detail.

Figure 9:
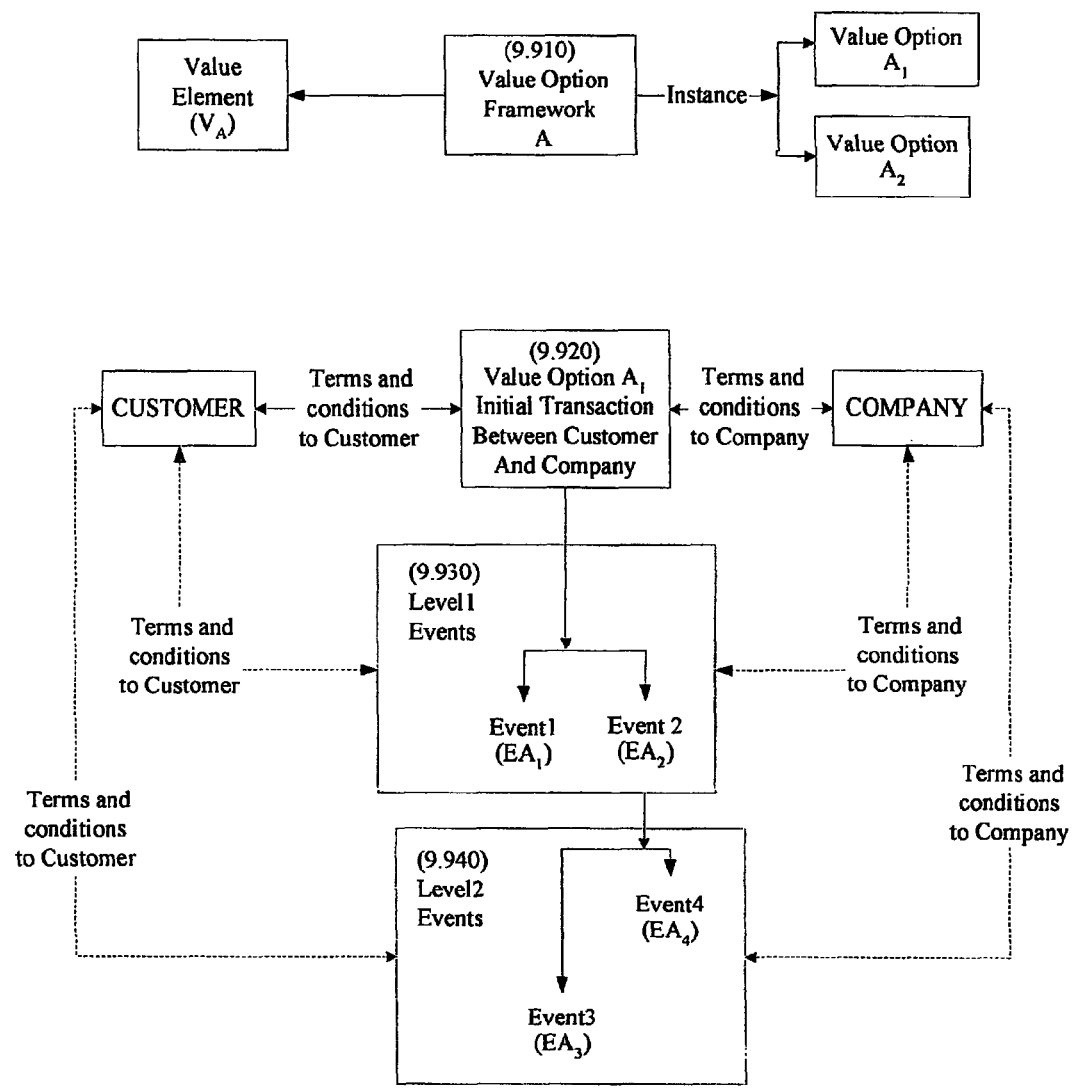
FIG. 9 is a diagrammatic representation of the generic structure of a value options framework.

Structure of a Value Option Framework:

FIG. 9 defines the structure of a Value Option Framework. The Box 9.910 shows a value option framework A. Every value option framework may be related to one or more value elements. As shown in the Box 9.910, value option framework A is related to value element $V_A$. One can create one or more instances of a value option framework as shown by the two value options ($A_1$ and $A_2$). The Box 9.920 shows the initial interaction between the customer and company where the company offers the value option $A_1$ to the customer. Every value option has an initial costs/savings and other benefits and conditions to the customer; and revenue/costs and other benefits and conditions to the company. The Initial Transaction is successful if the customer selects the given value option. Every successful transaction may be succeeded by one or more related events (or a series of events as shown by the Boxes 9.930 (Level 1 events) and 9.940 (Level 2 events). Just like the Initial Transaction, each event may also have costs/savings and benefits and conditions to the customer, and revenue/costs and benefits and conditions to the company, as shown by the linked arrows from Event $E_{A3}$ to both the customer and company.

The Initial Transaction may comprise one or more acts. One or more products may be selected, at one or more times, before, after, during the Initial Transaction, or any combination thereof. The Initial Transaction or any of the following events may have terms and conditions applicable to the customer, the company, another entity or any combination thereof. These terms and conditions may be set, preferably, to concurrently benefit at least both parties.

Consider, again, the process of formulating a value option framework. For each value option framework, the company-user also preferably categorizes its population of customers into one or more segments based on one or more criteria Customer segmentation is based on customer behavior and needs. Individual customers are not necessarily segmented or grouped; a particular customer may fall within different customer segments at different times. It is the customer behaviors and needs that are segmented. To provide an example, in the Box 860 in FIG. 8, all of the company customers are categorized into three customer segments, namely, $C^1_A, C^2_A, C^3_A$ for the value option framework A. The number of customer segments could vary depending on the industry and value option framework, and this method does not put a limit on the number of customer segments. The number of customer segments shown is for illustration purposes only and could be fewer than or more depending on industry selected, value option framework and user discretion. Further, a company may segment its customers differently for different value option frameworks or they may use the same customer segmentation for a few or all value option frameworks. The customer segmentation is done because the customer behavior can be subdivided into different groups and customer showing similar behavior could be dealt in a similar fashion.

After formulating one or more sets of value option framework(s) around the selected value elements, the user creates one or more value options for each set of value option frameworks. In FIG. 8, the value options $A_1, A_2$ and $A_3$ are created in box 8.850 for the value option framework A. The number of value options shown is for illustration purposes only and could be fewer or more depending on industry selected, value option framework and user discretion.

For each value option created, the user defines parameters for option pricing, benefits and conditions to the customer, as well as revenue, costs and option conditions to the company, under which the option would be used. If necessary, a user may also need to create a separate questionnaire to be completed by customers, pertaining to each value option.

There may or may not be any payment transaction related to the Initial Transaction and/or other event related to the Initial Transaction and/or Value Option Framework. A price may include, but is not limited to, a set of one or more Product Prices, a set of one or more option prices, any other price or any combination of the above. The price may comprise a monetary value or a soft value (e.g., benefits, coupons or exchange of another service) or other consideration. The price may be fixed or variable, with or without bounds. The company may set permissible range(s) or boundary limit(s) within which the price can vary, or it may offer the customer a set of prices to choose from. Since price conditions may depend upon various factors, which may or may not be variable, the same may be decided at anytime. The price conditions may be determined by the customer, the company, a third entity, or any combination thereof, at one or more times.

As shown in FIG. 8, the user creates value options for each particular customer segment (Act 8.870). In FIG. 8, the structure for value option conditions for Value Option $A_2$ tailored to customer segment $C^3_A$ is shown in the Box 8.880. Similarly, the user creates conditions and parameter values for each value option for each customer segment.

For one type of value option, one or more parameters for different customer segments may be the same. Across multiple value options (within the same value option framework), one or more parameter values may be the same for one or more different customer segments. It is possible that one or more value options may not be valid for a particular customer segment or a sub-segment within a customer segment.

Figure 10:
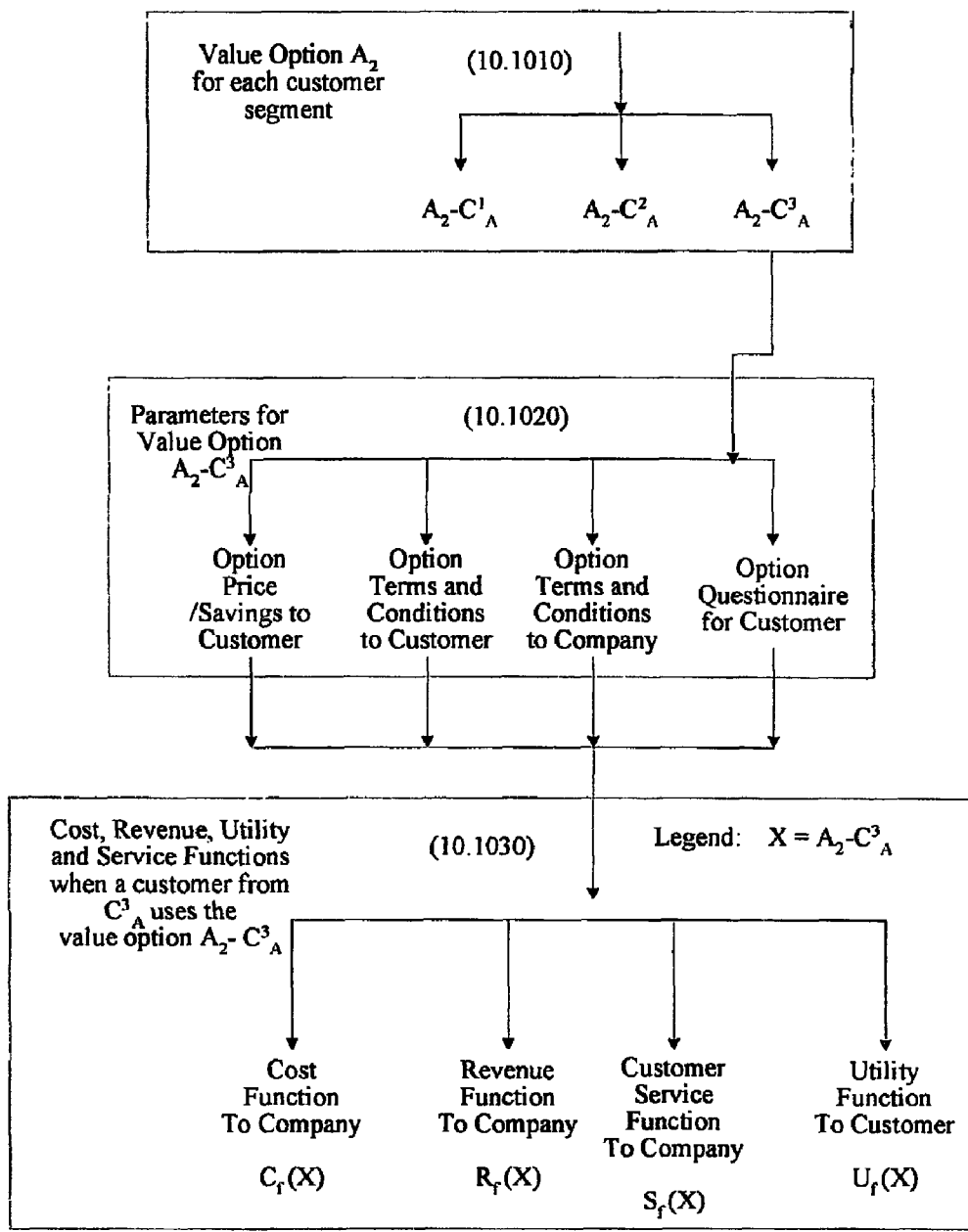
FIG. 10 is a diagrammatic illustration showing creation of a value option framework indicating how cost, revenue, utility and service functions.

Turning to FIG. 10, for each value option created for a specific customer segment, the user creates the following functions as shown in the Box 10.1030. (The number and type of functions shown is for illustration purposes only and could be fewer than or more depending on the industry selected, the value option framework and user discretion.) First, there is a Cost Function to the company, $C_f(X)$. This function expresses the cost elements to the company related to usage of a specific value option. For illustration purposes, FIG. 10 displays the cost function $[C_f(A_2-C^3_A)]$ to the company when a customer (within customer segment $C^3_A$) selects the value option $A_2$. This function expresses the costs to the company initially when the user selects the value option A2, and also for each of the related events if and when those related events take place. Next, there is a Revenue Function to the company, $R_f(X)$. This function expresses the revenue elements to the company related to usage of a specific value option. For illustration purposes, FIG. 10 displays the revenue function $[R_f(A_2-C^3_A)]$ to the company when a customer (within customer segment $C^3_A$) uses the value option $A_2$. This function expresses the revenue to the company initially when the user selects the value option A2; and also for each of the related events if and when those related events take place. Then there is a Customer Service Function to the company. This function expresses the customer service function to the company related to usage of a specific value option. For illustration purposes, FIG. 10 displays the customer service function $[S_f(A_2-C^3_A)]$ to the company when a customer (within customer segment $C^3_A$) uses the value option $A_2$. This function expresses the customer service level a company provides initially when the user selects the value option $A_2$, and also for each of the related events, if and when those related event take place. Finally, there is a Utility function to the customer. This function expresses the utility to the customer from use of a specific value option. For illustration purposes, FIG. 10 displays the utility function $[U_f(A_2-C^3_A)]$ to a customer (within customer segment $C^3_A$) when he or she uses the value option $A_2$. This function expresses the utility to a customer initially when he/she selects the value option $A_2$, and also for each of the related events if and when those related events take place.

To obtain the overall costs, revenue and service benefit for a particular value option framework, all the individual functions for each value option-customer segment combination are combined to determine the total overall costs and revenue benefits to the company and the service and utility benefits to customers. Benefits from all the value option frameworks can be simply added together to calculate total overall benefit values to the company.

5) Optimization of Value Options

Figure 7:
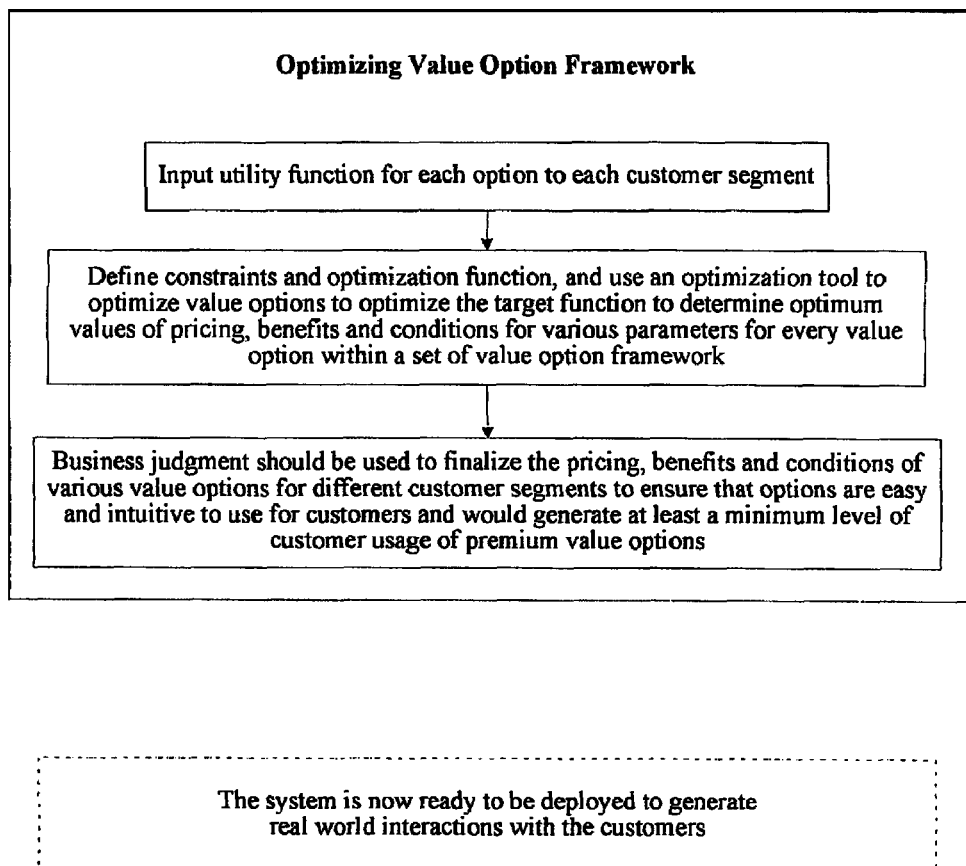
FIG. 7 is a flow chart illustrating optimization of a value option framework.

As an optional last Act in the first stage, as shown in FIG. 7, a financial analysis may be performed on the value option framework using the existing company and customer data to determine optimum pricing values and conditions of the value options. In other words, a company using the system and method can build utility functions based on cost and benefit equations of various options, and then can optimize across any one or combination of such functions. Any standard nonlinear constrained optimization software tool can be used to run iterations to determine optimized pricing and benefit values for different value options. Using standard sensitivity and scenario analysis techniques, a user can run what-if scenarios to determine the robustness of the value option framework. It is not necessary to perform this optimization to generate benefit from the new method and system taught above. However, performing optimization at this level may tend to increase the benefit derived.

Second Stage: Using Value Option Framework

After completing the first stage of the method, the user has been able to create important value option frameworks and specific value options within those frameworks.

The user has also segmented customers to be associated with each specific value option that may be applicable to each customer segment. The company is fully prepared now to use a structured format comprising value options and questionnaire to interact with its customers in real time to generate benefits for both customer and company.

The second stage of the new system and method, as depicted in FIG. 11, involves using the value option framework to interact with the customer to capture his or her requirements in detail. Once the customer selects a particular option, the system moves to the Event Optimizer stage, 11.1130, where the system reacts based on the event that may take place. The Event Optimizer, depending on the event, invokes an optimization algorithm, assesses the company operations in real time and optimizes across company operations and customer information to produce results that concurrently maximize the benefits for the company and the customer. The optimization may or may not modify the company product offerings to better suit the customer while simultaneously maximizing the company operations. Both of these steps will now be discussed in detail.

1. Dynamic Interaction to Determine Customer Demand in Detail (Act 11.1120)

In this Act, the company interacts with its customers in a structured format asking questions and/or offering value options. Preferably, this interaction occurs using a web-based data collection system. As stated above while an Internet based interaction is probably the most cost-effective approach to data collection, other methods may be employed, if preferred, or a combination of methods may be used.

On a browser, which accesses the seller's (i.e., company's) web site, a series of questions are presented to the customer and the customer supplies answers. These questions may also present value options and ask the customer to answer and select the options that suit them the best, enabling the company to determine detailed preferences and flexibilities in customer needs. The questions/value options are supplied from the database 2.210 based on the value options framework created in the first stage to deal with different customer segments.

2. Event Optimizer

Figure 12:
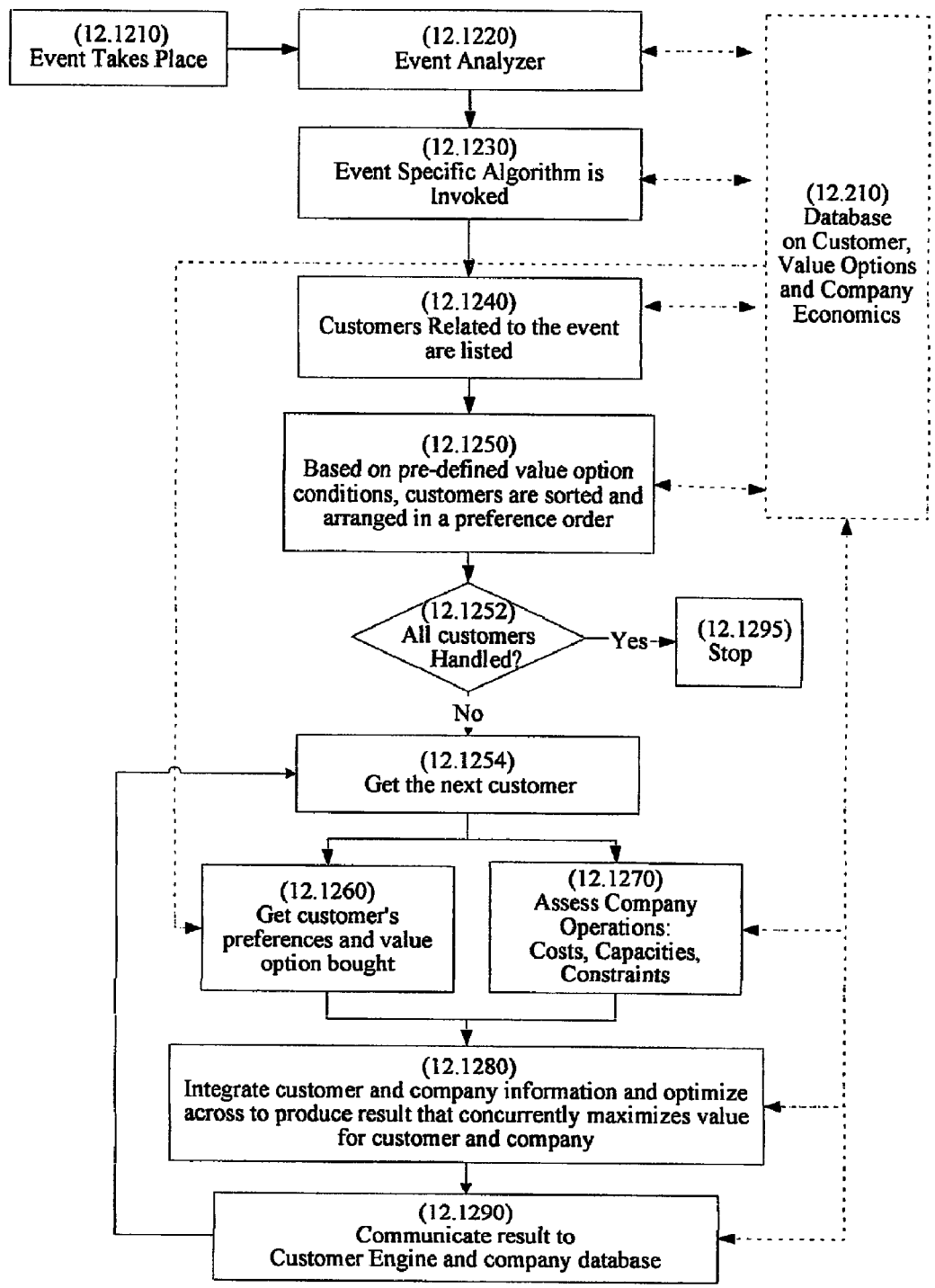
FIG. 12 is a diagrammatic illustration showing generally how an event is processed by the system and method shown, to fulfill a company's obligations to its customers as shown herein, delivering optimized results to the company and the customers.

Once the customer selects a value option, the system goes to the Event Optimizer phase where different steps are executed depending on the event that may occur. The event(s) is(are) related to the value option selected in the first Act. Turning to FIG. 12, the typical Event Optimizer architecture is shown. An Event Analyzer 12.1220 is a module that receives notifications of events and notes when a monitored event occurs. Event Optimizer 12.1210 analyzes the event and invokes an optimization algorithm specific to the event that is detected. Using that algorithm, the Event Optimizer collects the information on related customers and assesses the company operations in real time. A third Act takes the information collected from the previous two steps and uses predetermined criteria to optimize company operations along with customer demand. In this Act, the various scenarios are generated which optimize the total product value for the customer and profits and gains for the company. More details on the Event Optimizer are provided in the System Architecture section.

A user may create a value option framework, which includes a series of events. In this case, the Event Optimizer, after optimizing the result for the first event, may offer the results to the customer. The customer may or may not accept the results. If the customer does not accept the result the Event Optimizer may move on to handle other subsequent related events, and may again come back to the customer with more results. This process could be repeated several times depending on industry selected, the configuration and type of value option framework, and customer behavior.

Summary of Second Stage

In the second stage of the new method and system, the company interacts with the customer in a structured format to capture customer needs, preferences, flexibilities and relative utilities in detail. The next stage involves an Event Optimizer as explained above. The customers associated with the event are enlisted and sorted by pre-defined criteria. The Event Optimizer collects customer information from the data store and also assesses company operations in real time before integrating this information to produce one or more optimized results that concurrently maximize the benefits for the customer and company.

System Architecture: To Use and Implement an Instance of the Method

The system architecture as shown in FIG. 2 may be used to implement the new system and method taught above. The Value Option Creator (Box 2.240) allows the user to create and configure different value options that can be offered to the customers to capture their needs and preferences in detail and in a way that can be used to optimize across company operations. The Event Optimizer (Box 2.250) allows the company to optimize across company operations and customer needs when an event is triggered to provide a product offering that maximizes both customer utility and company profitability. A company would use the Customer Engine (Box 2.230) to interact with its customers via different channels. Each of these three sections is defined below in detail.

Customer Engine

The Customer Engine provides different interfaces that a company maintains at different channels, which are utilized to interact with the customers. These channels may include but are not limited to the company's website via the Internet, the company's call center via phone, and the company's retail outlet via in-person. The Customer Engine enables the company to ask questions and/or offer value options to customers in a pre-configured structured format. The Customer Engine generates its interfaces based on the data stored in the data store and populated by the Value Option Creator. The customers provide their responses and select value options that suit them. The Customer Engine then communicates back and stores customer responses and selections in the data store. The Customer Engine also may communicate the optimized results to the customer as and when generated by the Event Optimizer.

Value Option Creator (VOC)

The Value Option Creator allows a company to design, create and configure different value option frameworks and corresponding value options that can be offered to a customer to capture his or her needs and preferences in detail and in a way that can be used to achieve optimization across company operations. A company would use the Value Option Creator module to perform some or all of the following:

Develop various value option frameworks based on selected value elements and corresponding company economic factors.

Segment customers by one or more criteria. A customer segment may include one or more customers.

Develop costs, revenue and service functions based on a company's operations prior to using the herein-described system and method. The company may prefer to express cost elements in a real-time (i.e., up to date) dynamic fashion in order to be able to fully assess the profitability or contribution of each product sale opportunity.

Develop various value options within each value option framework.

Configure each value option differently (or keep it the same) for different customer segments. This involves choosing pricing, benefit conditions and the proper questionnaire for each value option for different customers.

Develop costs, revenue and service functions after the user (company) has designed and configured various value option frameworks.

To measure in real time or in quasi-real time the value benefit created for the passenger and/or company by implementing the new system and method in part or in full.

Optimize each value option framework and associated value options to determine optimized pricing and benefit schemes for the value options, in order to maximize the benefit for both the company and customers. What-if scenarios may be run to test the robustness of the value option frameworks' models.

The Value Option Creator (VOC) intakes the cost functions (marginal and total), revenue functions, utility functions, customer segments, capacity (scheduled and available) functions and other economic factor functions of the company. The VOC can be configured to store various customer value segments on which a user may want to build value option framework and associated value options. A user can also enter the constraints and ranges to perform pricing optimization to determine optimum pricing and the benefits of various options.

Ideally, a user may be able to create a Value Option Creator that is industry-and company-independent and can be used in several industries. Due to time and resource constraints, however, it is perfectly satisfactory for a user to build a less scalable and flexible industry-specific Value Option Creator.

Event Optimizer

The Event Optimizer allows the company to optimize its "bottom line" across company operations and customer needs, when an event is triggered. This is achieved by providing a product offering that maximizes both customer utility and company profitability. A suitable system architecture (i.e., overall flow) for the Event Optimizer in shown in FIG. 12. The following describes each Act in detail:

The Event Optimizer may start its functioning when a particular event is triggered (i.e., occurs and is detected at the time of purchase or later), Act 12.1210. The Event Analyzer (12.1220) analyzes the type and category of the triggered event by matching it with the list of events listed in data store 12.210. Once the event type is determined, the Event Analyzer searches the data store for an optimization algorithm that is associated with the triggered event, and executes that algorithm. (Such algorithms, naturally, have been developed and stored in the data store at an earlier time.) The algorithm collects from the data store a list of the customers that are associated with the triggered event, Act 12.1240, and sorts them based on pre-defined criteria listed in the value option framework associated with the event, Act 12.1250. The first customer is taken from the sorted list and his or her preferences and value option selection are retrieved from the data store. Act 12.1260. The algorithm then makes a real-time assessment of the company operations to get up-to-date costs, capacities and constraints. Act 12.1270. The information collected in the above two steps is then integrated (Act 12.1280) and, based on a pre-defined criteria, the algorithm optimizes across the company information and customer preferences to produce one or more results that concurrently maximize the benefit for both the company and the customer. The results are preferably communicated to the Customer Engine and to data store 12.210, Act 12.1290. These steps are repeated until all the customers have been taken care of Steps 12.1252, 12.1254 and 12.1295.

Figure 13:
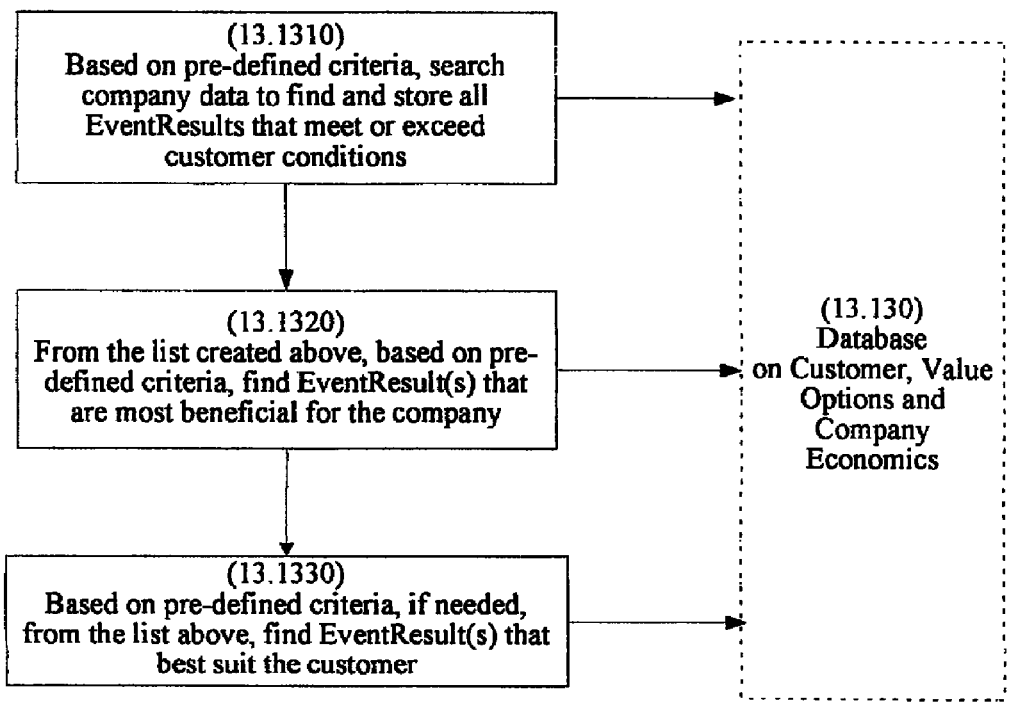
FIG. 13 is a flow chart expanding Act 1280 of FIG. 12.

FIG. 13 expands the Act 12.1280 to show the detailed sub-steps. The first Act (Act 13.1310) is to search the company data, based on pre-defined criteria, to determine and store all EventResults that meet or exceed the customer conditions (based on the value option selected and other preferences). An EventResult is a potential resultant output of an event to the customer and the company. The next Act 13.1320 is to determine from the stored list, those EventResults that are most beneficial to the company. If needed, another Act (13.1330) is performed to determine from the selected EventResults from the Act 13.1320, those results that best suit the customer.

Depending on the event type and related value option framework, the event-specific algorithm may communicate optimized results to the customer one or more times, depending on the algorithm and customer behavior.

Business Model to implement Value Option Frameworks related to the Invention

Different business models may be used to implement a value option framework as described in the current invention. The business models mentioned below, without limitation, may be used to implement any value option framework in any industry. As an example, a company may choose to implement an APO VOF (explained later) individually or in conjunction with one or more partners and/or other companies.

The OA and the company may engage in a business agreement to implement one or more value option frameworks. The business agreement may divide the total benefit generated by said value option framework between the two parties using any mechanism or criteria as desired. The total benefit may be shared between the two parties. The company may allocate one or more products to the OA. One or more companies may allocate only a part of or their entire product inventory to the OA to offer those products to the customers by way of regular and/or as options. In return, the OA may offer some revenue or fee to the company for all or a portion of the products allocated. This fee may be given only for the products that the OA is able to utilize or for all the allocated products. The lending fee may be a lump sum amount, may depend upon the number of products allocated or may depend on one or more factors as desired. The agreement may include a provision where the OA may return the allocated products back to the company at a certain time and date. There may be one or more conditions associated with the return of unused options and/or regular products, including, but not limited to, returning the same product, returning a higher value product and so on. The company may allot OA at least one product and said OA may deliver option on at least one of said allocated products. The OA may or may not enter into an agreement with the company to provide such option on its products. The OA may sell back at least one allocated product to said company or to at least one entity other than the company or both.

An OA may formulate an agreement with one or more companies on one or more VOFs to offer a combination of VOFs to customers. Said VOF may include different terms and conditions. For example, a customer may receive option price only from the company even if he/she is receiving products and/or options from the OA. Similarly, the customer may receive option price only from the OA even if he or she selected the products and/or received the options from the companies. The condition may also be set for a customer to make one or more payments to the company for the products and receive one or more payments from the company for the options received from that company, and to make one or more payments to the OA for the products and receive one or more payments from the OA for the options received from that OA. The condition may allow the customer to receive partial payments from the company and the rest from the OA or vice versa, the basis of which distribution may depend upon various factors, including, but are not limited to, the factors of company's choosing, the arrangement between the OA and the company and so on. In another example, the customer may receive the option price from the third party or may receive the option price from any of the combination of the entities mentioned above.

A company may allocate some inventory of one or more products to another entity such as an OA or Option Aggregator. The term "allocation of product inventory" "allocation of product(s)" implies, without limitation, assigning one or more units of one or more products to an entity for any purpose or use by the entity either exclusively or non-exclusively. The allocation of product may be conditional. For example, one of the conditions may require a return of at least one allocated product within a specified time period and/or other consideration(s).

Figure 13A:
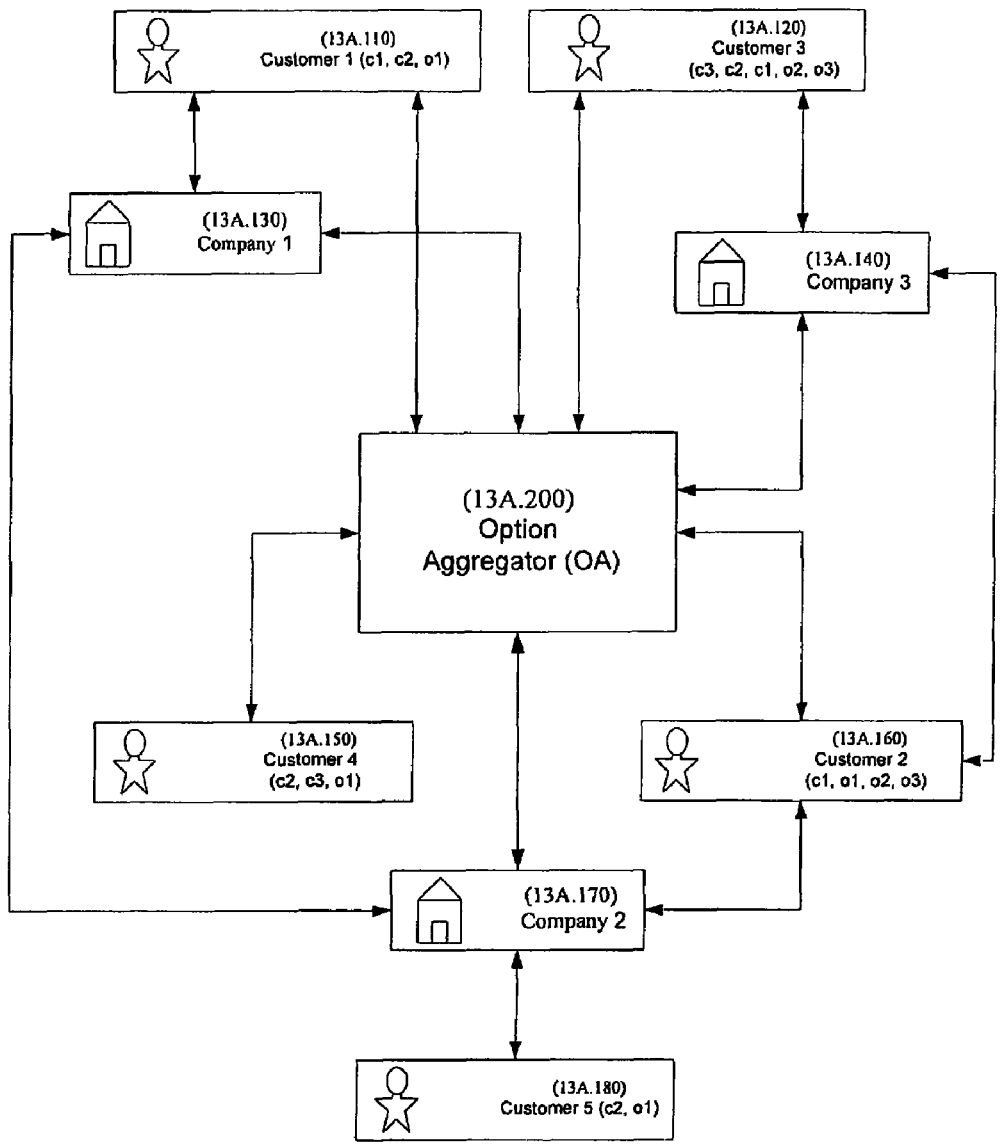
FIG. 13A is a diagrammatic illustration of various business models.

The customer may receive products and/or options from one or more of the company or OA or any combination thereof. For example, the FIG. 13A displays one example where three different companies choose to allocate one or more products to another entity (i.e., OA in this example). The OA may use the allocated products to operate a service to satisfy different needs of the customers. In FIG. 13A, the companies and their products are designated as Company 1/Product c1; Company 2/Product c2 and Company 3/Product c3 as shown by the Boxes 13A.130, 13A.170, 13A.140, respectively. In another arrangement, Company 1 and Company 2 may act together to implement the value option framework and may allocate one or more products to the OA which may on its own or together with either one or both the companies and may operate the service to offer said value option framework to the customers. Box 13A.110 represents Customer 1 receiving product c1 and c2 from Company 1 and an option o1 from the OA. The Box 13A.120 represents Customer 3 receiving product c3 from Company 3 and products c1 and c2 from the OA and options o2 and o3 from Company 3. In Box 13A.160, Customer 2 receives product c1 from the OA and options o1, o2 and o3 from OA, Company 2 and Company 3 respectively. In Box 13A.150, Customer 4 receives products c2 and c3 and also option o1 from the OA. In Box 13A.180, customer receives both product c2 and option o1 from Company 2.

There may be more combinations and arrangements among one or more companies, the OA and/or the customers. The companies and the OA may, without limitation, work together as partners, joint ventures, all together separate entities, partnerships etc., to offer and implement the value option frameworks related to the novel invention. The business model may be used with all the value option frameworks of the current invention which may involve some customization for the specific value option framework.

Figure 13B:
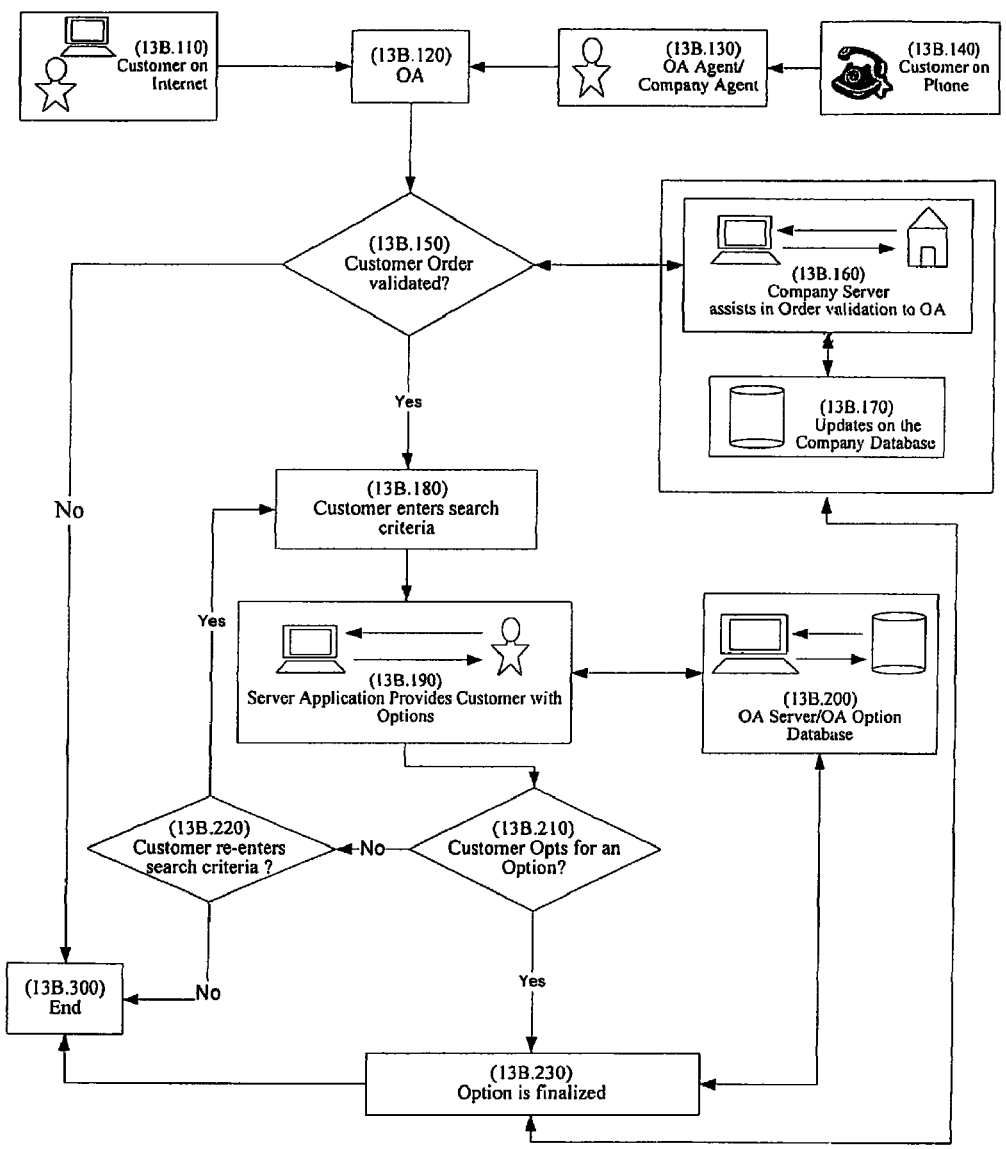
FIG. 13B is a diagrammatic illustration of one of ways of interaction between the customer and the OA and/or the company.

The customers may approach OA in many different ways and the same may depend on one or more factors including, but not limited to, way of implementation, type of implementation, one or more factors of choice of the company, OA, third entity and/or any combination thereof. In one of the ways customer may approach OA through phone as shown in Box 13B.140 and Box 138.130 of FIG. 13B to avail services from the OA. In another instance as shown in Box 13B.110, the customer may approach OA through Internet. The customer may use other ways of approaching the OA, which may include, but not limited to, fax, telex, mail and personal contact. In one of the implementations of the OA Business model, the OA may validate the Order with which a customer wishes to avail an option and it may be validated in coordination with the company from whom the customer has received said Order as shown in Boxes 13B.150 and 13B.160. Order validation process runs to validate the Order from the company server and the data store may be updated accordingly as shown in the Boxes 13B.150, 13B.160 and 13B.170. The validation process may involve back and forth interaction between the data store and/or servers of the OA and/or the company and/or any third party. There may be updates in the data store even if the Order is not validated. The company server may also provide OA with the information of its inventory.

If the Order is validated, the process may request the customer to enter the search criteria. Search is made corresponding to the search criteria entered by the customer (Box 13B.180). The server application may be used to provide a given set of Options corresponding to the search criteria (Box 13B.190). To provide the set of options, the server application may interact back and forth with OA server and/or OA option data store.

Next, if the customer opts for one or more options (Box 13B.210) and finalizes the same (Box 13B.230), various databases relating to the company, OA and/or any third party may be updated and the relevant transaction along with other information may be stored and/or updated as per Boxes 13B.170 and 13B.200. Once the databases are updated on finalization of the option, the control goes to Box 13B.300, where the process ends.

If the customer does not opt for the options presented, another test is performed to determine whether the customer wants to re-enter, modify and/or repeat the search criteria (Box 13B.220). If so, the process loops back to Box 13B.180, where the customer may be required to re-enter, modify and/or repeat the search criteria.

If the order is not validated or if the customer wishes not to re-enter/modify and/or repeat the search criteria, the control goes to Box 13B.300, where the process ends.

In one of the implementations of this business model and system, the servers and/or the data stores may belong only to the company, OA, third entity and/or any combination thereof.

Information Technology System for the Value Option Framework

A client-server architecture may be used to implement the value option framework. However, a company may use a computer hardware and software infrastructure of its choosing to implement a particular value option framework for achieving concurrent optimization.

One or more servers may be used for the system and one or more medium of communications may be used between the customer and the company and/or the OA and vice versa including, but not limited to, a highly secured VPN and Internet. There may be a cluster of servers to implement the system. One or more of such servers may be located at the premises of the company, OA, third entity and/or any combination thereof. Such premises may also be an offshore location which may or may not be accessible remotely. One or more databases may be involved and may be updated on a real time basis.

The FIG. 13C shows one of the ways by which the different entities involved and participating in the value option framework, interact and may participate in the value option framework. There may be other ways for implementing the value option framework which may depend upon including, but not limited to, the scale of the implementation, business requirements and number of entities involved. The entities may interact through a series of hardware products and services with the OA/company server(s). The OA may or may not be different than the company and the OA server may be the same as that of the company server. One of the entities shown in FIG. 13C is customer (Box 13C.110), who uses input device (Box 13C.120) to enter the requirements. The customer inputs are processed through the CPU (Box 13C.150) and one or more Hard Disk Drives (Box 13C.160). RAM (configuration of which may depend upon different factors) is used as memory device (Box 13C.140) while processing the customer input. The customer may approach the OA and/or the company through one or more series of Routers, Internet, Firewall and other hardware (Boxes 13C.330, 13C.335, 13C.340 respectively). The interactions between the company and/or the OA and the customer may pass through one or more load balancers (Box 13C.360) that distributes load across one or more servers as shown in Boxes 13C.300, 13C.310 and 13C.320. OA servers may update one or more primary database as shown in Boxes 13C.270, 13C.280, 13C.290. There may be one or more secondary databases (Box 13C.390) that may only be in the "Read Only" form (Box 13C.400) and may be updated through one or more replication servers (Box 13C.380). Alternatively, the company may have one or more separate temporary database structure wherein the entries are updated and stored until the final update is made in one or more main databases. One the final update is done, the entries in these temporary databases may be removed.

OA may interact with the application through Internet (Box 13C.350). OA application servers may also distribute load between one or more servers of OA and/or the company through one or more load balancers. Agent (Box 13C.260) may interact through input device as shown in the Box 13C.250. Input information may be processed by the CPU as shown in the Box 13C.180 with the use of one or more RAM, Hard Disk Drives (HDD) as shown in the Box 13C.200 and 13C.170 respectively. It may interact with the company through the Intranet (Boxes 13C.210 and 13C.220). The company and the OA may interact through a series of routers, firewalls and Internet (Boxes 13C.330, 13C.335 and 13C.340).

There may be another agent on behalf of the OA (Box 13C.410) which may input through one or more input devices (Box 13C.420). The information may be processed through the monitor, one or more hard disk drives, RAM and CPU as shown in Boxes 13C.430, 13C.440, 13C.460 and 13C.450 respectively). One of the ways in which said agent may interact with OA is through highly secured Intranet as shown in Box 13C.370.

The entire process may run at the premises of OA, company and/or any third entity or any combination thereof. It may also be possible to run a part of the system at one place and rest at one or more other places. The system may also be implemented even if one or more servers may be kept offshore locations and may be accessed remotely. The geographical locations of one or more hardware product and/or services may be different depending upon including, but not limited to, the factors of company's choice, ease of accessibility, infrastructure facilities. The structure or the interaction architecture of the system may vary depending on factors including, but not limited to, the set up of the company, changes in the technology and with the introduction of new and better technology enhancing the interaction process.

Figure 13D:
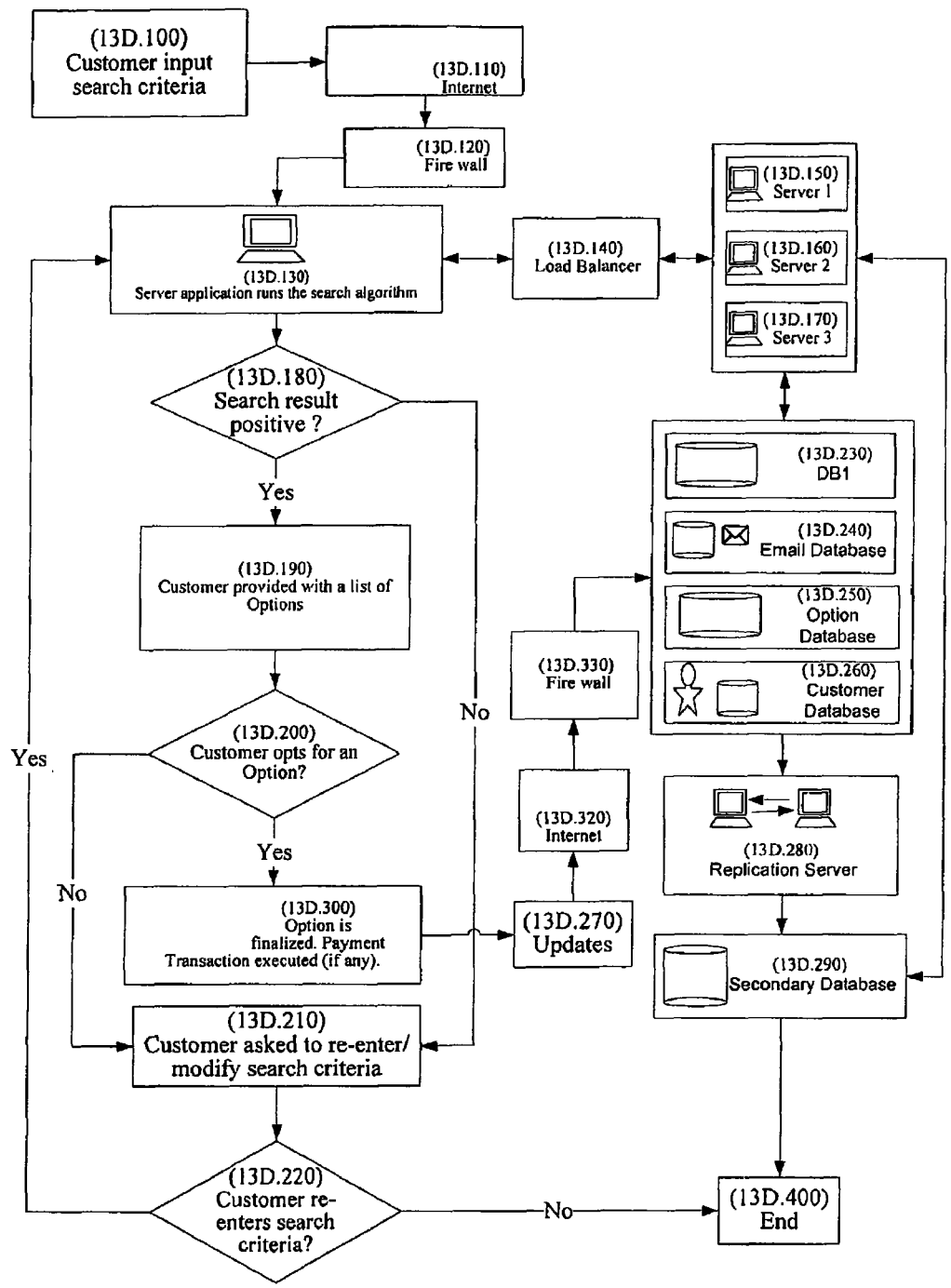
FIG. 13D is a diagrammatic illustration of implementation of one of the stages of a value option framework as a system.

Information technology is a part and parcel of the novel invention. The value option framework as a system may require integration with various hardware and/or network services. This is illustrated in FIG. 13D where a detailed implementation of one of the stages of value option framework is described duly integrated with the hardware products and services.

The customer inputs search criteria as shown in the Box 13D.100. The web page and/or the application may be hosted on the company's server, OA's server, any third entity's server and/or any combination thereof. Such a server may be located at the premises of the company, OA, any third entity location and/or any combination thereof and such a location may include an offshore location. The customer may approach the web (server) application of the company through Internet and one or more Firewall etc. as shown in the Boxes 13D.110 and 13D.120. The medium by which a customer reaches (approaches) the company web (server) application may vary depending on different conditions which may include, but not limited to, the best available communication medium at a particular time, scale and type of implementation of the value option framework and factors of company's choice.

Server application runs the search algorithms (Box 13D.130) corresponding to the customer requirements in association with one or more servers of the company as shown in the Boxes 13D.150, 13D.160, 13D.170 respectively. The servers may include, but are not limited to, web servers, application servers, database servers and networking servers. Said application may be hosted internally on one or more servers and databases either by the company and/or the OA or may be hosted on any third party's server. The servers may also be the servers of the OA or the servers may be run jointly by the company, OA and/or a third entity. Load balancer (Box 13D.140) may be utilized to distribute load across one or more company servers. The search algorithm may interact back and forth with one or more database including, but not limited to, email database, option database, inventory database, customer database, company database as shown in Boxes 13D.230, 13D.240, 13D.250 and 13D.260.

A test is performed to determine whether the outcome of the search algorithm is positive as shown in the Box 13D.180. If the outcome is negative, customer may be asked to re-enter/modify the search criteria (Box 13D.210). If the outcome of the search algorithm is positive, the customer is provided with a list of options as shown in the Box 13D.190. Once the customer is provided with a list of options to choose from, another test is performed to determine whether the customer has opted for one or more options (Box 13D.200). If customer has not opted for an option, then customer may be asked to re-enter/modify the search criteria (Box 13D.210). If the customer re-enters the search criteria, the control loops back to Box 13D.130 wherein the server application runs the search algorithm on the basis of the inputs received from the customer.

If the customer opts for an option and the option is finalized, at least one payment transaction is executed (if any) (Box 13D.300) and one or more databases may be updated (Box 13D.270) through interne, firewall as shown in Box 13D.320 and 13D.330. Said updates may also be done through one or more routers, highly secured VPN Network etc. Said primary databases including, but not limited to, email database, customer database, inventory database, option database may be updated correspondingly as shown by the Boxes 13D.230, 13D.240, 13D.250 and 13D.260. There may be corresponding updates in the secondary databases also (which are in "Read Only" format) as shown in Box 13D.290 through one or more replication servers (Box 13D.280). Alternatively, the company may have one or more separate temporary database structure wherein the entries are updated and stored until the final update is made in one or more main databases. One the final update is done, the entries in these temporary databases may be removed/deleted/discarded.

The algorithm ends after the needed updates are made in one or more databases and/or one or more severs or if the customer desires not to re-enter/modify the search criteria (Box 13D.400).

Figure 13E:
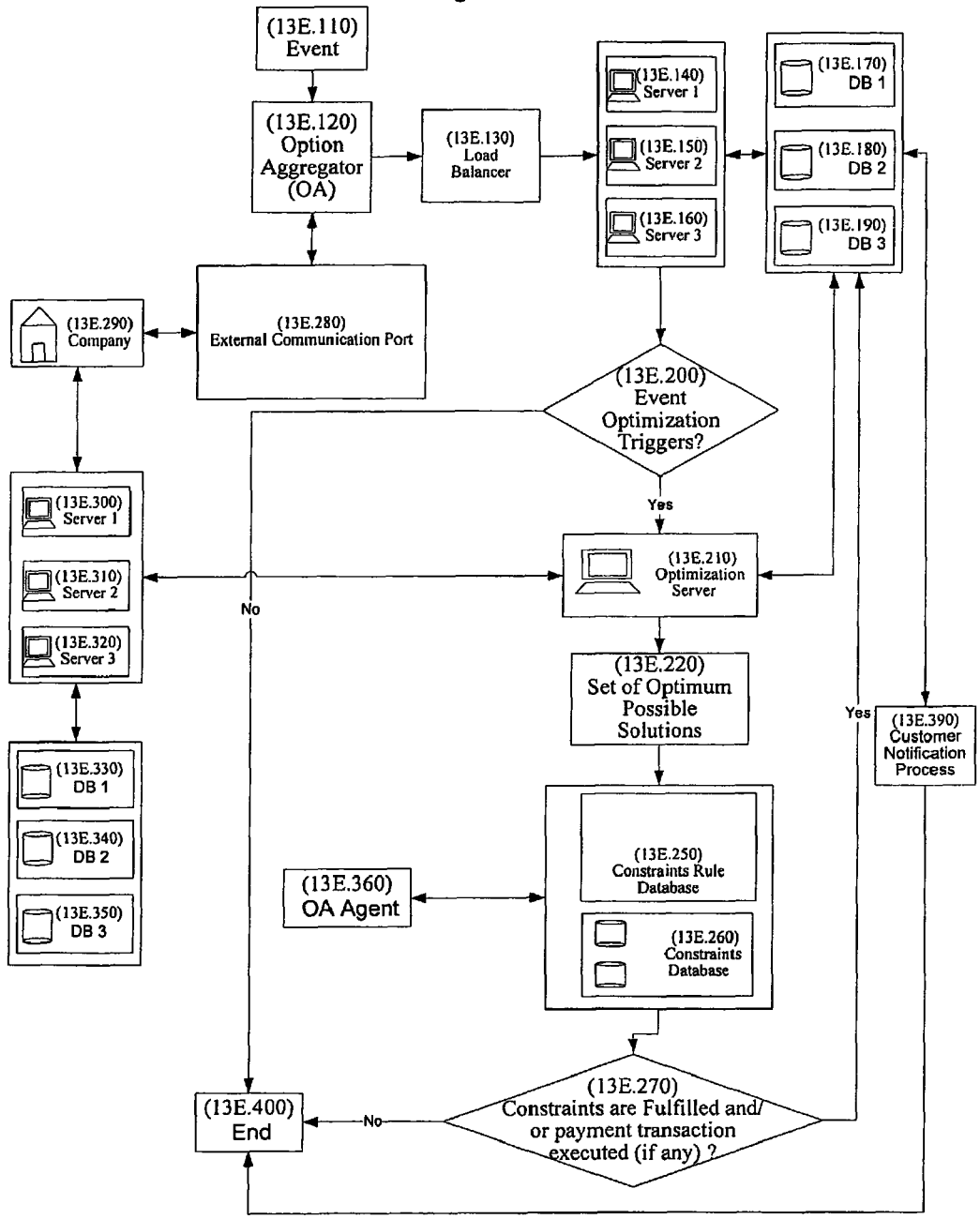
FIG. 13E is a diagrammatic illustration of implementation of event optimizer stage of a value option framework as a system.

Second stage in the value option framework is achieving concurrent optimization for at least two of the company, customer, OA, third entity or any combination thereof on occurrence of an event. FIG. 13E describes one of the ways of using the information network system in which interaction between OA, company and event (which may be triggered by the company, OA, customer, any third entity or any combination thereof) takes place.

FIG. 13E presents a diagrammatic representation of a chain of actions that takes place corresponding to occurrence of an event. There may be one or more different ways in which said action may take place and may depend upon the factors including, but not limited to, the arrangement between the OA and the company, factors of OA and/or company's choosing and one or more mediums of technology utilized in the system.

If an event is reported to an OA (Box 13E.110 and Box 13E.120), one or more load balancers (Box 13E.130) may be used to distribute the load across one or more servers (Boxes 13E140, 13E.150 and 13E.160). One or more different databases (of OA, third entity, the company and/or any combination thereof) may also be updated as per the requirement and the nature of the event. Information is processed through the servers using one or more RAM, Hard Disk Drives and other hardware products and corresponding to the occurrence of the event, updates are made in one or more databases as shown by the Boxes 13E.170, 13E.180 and 13E.190. One or more company servers and databases (shown by Boxes 13E.300, 13E.310 and 13E.320 and Boxes 13E.330, 13E.340 and 13E.350 respectively) may also be updated using external communication medium/port (Box 13E.280). The servers may include, but not limited to web servers, application servers, database servers and networking servers. One or more said databases include, but are not limited to, email database, option database, customer database.

Next, a test is performed to determine whether the Event Optimization process has been triggered by the occurrence of the event as shown in the Box 13E.200. If the Event Optimization process has been triggered, the process goes to the Optimization server (Box 13E.210). If the Event Optimization process has not been triggered, the process ends at Box 13E.400.

The Optimization server interacts with one or more databases including, but not limited to, the optimization rule database and customer rule database as shown in the Boxes 13E.170, 13E.180 and 13E.190. One or more optimization algorithm may be run within the optimization server using one or more RAM, Hard Disk Drives. As a result of optimization algorithm, the Optimization server may give one or more possible optimum solutions depending on the factors and rules determined by the company. OA and/or any third entity or any combination thereof, as shown in the Box 13E.220. A set of possible optimum solutions, then, passes through one or more databases including, but not limited to, constraints rule database and constraints (or validation) database as shown by the Boxes 13E.250 and 13E.260 respectively. While interacting with said database, the OA agent may also be approached as shown in Box 13E.260.

Next, a test is performed to determine whether the constraints are fulfilled and/or payment transaction is executed (if any) (Box 13E.270). If the constraints are fulfilled and the payment transaction is also executed (if required), a series of database updates as shown by the Boxes 13E.170, 13E.180 and 13E.190 may be done. Once one or more database are updated, the Customer Notification Process (Box 13E.390) takes place, in which the customer is notified, and the algorithm then ends in Box 13E.400. If the constraints are not fulfilled and/or payment transaction (if needed) is not executed, the process ends at Box 13E400.

One or more such kind of information technology system may be implemented for the specific value option framework. The system may be customized as per the specific requirements of the company, value option framework, OA, any third entity, customers and/or any combination thereof.

Benefit of Using the System and Method

Through this method, a new efficient approach is introduced for managing customer relationships, sales cycles, marketing, customer service, market research and customer feedback. It eliminates manual, time-consuming processes and replaces those with an efficient, automatic process.

By maximizing total value for its customers, a company can greatly improve its overall business prospects. The company can look to build very high customer retention rates and also increase the number of new customers gained per unit time. It can help to increase the overall sales and thus help increase the overall business value. The company may distribute a portion of additional value gained back to its customers to further strengthen its relationships with them, if it wishes.

A company may encourage customers to "opt in" to this system and provide the customer's preferences by giving rewards to customers to provide these preferences and commit early. The value options may be created and priced to motivate customers to make choices that both satisfy their needs and simultaneously allow the company to improve its operations.

This method further adds new dimensions to business parameters like inventory. Previously, for a company, inventory was either "Committed" or "Available." This method adds a new dimension of "flexibility." With the customer preferences and needs taken beforehand, we add the dimension of flexibility to the inventory. For example, a booked flight seat would conventionally be called committed inventory. But now within the new methodology, if the ticket-holding customer is flexible, his ticket may fall into a pool of flexible inventory availability, which may be sold to other customers, if necessary.

Another advantage is that the method creates a new type of inventor, called customer inventory. Once the method had been used for some period of time, a company, by using its powerful value option framework, would be able to capture its customers' and potential customers' future needs in advance. In other words, within the realm of company product offerings, the company would collect information on which customers want to purchase what products, when and with what specifications or parameters. Combining this individual customer data across thousands of customers would generate a customer needs and preference database with appropriate classification and parameters. The needs (and/or preferences) of this database could be classified as customer inventory wherein the items in inventory are the needs of several groups of customer with similar needs. Once the company has built such a database, they can use the customer inventory as and when needed in optimizing their internal operations to maximize value for both the company and the customers.

The method allows a company to move from a knowledge-based system to an expert system, which optimizes the decisions based on customer preferences and company economics. The method allows the companies to market a whole new paradigm of services and products surrounded around their original product offerings. This is achieved partly by unbundling formally bundled components of existing products, into components offered to the customer and partly by building new products and services. This allows the customers to choose product features they wish to purchase and saves the company from making investments and incurring costs in providing product components to those who don't want or desire those components.

In summary, it can be said this method accomplishes the following: (1) makes a business more attractive to customers by enabling customers to express their preferences; (2) makes a business more efficient and reduces costs; (3) allows a company to handle problems and disruptions in a quick, efficient manner to generate high customer satisfaction and keep their costs low; (4) helps a company to increase and strengthen its customer base, improve sales per customer, and customer retention, and (5) helps to increase the value customers gain from the purchased products.

The above method may be applied to several industries including, without limitation, airlines, hotels, automobiles, media, entertainment (television, radio, internet, etc.), furniture, insurance, computer hardware, travel (e.g., vacations, car rentals, cruises), events (such as theatre, movies, sports games etc.) and financial market. There may be several other industries that may benefit by using the new system and method.

Some value option frameworks related to the invention were described in full detail in incorporated-by-reference patent application Ser. Nos. 11/506,451, 11/474,115 and 10/973,802 and in each of international applications PCT/US2007/018290, PCT/US2007/014654 and PCT/US2007/014653. Discussions of these VOFs may be omitted or abridged herein; however such aspects are nonetheless intended to be part of this application and reference to these other applications may prove helpful for a fuller appreciation of the invention. A few value option frameworks will now be described in detail.

Alternate Product Option (APO) Value Option Framework

The creation and utilization (in two stages or acts) of another value option framework will now be discussed. This is the Alternate Product Option (APO) VOF. A company may implement an APO VOF in any industry. The customer need for flexibility (defined below) is used as the targeted value element. A detailed demonstration of the APO VOF is presented followed by a few examples of applying the APO VOF within different industries.

The first stage in the APO VOF involves steps (or acts) of capturing customer dynamics, assessing company operations and economic factors, integrating customer dynamics with company economic factors, formulating the VOF and optimizing the VOF. The second stage involves carrying out a dynamic interaction with the customer and then executing an Event Optimizer process. A detailed demonstration of the APO VOF is presented followed by a few examples of the APO VOF in other industries.

Figure 14:
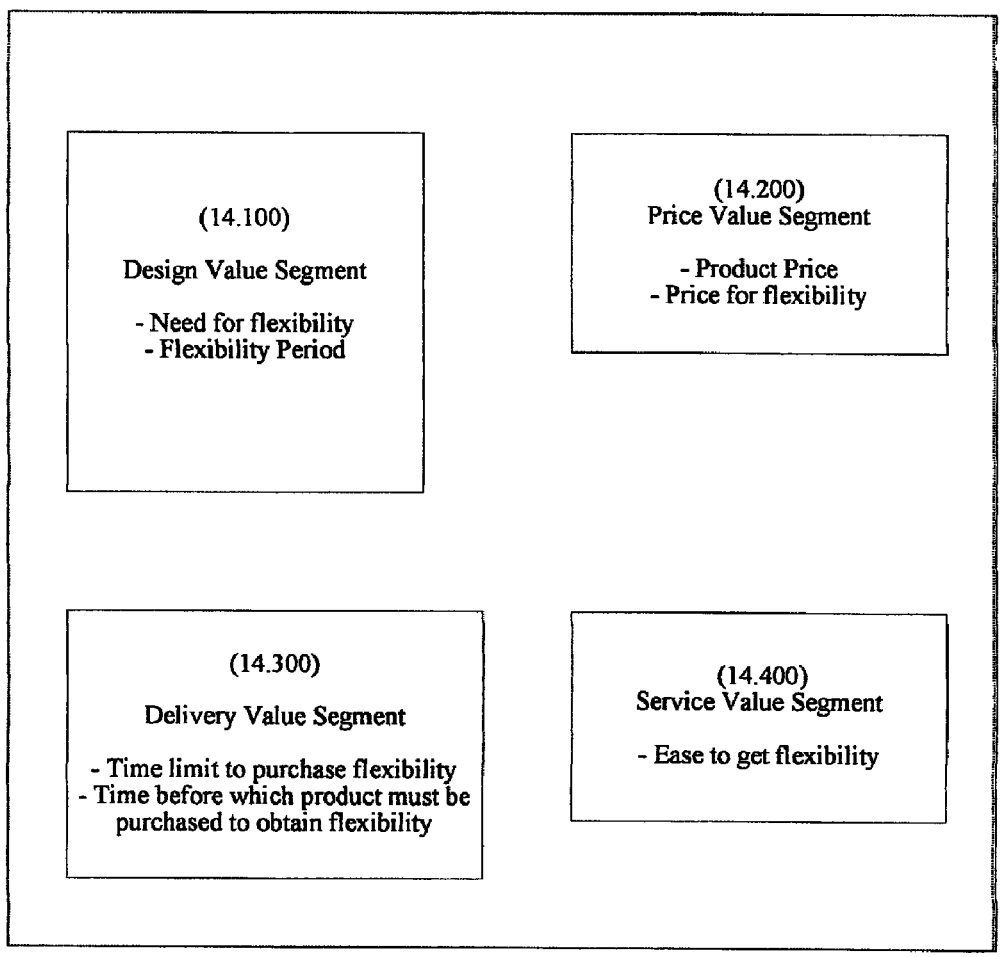
FIG. 14 is a diagrammatic illustration of an exemplary set of value segments and their value elements in the context of APO-VOF.

First Stage: Formulation of APO Value Option Framework (1) Capturing Customer Dynamics FIG. 14 shows an analysis of the value elements that are believed to matter to customers in relation to an APO. In the design value segment, shown in Box 14.100, important value elements may include, but are not limited to, the customers' need for flexibility and flexibility period. In the price value segment, shown in Box 14.200, important value elements may include, but are not limited to, Product Price and price for flexibility. In the delivery value segment, shown in Box 14.300, important value elements may include, but are not limited to, time before which a customer may be able to avail his or her flexibility, and how long before utilization, the product must be purchased to obtain flexibility. In the service value segment, the important value elements may include, but are not limited to, the ease of getting desired flexibility as shown in Box 14.400. It may be important to estimate the relative preferences and utilities of these value elements to different types of customers.

The customer need for flexibility is subjective in terms of one or more parameters including, without limitation, the length of flexibility period, extent of variation in need and others. The term "flexibility period" herein refers to the time period during which a customer may enjoy the flexibility in selecting and/or purchasing products. The needs of the customer may vary within a defined range. This range is termed "extent of variation in need". Some products may offer flexibility but the products may be highly priced, and hence only a few customers can afford to buy them or may be willing to pay for them. The customers may also desire flexibility and hassle free availability of the product at desired times. Many customers would be willing to pay for such additional flexibility. However, the price they pay or are willing to pay is subjective to the individual needs of the customers and the circumstances around.

(2) Assessment of Company Economics

An assessment of the crucial economic factors of a company, as indicated in Box 15.100, may reveal the factors to include, but not be limited to, fixed and variable costs, increased competition from competitors across different parameters, desire to reach out for newer market segments, the broad spectrum of time period over which the products are sold, a need to develop competitive advantage, and customer attrition rate.

An assessment of the crucial economic factors of a company may be performed, to determine the factors that affect the profitability, growth and goals of the company. It might be beneficial if a company utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information).

(3) Integration of Customer Dynamics with Company Economic Factors

Figure 15:
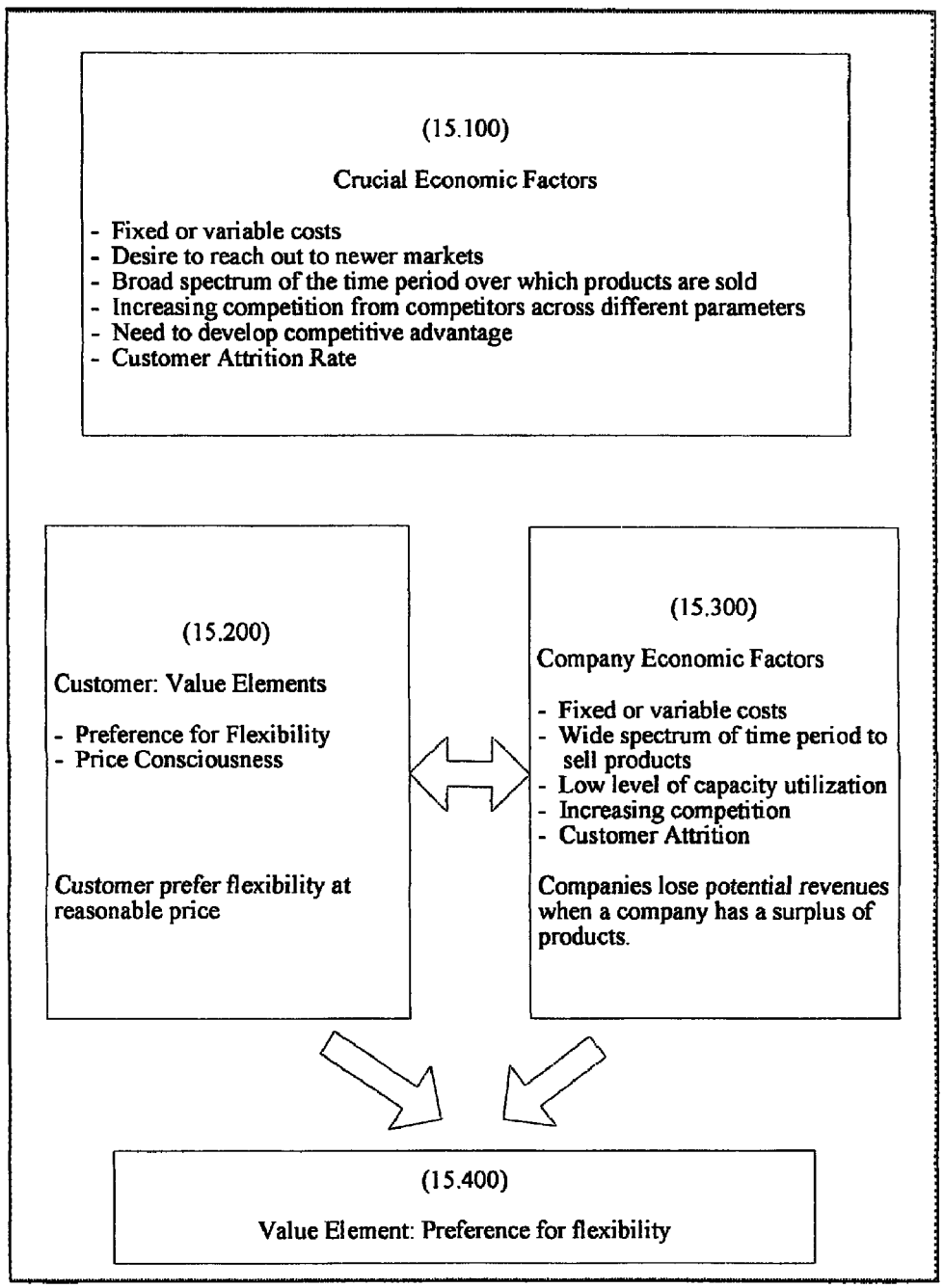
FIG. 15 is a diagrammatic illustration of company economic factors and mapping between customer dynamics and company economic factors.

FIG. 15 also illustrates an example of how a mapping can be done, between customer and company profiles, for the APO VOF in any industry. On one hand, the customers desire flexibility and are willing to pay for it accordingly. On the other hand, if a company has surplus products or capacity, that condition probably represents the loss of potential revenue (and/or opportunity cost) for that company. This is true even though no other potential customers have been turned away, simply because there may be one or more customers, who have purchased other products of the same or a different company and may be willing to switch to the unused surplus products (or capacity) at appropriate price/terms. But, today they are not able to do so for one or more reasons mentioned above. An opportunity thus exists to concurrently generate an incremental revenue benefit for the company from consumer surplus, and to maximize the purchase utilities for the customers. The APO framework is created based on a value element "Preference for flexibility". More specifically, as shown in the interaction between the Box 15.200 and Box 15.300, a mapping is performed between important customer value elements and company economic factors. The value element "Preference for flexibility" is extracted, as shown in Box 15.400 and an APO Value option framework is created.

(4) Formulating the "APO" Value Option Framework

Structure of APO Value Option Framework in Any Industry

Figure 16:
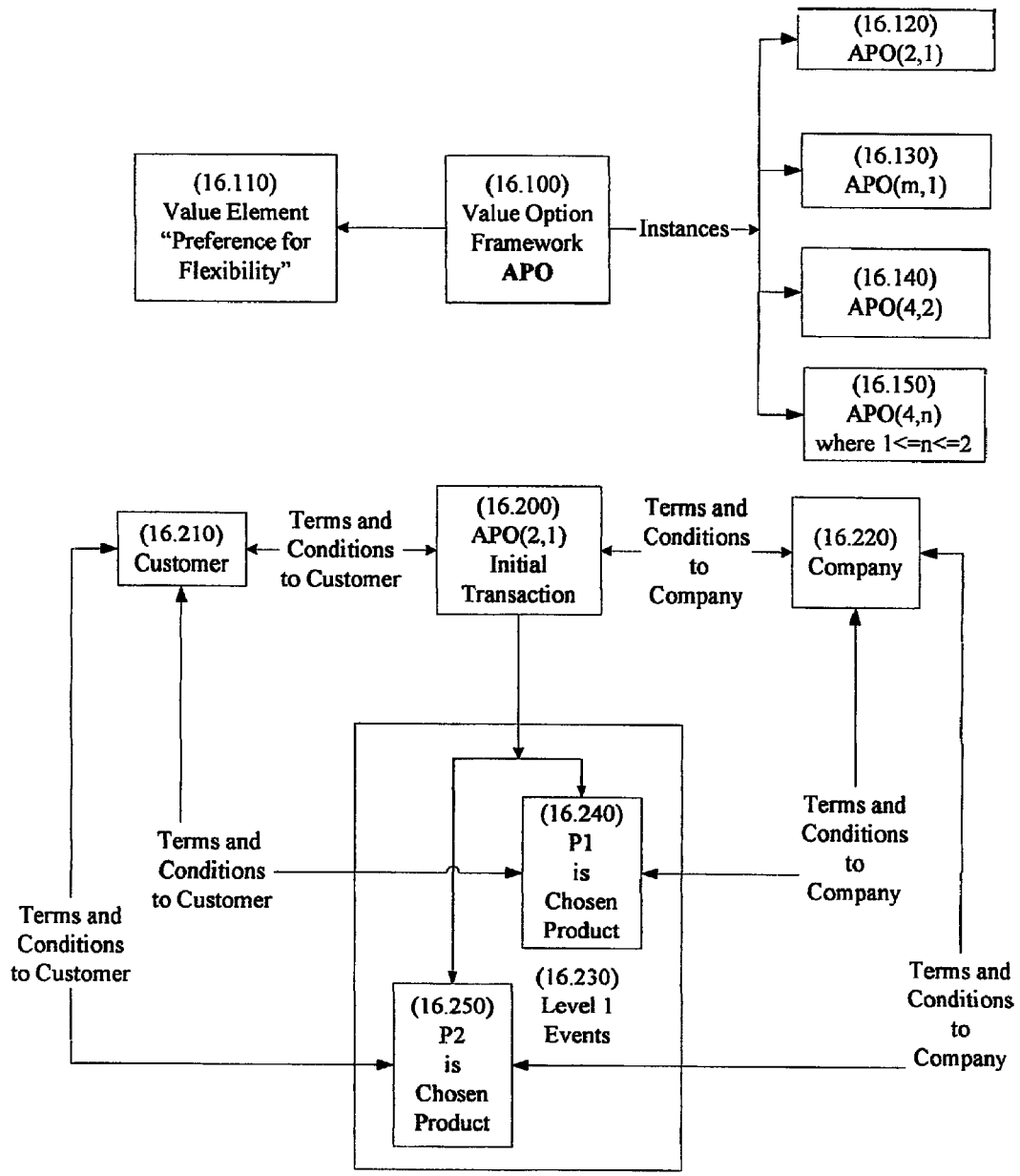
FIG. 16 is a partially-diagrammatic, partially-flow diagram representing the structure for creating an APO Value Option Framework.

FIG. 16 displays the structure of an APO value option framework (shown in Box 16.100) in any industry. The APO value option framework is related to the value element "Preference for flexibility", as shown in Box 16.110.

The first event in the APO VOF is referred to as "Initial Transaction" shown by Box 16.200, in which the customer (shown by Box 16.210) and the company (shown by Box 16.220) transact on an APO value option. There may be one or more Events (shown by Box 16.230) that follow the Initial Transaction.

In a successful Initial Transaction for an APO, a customer receives an option to choose up to 'n' out of 'm' selected products (said 'm' products termed "APO Products"). The 'n' products that are finally selected are termed "Chosen Products". After each of the 'n' Chosen Products is defined (or selected or chosen), the customer has the right to utilize (or can utilize) said Chosen Product. Apart from the 'n' Chosen Products, the remaining 'm-n' products are termed "Released Products". The Released Products (if any, that were probably held or blocked for said customer) may be sold to other customers as normal products or APO Products or used for other purposes. The Released Products in relation to said option may be reused by the company before, after, at or any combination thereof, the time the Released Products and/or Chosen Products are defined (or selected).

Numerically, the value of 'm' is greater than or equal to 1 and the value of 'n' may vary from '0' to 'm' depending upon the specific implementation of the APO framework. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value 'n' products may be defined in one or more transactions. The value of 'm' and/or 'n' may be defined and/or re-defined, at one or more times by the company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Products may include one or more products other than said 'm' products.

The company may award two or more confirmed products to a customer, where in said customer is allowed to utilize fewer and/or lesser than the awarded products. The term confirmed here may imply that the company has booked/reserved that product for said customer and he/she may be allowed to utilize that product subject to terms and conditions of the option contract. Booking here may include, but not be limited to, blocking of the product, holding of the product, reserving the product, formal acknowledgement of receipt, or anything else signifying similar meaning or interpretation. The term confirmation may allow the customer to utilize said confirmed product subject to the fulfillment of the terms and conditions, if any, in the option contract.

The time when an Initial Transaction is completed (i.e., the customer receives the APO option on said m Products) is referred to as the Initial Transaction Time (or ITT, in short). One or more of said m Products may be selected, at one or more times, before, after, during, or any combination thereof, the Initial Transaction and/or the time said option is delivered to the customer (or the customer receives said option) or any combination thereof. All the APO Products may be selected concurrently (i.e., all together in one transaction) or sequentially (i.e., in multiple transactions).

The delivery of an option may include, but is not limited to, electronic delivery of the option, physical delivery of the option, any other mode of delivery or any combination thereof. Once said option is delivered, one or more of m products may be available for use by the company, an entity other than the company and/or any combination thereof. The value of 'n' may be defined before, after or any time, the option being delivered to the customer. The delivery of option may occur in relation to the customer purchasing at least one product. The delivery of option may also occur in relation to the customer purchasing a product other than the product on which the option may be delivered. The customer may purchase a product other than the product on which the option is delivered to the customer.

The Initial Transaction may comprise one or more acts. The customer may select (or purchase) all APO Products concurrently (i.e., all together in one transaction) or sequentially (i.e., in multiple transactions). In the sequential case, a customer may select one or more products in one or more transactions just before or much before (a few days/weeks/months) the Initial Transaction for APO begins. Said selected product(s) (let's say X number of them), thus, may be considered as part of said m APO Products of the APO (m, n) transaction, and the customer may select only the remaining (m-X) number of APO Products during the Initial Transaction. All the transactions used to select all the APO Products of an APO (m, n) instance may be related to each other, and hence, are considered as related transactions (as defined earlier).

In an APO VOF, the sequential process may comprise a number of related transactions when all the APO Products are purchased one after another by paying a price in each (or some or none of the) transaction(s) or act(s). The transactions may be related due to a relationship during the Initial Transaction, one or more of the previously executed transactions, any other transaction or any combination thereof. In the related transactions, 'n' may be equal to 'm' when there may be at least one payment transaction between the company and the customer related to the products wherein such payment is made after the option has been granted. Said payment transaction may be one more transaction apart from the initial interaction and/or Initial Transaction in the event said customer utilizes all the 'm' products. The customer may select products prior to utilizing the penultimate product. The company, an entity other than said company and/or any combination thereof may reserve the right to limit the customer to products on, before, on or before, after, on or after or any combination thereof, a stated notification deadline date.

The time when an Initial Transaction is completed (i.e., the customer receives the APO option) is referred to as the Initial Transaction Time (or ITT, in short). One or more of said m Products may be selected, at one or more times, before, after, during, or any combination thereof, the Initial Transaction and/or the time said option is delivered to the customer (or the customer receives said option) or any combination thereof.

A company may choose to create one or more instances of an APO VOF based on factors including, but not limited to, number of APO Products, Chosen Products or Released Products, pre-determination of a number of Chosen Products or Released Products, other factors or any combination of the above. For example, an APO based on a combination of the number of APO Products (or m) and Chosen Products (or n) would be APO (m, n). Some APO instances are shown in Boxes 16.120, 16.130, 16.140 and 16.150. For example, when the number of Chosen Products is pre-determined, the APO (4, 2) instance may imply that the customer selects 4 APO Products, on the condition that the customer may choose any two out of those four products as Chosen Products. When the number of Chosen Products is not pre-determined, the APO (4, 2) instance may imply that the customer selects four APO Products, on the condition that the customer may choose zero, one or 2 products as Chosen Products out of APO Products. There may also be a minimum limit on n. For example, the APO (4,n) (where 1<=n<=2) instance limits the customer to choose a minimum of 1 and maximum of 2 Chosen Products out of the 4 selected APO Products.

The APO (2,1) instance, two APO Products and one Chosen Product, is used here as an example to demonstrate the details of the structure of an APO VOF. Box 16.200 refers to the Initial Transaction between the customer and the company, in which they transact on an APO (2, 1) value option. In a successful Initial Transaction for APO (2, 1), the customer selects two APO Products and can choose to use any 'one' of those two products. The product selected is the Chosen Product and the one not selected is the Released Product.

The Initial Transaction may have terms and conditions applicable to the customer or the company or both. These terms and conditions may be set, preferably, to concurrently benefit both parties. The connections between Box 16.200 and 16.220, and Box 16.200 and 16.210 refer to the terms and conditions to the company and the customer, respectively.

The APO VOF may or may not include any constraints on the APO Products. For example, a company may want to restrict APO applicability and availability on products that satisfy specific criteria. The two APO Products may or may not include practically constrained products. Practical constraints may include one or more constraints that will prevent a customer to utilize one or more given Products or prevent the customer from utilizing all the APO Products. Such practical constraints may include, but are not limited to, time constraints, location constraints and so forth. In other words, it may or may not be practically possible for a customer to utilize one or more of the selected products due to at least one practical constraint.

The APO VOF may or may not include any constraints on the APO Products based on their Product Prices (defined elsewhere). For example, the company may offer only those products as APO Products whose Product Prices at or before the ITT are less than a specified value, or may add a constraint on the maximum difference between the highest and the lowest Product Prices across a set of APO Products offered within a specific APO.

The APO Products may be selected by the company, the customer, another entity or any combination thereof. The APO VOF may enable a customer to have flexibility by selecting m Products and use said flexibility to satisfy his/her needs. Therefore, the customers would usually have the right to select (or define) the Chosen Products. However, in different implementations of APO VOF, the company, the customer, another entity or any combination thereof may select one or more of the Chosen Products related to an APO. The APO Products and the Chosen Products may be selected by the same entity, different entities or any combination thereof. The company may incorporate the customer information and the data related to the APO into the sales, production, inventory, other database or information system or any combination of the above. A customer may select APO Products in several ways; through mutual agreement (i.e., during a direct interaction such as a Product purchase), or the company may grant the APO Products to the customers without soliciting their interest or permission. For example, to enhance customer satisfaction or for any other purpose, a company may grant APO Products to customers based on the past customer behavior, interaction and so on.

The Initial Transaction may impose one or more conditions on the customer. A customer may be required to explicitly notify the company prior to or no later than a given date and time (referred to as the Notify Deadline) regarding the Chosen Product. For simplicity, it is assumed that whenever the term Notify Deadline is used in the following sections, the condition requires notification prior to the Notify Deadline. If there is no such explicit notification condition, the Chosen Product may be decided as per the terms and conditions of the option contract. In either case (explicit or implicit notification) the date and time when the Chosen Product is selected is referred to as the Customer Notification Time (or the CNT, in short). In the current discussion, the explicit notification condition is assumed unless specifically mentioned otherwise.

A company may determine one or more Notify Deadlines for a product at one or more times (e.g., before, during, after the Initial Transaction or any combination thereof) using factors including, but not limited to, customer needs, expected value of the product, company profitability goals, any other factors or a any combination of the above. Customer factors may also be considered in determining the Notify Deadlines, such as the flexibility periods desired by customers, picking easy times (like 6:00 pm instead of 6:32 pm) to help the customer remember the deadline(s) or any other factor that may affect the behavior of a customer. The APO VOF may or may not have a notification deadline condition.

The APO VOF may impose additional terms and conditions on the customer. The company and/or an entity other than the company may receive from customer, at one or more times, an indication of one or more terms and conditions associated with said option in the APO VOF. Similarly, at least one of said company and/or an entity other than said company may deliver to said customer, at one or more times, one or more terms and conditions associated with said option in the APO VOF. A customer may or may not have to pay any price for receiving APO Products (i.e., there may or may not be any payment transaction related to the Initial Transaction and/or other event related to the APO). There may be one or more prices related to the APO. A customer may be required to pay a price or fee related to APO at one or more times. A price may include, but is not limited to, a set of one or more Product Prices, a set of one or more APO Prices or any combination of the above. A company may use the method of its choosing to decide on all the Product Prices for APO.

The customer may be required to pay one or more prices during the Initial Transaction (which payment is referred to as an Initial Price), at the CNT (which payment is referred to as an Exercise Price) and/or at any other time, which may or may not be pre-determined between the customer and the company. The price may be a function of number of APO Products and/or Chosen Products, specific products selected for APO Products and/or Chosen Products, Notify Deadline, one or more Product Prices, any other factors of company's choosing or any combination of the above.

The price may include, but is not limited to, a monetary value or a soft/non-monetary value (e.g., discount vouchers, coupons or exchange of another service, other benefits such as loyalty program benefits, other forms or any combination of the above) or other consideration. The APO Price may be fixed or variable, with or without bounds. The company may set permissible range(s) or boundary limit(s) within which the APO Price can vary, or it may offer the customer a set of prices to choose from. Since price conditions may depend upon various factors, which may or may not be variable, the same may be decided at anytime. The price conditions may be determined by the customer, the company, a third entity, or any combination thereof at one or more times. One or more prices (Initial or Exercise or any other price) may be a negative value, which reflects that instead of the customer paying the company, the company shall pay a price to the customer.

Different price strategies may be implemented in the APO (2,1) instance. For example, a single Initial Price could make it attractive and easy for the customer to feel free to choose any product as the Chosen Product without worrying about any additional costs later. One or more of the APO prices may be embedded with the Product Price by using a special Product Price. A customer may be presumed to accept the APO offer while displaying the Product Price (that has the APO Price embedded in it). These presumptions may or may not include soliciting prior interest of the customer regarding the APO offer. In case, the APO price is merged with the Product Price, and where such price may or may not be separately identifiable, the customer may or may not be required to pay a separate price for APO.

The Notify Deadline may be pre-determined or may be determined later (i.e., after APO grant) by the company, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be charged if the customer notifies the company of the Chosen Product anytime before the first Notify Deadline. The price associated to the second Notify Deadline (i.e., the second earliest among the Notify Deadlines) may be charged if the customer notifies the company of the Chosen Product after the first Notify Deadline and before the second Notify Deadline. Similarly, different prices may be associated with other Notify Deadlines.

The terms and conditions of the APO VOF may not allow the customer to notify the company after the last Notify Deadline (i.e., the latest among the Notify Deadlines). This is done to facilitate the selection of the Chosen Product before the last Notify Deadline. As an operational measure, a rule may be set that if the customer fails, unintentionally or intentionally, to notify the company or an entity other than the company before the last Notify Deadline, then the company may treat either of the two products as the Chosen Product. Another approach may be (e.g., for company/customer) to designate one of the two products as a Default Product (during or after the APO purchase) that will be selected as the Chosen Product if the customer fails to notify the company of the Chosen Product before the last Notify Deadline. Any entity (e.g., the company or the customer) may (or may not) be allowed to change the Default Product once it is selected. The Exercise Price (if any) in the default case may or may not be equal to the Exercise Price for the Default Product for the last Notify Deadline. In the current discussion, a single Notify Deadline is considered.

The Exercise Price may be a function of Notify Deadline, Chosen Product, any other factor or any combination thereof. In such situations, a customer may have to pay a price to select a particular product as the Chosen Product at a given time.

The APO VOF may also include conditions imposed on or assumed by the company. For example, the company may be under a mandatory condition to hold (or block) a confirmed booking for the customer on the selected APO Products until the CNT passes to allow the customer to select either of the two products as the Chosen Product.

A company may determine customer preferences, either explicitly or implicitly, regarding utilization of up to n of m selected Products. The preferences may include, but not limited to, customer preferences for various products and services, needs, associated relative utilities, flexibilities, preferences regarding choice of Products, quality of Products, acceptable delays (relative) to receive different Products and so forth. The company, one or more entities other than the company or any combination thereof may seek customer preferences.

A company may also offer APO options to one or more customers on the basis of customer preferences, so obtained or collected. The company may offer said APO options based on the dynamics of the company including, but not limited to, inventory, operational data, revenue management data, cost data, financial data, accounting data, any other internal data, any combination thereof and so on.

A company may seek such preferences from the customers prior, during or after the customer has purchased the Product or any combination thereof. These customer preferences may help the company to perform concurrent optimization of value for the company, the customers, one or more entities other than the company or any combination of two or more of the above. The customers may also include the customers whose preferences have not been determined or collected to perform concurrent optimization. The data pertaining to the company, customers, one or more entities other than the company, any combination thereof, may be integrated to concurrently optimize the value for at least any two of said entities. There may or may not be any payment transaction between the company, one or more other entities and/or the customers regarding seeking such customer preferences, delivering APO options, customer participation in APO and so on.

A company may operate one or more systems and/or services to monitor the company dynamics. Monitoring may include, but is not limited to, monitoring of capacity, days to utilization, return and/or potential return of Products, flexible inventory that may be created in relation to said obtained preferences, analyzing various cost, revenue, operational or any other internal data and so on. The company may have one or more systems and/or services to analyze such data on a real-time or quasi real-time basis and draw conclusions on the basis of such analysis. Any of the systems and/or services may be operated by the company, one or more entities other than the company or any combination thereof.

A company may operate a system that defines customer preferences regarding at least utilizing up to n of m selected products, and n is less than m, operate a system that enables use of said preferences to optimize value for at least one of customers, said company and an entity other than said company. A company may concurrently optimize value for at least two of customers, said company and at least one entity other than said company.

A company may offer APO to all customers or any selected customers, such selection may be based on any criterion including, but not limited to, such as those who have expressed their relative preferences, those who have not expressed any preferences. By integrating the company dynamics and collected customer preferences, a company may offer appropriate incentives and terms and conditions for APO to generate desired participation.

Once the Initial Transaction is successful, there may be at least two possible related events, as shown by Box 16.230. The two events are (1) that P1 is the Chosen Product (as shown by Box 16.240) and (2) that P2 is the Chosen Product (as shown by Box 16.250). Each of these two events may be associated with various terms and conditions on the customer and/or the company. As explained above, the events may take place in two ways: either the customer selects the Chosen Product according to his/her utility, or the company selects the Chosen Product based on pre-determined rules (e.g., if the customer fails to notify the company before the Notify Deadline). In both situations, once the Chosen Product is selected, the company is free to reuse the Released Product for potential revenue. The customer may have to pay an additional exercise price at the CNT depending on the terms and conditions of the option contract. Once the Chosen Product is selected, the company and/or the customer may not change the Chosen Product except within the bounds of the terms and conditions in the option contract. The company or customer may (or may not) have the right to enforce the Chosen Product on the other party as per the terms and conditions of the option contract.

The Released Product may be blocked for the period between the ITT and the CNT. This period is termed the "Blocking Period". If there is more than one Notify Deadline, the exact length of the Blocking Period is unknown, but the minimum and maximum lengths are known to be between the ITT and the First Notify Deadline and between the ITT and the Last Notify Deadline, respectively.

The company may offer incentives to the customers to motivate them to choose one or more products as Chosen Products among the APO Products that may be more optimal for the company. A company may formulate one or more such offer (may referred to as Chosen Product Incentive Offers) and may send them to customers who have purchased APO but not yet selected their Chosen Product via email, phone, mail or any other communication channel. Thus, such customers may be persuaded to select said optimal product in lieu of incentives.

The company may generate revenue from the Released Product without utilizing the Released Product. The Product Price of the Released Product may be varied in such a way that may increase the demand of one or more other products offered by the same company, any other entity apart from said company, or any combination thereof. The variation in the Product Price of the Released Product may cause a spilled demand for this product but may create a surge in demand of one or more other products in the same or different product segments of the same company, any other company apart from said company or any combination thereof.

The above terms and conditions of the APO VOF may be set in a way to concurrently benefit the customer, the company, any other entity or any combination thereof. The customer receives additional utility from the flexibility to choose a desired product from among alternatives. The company benefits from enhanced customer satisfaction (loyalty and repeat business), incremental revenue from the APO Price and selling (reusing) the released products, generating revenues from Released Products without actually reusing the Released Products and other operational benefits.

An APO VOF may include a right for the customer to utilize each of the m selected APO Products, along with a right for the company to limit the products (to fewer than m) that the customer can utilize if the company notifies the customer on a stated Notify Deadline. Said on a stated Notify Deadline may include, but not limited to, on and/or before the stated Notify Deadline, on and/or after the stated Notify Deadline, any combination thereof. The right may include the condition that the company may notify the customer prior to or at the, prior to the, at or after the or after the stated Notify Deadline (which may be determined by the company and/or or the customer during or after the Initial Transaction). To provide flexibility to the customers, the company may offer (or allow) the customer to express their preferences regarding the Chosen Product(s) before the stated Notify Deadline. If the customer fails to do so, the company may or may not exercise their right to limit the customer to utilize fewer than (for example, at least one less) the earlier selected products (i.e., m products). The right may include the condition that the company may limit the customer after the customer expresses his/her preference for the Chosen Products. The company and/or an entity other than the company may have said limitation on at least one product. There may be a condition imposed on the customer to make at least one payment to the company when the customer expresses his or her preferences for the Chosen Products. The company and/or an entity other than the company may allow the customers to define said products on or before a stated date. The company and/or an entity other than the company may reserve the right to take back any 'm' minus 'n' products after the stated date. The customer, the company, an entity other than the company and/or any combination thereof may determine the notification date.

An APO VOF may include an option for the customer to utilize up to n of the m selected APO Products, where n<m, along with a condition that the customer may be able to utilize all the m selected products if there is at least one payment transaction between the company and customer in relation said APO grant, and that such payment is made after the APO is granted to the customer. This may provide additional flexibility to the customer. The customer may be limited to take the decision regarding utilizing all the m products before the utilization of the penultimate product. Said payment may be made in a separate transaction executed at any time after the Initial Transaction. The timing of said payment may be predetermined. The customer may be able to select all the m products together in one transaction.

The costs, revenues, benefits, terms and conditions shown here are for illustration purposes only and actual values could be different depending upon specific values selected by the company for value options, customer behavior, company characteristics, Notify Deadline(s) and other relevant factors.

Thus, the APO concurrently optimizes value for at least two of the company, its customers, any other entity or any combination thereof. The customers receive enhanced flexibility in utilizing a product and utility in terms of guaranteed availability of alternate products at a (presumably low) known price with no hassles, whereas the company receives a significant incoming revenue benefit from consumer surplus. The company gets to know the relative preferences and utilities of a customer for various products as some customers take this option and others don't. The presumption here is that customers make a logical decision to choose the APO value option framework if they prefer to have alternate product flexibility in utilizing one or more products and can afford to pay the APO, Price(s) (initial and exercise if any). The company also benefits from higher customer loyalty as customers receive higher satisfaction from using the company services, and can optimize its profitability by reusing/reselling the Released Products. The structure presented below for the APO (2,1) instance may be extended to implement other instances.

Example of APO VOF (2, 1) Structure

FIGS. 17 and 18 demonstrate an illustrative practical example of using the APO (2, 1) instance in any industry. Consider a customer who interacts with a company to get APO. Per Act 16.200, an Initial Transaction takes place between the company and the customer. FIG. 17 displays some of the details of the Initial Transaction. The customer selects two APO Products, P1 (shown in Box 17.100) and P2 (shown in Box 17.200), and can choose to utilize either of them but not both (i.e., select either of them as the Chosen Product). The company is under the condition to hold confirmed booking for the customer on both P1 and P2 until the Chosen Product is selected.

The customer pays an amount of $45 as the Initial APO Price and $500 as the Product Price to the company as part of the Initial Transaction. The Initial Transaction takes place on the 14$^{th}$ day of April (i.e., the ITT, shown in the second row of the Box 17.300). There is an explicit notification condition and the customer has to pick and notify the company regarding the Chosen Product.

The following text presents different cases to illustrate different types of terms and conditions that may be associated with the purchased APO. Four different scenarios are considered with different conditions (shown in FIG. 18). In all the scenarios, the Notify Deadline is expressed in terms of the number of days to utilization (DTU).

The first scenario, as demonstrated in the Box 18100, displays a condition of the explicit notification without any exercise price. The customer needs to notify the company regarding the Chosen Product before 7 DTU (as shown by the Notify Deadline). The APO Price charged during the Initial Transaction serves as the total direct incremental revenue for the company and as the direct cost to the customer. There is no exercise price if the customer defaults.

The second scenario, as demonstrated by Box 18.200, displays a condition of the explicit notification with an exercise price that is a function of the Chosen Product. The Notify Deadline is 7 DTU. If P1 is the Chosen Product, then customer has to pay $10 as the exercise price, as shown in the second column of the second row in the Box 18.200. If P2 is the Chosen Product, then the customer has to pay $20 as the exercise price, as shown in the second column of the third row in the Box 18.200. P1 is the Default Product and the exercise price in the Default case is $20. The total APO Price charged to the customer (i.e., the direct incremental revenue to company) may turn out to be $55 or $65 depending on the Chosen Product.

The third scenario, as demonstrated in the Box 18.300, displays a condition of the explicit notification with an exercise price that is a function of the Notify Deadline. There are four Notify Deadlines associated with the APO. The exercise price increases from $0 (for the First Notify Deadline of 30 DTU) to $40 (for the Last Notify Deadline of 1 DTU). If the CNT is before 30 DTU, then the customer pays nothing more to the company as shown in the second column of the second row in the Box 18.300. If the CNT is after 30 DTU and before 7 DTU, then the customer pays $20 as the exercise price (shown in the third column of the second row in Box 18.300). Similarly, the customer pays an exercise price of $30, if the CNT is after 7 DTU and before 3 DTU, and an exercise price of $40, if the CNT is after 3 DTU and before 1 DTU (as shown by the next two cells in the Box 18.300). If the customer fails to notify before 1 DTU (the Last Notify Deadline), then the Default Product P1 (shown in Box 18.300) will be selected as the Chosen Product at an exercise price of $40.

The fourth scenario, as demonstrated by Box 18.400, displays a condition of the explicit notification with an exercise price that is a function of both the Notify Deadline and the Chosen Product. Here, all the Notify Deadlines used in the third scenario are used in this scenario as well. If the CNT is before the First Notify Deadline, then the customer pays nothing more to the company if the Chosen Product is P1, and pays $10 as the exercise price if the Chosen Product is P2, as shown in the second column of the second and third rows in the Box 18.400, respectively. If the CNT is after the First Notify; Deadline and before the Second Notify Deadline, then the customer pays an exercise price of $20 or $25 if the Chosen Product is P1 or P2, respectively, as shown in the third column of the second and the third rows, respectively in the Box 18.400. Similarly, the customer pays an exercise price of $30 for P1 or $35 for P2, if the CNT is after 7 DTU and before 3 DTU, and $40 for P1 or $50 for P2, if the CNT is after 3 DTU and before 1 DTU, as shown in the fourth and fifth columns of the second and the third rows in the Box 18.400, respectively. If the customer fails to notify before the Last Notify Deadline (i.e., 1 DTU), then the Default Product, P2 (as shown in the Box 18.400), will be selected as the Chosen Product. The exercise price is $50 in the Default case.

Per Act 16.230, either of the two events may take place; either P1 is the Chosen Product or P2 is the Chosen Product. Let us assume that the customer chooses the product P1 as the Chosen Product and notifies the company with the CNT of 8 DTU in both the first and second scenarios and the CNT of 4 DTU in the third scenario. And in the fourth scenario, the customer fails to provide a timely notification.

In the first three scenarios. P1 is selected as the Chosen Product, and the P2 is released by the company to be used for further sales or other purposes. In the first scenario, the customer pays nothing more to the company. In the second scenario, the customer pays $10 as the exercise price, and thus, a total of $55 as the total APO Price to the company. In the third scenario, the customer pays $30 as the exercise price, and thus, a total of $75 as the total APO Price to the company.

hi the fourth scenario, the customer fails to notify the company and hence, the Default Product (i.e., P2) is selected to be the Chosen Product. The customer pays $50 more as the exercise price and thus, a total of $95 is paid to the company as the total APO Price.

Model to Analyze APO Applicability and Pricing Dynamics in any Industry

The model presented below may be applied for the APO VOF in any industry to study and analyze the dynamics of applying APO to a given set of products. In general, the Expected Value of a product (EV) implies the revenue (or other value, e.g., costs savings or revenue plus costs savings) expected, on average, by selling and/or using the product for any other purpose. Companies use different types of pricing mechanisms to price their products in order to generate value greater than or equal to the expected value of their products. The calculation of EV and Product Price is not discussed or presented here. A company may use a method of its choosing to calculate EV and Product Prices.

The following model presents a set of equations for the generic APO (m, n) instance. The company, customer, any other entity or any combination thereof selects m products and can choose any n products out of those m. The Chosen Products may be selected in many ways, where each such combination of Chosen Products along with associated conditions is termed "Chosen Product Group". A Chosen Product Group may include the combinations which may have the same exact set of products but may differ in terms of one or more associated conditions such as price, Notify Deadline(s) or others. For example, two combinations would be different when the Chosen Products are the same but the CNTs are different, leading to different Exercise Prices.

The following inequality is presented as a general function for the $t^{th}$ Chosen Product Group.

$$Si + \sum_{j=1}^{n} Pe(j, t) + \sum_{i=1}^{m} \Delta EVBP(i, t) >= 0$$

where,
k=total number of Chosen Product Groups,
Si=Sum of the all prices paid prior to or at the ITT, including all Product Prices and APO Prices.
Pe(j,t)=Exercise Price paid for selecting the product 'j' as the Chosen Product within the $t^{th}$ Chosen Product Group, and
$\Delta EVBP(i,t)$=change in the EV of Product 'i' across the Blocking Period, within the $t^{th}$ Chosen Product Group.

A set of k number of inequalities may be created, for each of the Chosen Product Groups (i.e., from 1 to k), which would together represent the APO dynamics. A company may then use and solve a system of k inequalities to determine optimal price, notify deadline, capacity and other conditions for the APO VOF.

A company may use the model provided above to decide on the terms and conditions of an APO VOF that would make the APO offer a valuable proposition for both the customer and the company. Notify Deadlines, APO Prices, Product Prices, APO availability on products and other terms and conditions may be decided based on an analysis done using the above model.

5) Optimization of APO VOF

As mentioned earlier (shown in FIG. 7), in the form of an optional last step in the first stage, a financial analysis may be performed using the existing company and customer data to determine the optimal terms and conditions of the APO VOF. 'What-if' scenarios may be executed to determine an optimal pricing strategy. The company may want to divide customers using one or more criteria and design separate APO VOF for each customer segment.

Second Stage: Using the APO Value Option Framework

After completing the first stage of the method, the company has created an APO VOF and specific options within that framework. The company may have also segmented customers and designed options accordingly. The company is fully prepared to use a structured format comprising one or more APO value options to interact with its customers in real time to generate benefits for both the company and its customers. The second stage of the APO VOF is now presented.

Figure 19:
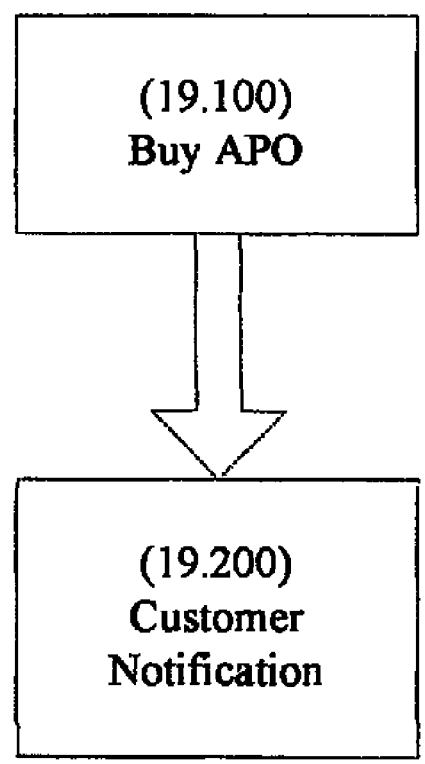
FIG. 19 is a diagrammatic illustration, in a high level flowchart, of a process for APO VOF implementation.

The implementation of the APO VOF between the company and its customer takes place through two high level acts, as shown in FIG. 19. In Act 19.100, the 'Buy APO' process, an interactive event between the customer and the company's web server, runs to carry out the Initial Transaction of the APO VOF. In this Act, a number of algorithms may be executed (e.g., availability, APO Price, Product Price and Notify Deadlines) on the company's server to optimally calculate the terms and conditions of the APO VOF to concurrently benefit the company, the customer, any other entity and/or any combination thereof. In Act 19.200, the customer notification process (explained later) is executed. In this process, the customer selects the Chosen Product. The process may also comprise one or more event optimizer algorithms that may help to optimally select the Chosen Product and/or to optimally reuse the Released Product.

Figure 20:
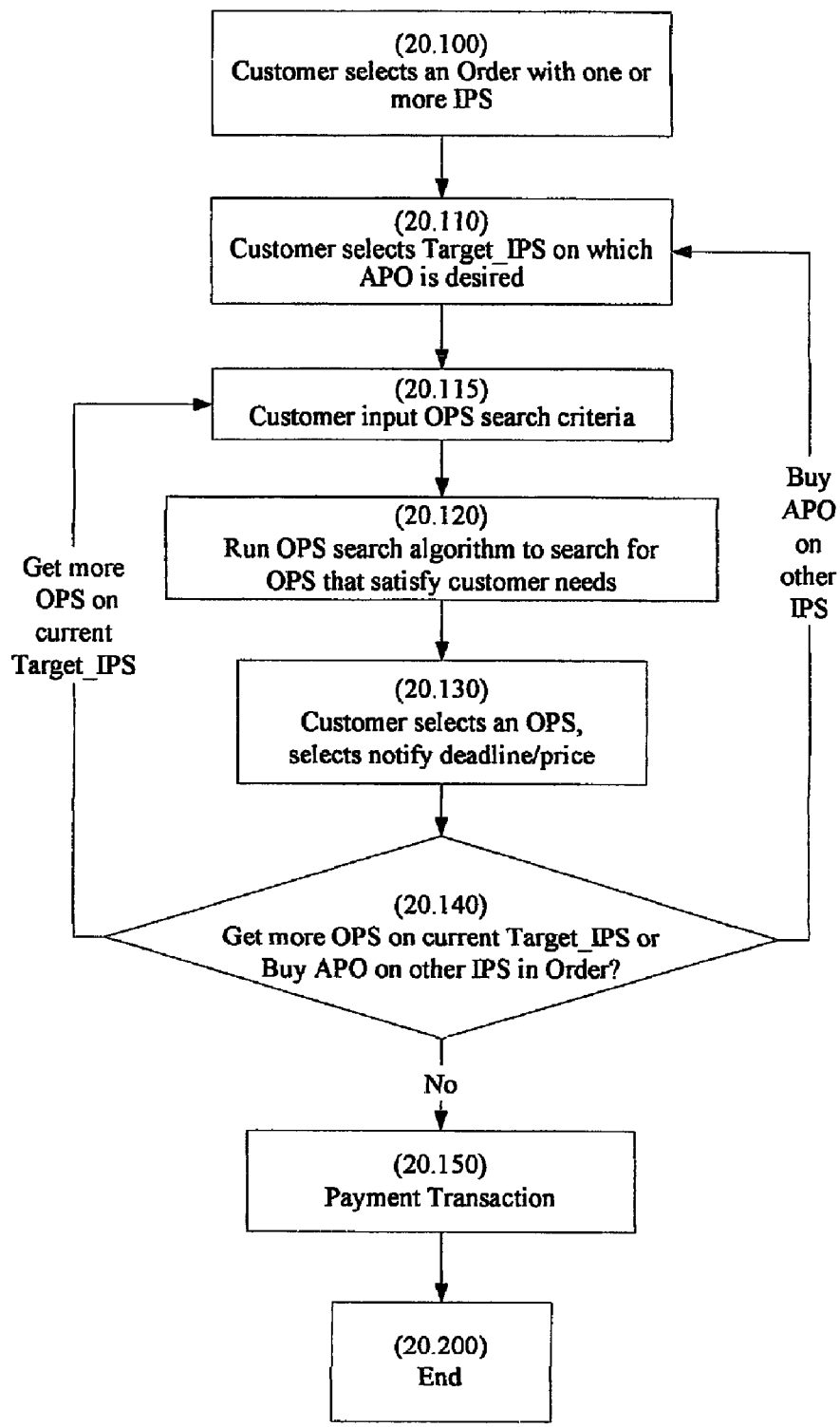
FIG. 20 is a flowchart that expands Act 100 of FIG. 19, illustrating a high level algorithm for the "Sequential Buy APO" process.
Figure 22:
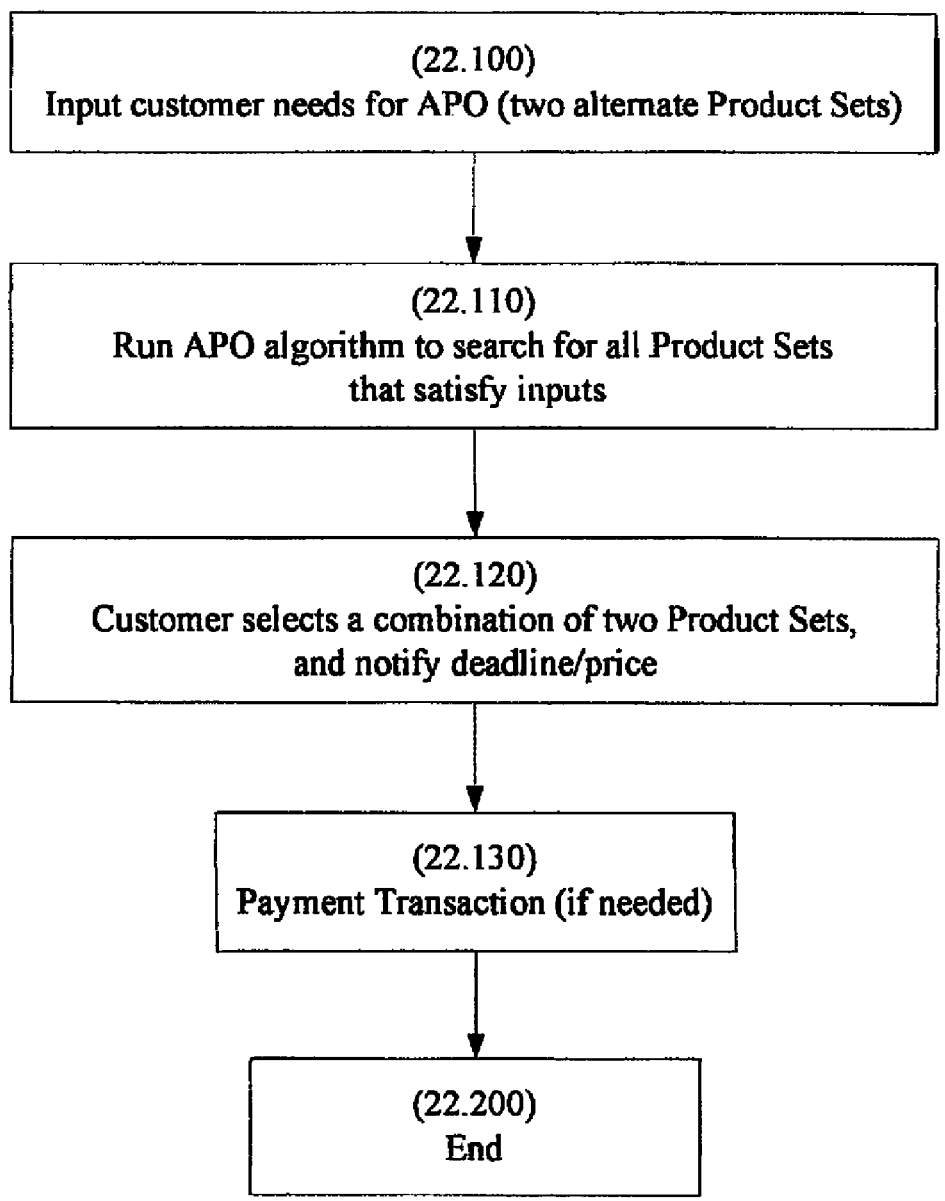
FIG. 22 is a flowchart of an algorithm for the "Concurrent Buy APO" process, an alternative process to FIG. 20.

As explained above, the Buy APO process may be implemented via the Sequential (shown in FIG. 20) or the Concurrent (shown in FIG. 22) process. There are many ways to do the Sequential process. As an example of the Sequential process, a customer may have already purchased a Product/Set/Order before the Initial Transaction begins. In such situations, said Product/Set/Order may be referred to as Initial Product/Initial Set/Initial Order or IP/IS/IO, in short, respectively. The Initial Set is also referred to as Initial Product Set (or IPS, in short). A customer may get an APO, i.e., get one or more APO Products/Sets/Orders on an IP/IPS/IO, respectively. An APO Product/Set/Order is also referred to as Option Product/Option Set/Option. Order, or OP/OS/OO, in short, respectively. An Option Set is also referred to as Option Product Set (or OPS, in short). The terms "APO Product"/"APO Set"/"APO Order", "Initial Product"/"Initial Set"/"Initial Order" and "Option Product"/"Option Set"/"Option Order", respectively, have been used interchangeably as and when context requires. The two events (one for the Initial Product and the other for the Initial Transaction) may be executed with a minimal (one just after another) or a significant time gap (e.g., few minutes, hours, days and so forth) in between them.

The APO VOF may be implemented at different levels including, but not limited to, Product, Set and Order. Few illustrations of implementation of these levels are presented later, along with the detailed discussions on specific industries since selection of an industry provides a context and makes the understanding smoother and easier.

A company may choose to implement an APO at any level(s). In a specific APO interaction between a customer and the company, the implementation level should be the same for all APO Products, Chosen Products and Released Products. For example, if APO is implemented at the Order level, then all the APO Products would refer to APO Orders; Chosen Products would refer to Chosen Orders; and Released Products would refer to Released Orders.

1. 'Buy APO'—Dynamic Interaction to Capture Customer Demand

In the Buy APO process, a customer interacts with the company's server to buy an APO. The interaction may take place, for example, via phone, in-person or on a website. The Sequential Buy APO Process is presented first along with its detailed algorithms, followed by a short summary of the Concurrent Buy APO Process.

Sequential Buy APO Process

There are several ways to implement the Sequential process. Few examples of implementation of the Sequential process are presented in reference with specific industries later, along with the detailed discussions on those industries since selection of an industry provides a context and makes the understanding smoother and easier.

The following presents an algorithmic illustration of the Sequential Buy APO process mentioned above. Consider FIG. 20. In Act 20.100, the customer selects (and/or purchases) an Order (with one or more IPS). Next, in Act 20.110, the customer reaches an interactive interface of the company's web server to a Buy APO page, where the customer selects an IPS (referred to as Target_IPS) on which an APO is desired. Next, the customer inputs the OPS search criteria for the current Target_IPS in Act 20.115.

Next, on clicking the "Search APO Products" button, control goes to Act 20.120, where the OPS search algorithm is executed to search for an OPS. The OPS search algorithm returns a list of valid OPSs, along with a list of Comb_NDs (defined elsewhere) and associated APO Prices. The details of the OPS search algorithm are presented later. Next, the search results are displayed for the customer, who then selects the desired OPS and one or more associated Comb_ND(s)/APO Price(s), as shown in Act 20.130.

Next, in Act 20.140, a test is performed to determine whether the customer wants to select more OPSs on the current Target_IPS or on another IPS. If the customer wants to get an OPS on another IPS, control loops back to Act 20.110, where the customer selects another IPS as the Target_IPS, and then the process is repeated again for the new Target_IPS. If the customer wants to get more OPSs on the current Target_IPS, control loops back to Act 20.115, where the customer enters the OPS search criteria, and then the process is repeated for the new OPS search criteria. If the customer does not want to buy any more OPSs, control goes to Act 20.150, where a payment transaction (if needed) may be executed. For example, a customer may need to pay a price for the Product after taking into consideration the initial APO Price (if any) using a credit card, direct bank account debit or any other payment transaction mechanism. Next, the algorithm ends in Box 20.200. The computation may be performed using a processor that may calculate results in optimal time.

OPS Search

Figure 21:
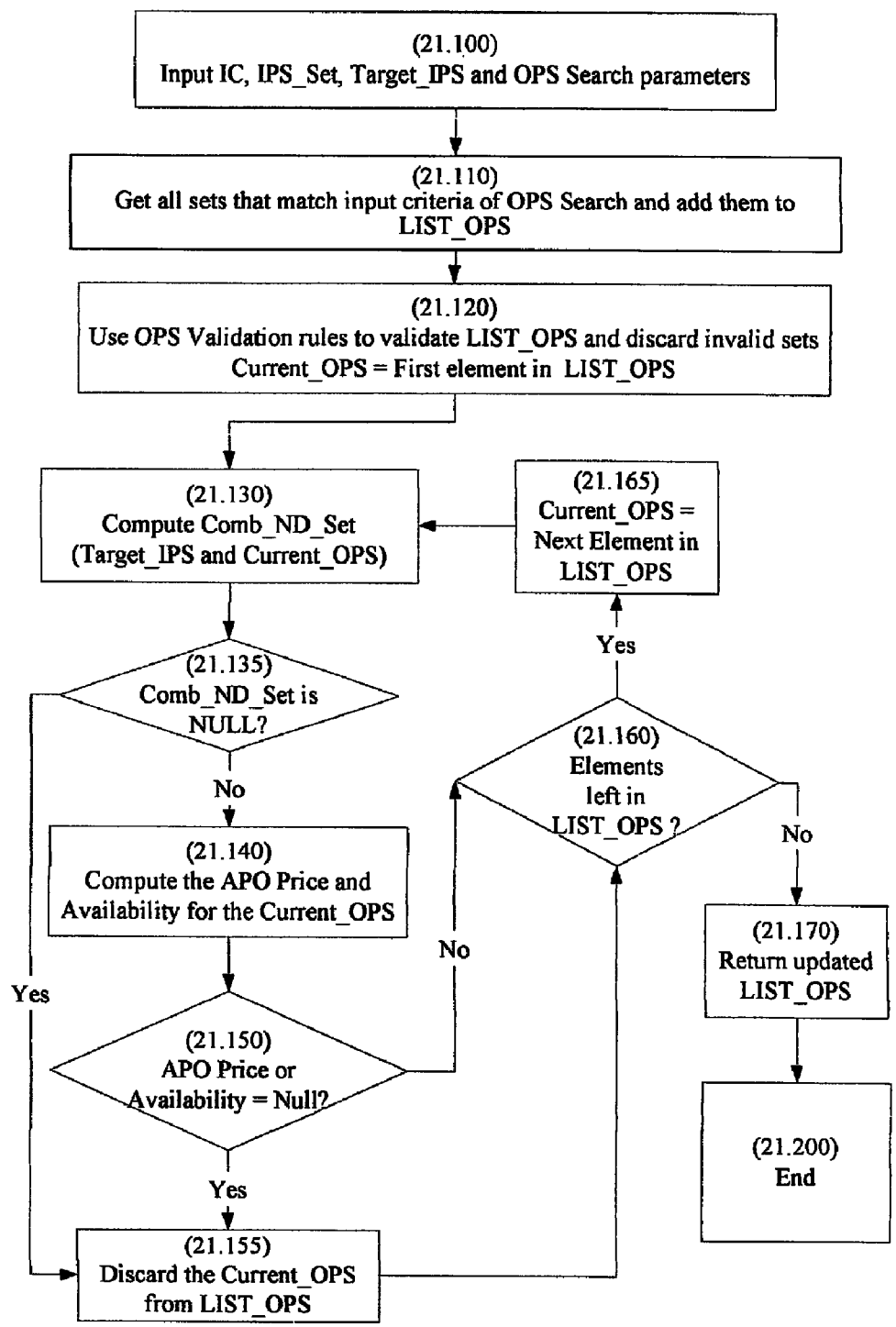
FIG. 21 is a flowchart that expands Act 120 of FIG. 19, illustrating an algorithm to search for APO Products (or Option Product Sets)

The following algorithm (shown in FIG. 21) determines and validates an OPS for a given set of conditions including, but not limited to, availability, Notify Deadline and price. One of the ways of implementation of the OPS Search has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 21.100, the number of customers (IC), IPS_Set (containing all the IPS in the Initial Order, and all the OPSs, (if any) already selected/purchased along with Comb_ND_Set(s) and Comb_OP_Set(s), for each IPS), Target_IPS and the OPS Search parameters are input to the system. The definitions and details on Comb_ND_Set and Comb_OP_Set are provided later. The OPS search parameters may include, but are not limited to, date, time and location, number of Products per Set, Notify Deadline, APO Price and so forth as appropriate for a given product in a given industry. A customer may be allowed to input Notify Deadline and/or APO Price on the basis of which valid OPSs (that satisfy the given criteria of Notify Deadline and/or APO Price) may be searched for and displayed for the customer. In another example, a customer may be asked to input one or more product related parameters, and then a set of Notify Deadlines and APO Prices may be computed for the Products that match the given criteria. In yet another example, a customer may input both product related parameters and Notify Deadline and/or APO Price inputs and then a search may be performed for valid OPSs. In another example, a customer may input to the system, one or more Products, and/or inputs to search for one or more additional products (e.g., price etc.) to search for OPS that may be combined with one or more input products (by the customer) to constitute the total set of products for an APO. In such situations, a company may also validate the products input by the customer to determine if said products are eligible to be APO Products.

Next, control goes to Act 21.110, where an OPS Search is performed for the given criteria. The search may be best performed using a processor that may calculate results in optimal time. The order in which search parameters are executed may be optimized to reduce the search time, however, it may or may not affect the final outcome. A company may select any order of its choosing. In Act 21.110, Product Sets are determined that match the search criteria and the resulting Sets are added to a list termed LIST_OPS.

Next, in Act 21.120, a list of OPS validation rules is obtained from the company's APO VOF database and the rules are used to validate all the Sets in the LIST_OPS list. Sets that do not satisfy the rules are discarded. Validation rules may include, but are not limited to, a Maximum Number of Products per Set Rule, a Maximum Product Price Rule and so forth. For example, a Maximum Number of Products per Set Rule discards the Sets that have more Products than specified. A company may implement any validation rule of its choosing to further qualify the Sets in the LIST_OPS list. As a last Act in Act 21.120, the first element in the updated LIST_OPS list is designated as the Current_OPS.

Next, control goes to Act 21.130, where a group of Comb_NDs is computed for the combination of the Target_IPS, all the existing OPS of the Target_IPS and the Current_OPS, and added to a set called Comb_ND_Set. Next, in Act 21.135, a test is performed to determine whether the Comb_ND_Set obtained in the previous Act is Null. If so, control goes to Act 21.155. If not, control goes to Act 21.140, where the APO availability and APO Price for the Comb_ND_Set are determined. Next, in Act 21.150, another test is performed to determine whether the APO Availability or the APO Price is Null. If so, control goes to Act 21.155. If not, control goes to Act 21.160.

In Act 21.155, the Current_OPS is discarded from the LIST_OPS list_and control goes to Act 21.160, where a test is performed to determine if more elements are left in the LIST OPS list. If so, control goes to Act 21.165. If not, control goes to Act 21.170.

In Act 21.165, the next element in the LIST_OPS list is designated as the Current_OPS and control loops back to Act 21.130 to repeat the process for the new Current OPS. In Act 21.170, the updated LIST_OPS list is returned as the search result, and then the algorithm ends in Box 21.200.

Computation of Notify Deadlines

A company may set one or more Notify Deadlines of its choosing for its Products. Once the Notify Deadlines have been set for each Product, the next Act is to create a framework to compute the Notify Deadlines for a group of Products (such as a Set, an Order or any other group). The following sections present an example of a framework that may be used to obtain a set of Notify Deadlines applicable to a group of Products. A company may use any framework and algorithm of its choosing to obtain the same.

A set of Notify Deadlines associated with a Product, a Set and a combination of two or more Sets is called Product_ND_Set, Set_ND_Set and Comb_ND_Set, respectively. Each element in the Product_ND_Set, Set_ND_Set and Comb_ND_Set is termed Product_ND, Set_ND and Comb_ND, respectively. The Comb_ND_Set may be computed by combining the Set_ND_Sets of all the given Sets. A Set_ND_Set may be computed by combining the Product_ND_Sets of all the Products under that Set. The Notify Deadlines may be computed based on various parameters and factors of the company, choosing. One example to compute a Comb_ND_Set is as follows. First compute Set_ND_Set for all Sets. A Set_ND_Set is computed by first selecting earliest of the Notify Deadlines of each Product within the concerned Set, and then picking the latest of those Deadlines, and noting that as the Target_Deadline. Next step is to pick all those Notify Deadlines that fall after the Target_Deadline. Notify Deadlines thus obtained may be validated using various validation rules based on company factors such as customer utility, product parameters and so forth. Similarly, the Comb_ND_Set may thus be computed by repeating the above process for Set_ND_Sets, thus obtained for each Set.

Available Capacity Check

The APO available capacity for an OPS may depend on one or more factors including, but not limited to, Notify Deadline, APO Prices, expected Product value and so forth. A company may use any method of its choosing to determine APO capacity of a product. For example, a company may choose to have a fixed APO capacity for one or more of its products.

An instance to compute APO capacity is discussed below. Consider the case, when APO Capacity is dependent on Notify Deadline. In such situation, the objective is to determine those Comb_NDs within the Comb_ND_Set on which APO is available for the given OPS. The APO Capacity and the Used APO Capacity (the total number of Products on which APO has been sold but not exercised) may be calculated for each Comb_ND within the Comb_ND_Set. Available Capacity (AC) would then be the difference of APO Capacity and Used APO Capacity for the given Product. If the AC is greater than or equal to the number of incoming customers desiring an APO, then the APO capacity is available at a given Comb_ND for the given OPS. The process may be repeated for all Notify Deadlines within Comb_ND_Sets. APO may be made available on a given OPS for a given Comb_ND, if APO is available on all the Products of OPS for the given Comb_ND.

APO Price Calculation

A company may set APO Prices for a Product using any method of company's choosing. Once the APO Prices have been set for each product, the next Act is to create a framework to compute APO Prices for a group of Products (such as a Set, an Order or any other group) by using APO Prices for each of the Products in the group.

The parameters Product_OP refer to an APO Price (and may or may not be corresponding to a Notify Deadline) associated with a Product. Similarly, Set_OP and Comb_OP refer to APO Price (may or may not be corresponding to a Notify Deadline) associated with a Set and a combination of two or more Sets, respectively. A set of Product_OPs, Set_OPs and Comb_OPs is termed Product_OP_Set, Set_OP_Set and Comb_OP_Set, respectively. The Comb_OP_Set is computed by combining the Set_OP_Sets of the IPS and all the OPSs (existing and new). A Set_OP_Set is computed by combining the Product_OP_Sets of all the Products under that Set.

One or more Set_OP_Rules may be read from the company's database and applied to calculate Set_OP_Set for each input Segment (IPS and all OPSs) using the Product_OP_Sets of all the Products of said Set. A company may use any Set_OP_Set Rule of its choosing. Set_OP_Rules may be defined to calculate Set_OP as the sum, average, highest, lowest or any other function of Product_OPs of all the Products at a given Comb_ND. Similarly, a Comb_OP_Set comprises one or more Comb_OPs, and is calculated using one of the pre-determined rules, termed Comb_OP_Rules, to combine the Set_OPs of all the Sets in the combination. A company may use a Comb_OP_Rule of its choosing. Comb_OP_Rules may be defined similar to the Set_OP_Rules.

Concurrent Buy APO Process

As explained above, in the Concurrent Buy APO process, a customer selects all the APO Products concurrently in one transaction. An algorithmic illustration of an example of the Concurrent Buy APO process is displayed in FIG. 22. The APO (2,1) instance is assumed here as an example. Consider a customer who wants flexibility in his trip and wants two APO Product Sets. In Act 22.100, the customer needs for APO are input, including, but not limited to, a search criteria for two Product Sets according to customer's utility (may be similar to the search criteria defined above for the Sequential Buy APO process).

Next, in Act 22.110, the APO algorithm is run to determine the combinations of two Product Sets that satisfy inputs. A list of such search results is displayed for the customer along with the associated terms and conditions including, but not limited to, Notify Deadlines, APO Price and Product Price for each such combination. The APO algorithms for the Sequential Buy APO (defined above) process may also be used for the Concurrent Buy APO process.

Next, in Act 22.120, the customer selects a desired combination of two Sets and the associated conditions such as APO Price/Notify Deadline. Next, in Act 22.130, a payment transaction is executed, if needed. For example, the customer pays the Product Price for APO (if any) using a credit card, direct bank account debit or any other payment transaction mechanism. Next, the algorithm ends in Box 22.200. The computation may be performed using a processor that may calculate results in optimal time.

(2) Event Optimizer

After the completion of the Buy APO process, the next stage is the Event Optimizer. In this stage, the customer notification (or CN, in short) process as shown in Act 19.200 is executed. In this process, a customer selects a Chosen Product. The process may also comprise one or more event optimizer algorithms that may help to optimally select the Chosen Product and/or to optimally reuse the Released Product. One of the ways of implementation of Event Optimizer stage with the help of information technology tools has already been discussed above wherein said tools include, but are not limited to, one or more servers, database, load balancers, firewall, routers, interne, highly secured VPN, Intranet, RAM, hard disk drives, CPUs, monitors as shown by FIG. 13E.

APO Exercise Process

In the Customer Notification (or CN, in short) process, a customer interacts with a company's server to select the Chosen Product. The interaction may take place (for example) via phone, in-person, on a website or via any other communication mechanism. The Customer Notification process may be performed using any rule/method as desired.

Customer Notification (or CN) Process

The primary objective of the CN process is to select (or define) the Chosen Product. In the CN process, a decision for the Chosen Product is notified to the company. As mentioned earlier, the Chosen Product may be defined by the company, the customer, another entity or any combination thereof. The customer interacts with a company server that runs the CN process, to select the Chosen Product. It the customer fails to notify the company of the Chosen Product before the Notify Deadline, the Chosen Product is decided based on the terms and conditions set before in the Initial Transaction of the APO purchased by the customer.

Figure 23:
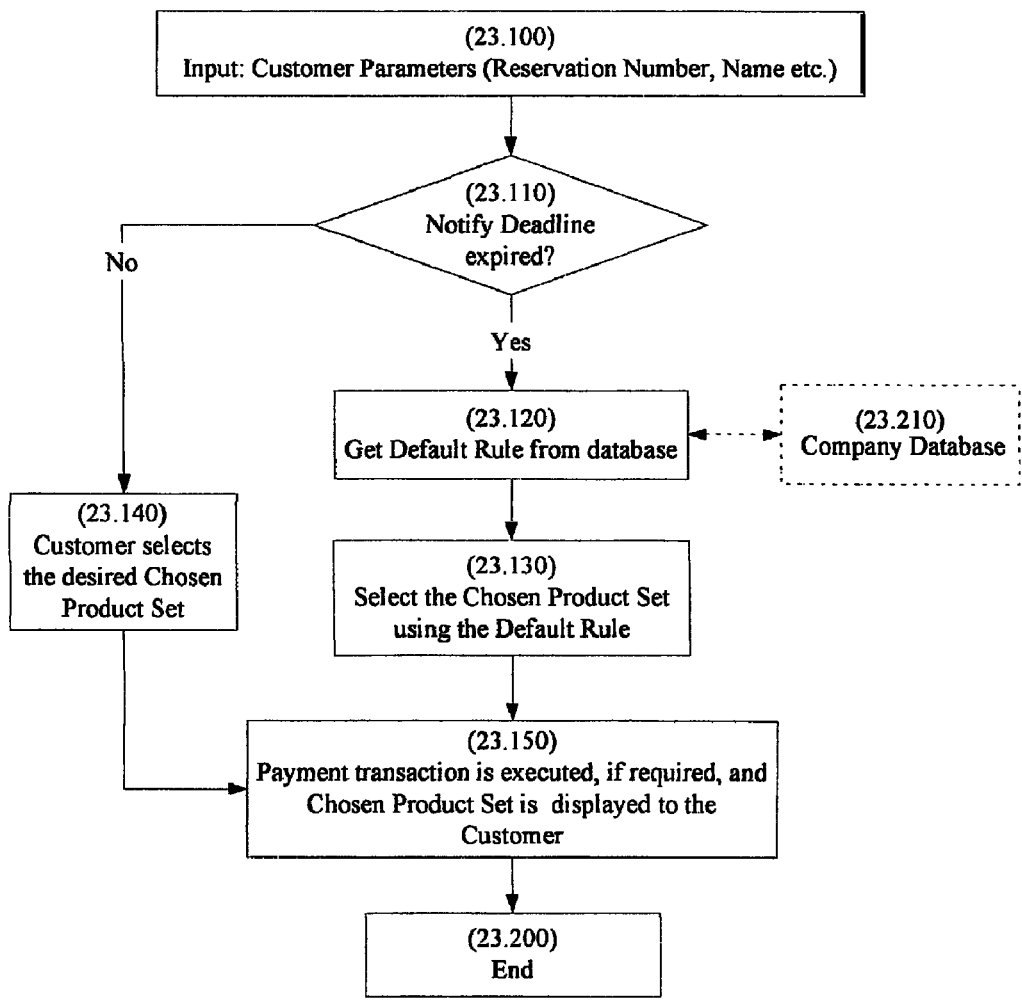
FIG. 23 is a flowchart that expands Act 200 of FIG. 19, illustrating an algorithm for the "Customer Notification" process.

FIG. 23 depicts an example of an algorithm that may be used to execute the Customer Notification process. In Act 23.100, a customer enters input parameters, such as order confirmation number, last name, purchase date and so forth to retrieve the data from the company database for the purchased Product Order and APO Products. Next, in Act 23.110, a test is performed to determine whether the Notify Deadline has expired or not. If so, then control goes to Act 23.120. If not, then control goes to Act 23.140.

In Act 23.120, a Default Rule is read from the company's database. A Default Rule defines a criteria to select the Chosen Product if the customer fails to provide a timely notification (i.e. before the Notify Deadline) to the company regarding his/her decision of the Chosen Product. A company may use a Default Rule of company's choosing. A company may use a rule to choose a product with the lower expected value, earlier departure date, lower sales volume or any other factor. Next, in Act 23.130, the Default Rule, thus obtained, is used to select the Chosen Product Set, and then control goes to Act 23.150. In Act 23.140, the customer selects the desired Chosen Product. Next, control goes to Act 23.150.

In Act 23.150, a payment transaction (if any) is executed, and then the Chosen Product is displayed to the customer. The payment transaction may be related to the APO purchased by the customer (such as a payment of an APO Exercise Price). The algorithm, then ends in Box 23.200. The computation may be performed using a processor that may calculate results in optimal time.

Implementation of APO VOF in Conjunction with Other VOFs

APO VOF may be used in conjunction with one or more other VOFs, for example, the FRO (Flexibility Reward Option) VOF. A customer who receives an APO is termed "A" type of customer. A company may form a group of one or more APO customers and one or more FRO customers, where the options (APO and FRO) obtained by the group members are complimentary in nature. As an example, consider an A customer who bought an APO to choose either of P1 and P2 as the Chosen Product, and consider a Y customer who received a FRO and is flexible to take any of P1 and P2 as the Chosen Product. Thus, if A decides to choose P1 as the Chosen Product, the company may assign P2 as the Chosen Product for Y, and vice versa. The customers A and Y have taken complimentary options and may form a group. The company may need to hold only one unit of inventory in P1 and P2 to satisfy the needs of both A and Y (assuming each A and Y only need one unit of product). Such a combination of complimentary options or VOFs may improve efficiency and concurrently enhance value for all the parties involved (in the context of the current example, enhance value for A, Y and the company).

The implementation of the grouping of A type and Y type of customers may be done in one or more ways. One way to implement such grouping is to first have one or more Y type of customers and based on such customer(s), the company may offer complimentary APOs to customers to make groups. In another implementation, the company may first offer APO and based on such APO customer(s), company offers complimentary FROs to customers to make groups. In yet another implementation, the company may offer APO and FRO separately and then define a process to make complimentary groups of A and Y customers (such groups termed "AY_Groups").

A company may choose to create AY_Groups at various group levels such as implementation of grouping at Level 1, Level 2 and so on. In Level 1 grouping, an AY_Group involves one each of A and Y type of customers. An example of Level 1 grouping has already been given above (the two customer, A and Y, example).

In Level 2 grouping, the grouping involves making complimentary groups for more than 2 customers. As an example, consider an A customer who bought an APO to choose either of P1 and P3 as the Chosen Product, a Y1 customer who received a FRO and is flexible to take any of P1 and P2 as the Chosen Product and a Y2 customer who has also received a FRO and is flexible to take any of P2 and P3 as the Chosen Product. A notation A-Y1-Y2 represents this example. Thus, if A decides to choose P1 as the Chosen Product, the company may assign P2 as the Chosen Product for Y1 and P3 as the Chosen Product for Y2. Alternatively, if A decides to choose P3 as the Chosen Product, the company may assign P1 and P2 as the Chosen Products for Y1 and Y2, respectively.

It is assumed that a "unit" represents one unit of product (or product capacity) and each customer needs only one unit of a product. Continuing with the above example, if the company were to not consider the complimentary nature of options obtained by A, Y1 and Y2 customers, the company may need to hold (or block) a total of 4 units of capacity to ensure complete satisfaction of needs of A, Y1 and Y2, i.e., 2 units for A (1 unit each of P1 and P3 as A could choose any product), 1 unit for Y1 (of either P1 or P2) and 1 unit for Y2 (of either P2 or P3). This implies, to satisfy a total need of 3 units of products, the company may need to hold (or block) 4 units of product capacity, creating a redundant capacity of 1 unit that the company may not be able to use otherwise. By creating a complimentary group of A-Y1-Y2, the company needs to only hold (or block) 3 units of capacity (1 unit each in P1, P2 and P3), thus, freeing up 1 unit of redundant capacity. Thus, an AY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-Y1-Y2-Y3.

A company may choose to implement grouping at various product levels such as Product. Set and Order. A company may also change terms and conditions of one or more option contracts of one or more FRO and/or APO customers (for e.g., price, notify deadline and so on) to solicit customer participation in FRO/APO to create more AY_Groups. The company may also offer incentives to customers to choose complimentary FRO/APO offerings to enable the company to create more AY_Groups. The implementation methods mentioned above for grouping are for illustration purposes only and a company may choose to implement grouping in one or more other ways or by combining above said methods or by combining one or more other ways along with one or more above said methods.

Figure 24:
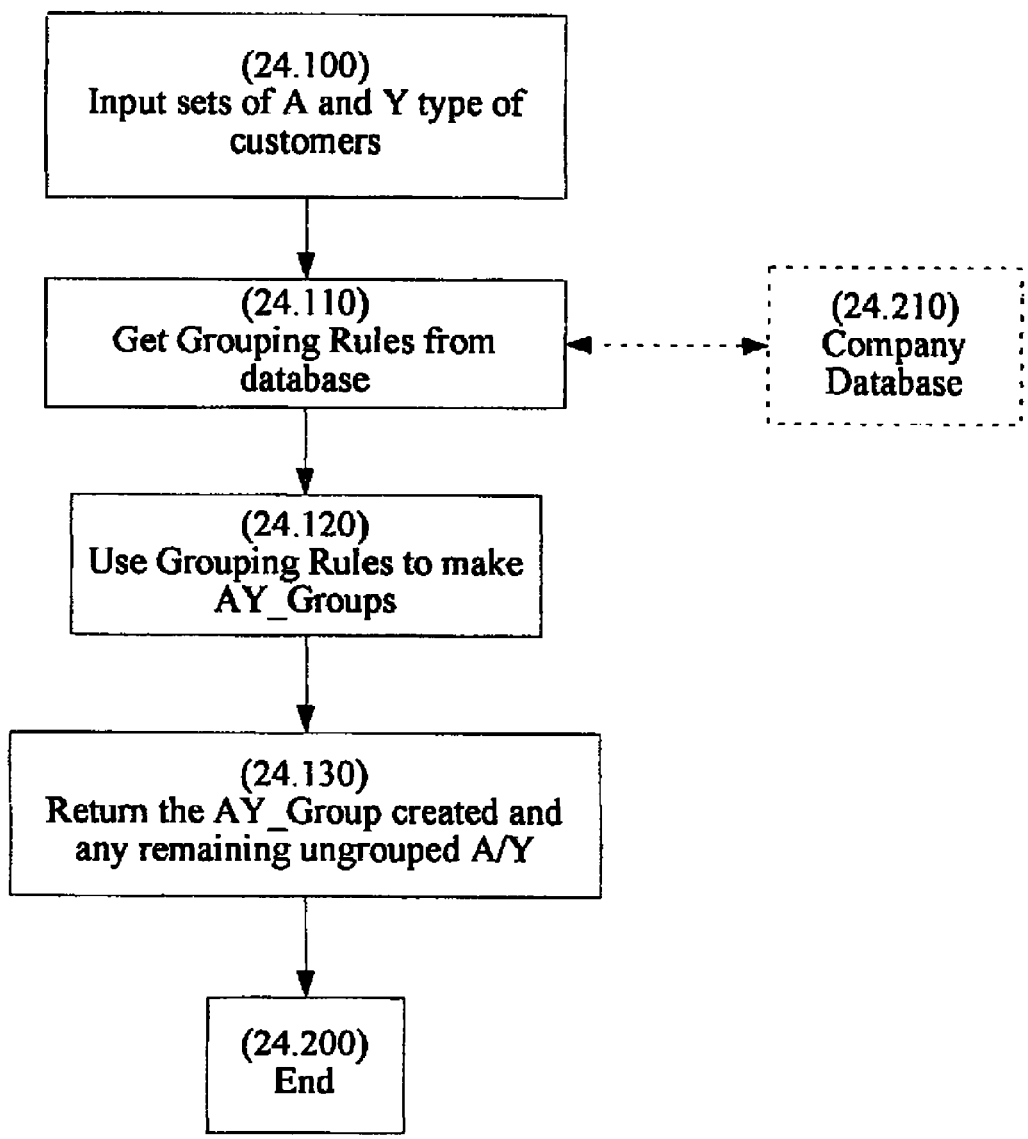
FIG. 24 is a flowchart illustrating an example of an algorithm to implement grouping of A and Y type of customers.

FIG. 24 displays a flow chart that illustrates one way of implementing grouping of A and Y type of customers. In Act 24.100, sets of A and Y customers are taken as input. Next, in Act 24.110, a set of one or more Grouping Rules is read from the company's database (24.210). A grouping rule may depend upon the number of A and/or Y type of customers, desired capacity redundancy in the system, the permissible time factor to create AY_Groups, any other rule of company choosing, any combination thereof and so on. For example, a company may choose a Grouping Rule whereby new groups are created by first ungrouping one or more of the AY_Groups (created earlier but unexercised, for example, groups for which the customer has not been notified, or if notified, the customer has not utilized the Product and the terms of option contract allows for a change in the Chosen Product). A Grouping Rule may create groups of only those A and Y type of customers who have yet to be grouped and discarding all NY customers, which have already been grouped. A company may implement any Grouping Rule to formulate AY_Groups. The choice to Grouping rules may enhance the overall value for the company (for example, reduce the total capacity required to satisfy product needs for all A and Y customers). Theoretically, the number of units of the Product required (or blocked) should be equal to the number of customers buying the Product (assuming each customer wants one unit of product). Thus, by implementing the grouping and with the help of appropriate Grouping Rules, the company may attempt to achieve such theoretical minima.

Next, in Act 24.120, the Grouping Rules, so obtained from the company's database, are used to make AY_Groups. Next, in Act 24.130, the AY_Groups so created are returned along with ungrouped A/Y, if any, and the process then ends in Box 24.200.

The grouping may enhance customers' experience, and may comprise operating a system that delivers a FRO to at least a "first customer" to utilize up to n of m selected products for said first customer, and n is less than or equal to m; operating a system that delivers an APO to at least a "second customer" to utilize up to k of p selected products, and k is less than or equal to p; operating a system to define each of the k Chosen Products, whereby after each of the k Chosen Products is defined, said "second customer" can utilize said Chosen Product; operating a system wherein a company defines t Chosen Product(s) for said "first customer" after each of said k Chosen Products is defined, wherein after each of said t products is defined, said first customer can utilize said defined product, where t is less than or equal to n. Said t products may be a subset of n products, m products or both. Said t products or n products or both may also include one or more products not included in said m selected products. Similarly, k products may be a subset of p products, or may include one or more products other than said p products. The grouping may be performed for a multiplicity of at least one of said first or second customers and may combine together at least one of each of said first and second customers to formulate at least one group with at least one complementary set of options. The grouping may enable a company, an entity other than said company and/or any combination thereof to utilize at least one of said m or p products at least after delivery of any of said first or second options. The company and/or an entity other than said company may implement FRO VOF where in the first and/or second customer in said grouping may be same. The notification conditions may be different, same or any combination thereof for the first and second option.

Said first and/or second option may or may not include any notification deadline condition. The company, the second customer, an entity other than said company and/or any combination thereof may define, at one or more times, at least one of said k chosen products. The company, the first customer, an entity other than said company and/or any combination thereof may define, at one or more times, at least one of said p chosen products. The first customer may select, at one or more times, at least one of said m products. The second customer may select, at one or more times, at least one of said p products. The company and/or an entity other than the company may receive from at least one of said first or second customer, at one or more times, an indication of one or more terms and conditions associated with said first or second options, respectively. Similarly, at least one of said company and/or an entity other than said company may deliver to at least one of said first or second customers, at one or more times, one or more terms and conditions associated with said first or second option, respectively. There may or may not be any payment transaction between the company, an entity other than the company, and at least one of said first and/or second customer.

APO VOF may be used in conjunction with one or more other VOFs, for example, the UPO (Upgrade Product Option) VOF. A customer who received an APO is termed "A" type of customer. A company may form a group of one or more APO customers and one or more UPO customers, where the options (APO and UPO) obtained by the group members are complimentary in nature. As an example, consider two customers A(P1, P2) and U[up(P2), base(P1)]. The notation A(P1, P2) implies a customer A who has received an APO and has the flexibility to choose either of P1 or P2 as the Chosen Product. The notation U[up(P2), base(P1)] implies a customer U who received a UPO and wishes to get an upgrade from P1 (i.e., the base product) to P2 (i.e., the up product). Thus, if A decides to choose P1 as the Chosen Product, the company may upgrade U to P2. If A decides to choose P2 as the Chosen Product, the company may not upgrade U and hence U gets P1. The customers A and U have taken complimentary options and may form a group. The company may need to hold only one unit of inventory in P1 and P2 to satisfy the needs of both A and U (assuming each A and U only need one unit of product). Such a combination of complimentary options or VOFs may improve efficiency and concurrently enhance value for all the parties involved (in the context of the current example, enhance value for A, U and the company).

The implementation of the grouping of A type and U type of customers may be done in one or more ways. One way to implement such grouping is to first offer and secure one or more U type of customers and based on such customer(s), the company may offer complimentary APOs to customers to make groups. In another implementation, the company may first offer and secure APO customers and based on such APO customer(s), company offers complimentary UPOs to customers to make groups. In yet another implementation, the company may offer APO and UPO separately and then define a process to make complimentary groups of A and U customers (such groups termed "AU_Groups").

A company may choose to create AU_Groups at various group levels such as implementation of grouping at Level 1, Level 2 and so on. In Level 1 grouping, an AU_Group involves one each of A and U type of customers. An example of Level 1 grouping has already been given above (the two customer, A and U, example).

In Level 2 grouping, the grouping involves making complimentary groups for more than 2 customers. As an example, consider three customers A(P1, P2, P3), U1[up(P2, P3), base(P1)] and U2[up(P1, P3), base(P2)]. The notation A(P1, P2, P3) implies a customer A who received an APO on P1, P2 and P3 (flexibility to choose any one of P1, P2 or P3 as the Chosen Product). The notation U1[up(P2, P3), base(P1)] implies a customer U1 who received a UPO and wishes to get an upgrade from P1 (base product) to either P2 or P3 (any of the two up products), and U2[up(P1, P3), base(P2)] implies a customer U2 who received a UPO and wishes to get an upgrade from P2 (base product) to either P1 or P3 (any of the two up products). A company may group these three customers together. If A decides to choose P1 as the Chosen Product, the company may upgrade U1 to P2 and U2 to P3. Alternatively, if A decides to choose P2 as the Chosen Product, the company may upgrade U1 to P3 and U2 to P1. In the third case, if A decides to choose P3 as the Chosen Product, the company may upgrade U1 to P2 and U2 to P1. Thus by grouping them together, the company needed to hold only one unit of inventory in each of the three products P1, P2 and P3 to satisfy needs for all three customers in all different situations.

It is assumed that a "unit" represents one unit of product (or product capacity) and each customer needs only one unit of a product. Continuing with the above example, if the company were to not consider the complimentary nature of options obtained by A, U1 and U2 customers, the company may need to hold (or block) a total of 5 units of capacity to ensure complete satisfaction of needs of A, U1 and U2, i.e., 3 units for A (1 unit each of P1, P2 and P3 as A could choose any product), 1 unit for U1 in P1 (base product) and 1 unit for U2 in P2. Even by blocking (or holding) 5 units of space, there may be no guarantee that the company would be able to satisfy upgrade needs for U1 or U2 (in the event they are not grouped together). This implies, to satisfy a total need of 3 units of products, the company may need to hold (or block) 5 units of product capacity, creating a redundant capacity of 2 units that the company may not be able to use otherwise. By creating a complimentary group of A-U1-U2, the company needs to only hold (or block) 3 units of capacity (1 unit each in P1, P2 and P3), thus, freeing up 2 units of redundant capacity. Thus, an AU_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-U1-U2-U3.

A company may choose to implement grouping at various product levels such as Product, Set and Order. A company may also change terms and conditions of one or more option contracts of one or more UPO and/or APO customers (for e.g., price, notify deadline and so on) to solicit customer participation in UPO/APO to create more AU_Groups. The company may also offer incentives to customers to choose complimentary UPO/APO offerings to enable the company to create more AU_Groups. The implementation methods mentioned above for grouping are for illustration purposes only and a company may choose to implement grouping in one or more other ways or by combining above said methods or by combining one or more other ways along with one or more above said methods.

Figure 25:
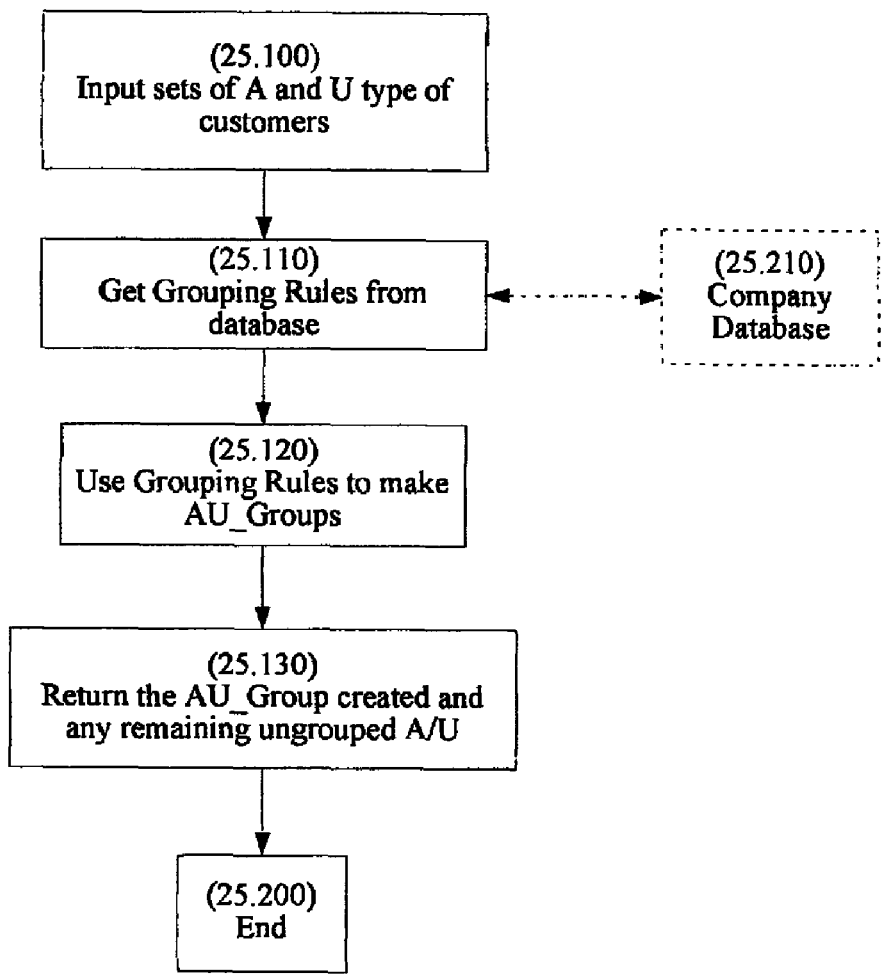
FIG. 25 is a flowchart illustrating an example of an algorithm to implement grouping of A and U type of customers.

FIG. 25 displays a flow chart that illustrates one way of implementing grouping of A and U type of customers. In Act 25.100, sets of A and U customers are taken as input. Next, in Act 25.110, a set of one or more Grouping Rules is read from the company's database (25.210). A grouping rule may depend upon the number of A and/or U type of customers, desired capacity redundancy in the system, the permissible time factor to create AU_Groups, any other rule of company choosing, any combination thereof and so on. For example, a company may choose a Grouping Rule whereby new groups are created by first ungrouping one or more of the AU_Groups (created earlier but unexercised, for example, groups for which the customer has not been notified, or if notified, the customer has not utilized the Product and the terms of option contract allows for a change in the chosen Product). In another example, a Grouping Rule may create groups or only those A and U type of customers who are yet to be grouped and discarding all A/U customers, which have already been grouped. A company may implement any Grouping Rule to formulate AU_Groups. The choice to Grouping rules may enhance the overall value for the company (for example, reduce the total capacity required to satisfy product needs for all A and U customers). Theoretically, the number of units of the Product required (or blocked) should be equal to the number of units the customers shall be eventually utilizing. Thus, by implementing the grouping and with the help of appropriate Grouping Rules, the company may attempt to achieve such theoretical minima.

Next, in Act 25.120, the Grouping Rules, so obtained from the company's database, are used to make AU_Groups. Next, in Act 25.130, the AU_Groups so created are returned along with ungrouped A/U, if any, and the process then ends in Box 25.200.

The grouping may enhance customers' experience, and may comprise operating a system that delivers a UPO to at least a "first customer" to utilize up to n of m selected products for said first customer, where n is less than or equal to m; operating a system that delivers an APO to at least a "second customer" to utilize up to k of p selected products, where k is less than or equal to p; operating a system to define each of the k Chosen Products, whereby after each of the k Chosen Products is defined, said "second customer" can utilize said Chosen Product; operating a system wherein a company defines t Chosen Product(s) for said "first customer" after each of said k Chosen Products is defined, wherein after each of said t products is defined, said first customer can utilize said defined product, where t is less than or equal to n. Said t products may be a subset of n products, m products or both. Said t products or n products or both may also include one or more products not included in said m selected products. Similarly, k products may be a subset of p products, or may include one or more products other than said p products. The grouping may be performed for a multiplicity of at least one of said first or second customers and may combine together at least one of each of said first and second customers to formulate at least one group with at least one complementary set of options. The grouping may enable a company, an entity other than said company and/or any combination thereof to utilize at least one of said in or p products at least after delivery of any of said first or second options. The company and/or an entity other than said company may implement APO VOF where in the first and/or second customer in said grouping may be same. The notification conditions may be different, same or any combination thereof for the first and second option.

Said first and/or second option may or may not include any notification deadline condition. The company, the second customer, an entity other than said company and/or any combination thereof may define, at one or more times, at least one of said k chosen products. The company, the first customer, an entity other than said company and/or any combination thereof may define, at one or more times, at least one of said p chosen products. The first customer may select, at one or more times, at least one of said m products. The second customer may select, at one or more times, at least one of said p products. The company and/or an entity other than the company may receive from at least one of said first or second customer, at one or more times, an indication of one or more terms and conditions associated with said first or second options, respectively. Similarly, at least one of said company and/or an entity other than said company may deliver to at least one of said first or second customers, at one or more times, one or more terms and conditions associated with said first or second option, respectively. There may or may not be any payment transaction between the company, an entity other than the company, and at least one of said first and/or second customer.

Business Model to Implement APO

Different business models may be used to implement an APO VOF. The business models mentioned below, without limitation, may be used to implement the APO VOF in any industry. For example, a company may choose to implement an APO VOF individually or in conjunction with one or more partners and/or other companies.

As mentioned in section above, in another implementation of APO, a company may allocate product inventory to another entity. The term "allocation of inventory or product inventory" or "allocation of product(s)" implies, without limitation, assigning one or more units of one or more product(s) to an entity for any purpose or use by the entity either exclusively or non-exclusively. For example, an entity may use the allocated products to offer APO to customers and/or to sell the products as regular products. An allocation of product may be conditional. For example, one of the conditions may require a return of at least one allocated product after a specified time period and/or other consideration(s).

The customer may select or purchase one or more products from the company or/and said entity and then interact with said entity to purchase one or more APO Products in relation to said (already purchased) products. Said entity may also receive product allocation from more than one company, and thus, offer products from multiple companies to a single customer during the Initial Transaction for APO.

The OA may use those products and operate a service to offer APOs to the company customers. As explained above in FIG. 13A, a customer may select one or more products from the OA, and then receive an APO on those selected products from the OA. Another approach would be for a customer to select one or more products from the company and then receive the APO option on those selected products from the OA. In another example, a customer may select one or more products from both the company and the OA, and then receive the APO option on those selected products from the OA. It is also possible that the customer receives an APO from the company or both from the company and the OA on a given set of selected products.

The OA and the company may simultaneously offer APOs to the customers, i.e., a customer may either approach the company or the OA to receive an APO on desired products. In another model, the OA may operate as the sole provider of the APO to all the customers of a company. In a yet another model, the OA and the company may choose to work together and jointly offer APOs to the company customers. The OA or the company may offer and sell APOs to customers using either or both of the Sequential or the Concurrent Buy APO processes.

As explained in FIG. 13A above, an OA may be able to offer APO on products from one or multiple companies. An OA may receive allocation of product from two or more companies. A customer may purchase one or more products from one or more companies and/or from the OA, and then receive an APO option on those selected products from the OA. Even if the OA may not be entitled to or does not receive product allocation from a company, it may still be able to formulate an agreement with that company to offer APOs on the products of that company. Thus, a customer may be able to receive an APO on products from multiple companies, giving the customer more flexibility and variety to choose from. For example, a customer may receive an APO on two products from two different companies and can choose to utilize either of them within the terms and conditions of the option contract. This may provide a lot of flexibility for the customers, especially when the customer desires products which are available with only few companies. An OA may be able to thus create a multi-company APO VOF Framework, which may tremendously enhance the flexibility for the customers. All the participating companies that allocate products to and/or partner with the OA to offer APO may also gain from an overall increase in the total spending by the consumers, enhanced overall customer satisfaction and/or other operational benefits. Either or both of the OA and the company may process the Chosen Products associated with an APO purchased by the customer. A customer may receive products related to the APO grant from the OA or the company. An entity (the OA and the company) may process the products offered only by that entity or by either of the two entities.

The OA and the company may engage in a business agreement to implement an APO program. The business agreement may divide the total benefit generated by the APO program between the two parties using any mechanism or criteria as desired. The total APO Revenue Benefit may be shared between the two parties. The company may allocate products to the OA. One or more companies may allocate only few or may allocate their entire inventory to the OA to offer those products to the customers by way of regular and/or APO products. The OA may offer those products as APO Products to customers. In return, the OA may offer a lending revenue or fee to the company for all or a portion of the products allocated. This lending fee may be given only for the products that the OA is able to utilize or for all the allocated products. The lending fee may be a lump sum amount, may depend upon the number of products allocated or may depend on one or more factors as desired. The agreement may include a provision where the OA may return the allocated products back to the company at a certain time and date. There may be one or more conditions associated with the return of unused APO Products and/or the Released Products, including, but not limited to, returning the same product, returning a higher value product and so on.

The APO VOF may include different conditions imposed on the customer regarding the payments related to the APO. For example, a customer may be asked to make payments only to the company even if he/she is receiving products and/or options from the OA. Similarly, the customer may be required only to pay to the OA even if he or she has selected the products and/or received the options from the companies. The condition may also be set to ask a customer to make one or more payments to the company for the products and/or options received from that company, and to make one or more payments to the OA for the products and/or options received from that OA. The condition may allow the customer to make partial payments to the company and the rest to the OA or vice versa, the basis of which distribution may depend upon various factors, including, but are not limited to, the factors of company's choosing, the arrangement between the OA and the company and so on. In another example, the customer may be required to pay to a third party or may be required to pay to any of the combination of the entities mentioned above.

Information Technology System for APO

A client-server architecture may be used to implement the APO VOF. However, a company may use a computer hardware and software infrastructure of its choosing to implement an APO VOF.

The APO VOF may be best implemented using one or more computer-implemented methods to operate a computer-implemented service to offer APOs to the customers, that includes, but not limited to, recording the information pertaining to the offered and/or sold APOs in a database. It may also include operating a computer-implemented service (and/or system) or other service (and/or system) to define the Chosen Products, and recording said Chosen Products (or defined products) and all the products related to an APO in a database.

For the stage one (i.e., to formulate the APO VOF), an application server may be used along with a database (e.g., a relational database) that stores all the information relevant to the company and the customer. The database may include all the relevant information sufficient to identify products the company chooses to make eligible for APO. One or more users (e.g., a business analyst or manager) may have full access to this server through Intranet or highly secured VPN environment to design an optimal value option framework. The database shall also store all the information pertaining to all the acts (in stage one) used by a company while formulating the APO VOF.

A similar or a different application server and/or a cluster of application servers (functioning concurrently) along with one or more web servers and a set of one or more database servers may be used for the Buy APO as explained in FIG. 13D above and CN (Customer Notification) processes in the stage two of the APO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Buy APO process and the CN process may be computer-implemented as explained and discussed above in FIGS. 13D and 13E. All the customer interactions and the related information such as customer needs, inputs, payment transactions etc. are stored in this database, including information pertaining to the interactions with those customers who may not purchase and/or receive APO. The systems for stage two and stage one may be maintained in a synchronized environment so that each system has access to the most current information and can communicate with each other.

As discussed above, there may be other ways for implementing the APO VOF which may depend upon including, but not limited to, the scale of the implementation, business requirements and number of entities involved. The entities may interact through a series of hardware products and services with the OA/company server(s). The OA may or may not be different than the company and the OA server may be the same as that of the company server. The information technology and network system to implement APO VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, the company may have one or more separate temporary database structure wherein the entries are updated and stored until the final update is made in one or more main databases. One the final update is done, the entries in these temporary databases may be removed.

The entire system may run at the premises of OA, company and/or any third entity or any combination thereof. It may also be possible to run a part of the system at one place and rest at one or more other places. The system may also be implemented even if one or more servers may be kept off-shore locations and may be accessed remotely. The geographical locations of one or more hardware product and/or services may be different depending upon including, but not limited to, the factors of company's choice, ease of accessibility, infrastructure facilities. The structure or the interaction architecture of the system may vary depending on factors including, but not limited to, the set up of the company, changes in the technology and with the introduction of new and better technology enhancing the interaction process.

A customer may interact with the Buy APO and/or the CN process either directly or indirectly using a local or a remote terminal (e.g., a computer with a browser and an access to the Internet) that is able to access the web server(s) that host the Buy APO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one may be hosted and run by a company, an OA, a third party service provider or any combination of the above. Similarly, the system for the stage two may be hosted by a company, an OA, a third party service provider or any combination of the above. In the model, where the OA receives product allocation from the company and offers APO to the customers directly, the web server, application server and database for both stage one and stage two shall be managed by the OA. The OA may also have partial (or complete) access to the company database and systems through a highly secured environment (for example, a virtual private network). In the model, when an OA and a company tie-up together to provide APO, all the computer hardware and software infrastructure for both stage one and stage two may be hosted by and/or property of either or both (mutually) of the sides depending upon the business agreement between them.

Alternate Room Option (ARO) Value Option Framework in the Hotel Industry

As explained above, an APO VOF can be implemented in any industry. The implementation of APO in the hotel industry is discussed herein. Within the hotel industry, the customer need for accommodation flexibility (defined below) is used as the targeted value element. With respect to the selected value element (i.e., customer need for accommodation flexibility) in the hotel industry, the APO VOF may be appropriately termed Alternate Room Option (ARO) VOF.

The first stage in the ARO VOF involves steps (or acts) of: capturing customer dynamics, assessing hotel operations and economic factors, integrating customer dynamics with hotel economic factors, formulating the VOF and optimizing the VOF. The second stage involves carrying out a dynamic interaction with the customer and then executing an Event Optimizer process. The specific detailed steps with respect to the ARO VOF will now be discussed.

Figure 26:
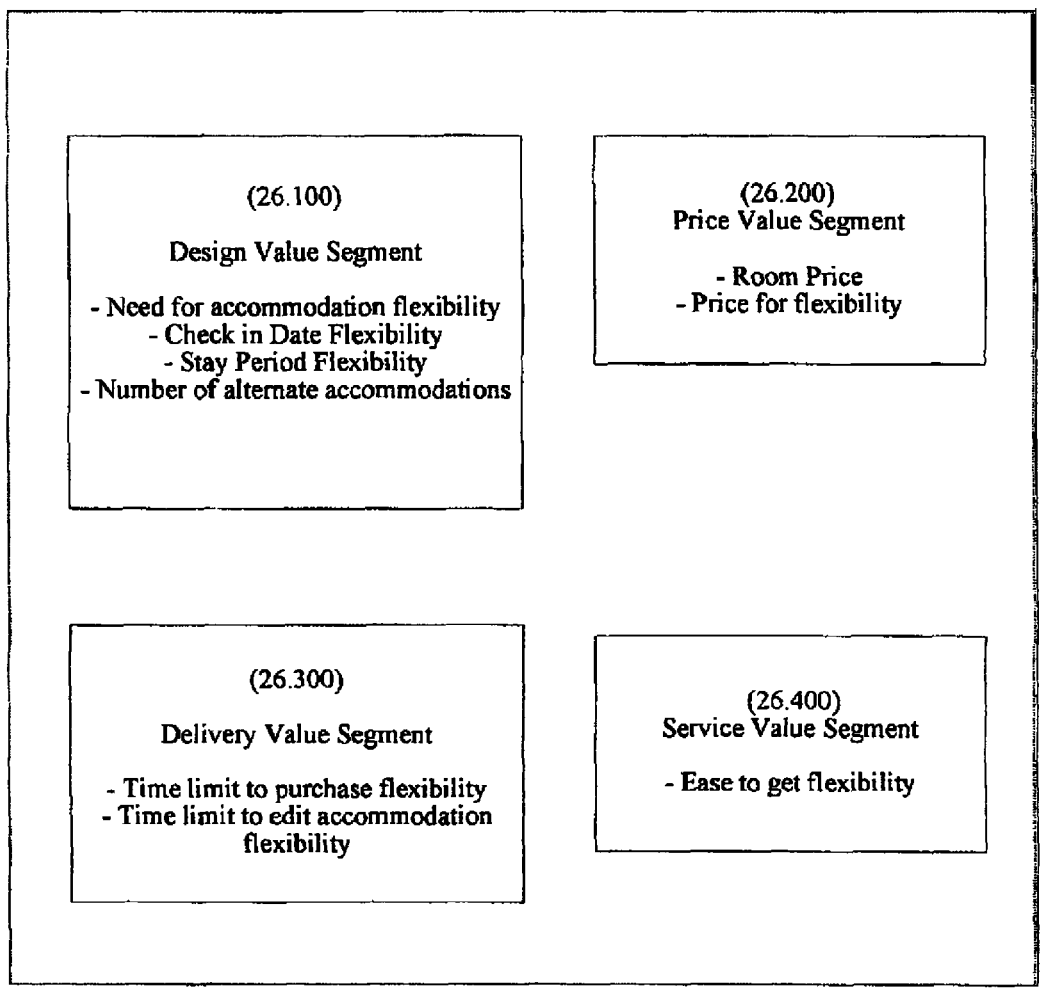
FIG. 26 is a diagrammatic illustration of an exemplary set of value segments and their value elements in the context of ARO-VOF in the hotel industry.

First Stage: Formulation of ARO Value Option Framework in the Hotel Industry (1) Capturing Customer Dynamics FIG. 26 shows an analysis of the value elements that are believed to matter to customers in relation to an ARO in the hotel industry. In the design value segment, shown in Box 26.100, important value elements may include, but are not limited to, need for accommodation flexibility, check-in date and/or time flexibility, stay period flexibility and number of alternate accommodations available and compromise(s) a customer may have to make with regard to various preferences in the alternate accommodation. In the price value segment, shown in Box 26.200, important value elements may include, but are not limited to, Room Price and price for accommodation flexibility. In the delivery value segment, shown in Box 26.300, important value elements may include, but are not limited to, how close to scheduled check-in the customer may edit his/her reservation easily and favorably, and how long before check-in the reservation must be made to obtain flexibility. In the service value segment, the important value elements may include, but are not limited to, the ease of getting desired flexibility as shown in Box 26.400. It may be important to estimate the relative preferences and utilities of these value elements to different types of customers.

The customer need for accommodation flexibility is subjective in terms of one or more parameters including, without limitation, the length of the "flexibility period", extent of stay plan variation in need and others. The term "flexibility period" refers to the time period during which a customer wants to keep his plans flexible. Some customers may desire a flexibility period that extends up to a few hours before the check-in, whereas, some others may only want it up to a few days before the desired check-in. The term "stay plan variation" refers to the extent to which a customer expects the accommodation plan to change. It may be expressed in terms of potential time periods for check-in, check-out and stay, range of properties in which a customer may prefer to stay (for e.g, a hotel near the airport or in the downtown), various hotel services/amenities needed during accommodation such as parking, food/restaurant availability, exercise room, Internet, business facilities, Saturday night/entertainment shows and so forth. Customers are concerned about change/cancellation fees, unavailability of desired accommodation, the efforts required and the hassles involved in making reservation changes. Many customers would be willing to pay for flexibility. However, the price a customer can pay or is willing to pay is subjective and may differ from customer to customer; or even for the same customer, may differ from one trip (or circumstance) to another.

(2) Assessment of Hotel Economics

An assessment of the crucial economic factors of a hotel, as indicated in Box 27.100, may reveal the factors to include, but not be limited to, high fixed costs, lower and fluctuating occupancy rates, the perishable nature of the rooms (or room nights), the expected value of different rooms at different times within the same property or across difference properties, the broad spectrum of time period over which the rooms in a hotel are sold, increased competition from budget hotels, high customer attrition rate, and fragmentation in the hotel industry.

An assessment of the crucial economic factors of a hotel may be performed, to determine the factors that affect the profitability, growth and goals of the hotel. It might be beneficial if a hotel utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information).

(3) Integration of Customer Dynamics with Hotel Economic Factors

Figure 27:
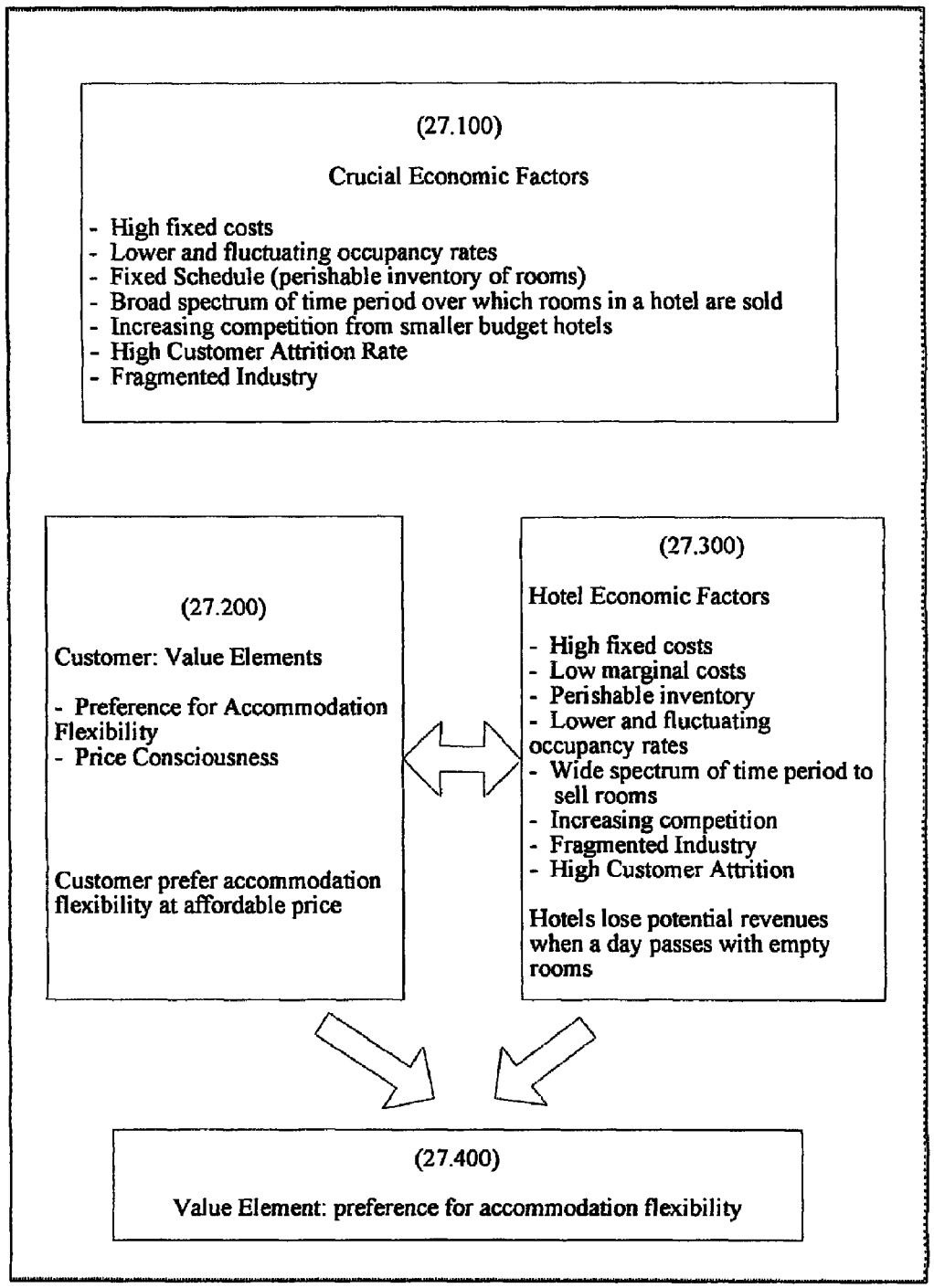
FIG. 27 is a diagrammatic illustration of hotel economic factors and mapping between customer dynamics and hotel economic factors.

FIG. 27 also illustrates an example of how a mapping can be done, between customer and hotel profiles, for the ARO VOF in the hotel industry. On one hand, there is a preference for accommodation flexibility among customers. On the other hand, once a day passes with one or more unutilized rooms, that condition probably represents the loss of potential revenue for that hotel. This is true even though no other potential customers have been turned away, simply because there may be one or more customers willing to take those unfilled rooms in that hotel (in question) at appropriate price/terms. But, today they are not able to do so for one or more reasons mentioned above. An opportunity thus exists to concurrently generate an incremental revenue benefit for the hotel from consumer surplus, and to maximize the purchase utilities for the customers. The ARO framework is created based on a value element "Preference for accommodation flexibility". More specifically, as shown in the interaction between the Box 27.200 and Box 27.300, a mapping is performed between important customer value elements and hotel economic factors. The value element "Preference for accommodation flexibility" is extracted, as shown in Box 27.400 and an ARO Value option framework is created.

(4) Formulating the "ARO" Value Option Framework in the Hotel Industry

Structure of ARO Value Option Framework in the Hotel Industry

Figure 28:
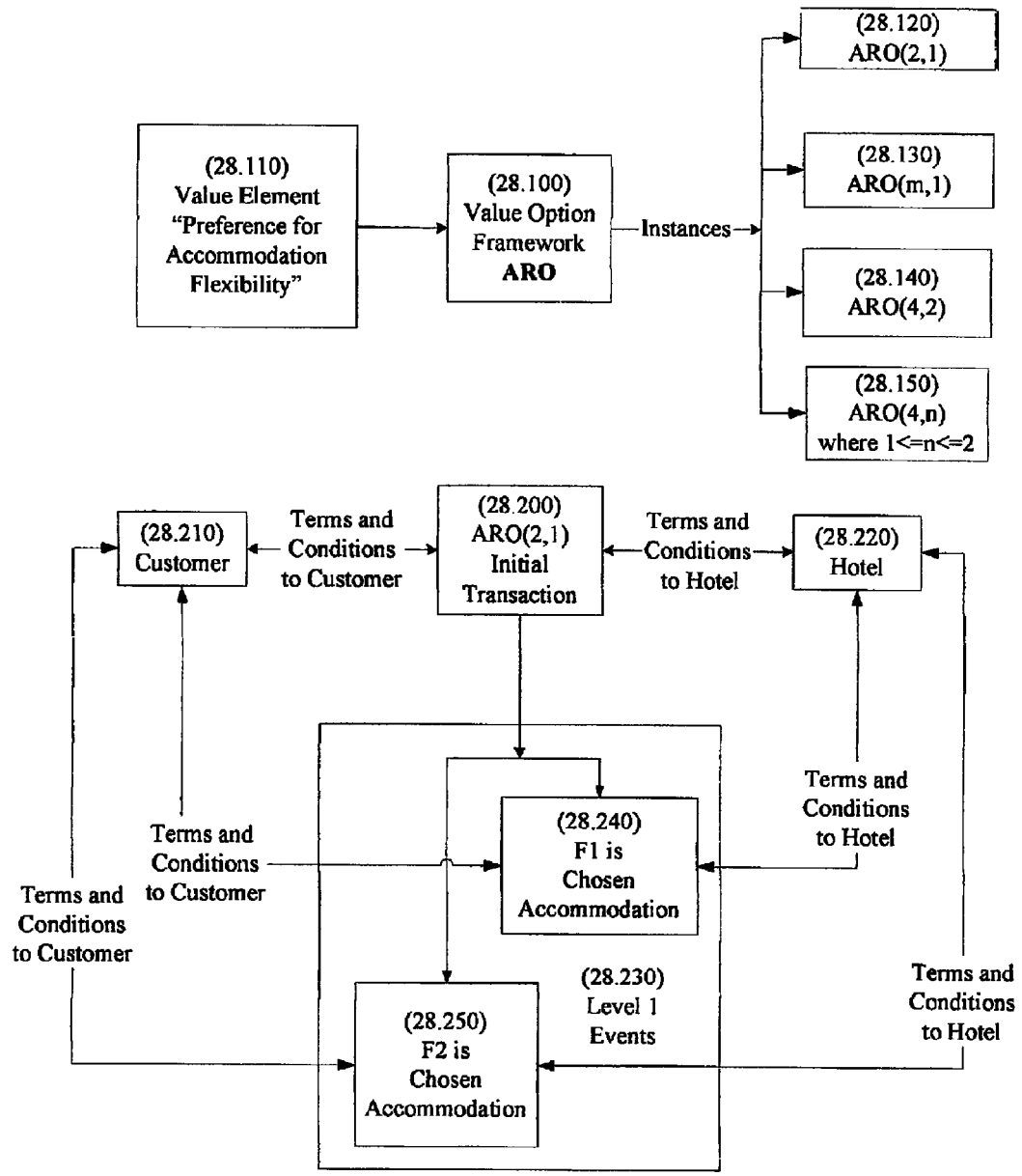
FIG. 28 is a partially-diagrammatic, partially-flow diagram representing the structure for creating an ARO Value Option Framework.

FIG. 28 displays the structure of an ARO value option framework (shown in Box 28.100) in the hotel industry. The ARO value option framework is related to the value element "Preference for accommodation flexibility", as shown in Box 28.110.

The first event in the ARO VOF is referred to as "Initial Transaction", shown by Box 28.200, in which the customer (shown by Box 28.210) and the hotel (shown by Box 28.220) transact on an ARO value option. There may be one or more Events (shown by Box 28.230) that follow the Initial Transaction.

In a successful Initial Transaction for an ARO, the customer receives an option to choose up to 'n' out of 'm' selected rooms (said 'm' rooms termed "ARO Rooms"). The rooms that are finally selected are termed "Chosen Rooms". After each of the 'n' Chosen Rooms is defined (or selected or chosen), the customer has the right to utilize (or can utilize) said Chosen Room. Apart from the Chosen Rooms, the remaining 'm-n' rooms are termed "Released Rooms". The Released Rooms (if any, that were probably held or blocked for said customer) may be sold to other customers as normal Rooms or ARO Rooms or used for other purposes. The Released Rooms in relation to said option may be reused by the hotel before, after, at or any combination thereof, the time the Released Rooms and/or Chosen Rooms are defined (or selected).

Numerically, the value of 'm' is greater than or equal to 1 and the value of 'n' may vary from '0' to depending upon the specific implementation of the ARO framework. The value of and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'n' Rooms may be defined in one or more transactions. The value of 'm' and/or 'n' may be defined and/or re-defined, at one or more times, by the hotel, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Rooms may include one or more Rooms other than said 'm' Rooms.

The hotel may award two or more confirmed rooms to a customer, where in said customer is allowed to utilize fewer and/or lesser than the awarded rooms. The term confirmed here may imply that the hotel has booked/reserved that room for said customer and he/she may be allowed to utilize that room subject to terms and conditions of the option contract. Booking here may include, but not be limited to, blocking of the room, holding of the room, reserving the room, formal acknowledgement of receipt, or anything else signifying similar meaning or interpretation. The term confirmation may allow the customer to utilize said confirmed room subject to the fulfillment of the terms and conditions, if any, in the option contract.

The time when an Initial Transaction is completed (i.e., the customer receives the ARO option on said m Rooms) is referred to as the Initial Transaction Time (or ITT, in short). One or more of said m Rooms may be selected, at one or more times, before, after, during, or any combination thereof, the Initial Transaction and/or the time said option is delivered to the customer (or the customer receives said option) or any combination thereof. All the ARO Rooms may be selected concurrently (i.e., all together in one transaction) or sequentially (i.e., in multiple transactions).

The delivery of an option may include, but is not limited to, electronic delivery of the option, physical delivery of the option, any other mode of delivery or any combination thereof. Once said option is delivered, one or more of m Rooms may be available for use by the hotel, an entity other than the hotel and/or any combination thereof. The value of 'n' may be defined before, after or any time, the option being delivered to the customer. The delivery of option may occur in relation to the customer purchasing at least one Room. The delivery of option may also occur in relation to the customer purchasing a Room other than the Room on which the option may be delivered. The customer may purchase a Room other than the Room on which the option is delivered to the customer.

The Initial Transaction may comprise one or more acts. The customer may select (or purchase) all ARO Rooms concurrently (i.e., all together in one transaction) or sequentially (i.e., in multiple transactions). In the sequential case, a customer may select one or more rooms in one or more transactions just before or much before (a few days/weeks/months) the Initial Transaction for ARO begins. Said selected room(s) (let's say X number of them), thus, may be considered as part of said m ARO Rooms of the ARO (m, n) transaction, and the customer may select only the remaining (m-X) number of ARO Rooms during the Initial Transaction. All the transactions used to select all the ARO Rooms of an ARO (m, n) instance are related to each other, and hence, are considered as related transactions (as defined earlier).

The 'm' rooms may be dependant on one or more variables including, but not limited to, different hotel properties or locations, floors (smoking versus non smoking), room type, star ratings, accessory type, proximity to one or more modes of transportation, proximity to other facilities like shopping malls, sea shore, harbor and so on, different type of room views such as hill view, city view, pool view and so on, number of guests in the room, other amenities such as night shows, morning shows, kids activity center, golf course, business center, health center, car parking and so on, and/or a combination of one or more of these and/or other factors.

In an ARO VOF, the sequential process may comprise a number of related transactions when all the ARO Rooms are purchased (or reserved) one after another by paying a price in each (or some or none of the) transaction(s) or act(s). The transactions may be related due to a relationship during the Initial Transaction, one or more of the previously executed transactions, any other transaction or any combination thereof. In the related transactions, 'n' may be equal to 'm' when there may be at least one payment transaction between the hotel and the customer related to the Rooms wherein such payment is made after the option has been granted. Said payment transaction may be one more transaction apart from the initial interaction and/or Initial Transaction in the event said customer utilizes all the 'm' Rooms. The customer may select Rooms prior to utilizing the penultimate Room. The hotel, an entity other than said hotel and/or any combination thereof may reserve the right to limit the customer to 'n' Rooms on, before, on or before, after, on or after or any combination thereof, a stated notification deadline date.

The time when an Initial Transaction is completed (i.e., the customer receives the ARO option) is referred to as the Initial Transaction Time (or ITT, in short). One or more of said m rooms may be selected, at one or more times, before, after, during, or any combination thereof, the Initial Transaction and/or the time said option is delivered to the customer (or the customer receives said option).

A hotel may be considered as a means of accommodation for a given time unit for one or more customers. A hotel duration may be considered as the most fundamental unit. The duration may range from a few hours to one night to more than one night. For example, a customer may want to stay at a hotel for one night or more than one night or a customer may use one or more facilities (such as board rooms, meeting rooms, banquet halls, ball rooms, business centers, swimming pool area and so forth) of a hotel for one or more hours (or nights, or days, or weeks, or months or for any period of time) for one or more events such as meetings, seminars, conferences or any other event or any combination thereof. There may be one or more services or characteristics associated with the room. Said services or characteristics may be internal features or external features associated with the room or any combination thereof. Internal features associated with the room may include, but are not limited to, interior furnishing, size/number of beds, mini bar in the room, kitchen with cookware and/or tableware, crib, rollaway bed, pull out sofa bed, room with sitting area deluxe bath amenities, wireless internet access in the room, hair dryers, iron board, safety vaults, tv-cable, in room movies, telephones, voicemail, data ports, alarm clocks, refrigerator, coffee/tea maker, and so on. External features associated with the room may include, but are not limited to, reserved parking space, amusement shows, indoor and/or outdoor swimming pools, heated water pool, bowling, golf courses, laundry services, valet services, multi-cuisine restaurant, luggage storage, handicap accessibility facilities, automated teller, business center, casino, car rental desk, gift shop, news stand, tour desk, walking track, health center, sight seeing tours, children activities, barber shop, beauty salon, spa and/or massage centers, concierge service, and so on. Said space may include, but is not limited to, space for any purpose such as for stay, for accommodation, for holding meetings, seminars, conferences, events, space for parking of vehicle, space in the recreation hall, space in the Saturday night show and so on.

A hotel may choose to create one or more instances of an ARO VOF based on factors including, but not limited to, number of ARO Rooms, Chosen Rooms or Released Rooms, pre-determination of a number of Chosen Rooms or Released Rooms, check-in/check-out times; other factors or any combination of the above. For example, an ARO formulation based on a combination of the number of ARO Rooms (or m) and Chosen Rooms (or n) would be ARO (m, n). Some ARO instances are shown in Boxes 28.120, 28.130, 28.140 and 28.150. For example, when the number of Chosen Rooms is pre-determined, the ARO (4, 2) instance may imply that the customer selects 4 ARO Rooms, on the condition that the customer may choose any two out of those four rooms. When the number of Chosen Rooms is not pre-determined, the ARO (4, 2) instance may imply that the customer selects four ARO Rooms, on the condition that the customer may choose zero, one or 2 rooms as Chosen Rooms. There may also be a minimum limit on n. For example, the ARO (4, n) (where 1<=n<=2) instance limits the customer to choose a minimum of 1 and maximum of 2 Chosen Rooms out of the 4 selected ARO Rooms.

The ARO (2, 1) instance, two ARO Rooms and one Chosen Room, is used here as an example to demonstrate the details of the structure of an ARO VOF. Box 28.200 refers to the Initial Transaction between the customer and the hotel, in which they transact on an ARO (2, 1) value option. In a successful Initial Transaction for the ARO (2, 1), the customer selects two ARO Rooms and can choose to utilize any 'one' of those two rooms. The room selected is the Chosen Room and the one not selected is the Released Room.

The Initial Transaction may have terms and conditions applicable to the customer or the hotel or both. These terms and conditions may be set, preferably, to concurrently benefit both parties. The connections between Box 28.200 and 28.220, and Box 28.200 and 28.210 refer to the terms and conditions to the hotel and the customer, respectively.

Few examples mentioned below may help in understanding various types of ARO which may be offered by the hotel. The hotel may offer different features and may combine one or more features, products and services and offer them as an ARO to the customers.

A customer may take an ARO for different check-in dates. For example, a customer buys ARO for a hotel room and gets the right to check-in on either $5^{th}$ or $7^{th}$ of the month, and would need to notify the hotel before $4^{th}$ about his/her Chosen Room. i.e. in this case, the Chosen check-in date.

A customer may take an ARO for different hotel locations served by one or more hotel chains. For example, a customer may obtain ARO for two hotel properties, one located in downtown and the other one near the airport, whereby ARO provides the right to the customer to choose any of these two hotels until a given notify deadline. Now, if the customer is arriving late in the evening, he/she may prefer to have the hotel located close to the airport. But if the customer is arriving by daytime, then he/she may prefer to have the hotel located in the downtown.

A customer may also take an ARO based on the room type in the hotel. For example, a customer may take an ARO for two types of hotel room—ARO between regular room and a suite, whereby the customer gets a right to choose any of the room type and notify the hotel about his/her Chosen Room. If the customer were to arrive alone, then he/she may choose a regular room and if he/she were to arrive with his/her spouse, then the customer may choose the suite as Chosen Room.

A customer may also take an ARO to cover up his/her uncertainty over the period of stay. For example, a customer is planning a pleasure trip to City A and City B. The customer is scheduled to arrive in City A on $3^{rd}$ of the month. The customer may take an ARO for stay in City A to either stay for 3 days or 5 days since the customer may not be sure how many days he/she may spend in City A. The customer may then subsequently take an ARO for arriving in City B, i.e. either arriving on $6^{th}$ or $8^{th}$ of the month, depending upon the time period he/she spends in City A. The customer gets a right to notify the hotel in City A about Chosen Room (or Chosen Period) of stay and also to notify the hotel in City B about his/her arrival, up to a stipulated notify deadline. Hence, the customer is saved from the hassle and cost involved in making changes due to changes in his or her plan.

A customer may combine one or more of the above ARO features while buying ARO for a hotel room. For example, Sam is scheduled to attend a business meeting on Friday and has an original reservation in the regular room in a hotel located next to the airport for just one day. Sam is unsure about whether he would be able to attend the meeting and then spend couple of days in that city with his wife as it depends upon the schedule of his wife (Mary), which she can confirm only by Thursday. Sam does not want to have the uncertainty for the reservation till Thursday. Hence, the hotel offers Sam an ARO to take care of his uncertainty. Now, Sam has an alternate reservation for a suite with king size bed at a different hotel of the same hotel chain, which is in the downtown, with reserved parking for his car (since he would coming by his car along with his spouse), confirmed reservation for a Saturday night show in the hotel for him and his spouse for four days. Sam has to let the hotel know about his Chosen Room by Thursday evening, thereby doing away with the last minute uncertainty and unavailability.

A customer may take an ARO for different types of rooms for different periods. For example, a customer may take ARO giving him/her the option to choose from the regular room for first two days of his/her stay and suite for next two days or a suite for all the four days depending upon whether his/her spouse joins him/her later or arrives with him/her on the first day itself. Now the customer gets the right to notify the hotel about his/her Chosen Room for the Chosen Stay Period.

A customer may plan to visit any two out of three selected cities but is unsure as of now which cities to choose finally. The customer buys an ARO (3, 2) on hotel rooms in three different cities where in the customer has to choose two cities before a stipulated notify deadline and has to notify the hotel about the Chosen Rooms (or Chosen Cities in this case). The customer gets a right to choose any two out of the three selected city hotel rooms as Chosen Rooms.

A customer may like to choose between different facilities such as business centre, golf course, spa and massage centers depending on the circumstances. For example, Sam has scheduled a meeting with his client but is unsure whether the client would prefer a meeting room or a restaurant for said meeting. Sam buys an ARO whereby he has the option to notify the hotel about his Chosen Room Product (either meeting room or the restaurant) before a notify deadline.

A customer may require different facilities as per the hotel location and as per his/her companions. For example, Sam is to arrive in Las Vegas with his wife, a kid and his pet, if he is not going on a business trip to New York. Sam buys an ARO for the hotel rooms in Las Vegas and New York. The ARO gives Sam an option to choose either a non-smoking room in Las Vegas hotel with a baby-sitter, permission to bring in pets, onsite spa, room service and kids centre or a smoking room in New York hotel with Hi-Speed Internet access and business services. Sam has to notify the hotel about his Chosen Room by Thursday morning whereby enabling Sam to avoid the last minutes hassles, costs, and unavailability.

A customer may be unsure about his/her arrival time to the hotel. If the customer arrives in the morning, he/she would prefer to use the Golf course and if he/she arrives in the evening, he/she would like to watch the Saturday Night Show. The customer buys an ARO enabling him/her to choose between the two facilities and notify the hotel about his/her Chosen Room Product before a pre-determined notify deadline.

Consider another example. Sam wants to arrange a stay for one of his client executives. He is unsure whether the person arriving would be the top level client executive or middle level client executive as it depends on client's schedule over which Sam has no control. Sam does not want to spend extra money on the middle level executive but also wants to make sure that he provides the top level executive with the best of the facilities and full luxury, if the case be. Thus, Sam buys an ARO and gets the flexibility to book a business suite with complimentary breakfast and a regular room with no additional facilities. Sam can notify the hotel about his Chosen Hotel (Chosen Room Set) before the notify deadline.

The ARO VOF may or may not include any constraints on the ARO Rooms. For example, a hotel may want to restrict ARO applicability and availability on rooms that satisfy specific criteria.

In the context of the hotel industry, the parameters/characteristics of a room may include, but are not limited to, hotel related parameters, check-in/check-out times, services and other miscellaneous parameters. The hotel related parameters may include, but are not limited to, operating hotel entity (i.e, the hotel that operates the room), owner of the hotel property, marketing hotel (a hotel that sells/rents out the room), any other hotel or intra/inter-hotel groups associated with the room or any combination of the above. The check-in/check-out parameters may include, but are not limited to, a hotel and its location (area or street, landmark, city, state, country), date and time, seasonality, weather and other operational conditions, and so forth. The services and other miscellaneous parameters may include, but are not limited to, type of hotel, room duration, in-room or other services, hotel services such as amusement parks, parking areas, recreation halls, shows, and other facilities, and so forth.

The ARO VOF may or may not include any constraints on the ARO Rooms. The two ARO Rooms may or may not include practically constrained rooms. Practical constraints may include one or more constraints that will prevent a customer to utilize one or more given rooms. Such practical constraints may include, but are not limited to, time constraints, location constraints and so forth. The time constraints may include, but not are limited to, constraints from check-in and/or check-out times of the two ARO Rooms. The location constraints may include, but are not limited to, the distance between the locations of the two hotels. In other words, it may or may not be practically possible for one customer to utilize one or more of the selected rooms due to at least one practical constraint. For example, a customer may receive an ARO to utilize each of the m selected rooms that include at least one practically constrained room, where it may not be possible for the customer utilize all the m selected rooms. For example, the two selected rooms may or may not be in the same city.

The ARO VOF may or may not include any constraints on the ARO Rooms based on their Room Prices (defined elsewhere). For example, the hotel may offer only those rooms as ARO Rooms whose Room Prices at or before the ITT are less than a specified value, or may add a constraint on the maximum difference between the highest and the lowest Room Prices across a set of ARO Rooms offered within a specific ARO.

The ARO Rooms may be selected by the hotel, the customer, another entity or any combination thereof. The ARO VOF may enable a customer to have flexibility by selecting m Rooms and use said accommodation flexibility to satisfy his/her needs. Therefore, the customers would usually have the right to select (or define) the Chosen Rooms. However, in different implementations of ARO VOF, the hotel, the customer, another entity or any combination thereof may select one or more of the Chosen Rooms related to an ARO. The ARO Rooms and the Chosen Rooms may be selected by the same entity, different entities or any combination thereof. The hotel may incorporate the customer information and the data related to the ARO into the sales, production, inventory, other database or information system or any combination of the above.

A customer may select ARO Rooms in several ways; through mutual agreement (i.e., during a direct interaction such as a room reservation), or the hotel may grant the ARO Rooms to the customer without soliciting their interest or permission. For example, to enhance customer satisfaction or for any other purpose, a hotel may grant ARO Rooms to customers based on the past customer behavior, interaction and so on.

The Initial Transaction may impose one or more conditions on the customer. A customer may be required to explicitly notify the hotel prior to or no later than a given date and time (referred to as the Notify Deadline) regarding the Chosen Room. If there is no such explicit notification condition, the act of the customer checking-in for either of the two rooms may serve as an implicit notification to the hotel or the ARO Rooms may be decided as per the terms and conditions of the option contract. In either case (explicit or implicit notification) the date and time when the Chosen Room is selected is referred to as the Customer Notification Time (or the CNT, in short). In the current discussion, the explicit notification condition is assumed unless specifically mentioned otherwise. The Chosen Room may be dependant on one or more variables including, but not limited to, the desired check-in date, stay period, hotel location, particular amenities, other facilities, and so forth and/or any combination of one or more such variables.

A hotel may determine one or more Notify Deadlines for a room at one or more times (e.g., before, during, after the Initial Transaction or any combination thereof) using factors including, but not limited to, customer needs, expected room value, hotel profitability goals, any other factors or a any combination of the above. Customer factors may also be considered in determining the Notify Deadlines, such as the flexibility periods desired by customers, picking easy times (like 6:00 pm instead of 6:32 pm) to help the customer remember the deadline(s) or any other factor that may affect the behavior of a customer. The ARO VOF may or may not have a notification deadline condition.

The hotel may offer incentives to the customers to motivate them to choose one or more products as Chosen Rooms among the ARO Rooms that may be more optimal for the hotel. A hotel may formulate one or more such offer (may referred to as Chosen Room Incentive Offers) and may send them to customers who have purchased ARO but not yet selected their Chosen Room via email, phone, mail or any other communication channel. Thus, such customers may be persuaded to select said optimal room in lieu of incentives.

The ARO VOF may impose additional terms and conditions on the customer. The hotel and/or an entity other than the hotel may receive from customer, at one or more times, an indication of one or more terms and conditions associated with said option in the ARO VOF. Similarly, at least one of said hotel and/or an entity other than said hotel may deliver to said customer, at one or more times, one or more terms and conditions associated with said option in the ARO VOF. A customer may or may not have to pay any price for receiving ARO Rooms (i.e., there may or may not be any payment transaction related to the Initial Transaction and/or other event related to the ARO). There may be one or more prices related to the ARO. A customer may be required to pay a price or fee related to ARO at one or more times. A price may include, but is not limited to, a set of one or more Room Prices, a set of one or more ARO Prices or any combination of the above. A hotel may use the method of its choosing to decide on all the Room Prices for ARO.

The customer may be required to pay one or more prices during the Initial Transaction (which payment is referred to as an Initial Price), at the CNT (which payment is referred to as an Exercise Price) and/or at the time of checking-in or at any other time, which may or may not be pre-determined between the customer and the hotel. The price may be a function of number of ARO Rooms and/or Chosen Rooms, specific rooms selected for ARO Rooms and/or Chosen Rooms, Notify Deadline, one or more Room Prices and/or expected value of the ARO Rooms, any other factors of hotel's choosing or any combination of the above.

The price may include, but is not limited to, a monetary value or a soft/non-monetary value (e.g., discount vouchers, hotel coupons or exchange of another service, other benefits such as loyalty program bonus or benefits, other forms or any combination of the above) or other consideration. The ARO Price may be fixed or variable, with or without bounds. The hotel may set permissible range(s) or boundary limit(s) within which the ARO Price can vary, or it may offer the customer a set of prices to choose from. Since price conditions may depend upon various factors, which may or may not be variable, the same may be decided at anytime. The price conditions may be determined by the customer, the hotel, a third entity, or any combination thereof at one or more times. One or more prices (Initial or Exercise or any other price) may be a negative value, which reflects that instead of the customer paying the hotel, the hotel shall pay a price to the customer.

Different price strategies may be implemented in the ARO (2, 1) instance. For example, a single Initial Price could make it attractive and easy for the customer to feel free to choose any room as the Chosen Room without worrying about any additional costs later. One or more of the ARO prices may be embedded with the Room Price by using a special Room Price or enhancing features on a currently existing pricing structure. A customer may be presumed to accept the ARO offer while displaying the Room Price (that has the ARO Price embedded in it). These presumptions may or may not include soliciting prior interest of the customer regarding the ARO offer. In case, the ARO price is merged with the Room Price, and where such price may or may not be separately identifiable, the customer may or may not be required to pay a separate price for ARO.

The Notify Deadline may be pre-determined or may be determined later (i.e., after ARO grant) by the hotel, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be charged if the customer notifies the hotel of the Chosen Room anytime before the first Notify Deadline. The price associated to the second Notify Deadline (i.e., the second earliest among the Notify Deadlines) may be charged if the customer notifies the hotel of the Chosen Room after the first Notify Deadline and before the second Notify Deadline. Similarly, different prices may be associated with other Notify Deadlines.

The terms and conditions of the ARO VOF may not allow the customer to notify the hotel after the last Notify Deadline (i.e., the latest among the Notify Deadlines). This is done to facilitate the selection of the Chosen Room before the last Notify Deadline. As an operational measure, a condition may be imposed that if the customer fails, unintentionally or intentionally, to notify the hotel before the last Notify Deadline, then the hotel may treat either of the two rooms as the Chosen Room. Another approach may be (e.g., for hotel/customer) to designate one of the two rooms as a Default Room (during or after the ARO purchase) that will be selected as the Chosen Room if the customer fails to notify the hotel of the Chosen Room before the last Notify Deadline. Any entity (e.g., the hotel or the customer) may (or may not) be allowed to change the Default Room once it is selected. The Exercise Price (if any) in the Default case may or may not be equal to the Exercise Price for the Default Room for the last Notify Deadline. In the current discussion, a single Notify Deadline is considered.

The exercise price may be a function of the Notify Deadline, Chosen Room, any other factor or any combination thereof. In such situations, a customer may have to pay a unique price to select a particular room as the Chosen Room at a given time.

The ARO VOF may also include conditions imposed on or assumed by the hotel. For example, the hotel may be under a mandatory condition to hold a confirmed reservation for the customer on both rooms until the CNT passes to allow the customer to select either of the two rooms as the Chosen Room.

A hotel may determine customer preferences, either explicitly or implicitly, regarding utilization of up to n of m selected Rooms. The preferences may include, but not limited to, customer preferences for various rooms and services, needs, associated relative utilities, flexibilities, preferences regarding choice of Rooms, quality of Rooms, acceptable delays (relative) to receive different Rooms and so forth. The hotel, one or more entities other than the hotel or any combination thereof may seek customer preferences.

A hotel may also offer ARO options to one or more customers on the basis of customer preferences, so obtained or collected. The hotel may offer said ARO options based on the dynamics of the hotel including, but not limited to, inventory, operational data, revenue management data, cost data, financial data, accounting data, any other internal data, any combination thereof and so on.

A hotel may seek such preferences from the customers prior, during or after the customer has purchased the Room or any combination thereof. These customer preferences may help the hotel to perform concurrent optimization of value for the hotel, the customers, one or more entities other than the hotel or any combination of two or more of the above. The customers may also include the customers whose preferences have not been determined or collected to perform concurrent optimization. The data pertaining to the hotel, customers, one or more entities other than the hotel, any combination thereof, may be integrated to concurrently optimize the value for at least any two of said entities. There may or may not be any payment transaction between the hotel, one or more other entities and/or the customers regarding seeking such customer preferences, delivering ARO options, customer participation in ARO and so on.

A hotel may operate one or more systems and/or services to monitor the hotel dynamics. Monitoring may include, but is not limited to, monitoring of capacity, days to utilization, return and/or potential return of Rooms, flexible inventory that may be created in relation to said obtained preferences, analyzing various cost, revenue, operational or any other internal data and so on. The hotel may have one or more systems and/or services to analyze such data on a real-time or quasi real-time basis and draw conclusions on the basis of such analysis. Any of the systems and/or services may be operated by the hotel, one or more entities other than the hotel or any combination thereof.

A hotel may operate a system that defines customer preferences regarding at least utilizing up to n of m selected rooms, and n is less than m, operate a system that enables use of said preferences to optimize value for at least one of customers, said hotel and an entity other than said hotel. A hotel may concurrently optimize value for at least two of customers, said hotel and at least one entity other than said hotel.

A hotel may offer ARO to all customers or any selected customers, such selection may be based on any criterion including, but not limited to, such as those who have expressed their relative preferences, those who have not expressed any preferences. By integrating the hotel dynamics and collected customer preferences, a hotel may offer appropriate incentives and terms and conditions for ARO to generate desired participation.

Once the Initial Transaction is successful, there may be at least two possible related events, as shown by Box 28.230. The two events are (1) that R1 is the Chosen Room (as shown by Box 28.240) and (2) that R2 is the Chosen Room (as shown by Box 28.250). Each of these two events may be associated with various terms and conditions on the customer and/or the hotel. As explained above, the events may take place in two ways: either the customer selects the Chosen Room according to his/her utility, or the hotel selects the Chosen Room based on pre-determined rules (e.g., if the customer fails to notify the hotel before the Notify Deadline). In both situations, once the Chosen Room is selected, the hotel is free to reuse the Released Room for potential revenue. The customer may have to pay an additional exercise price at the CNT depending on the terms and conditions of the option contract. Once the Chosen Room is selected, the hotel and/or the customer may not change the Chosen Room except within the bounds of the terms and conditions in the option contract. The hotel or customer may have the right to enforce the Chosen Room on the other party as per the terms and conditions of the option contract.

The Released Room may be blocked for the period between the ITT and the CNT. This period is termed the "Blocking Period". If there is more than one Notify Deadline, the exact length of the Blocking Period is unknown, but the minimum and maximum lengths are known to be between the ITT and the first Notify Deadline and between the ITT and the last Notify Deadline, respectively.

The hotel may generate revenue from the Released Room without utilizing the Released Room. The Room Price of the Released Room may be varied in such a way that may increase the demand of one or more other rooms offered by the same hotel, any other entity apart from said hotel, or any combination thereof. The variation in the Room Price of the Released Room may cause a spilled demand for this room but may create a surge in demand of one or more other rooms in the same or different room segments of the same hotel, any other hotel apart from said hotel or any combination thereof.

The above terms and conditions of the ARO VOF may be set in a way to concurrently benefit at least two of the customer, the hotel, any other entity or any combination thereof. The customer receives additional utility from the flexibility to choose a desired room from among alternatives. The hotel benefits from enhanced customer satisfaction (loyalty and repeat business), incremental revenue from the ARO Price and selling (reusing) the Released Rooms, generating revenues from Released Rooms without actually reusing the Released Rooms and other operational benefits.

An ARO VOF may include a right for the customer to utilize each of the m selected ARO Rooms, along with a right for the hotel to limit the rooms (to fewer than m) which the customer can utilize if the hotel notifies the customer on a stated Notify Deadline. Said on a stated Notify Deadline may include, but not limited to, on and/or before the stated Notify Deadline, on and/or after the stated Notify Deadline, any combination thereof. The right may include the condition that the hotel may notify the customer prior to or at the, prior to the, at or after the or after the stated Notify Deadline (which may be determined by the hotel and/or the customer during or after the Initial Transaction). To provide flexibility to the customers, the hotel may offer (or allow) the customer to express their preferences regarding the Chosen Room(s) before the stated Notify Deadline. If the customer fails to do so, the hotel may or may not exercise their right to limit the customer to use fewer than (for example, at least one less) the earlier selected rooms (i.e., m rooms). The right may include the condition that the hotel may limit the customer after the customer expresses his/her preference for the Chosen Rooms. The hotel and/or an entity other than the hotel may have said limitation on at least one Room. There may be a condition imposed on the customer to make at least one payment to the hotel when the customer expresses his or her preferences for the Chosen Rooms. The hotel and/or an entity other than the hotel may allow the customers to define said 'n' Rooms on or before a stated date. The hotel and/or an entity other than the hotel may reserve the right to take back any 'm' minus 'n' Rooms after the stated date. The customer, the hotel, an entity other than the hotel and/or any combination thereof may determine the notification date.

An ARO VOF may include an option for the customer to utilize up to n of the m selected ARO Rooms, where n<m, along with a condition that the customer may be able to utilize all the m selected rooms if there is at least one payment transaction between the hotel and customer in relation to said ARO grant, and that such payment is made after the ARO is granted to the customer. This may provide additional flexibility to the customer. The customer may be limited to take the decision regarding utilizing all the m rooms before the check-in of the penultimate room. Said payment may be made in a separate transaction executed at any time after the Initial Transaction. The timing of said payment may be pre-determined. The customer may be able to select all the m rooms together in one transactions.

The costs, revenues, benefits, terms and conditions shown here are for illustration purposes only and actual values could be different depending upon specific values selected by the hotel for value options, customer behavior, hotel characteristics. Notify Deadline(s) and other relevant factors.

Example of ARO VOF (2, 1) Structure in the Hotel Industry

FIGS. 29 and 30 demonstrate an illustrative practical example of using the ARO (2, 1) instance in the hotel industry. Consider a customer who interacts with a hotel to get an ARO. Per Act 28.200, an Initial Transaction takes place between the hotel and the customer. FIG. 29 displays some of the details of the Initial Transaction. The customer selects two ARO Rooms, R1 (shown in Box 29.100) and R2 (shown in Box 29.200), and can choose to utilize either of them but not both (i.e., select either of them as the Chosen Room). The hotel is under the condition to hold confirmed booking for the customer on both R1 and R2 until the Chosen Room is selected.

The customer pays an amount of $25 as the Initial ARO Price and $250 as the Room Price to the hotel as part of the Initial Transaction. The Initial Transaction takes place on the 15$^{th}$ day of May (i.e., the ITT, shown in the second row of the Box 29.300). There is an explicit notification condition and the customer has to pick and notify the hotel regarding the Chosen Room.

The following text presents different cases to illustrate different types of terms and conditions that may be associated with the purchased ARO. Three different scenarios are considered with different conditions (shown in FIG. 30). In all the scenarios, the Notify Deadline is expressed in terms of the number of days to check-in (DTC) of R1, the earlier check-in date of the two rooms.

The first scenario, as demonstrated in the Box 30.100, displays a condition of the explicit notification without any exercise price. The customer needs to notify the hotel regarding the Chosen Room before 3 DTC (as shown by the Notify Deadline). The ARO Price charged during the Initial Transaction serves as the total direct incremental revenue for the hotel and as the direct cost to the customer. There is no exercise price if the customer defaults.

The second scenario, as demonstrated by Box 30.200, displays a condition of the explicit notification with an exercise price that is a function of the Chosen Room. The Notify Deadline is 3 DTC. If R1 is the Chosen. Room, then customer has to pay $10 as the exercise price, as shown in the second column of the second row in the Box 30.200. If R2 is the Chosen Room, then the customer has to pay $20 as the exercise price, as shown in the second column of the third row in the Box 30.200. The total ARO Price charged to the customer (i.e., the direct incremental revenue to hotel) may turn out to be $35 or $45 depending on the Chosen Room.

The third scenario, as demonstrated in the Box 30.300, displays a condition of the explicit notification with an exercise price that is a function of the Notify Deadline. There are four Notify Deadlines associated with the ARO. The exercise price increases from $0 (for the First Notify Deadline of 5 DTC) to $20 (for the Last Notify Deadline of 1 DTC). If the CNT is before 5 DTC, then the customer pays nothing more to the hotel as shown in the second column of the second row in the Box 30.300. If the CNT is after 5 DTC and before 3 DTC, then the customer pays $5 as the exercise price (shown in the third column of the second row in Box 30.300). Similarly, the customer pays an exercise price of $10, if the CNT is after 3 DTC and before 2 DTC, and an exercise price of $20, if the CNT is after 2 DTC and before 1 DTC (as shown by the next two cells in the Box 30.300). If the customer fails to notify before 1 DTC (the Last Notify Deadline), then the Default Room R1 (shown in Box 30.300) will be selected as the Chosen Room at an exercise price of $20.

5) Optimization of ARO VOF in the Hotel Industry

As mentioned earlier (shown in FIG. 7), in the form of an optional last step in the first stage, a financial analysis may be performed using the existing hotel and customer data to determine the optimal terms and conditions of the ARO VOF. 'What-if' scenarios may be executed to determine an optimal pricing strategy. The hotel may want to divide customers using one or more criteria and design separate ARO VOF for each customer segment.

Second Stage: Using the ARO Value Option Framework in the Hotel Industry

After completing the first stage of the method, the hotel has created an ARO VOF and specific options within that framework. The hotel may have also segmented customers and designed options accordingly. The hotel is fully prepared to use a structured format comprising one or more ARO value options to interact with its customers in real time to generate benefits for both the hotel and its customers. The second stage of the ARO VOF is now presented. A detailed demonstration for the second stage of the APO VOF has already been presented above.

Figure 31:
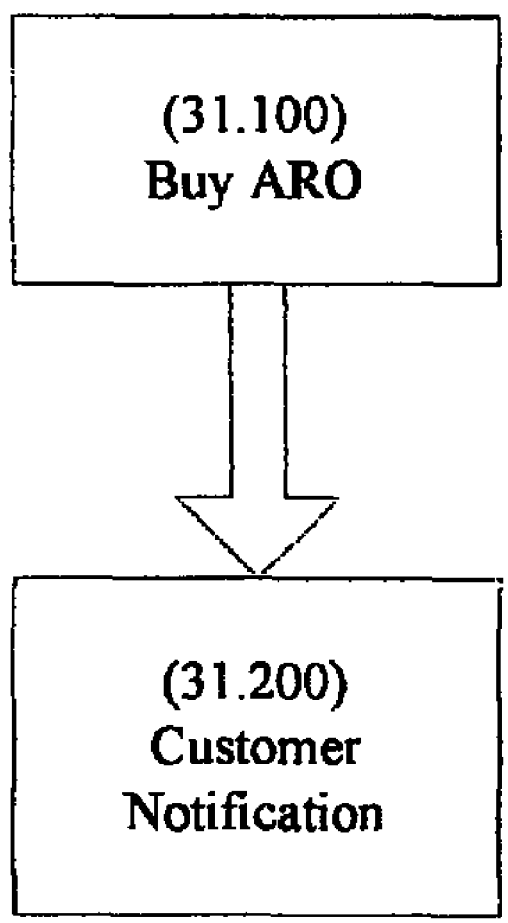
FIG. 31 is a diagrammatic illustration, in a high level flowchart, of a process for ARO VOF implementation.

The implementation of the ARO VOF between the hotel and its customer takes place through two high level acts, as shown in FIG. 31. In Act 31.100, the 'Buy ARO' process, an interactive event between the customer and the hotel's web server, runs to carry out the Initial Transaction of the ARO VOF. In this Act, a number of algorithms, may be executed (e.g., availability, ARO Price, Room Price and Notify Deadlines) on the hotel's server to optimally calculate the terms and conditions of the ARO VOF to concurrently benefit the hotel, the customer, any other entity and/or any combination thereof. In Act 31.200, the customer notification process (explained later) is executed. In this process, the customer selects the Chosen Room. The process may also comprise one or more event optimizer algorithms that may help to optimally select the Chosen Room and/or to optimally reuse the Released Room.

Figure 38:
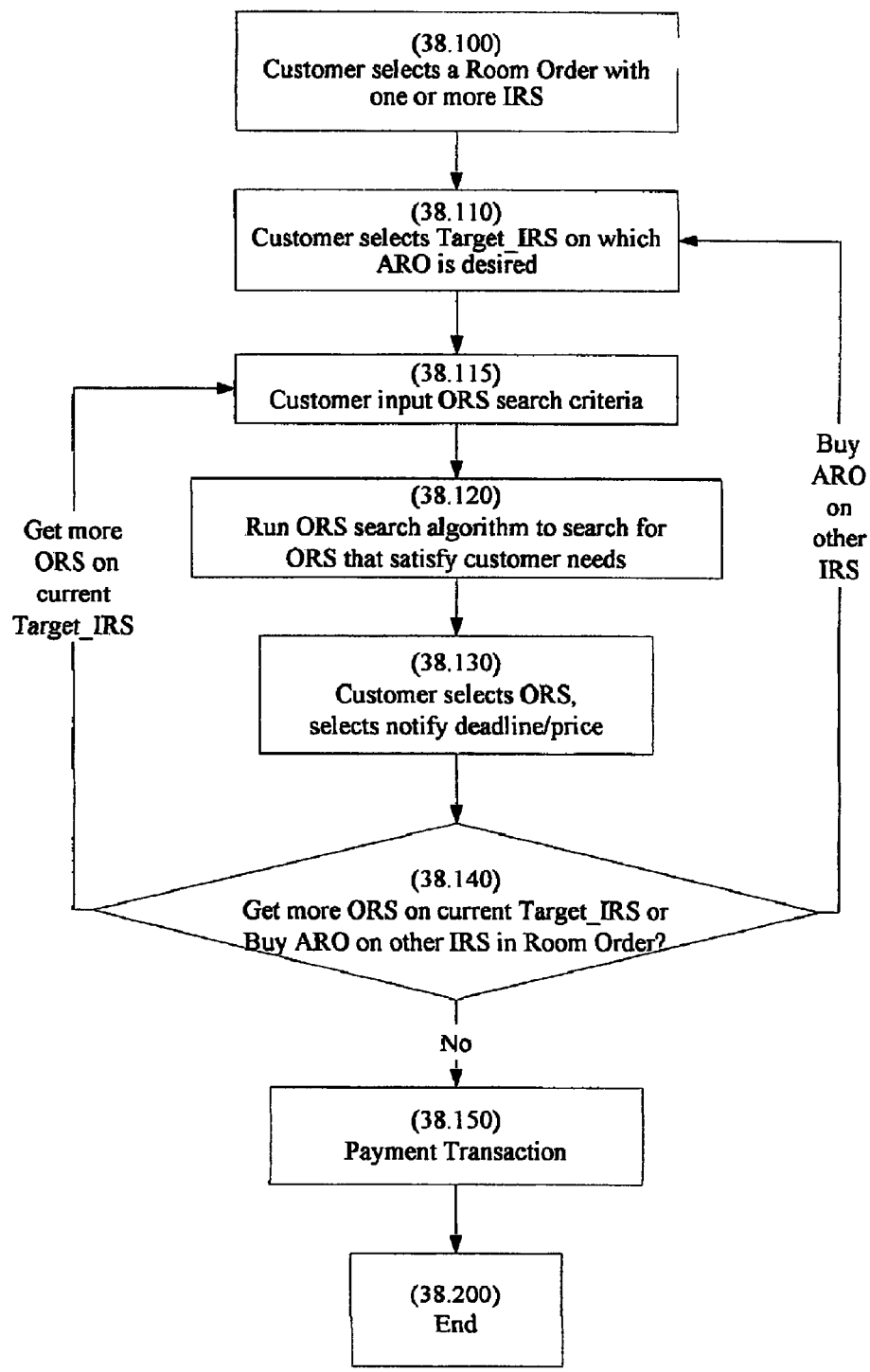
FIG. 38 is a flowchart that expands Act 100 of FIG. 31, illustrating a high level algorithm for the "Sequential Buy ARO" process.
Figure 40:
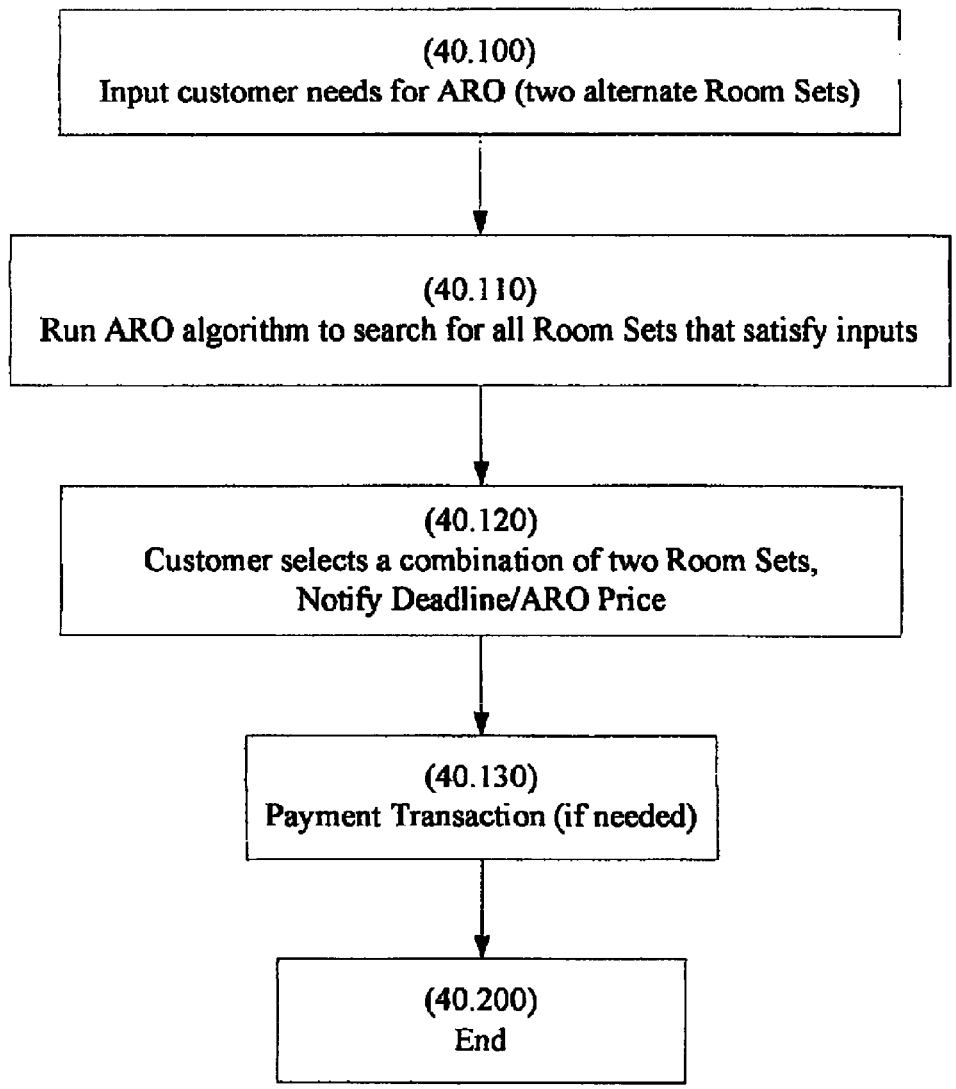
FIG. 40 is a flowchart of an algorithm for the "Concurrent Buy ARO" process, an alternative process to FIG. 38.

As explained above, the Buy ARO process may be implemented via the Sequential (shown in FIG. 38) or the Concurrent (shown in FIG. 40) process. There are many ways to do the Sequential process. As an example of the Sequential process, a customer may select (or purchase) a Room Product/Room Set/Room Order before the Initial Transaction begins. In such situations, said Room Product/Room Set/Room Order may be referred to as Initial Room Product/Initial Room Set/Initial Room Order or IRP/IRS/IRO, in short, respectively. A customer may purchase an ARO i.e., purchase one or more ARO Room Products/Room Sets/Room Orders on an IRP/IRS/IRO, respectively. An ARO Room Product/Room Set/Room Order is also referred to as Option Room Product/Option Room Set/Option Room Order, or ORP/ORS/ORO, in short, respectively. The terms "ARO Room Product"/"ARO Room Set"/"ARO Room Order", "Initial Room Product"/"Initial Room Set"/"Initial Room Order" and "Option Room Product"/"Option Room Set"/"Option Room Order", respectively, have been used interchangeably as and when context requires. The two events (one for the Initial Room and the other for the Initial Transaction) may be executed with a minimal (one just after another) or a significant time gap (e.g., few minutes, hours, days and so forth) in between them.

The ARO VOF may be implemented at different levels including, but not limited to, Room Product, Room Set and Room Order. Illustration of Room Product and Room Set in the hotel industry is given as an example as shown in FIGS. 32 and 33 respectively.

FIG. 32 displays a practical example of ARO implementation at the Room Product level. A customer buys ARO on Room Product (i.e., Initial Room Product or IRP, in short) in a Room Set and receives one Option Room Product (or ORP, in short) on IRP, as shown in Box 32.200. The customer may select either the IRP (Meeting Room) or the ORP (Saturday Night Show) as the Chosen Room Product (or CRP, in short) for the Room Product in the Room Set.

FIG. 33 displays a practical example of implementing ARO (2, 1) at the Set level. A customer selects a Room Order comprising an IRS (hotel at T square, guest room, smoking room, saturday night show) as shown in Box 33.100. The customer then buys ARO on the IRS, and receives one ORS (hotel near airport, business suite, non-smoking room, meeting room) as shown in Box 33.200. The customer may select either the IRS or the ORS, as the Chosen Room Set for this Room Order.

A hotel may choose to implement an ARO at any level(s). In a specific ARO interaction between a customer and the hotel, the implementation level should be the same for all ARO Rooms, Chosen Rooms and Released Rooms. For example, if ARO is implemented at the Room Set level, then all the ARO Rooms would refer to ARO Room Sets; Chosen Rooms would refer to Chosen Room Sets; and Released Rooms would refer to Released Room Sets.

1. 'Buy ARO'—Dynamic Interaction to Capture Customer Demand in the Hotel Industry In the Buy ARO process, a customer interacts with a hotel's server to buy an ARO. The interaction may take place (for example) via phone, in-person or on a website. The Sequential Buy ARO Process is presented first along with its detailed algorithms, followed by a short summary of the Concurrent Buy ARO Process.

Sequential Buy ARO Process in the Hotel Industry

There are several ways to implement the Sequential process. The following presents an example of the Sequential Buy ARO Process when an ARO is bought at the Room Set level. It is also assumed here that the customer first purchases an Initial Room Order with one or more IRS, and then opts to buy an ARO to select one or more ORS (Option Room Sets) on the desired IRS.

As an instance of the Sequential Buy ARO process, a customer has purchased a Room Order (with one or more rooms) and then selects an ARO through the interactive interface of the web pages as shown in FIGS. 34, 35, 36 and 37. FIG. 34 displays the summary of the purchased Room Order, which comprises a Room Set: Hotel XYZ International with guest room and special preferences (non smoking room and Saturday night show). Clicking on the marketing banner representing "Buy ARO", the customer is linked to the Web page shown in FIG. 35 and a Buy ARO interaction begins.

The series of web pages in FIGS. 35, 36 and 37 may (for example) be displayed in a customer's browser by a hotel's web server, to facilitate the interaction between the customer and the hotel when the customer comes to select (purchase) an ARO (during or after the Initial Room Order is purchased and/or selected). The Initial Room Order is displayed in FIG. 35. The customer may choose to purchase an ARO on the IRS by entering the search criteria for ORS in the "Search ARO Section" (shown in FIG. 35) and then clicking on the "Search ARO Rooms" button. After the click, the Buy ARO algorithm running "behind the scenes" on a server of the hotel qualifies the availability, applicability and price conditions on all the ORSs (Option Room Sets) available and displays them in the screen as shown in FIG. 36. For each of the ORSs, a set of one or more Notify Deadlines and the corresponding ARO Prices are shown in the form of "Select" buttons (shown in the "ARO Notify Deadline/ARO Price" section in FIG. 36). The customer may select any desired ORS (along with the Notify Deadline and ARO Price) by clicking on a "Select" button associated with any of the Notify Deadlines displayed in the corresponding row. Once the customer clicks the "Select" button, he/she is hyperlinked to the web page as shown in FIG. 37, where the summary of the IRS and the selected ORS is shown.

Next, the customer may choose to select (purchase) more ORS on the same IRS. To purchase another ORS on the current IRS, the customer may click on "Add more ARO Rooms" button and the customer may repeat the ORS search process for this. Once all the desired ORSs have been selected, the customer clicks the "Save & Purchase" link (shown in FIG. 37), and a payment transaction is executed to complete the purchase.

The following presents an algorithmic illustration of the Sequential Buy ARO process mentioned above. Consider FIG. 38. In Act 38.100, the customer selects (and/or purchases) a Room Set (with one or more RP). Next, in Act 38.110, the customer reaches an interactive interface of the hotel's web server to a Buy ARO page, where the customer selects an IRS (referred to as Target_IRS) on which an ARO is desired. Next, the customer inputs the ORS search criteria (with one or more selected RP or one or more of the selected RP and one or more of other RP or any combination thereof) for the current Target_IRS in Act 38.115.

Next, on clicking the "Search ARO Rooms" button, control goes to Act 38.120, where the ORS search algorithm is executed to search for one or more ORS. The ORS search algorithm returns a list of valid ORSs, along with a list of Comb_NDs (defined elsewhere) and associated ARO Prices. The details of the ORS search algorithm are presented later. Next, the search results are displayed for the customer, who then selects the desired ORS and one or more associated Comb_ND(s)/ARO Price(s), as shown in Act 38.130.

Next, in Act 38.140, a test is performed to determine whether the customer wants to select more ORSs on the current Target_IRS or on another IRS. If the customer wants to get an ORS on another IRS, control loops back to Act 38.110, where the customer selects another IRS as the Target_IRS, and then the process is repeated again for the new Target_IRS. If the customer wants to get more ORSs on the current Target_IRS, control loops back to Act 38.115, where the customer enters the ORS search criteria, and then the process is repeated for the new ORS search criteria. If the customer does not want to buy any more ORSs, control goes to Act 38.150, where a payment transaction (if needed) may be executed. For example, a customer may need to pay a price for the Room after taking into consideration the Initial ARO Price (if any) using a credit card, direct bank account debit or any other payment transaction mechanism. Next, the algorithm ends in Box 38.200. The computation may be performed using a processor that may calculate results in optimal time.

ORS Search

Figure 39:
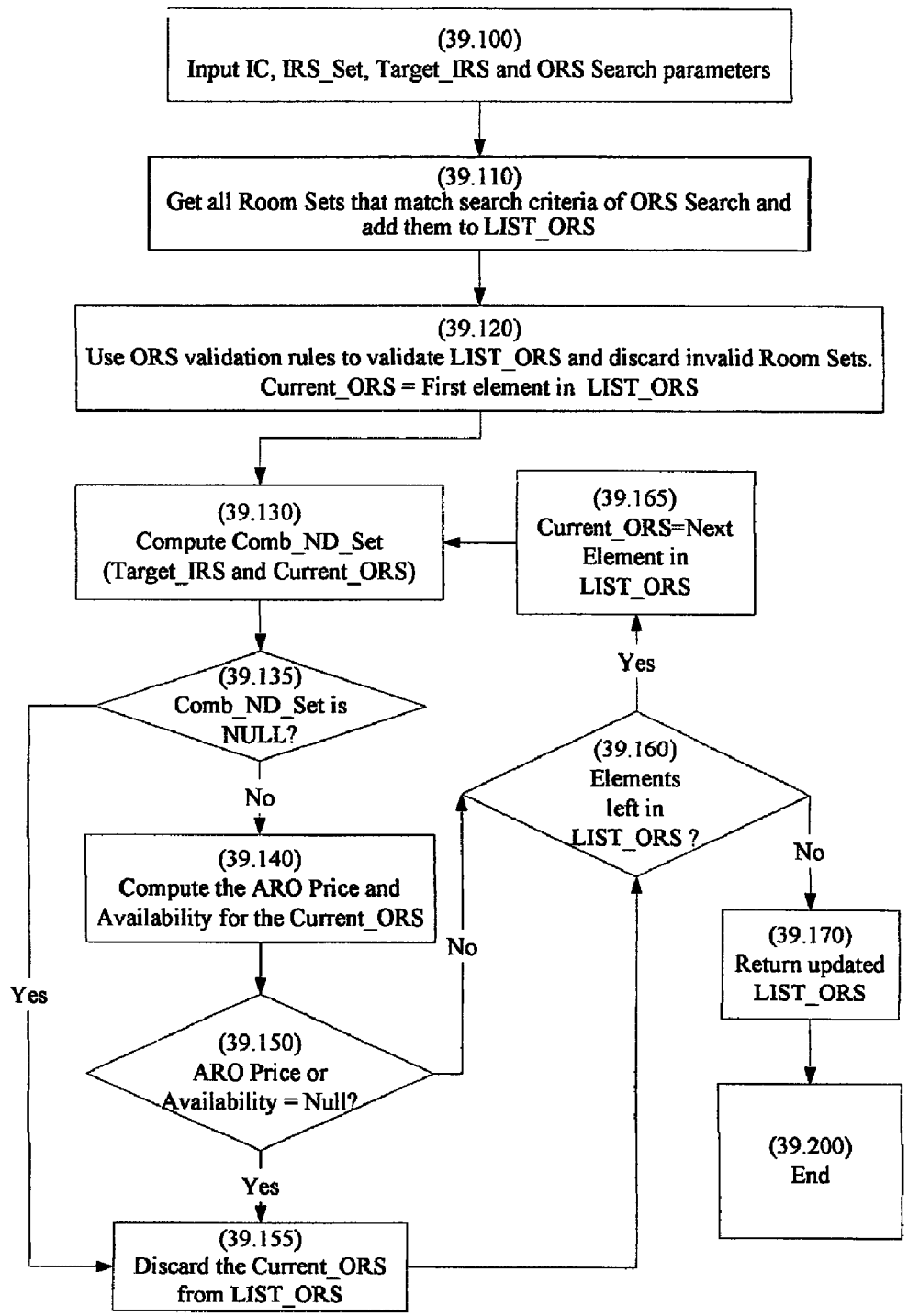
FIG. 39 is a flowchart that expands Act 120 of FIG. 38, illustrating an algorithm to search for ARO Rooms (or Option Room Sets)

The following algorithm (shown in FIG. 39) determines and validates an ORS for a given set of conditions including, but not limited to, availability, Notify Deadline and ARO price. One of the was of implementation of the ORS Search has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 39.100, the number of customers (IC), IRS_Set (containing all the IRS in the Initial Room Order, and all the ORSs, (if any) already selected/purchased along with Comb_ND_Set(s) and Comb_OP_Set(s), for each IRS), Target_IRS and the ORS Search parameters are input to the system. The details on Comb_ND_Set and Comb_OP_Set are provided later. The ORS search parameters include, but are not limited to, date, time For check-in/check-out and location of the hotel, number of Room Products per Room Sets, Notify Deadline, ARO Price and so forth. A customer may be allowed to input Notify Deadline and/or ARO Price on the basis of which valid ORSs (that satisfy the given criteria of Notify Deadline and/or ARO Price) may be searched for and displayed for the customer. In another example, a customer may input location and/or room type related parameters as inputs, and then a set of Notify Deadlines and ARO Prices may be computed for the hotels that match the given criteria. In yet another example, a customer may input both location and/or room type and Notify Deadline and/or ARO Price inputs and then a search may be performed for valid ORSs. In some situations, a hotel may also validate the rooms input by the customer to determine if said rooms are eligible to be ARO Rooms.

Next, control goes to Act 39.110, where an ORS Search is performed for the given criteria. The search may be best performed using a processor that may calculate results in optimal time. The order in which search parameters are executed may be optimized to reduce the search time, however, it may or may not affect the Final outcome. A hotel may select any order of its choosing.

In Act 39.110, Room Sets are determined that match the search and the resulting Room Sets are added to a list termed LIST_ORS. Next, in Act 39.120, a list of ORS validation rules is obtained from the hotel's ARO VOF database and the rules are used to validate all the Room Sets in the LIST_ORS list. Room Sets that do not satisfy the rules are discarded. Validation rules may include, but are not limited to, a Maximum Number of Room Products per Room Set Rule, a Maximum Room Price Rule, a Time Synchronization Rule, and so forth. For example, a Maximum Number of Room Products per Room Set Rule discards the Room Sets that have more Room Products than specified. A hotel may implement any validation rule of its choosing to further qualify the Room Sets in the LIST_ORS list. As a last Act in Act 39.120, the first element in the updated LIST_ORS is designated as the Current_ORS.

Next, control goes to Act 39.130, where a group of Comb_NDs is computed for the combination of the Target_IRS, all the existing ORS of the Target_IRS and the Current_ORS, and added to a set called Comb_ND_Set. Next, in Act 39.135, a test is performed to determine whether the Comb_ND_Set obtained in the previous Act is Null. If so, control goes to Act 39.155. If not, control goes to Act 39.140, where the ARO availability and ARO Price for the Comb_ND_Set are determined. Next, in Act 39.150, another test is performed to determine whether the ARO Availability or the ARO Price is Null. If so, control goes to Act 39.155. If not, control goes to Act 39.160.

In Act 39.155, the Current_ORS is discarded from the LIST_ORS list, and control goes to Act 39.160, where another test is performed to determine if more elements are left in the LIST_ORS list. If so, control goes to Act 39.165. If not, control goes to Act 39.170.

In Act 39.165, the next element in the LIST_ORS list is designated as the Current_ORS and control loops back to Act 39.130 to repeat the process for the new Current_ORS. In Act 39.170, the updated LIST_ORS list is returned as the search result, and the algorithm ends in Box 39.200.

Computation of Notify Deadlines in the Hotel Industry

A hotel may set one or more Notify Deadlines of its choosing for its Room Products. Once the Notify Deadlines have been set for each Room Product, the next Act is to create a framework to compute Notify Deadlines for a group of Room Products (such as a Room Set, a Room Order or any other group). The following sections present an example of a framework that may be used to obtain a set of Notify Deadlines applicable to a group of Room Products. A hotel may use any framework and algorithm of its choosing to obtain the same.

A set of Notify Deadlines associated with a Room Product, a Room Set and a combination of two or more Room Sets is called Product_ND_Set, Set_ND_Set and Comb_ND_Set, respectively. Each element in the Product_ND_Set, Set_ND_Set and Comb_ND_Set is termed Product_ND, Set_ND and Comb_ND, respectively. The Comb_ND_Set may be computed by combining the Set_ND_Sets of all the given Room Sets. A Set_ND_Set is computed by combining the Product_ND_Sets of all the Room Products under that Room Set. The Notify Deadlines may be computed based on various parameters and factors of the hotel choosing. One example to compute a Comb_ND_Set is as follows. First compute Set_ND_Set for all Room Sets. A Set_ND_Set is computed by first selecting earliest of the Notify Deadlines of each Room Product within the concerned Room Set, and then picking the latest of those Deadlines, and noting that as the Target_Deadline. Next step is to pick all those Notify Deadlines that fall after the Target_Deadline. Notify Deadlines thus obtained may be validated using various validation rules based on hotel factors such as customer utility, room parameters and so forth. Similarly, the Comb_ND_Set may thus be computed by repeating the above process for Set_ND_Sets, thus obtained for each Room Set.

Available Capacity Check in the Hotel Industry

The ARO available capacity for an ORS may depend on one or more factors including, but not limited to, Notify Deadline, ARO Prices, expected room value and so forth. A hotel may use any method of its choosing to determine ARO capacity of a Room. For example, a hotel may choose to have a fixed ARO capacity for one or more of its Room Products.

An instance to compute ARO capacity is discussed below. Consider the case, when ARO Capacity is dependent on Notify Deadline. In such situation, the objective is to determine those Comb_NDs within the Comb_ND_Set on which ARO is available for the given ORS. The ARO Capacity and the Used ARO Capacity (the total number of Room Products on which ARO has been sold but not exercised) may be calculated for each Comb_ND within the Comb_ND_Set. Available Capacity (AC) would then be the difference of ARO Capacity and Used ARO Capacity for the given Room Product. If the AC is greater than or equal to the number of incoming customers desiring an ARO, then the ARO capacity is available at a given Comb_ND for the given ORS. The process may be repeated for all Notify Deadlines within Comb_ND_Sets. An ARO may be made available on a given ORS for a given Comb_ND, if ARO is available on all the Room Products of ORS for the given Comb_ND.

ARO Price Calculation

A hotel may set ARO Prices for a Room Product using any method of a hotel's choosing. Once the ARO Prices have been set for each Room Product, the next Act is to create a framework to compute ARO Prices for a group of Room Products (such as a Room Set, a Room Order or any other group) by using ARO Prices for each of the Room Products in the group.

The parameters Product_OP refer to an ARO Price (may or may not be corresponding to a Notify Deadline) associated with a Room Product. Similarly, Set_OP and Comb_OP refer to ARO Price (may or may not be corresponding to a Notify Deadline) associated with a Room Set and a combination of two or more Room Sets, respectively. A set of Product_OPs, Set_OPs and Comb_OPs is termed Product_OP_Set, Set_OP_Set and Comb_OP_Set, respectively. The Comb_OP_Set is computed by combining the Set_OP_Sets of the IRS and all the ORSs (existing and new). A Set_OP_Set is computed by combining the Product_OP_Sets of all the Room Products under that Room Set.

One or more Set_OP_Rules may be read from the hotel's database and applied to calculate Set_OP_Set for each input Room_Set (IRS and all ORSs) using the Product_OP_Sets of all the Room Products of said Room_Set. A hotel may use any Set_OP_Set Rule of its choosing. Set_OP_Rules may be defined to calculate Set OP as the sum, average, highest, lowest or any other function of Product OPs of all the Room Products at a given Comb_ND. Similarly, a Comb_OP_Set comprises one or more Comb_OPs, and is calculated using one of the pre-determined rules, termed Comb_OP_Rules, to combine the Set_OPs of all the Room Sets in the combination. A hotel may use a Comb_OP_Rule of its choosing. Comb_OP_Rules may be defined similar to the Set_OP_Rules.

Concurrent Buy ARO Process in the Hotel Industry

As explained above, in the Concurrent Buy ARO process, a customer selects all the ARO Rooms concurrently in one transaction. An algorithmic illustration of an example of the Concurrent Buy ARO process is displayed in FIG. 40. An ARO (2, 1) instance is assumed here as an example. Consider a customer who wants accommodation flexibility in his/her trip and wants two ARO Room Sets. In Act 40.100, the customer needs for ARO are input, including, but not limited to, a search criteria for two Room Sets according to customer's utility (may be similar to the search criteria defined above for the Sequential Buy ARO process).

Next, in Act 40.110, the ARO algorithm is run to determine the combinations of two Room Sets that satisfy inputs. A list of such search results is displayed for the customer along with the associated terms and conditions including, but not limited to, Notify Deadlines, ARO Price and Room Price for each such combination. The ARO algorithms defined above for the Sequential Buy ARO process (defined above) may also be used for the Concurrent Buy ARO process.

Next, in Act 40.120, the customer selects a desired combination of two Room Sets and the associated conditions such as ARO Price/Notify Deadline. Next, in Act 40.130, a payment transaction is executed, if needed. For example, the customer pays the Room Price for ARO (if any) using a credit card, direct bank account debit or any other payment transaction mechanism. Next, the algorithm ends in Box 40.200. The computation may be performed using a processor that may calculate results in optimal time.

(2) Event Optimizer in the Hotel Industry

After the completion of the Buy ARO process, the next stage is the Event Optimizer. In this stage, the customer notification (or CN, in short) process as shown in Act 31.200 is executed. In this process, a customer selects a Chosen Room. The process may also comprise one or more event optimizer algorithms that may help to optimally select the Chosen Room and/or to optimally reuse the Released Room. The details of the CN process are provided later. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E.

ARO Exercise Process in the Hotel Industry

In the Customer Notification (or CN, in short) process, a customer interacts with a hotel's server to select the Chosen Room. The interaction may take place (for example) via phone, in-person, on a website or via any other communication mechanism. The Customer Notification process may be performed using any rule/method as desired.

Customer Notification (or CN) Process in the Hotel Industry

The primary objective of the CN process is to select (or define) the Chosen Room. In the CN process, a decision for the Chosen Room is notified to the hotel. As mentioned earlier, the Chosen Room may be defined by the hotel, the customer, another entity or any combination thereof. The customer interacts with a hotel server that runs the CN process, to select the Chosen Room. If the customer fails to notify the hotel of the Chosen Room before the Notify Deadline, the Chosen Room is decided based on the terms and conditions set before in the Initial Transaction of the ARO purchased by the customer.

Figure 41:
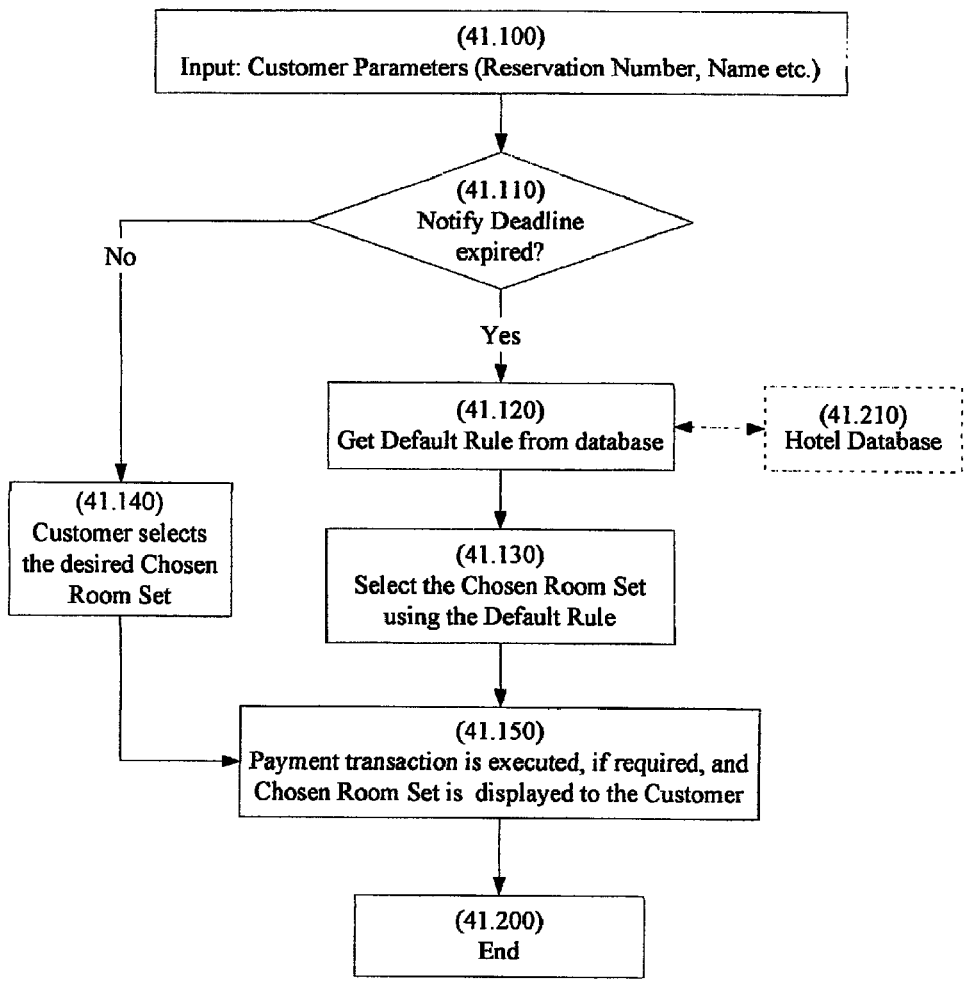
FIG. 41 is a flowchart that expands Act 200 of FIG. 31, illustrating an algorithm for the "Customer Notification" process.

FIG. 41 displays an example of an algorithm that may be used to execute the Customer Notification process. In Act 41.100, a customer enters input parameters, such as Reservation/Confirmation Number, Last Name, purchase date and so forth to retrieve the data from the hotel database for the Initial Room Order and ARO Rooms. Next, in Act 4.1.110, a test is performed to determine whether the Notify Deadline has expired or not. If so, then control goes to Act 41.120. If not, then control goes to Act 41.140.

In Act 41.120, a Default Rule is read from the hotel's database (Box 41.210). A Default Rule defines a criteria to select the Chosen Room if the customer fails to provide a timely notification (i.e. before the Notify Deadline) to the hotel regarding his/her decision of the Chosen Room. A hotel may use a Default Rule of hotel's choosing. A hotel may use a rule to choose a room with the lower expected value, earlier check-in date, lower occupancy rate or any other factor. Next, in Act 41.130, the Default Rule, thus obtained, is used to select the Chosen Room Set, and then control goes to Act 41.150. In Act 41.140, the customer selects the desired Chosen Room. Next, control goes to Act 41.150.

In Act 41.150, a payment transaction (if any) is executed, and then the Chosen Room is displayed to the customer. The payment transaction may be related to the ARO purchased by the customer (such as a payment of an ARO Exercise Price). The algorithm, then ends in Box 41.200. The computation may be performed using a processor that may calculate results in optimal time.

Implementation of ARO VOF in Conjunction with Other VOFs in the Hotel Industry

ARO VOF may be used in conjunction with one or more other VOFs, for example, the FRO (Flexibility Reward Option) VOF. A customer who receives an ARO is termed "A" type of customer. A hotel may form a group of one or more ARO customers and one or more FRO customers, where the options (ARO and FRO) obtained by the group members are complimentary in nature. As an example, consider an A customer who bought an ARO to choose either of room R1 or room R2 as the Chosen Room, and consider a Y customer who received a FRO and is flexible to take any of R1 and R2 as the Chosen Room. Thus, if A decides to choose R1 as the Chosen Room, the hotel may assign R2 as the Chosen Room for Y, and vice versa. The customers A and Y have taken complimentary options and may form a group. The hotel may need to hold only one unit of inventory in R1 and R2 to satisfy the needs of both A and Y (assuming each A and Y only need one unit of room). Such a combination of complimentary options or VOFs may improve efficiency and concurrently enhance value for all the parties involved (in the context of the current example, enhance value for A, Y and the hotel).

The implementation of the grouping of A type and Y type of customers may be done in one or more ways. One way to implement such grouping is to first have one or more Y type of customers and based on such customer(s), the hotel may offer complimentary AROs to customers to make groups. In another implementation, the hotel may first offer ARO and based on such ARO customer(s), hotel offers complimentary FROs to customers to make groups. In yet another implementation, the hotel may offer ARO and FRO separately and then define a process to make complimentary groups of A and Y customers (such groups termed "AY_Groups").

A hotel may choose to create AY_Groups at various group levels such as implementation of grouping at Level 1, Level 2 and so on. In Level 1 grouping, an AY_Group involves one each of A and Y type of customers. An example of Level 1 grouping has already been given above (the two customer, A and Y, example).

In Level 2 grouping, the grouping involves making complimentary groups for more than 2 customers. As an example, consider an A customer who bought an ARO to choose either room R1 or room R3 as the Chosen Room, a Y1 customer who received a FRO and is flexible to take any of room R1 and room R2 as the Chosen Room and a Y2 customer who has also received a FRO and is flexible to take any of R2 and R3 as the Chosen Room. A notation A-Y1-Y2 represents this example. Thus, if A decides to choose R1 as the Chosen Room, the hotel may assign R2 as the Chosen Room for Y1 and R3 as the Chosen Room for Y2. Alternatively, if A decides to choose R3 as the Chosen. Room, the hotel may assign R1 and R2 as the Chosen Rooms for Y1 and Y2, respectively.

It is assumed that a "unit" represents one unit of room (or room capacity) and each customer needs only one unit of a room. Continuing with the above example, if the hotel were to not consider the complimentary nature of options obtained by A, Y1 and Y2 customers, the hotel may need to hold (or block) a total of 4 units of capacity to ensure complete satisfaction of needs of A, Y1 and Y2, i.e., 2 units for A (1 unit each of R1 and R3 as A could choose any room), 1 unit for Y1 (either R1 or R2) and 1 unit for Y2 (either R2 or R3). This implies, to satisfy a total need of 3 units of rooms, the hotel may need to hold (or block) 4 units of room capacity, creating a redundant capacity of 1 unit that the hotel may not be able to use otherwise. By creating a complimentary group of A-Y1-Y2, the hotel needs to only hold (or block) 3 units of capacity (1 unit each in R1, R2 and R3), thus, freeing up 1 unit of redundant capacity. Thus, an AY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-Y1-Y2-Y3.

A hotel may choose to implement grouping at various room levels such as Room Product, Room Set and Room Order. A hotel may also change terms and conditions of one or more option contracts of one or more FRO and/or ARO customers (for e.g., price, notify deadline and so on) to solicit customer participation in FRO/ARO to create more AY_Groups. The hotel may also offer incentives to customers to choose complimentary FRO/ARO offerings to enable the hotel to create more AY_Groups. The implementation methods mentioned above for grouping are for illustration purposes only and a hotel may choose to implement grouping in one or more other ways or by combining above said methods or by combining one or more other ways along with one or more above said methods.

Figure 42:
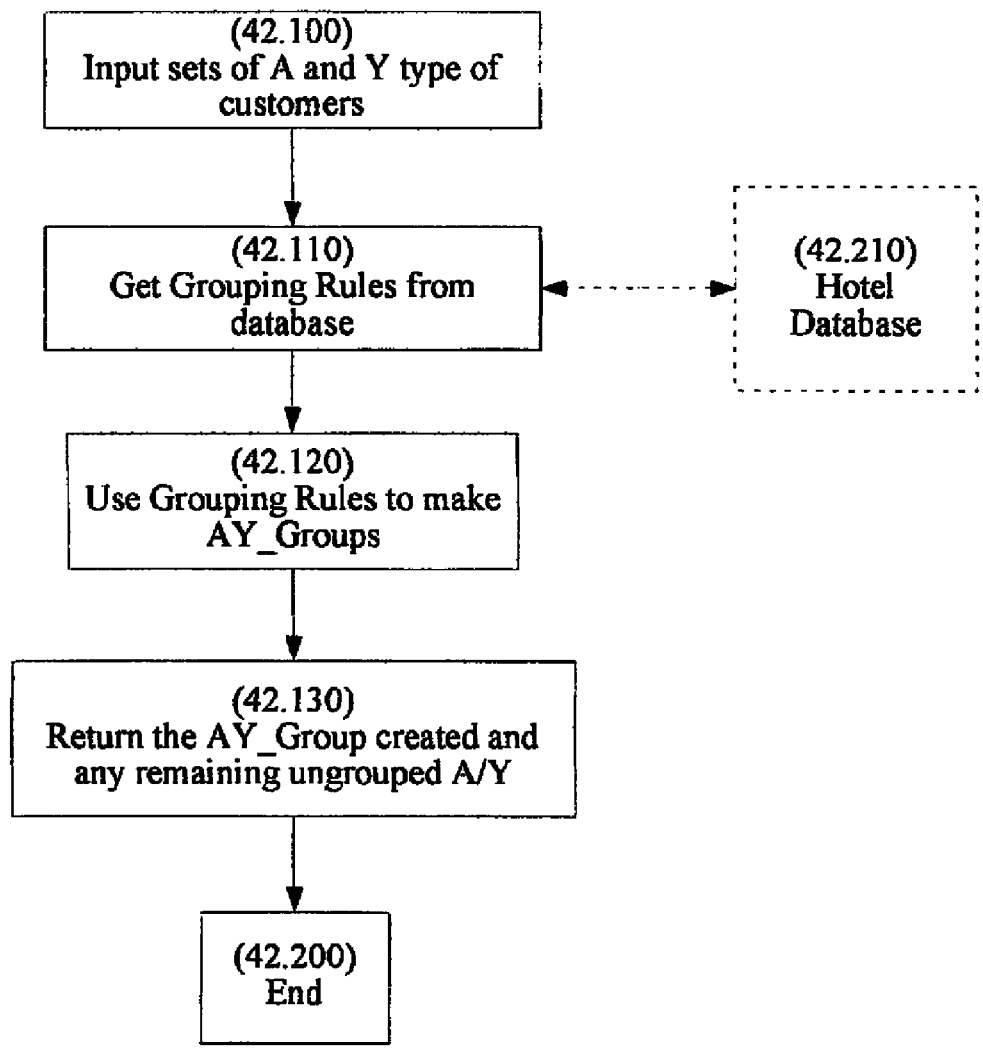
FIG. 42 is a flowchart illustrating an example of an algorithm to implement grouping of A and Y type of customers in context of the hotel industry.

FIG. 42 displays a flow chart that illustrates one way of implementing grouping of A and Y type of customers. In Act 42.100, sets of A and Y customers are taken as input. Next, in Act 42.110, a set of one or more Grouping Rules is read from the hotels database (42.210). A grouping rule may depend upon the number of A and/or Y type of customers, desired capacity redundancy in the system, the permissible time factor to create AY_Groups, any other rule of hotel's choosing, any combination thereof and so on. For example, a hotel may choose a Grouping Rule whereby new groups are created by first ungrouping one or more of the AY_Groups (created earlier but unexercised, for example, groups for which the customer has not been notified, or if notified, the customer has not utilized the room and the terms of option contract allows for a change in the Chosen Room). A Grouping Rule may create groups of only those A and Y type of customers who have yet to be grouped and discarding all NY customers, which have already been grouped. A hotel may implement any Grouping Rule to formulate AY_Groups. The choice to Grouping rules may enhance the overall value for the hotel (for example, reduce the total capacity required to satisfy room needs for all A and Y customers). Theoretically, the number of units of the room required (or blocked) should be equal to the number of customers buying the room (assuming each customer wants one unit of room). Thus, by implementing the grouping and with the help of appropriate Grouping Rules, the hotel may attempt to achieve such theoretical minima.

Next, in Act 42.120, the Grouping Rules, so obtained from the hotel's database, are used to make AY_Groups. Next, in Act 42.130, the AY_Groups so created are returned along with ungrouped if any, and the process then ends in Box 42.200.

The grouping may enhance customers' experience, and may comprise operating a system that delivers a FRO to at least a "first customer" to utilize up to n of m selected rooms for said first customer, and n is less than or equal to m; operating a system that delivers an ARO to at least a "second customer" to utilize up to k of p selected rooms, and k is less than or equal to p; operating a system to define each of the k Chosen Rooms, whereby after each of the k Chosen Rooms is defined, said "second customer" can utilize said Chosen Room; operating a system wherein a hotel defines t Chosen Room(s) for said "first customer" after each of said k Chosen Rooms is defined, wherein after each of said t rooms is defined, said first customer can utilize said defined room, where t is less than or equal to n. Said t rooms may be a subset of n rooms, m rooms or both. Said t rooms or n rooms or both may also include one or more rooms not included in said m selected rooms. Similarly, k rooms may be a subset of p rooms, or may include one or more rooms other than said p rooms. The grouping may be performed for a multiplicity of at least one of said first or second customers and may combine together at least one of each of said first and second customers to formulate at least one group with at least one complementary set of options. The grouping may enable a hotel, an entity other than said hotel and/or any combination thereof to utilize at least one of said m or p rooms at least after delivery of any of said first or second options. The hotel and/or an entity other than said hotel may implement ARO VOF where in the first and/or second customer in said grouping may be same. The notification conditions may be different, same or any combination thereof for the first and second option.

Said first and/or second option may or may not include any notification deadline condition. The hotel, the second customer, an entity other than said hotel and/or any combination thereof may define, at one or more times, at least one of said k Chosen Rooms. The hotel, the first customer, an entity other than said hotel and/or any combination thereof may define, at one or more times, at least one of said p Chosen Rooms. The first customer may select, at one or more times, at least one of said m Rooms. The second customer may select, at one or more times, at least one of said p Rooms. The hotel and/or an entity other than the hotel may receive from at least one of said first or second customer, at one or more times, an indication of one or more terms and conditions associated with said first or second options, respectively. Similarly, at least one of said hotel and/or an entity other than said hotel may deliver to at least one of said first or second customers, at one or more times, one or more terms and conditions associated with said first or second option, respectively. There may or may not be any payment transaction between the hotel, an entity other than the hotel, and at least one of said first and/or second customer.

ARO VOF may be used in conjunction with one or more other VOFs, for example, the URO (Upgrade Room Option) VOF. A customer who received an ARO is termed "A" type of customer. A hotel may form a group of one or more ARO customers and one or more URO customers, where the options (ARO and URO) obtained by the group members are complimentary in nature. As an example, consider two customers A(R1, R2) and U[up(R2), base(R1)]. The notation A(R1, R2) implies a customer A who has received an ARO and has the flexibility to choose either R1 or R2 as the Chosen Room. The notation U[up(R2), base(R1)] implies a customer U who received a URO and wishes to get an upgrade from R1 (i.e., the base room) to R2 (i.e., the up room). Thus, if A decides to choose R1 as the Chosen Room, the hotel may upgrade U to R2. If A decides to choose R2 as the Chosen Room, the hotel may not upgrade U and hence U gets R1. The customers A and U have taken complimentary options and may form a group. The hotel may need to hold only one unit of inventory each in R1 and R2 to satisfy the needs of both A and U (assuming each A and U only need one unit of room). Such a combination of complimentary options or VOFs may improve efficiency and concurrently enhance value for all the parties involved (i.e., in the context of the current example, enhance value for A, U and the hotel).

The implementation of the grouping of A type and U type of customers may be done in one or more ways. One way to implement such grouping is to first offer and secure one or more U type of customers and based on such customer(s), the hotel may offer complimentary AROs to other customers to make groups. In another implementation, the hotel may first offer and secure ARO customers and based on such ARO customer(s), hotel offers complimentary UROs to other customers to make groups. In yet another implementation, the hotel may offer ARO and URO separately and then define a process to make complimentary groups of A and U customers (such groups termed "AU_Groups").

A hotel may choose to create AU_Groups at various group levels such as implementation of grouping at Level 1, Level 2 and so on. In Level 1 grouping, an AU_Group involves one each of A and U type of customers. An example of Level 1 grouping has already been given above (the two customer, A and U, example).

In Level 2 grouping, the grouping involves making complimentary groups for more than 2 customers. As an example, consider three customers A(R1, R2, R3), U1[up(R2, R3), base(R1)] and U2[up(R1, R3), base(R2)]. The notation A(R1, R2, R3) implies a customer A who received an ARO on R1, R2 and R3 (flexibility to choose any one of R1, R2 or R3 as Chosen Room). The notation U1[up(R2, R3), base(R1)] implies a customer U1 who received a URO and wishes to get an upgrade from R1 (base room) to either R2 or R3 (any of the two up rooms), and U2[up(R1, R3), base(R2)] implies a customer U2 who received a URO and wishes to get an upgrade from R2 (base room) to either R1 or R3 (any of the two up rooms). A hotel may group these three customers together. If A decides to choose R1 as the Chosen Room, the hotel may upgrade U1 to R2 and U2 to R3. Alternatively, if A decides to choose R2 as the Chosen Room, the hotel may upgrade U1 to R3 and U2 to R1. In the third case, if A decides to choose R3 as the Chosen Room, the hotel may upgrade U1 to R2 and U2 to R1. Thus by grouping them together, the hotel needed to hold only one unit of inventory in each of the three rooms R1, R2 and R3 to satisfy needs for all three customers in all different situations.

It is assumed that a "unit" represents one unit of room (or room capacity) and each customer needs only one unit of a room. Continuing with the above example, if the hotel were to not consider the complimentary nature of options obtained by A, U1 and U2 customers, the hotel may need to hold (or block) a total of 5 units of capacity to ensure some level of satisfaction of needs for A, U1 and U2, i.e., 3 units for A (1 unit each of R1, R2 and R3 as A could choose any room), 1 unit for U1 in R1 (base room) and 1 unit for U2 in R2. Even by blocking (or holding) 5 units of space, there may be no guarantee that the hotel would be able to satisfy upgrade needs for U1 or U2 (in the event they are not grouped together). This implies, to satisfy a total need of 3 units of rooms, the hotel may need to hold (or block) 5 units of room capacity, creating a redundant capacity of 2 units that the hotel may not be able to use otherwise. By creating a complimentary group of A-U1-U2, the hotel needs to only hold (or block) 3 units of capacity (1 unit each in R1, R2 and R3), thus, freeing up 2 units of redundant capacity. Thus, an AU_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-U1-U2-U3.

A hotel may choose to implement grouping at various room levels such as Room Product, Room Set and Room Order. A hotel may also change terms and conditions of one or more option contracts of one or more URO and/or ARO customers (for e.g., price, notify deadline and so on) to solicit customer participation in URO/ARO to create more AU_Groups. The hotel may also offer incentives to customers to choose complimentary URO/ARO offerings to enable the hotel to create more AU_Groups. The implementation methods mentioned above for grouping are for illustration purposes only and a hotel may choose to implement grouping in one or more other ways or by combining above said methods or by combining one or more other ways along with one or more above said methods.

Figure 43:
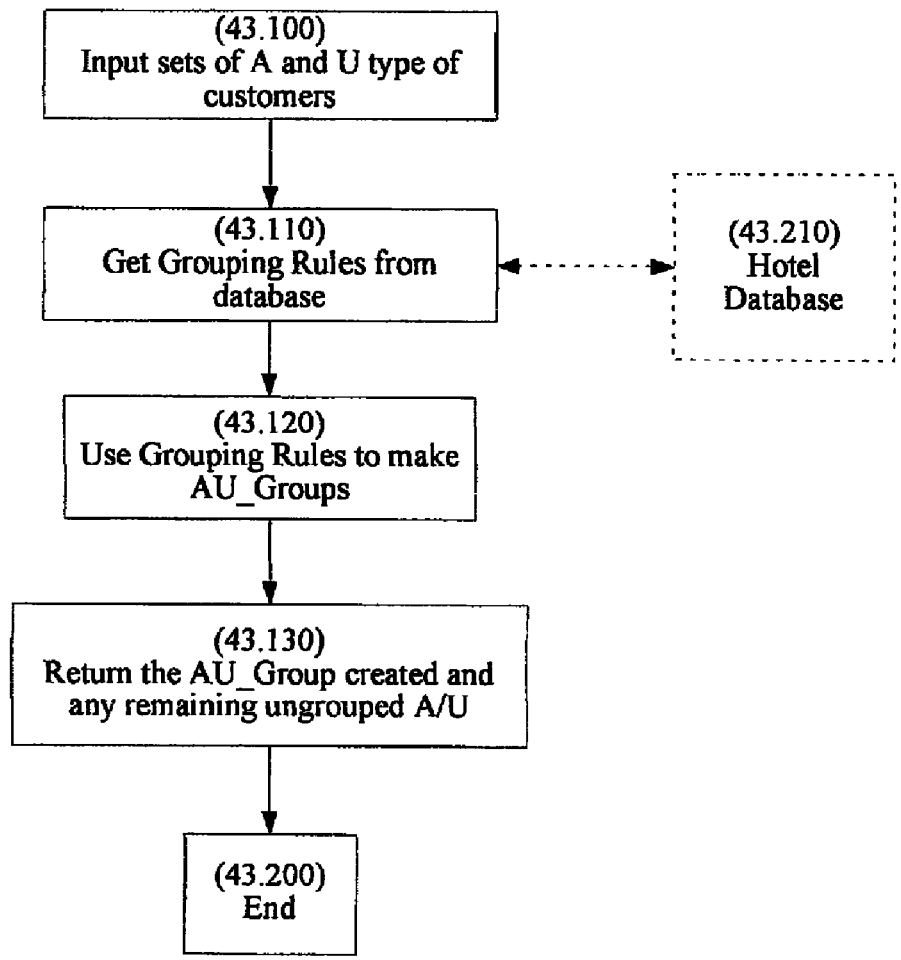
FIG. 43 is a flowchart illustrating an example of an algorithm to implement grouping of A and U type of customers in context of the hotel industry.

FIG. 43 displays a flow chart that illustrates one way of implementing grouping of A and U type of customers. In Act 43.100, sets of A and U customers are taken as input. Next, in Act 43.110, a set of one or more Grouping Rules is read from the hotel's database (43.210). A grouping rule may depend upon the number of A and/or U type of customers, desired capacity redundancy in the system, the permissible time factor to create AU_Groups, any other rule of hotel choosing, any combination thereof and so on. For example, a hotel may choose a Grouping Rule whereby new groups are created by first ungrouping one or more of the AU_groups (created earlier but unexercised, for example, groups for which the customer has not been notified, or if notified, the customer has not utilized the room and the terms of option contract allows for a change in the Chosen Room). In another example, a Grouping Rule may create groups of only those A and U type of customers who are yet to be grouped and discarding all A/U customers, which have already been grouped. A hotel may implement any Grouping Rule to formulate AU_Groups. The choice to Grouping rules may enhance the overall value for the hotel (for example, reduce the total capacity required to satisfy room needs for all A and U customers). Theoretically, the number of units of the room required (or blocked) should be equal to the number of units the customers shall be eventually utilizing. Thus, by implementing the grouping and with the help of appropriate Grouping Rules, the hotel may attempt to achieve such theoretical minima.

Next, in Act 43.120, the Grouping Rules, so obtained from the hotel's database, are used to make AU_Groups. Next, in Act 43.130, the AU_Groups so created are returned along with ungrouped A/U, if any, and the process then ends in Box 43.200.

The grouping may enhance customers' experience, and may comprise operating a system that delivers a URO to at least a "first customer" to utilize up to n of m selected rooms for said first customer, and n is less than or equal to m; operating a system that delivers an ARO to at least a "second customer" to utilize up to k of p selected rooms, and k is less than or equal to p; operating a system to define each of the k Chosen Rooms, whereby after each of the k Chosen Rooms is defined, said "second customer" can utilize said Chosen Room; operating a system wherein a hotel defines t Chosen Room(s) for said "first customer" after each of said k Chosen Rooms is defined, wherein after each of said rooms is defined, said first customer can utilize said defined room, where t is less than or equal to n. Said t rooms may be a subset of n rooms, m rooms or both. Said t rooms or n rooms or both may also include one or more rooms not included in said m selected rooms. Similarly, k rooms may be a subset of p rooms, or may include one or more rooms other than said p rooms. The grouping may be performed for a multiplicity of at least one of said first or second customers and may combine together at least one of each of said first and second customers to formulate at least one group with at least one complementary set of options. The grouping may enable a hotel, an entity other than said hotel and/or any combination thereof to utilize at least one of said m or p rooms at least after delivery of any of said first or second options. The hotel and/or an entity other than said hotel may implement ARO VOF where in the first and/or second customer in said grouping may be same. The notification conditions may be different, same or any combination thereof for the first and second option.

Said first and/or second option may or may not include any notification deadline condition. The hotel, the second customer, an entity other than said hotel and/or any combination thereof may define, at one or more times, at least one of said k Chosen Rooms. The hotel, the first customer, an entity other than said hotel and/or any combination thereof may define, at one or more times, at least one of said p Chosen Rooms. The first customer may select, at one or more times, at least one of said m Rooms. The second customer may select, at one or more times, at least one of said p Rooms. The hotel and/or an entity other than the hotel may receive from at least one of said first or second customer, at one or more times, an indication of one or more terms and conditions associated with said first or second options, respectively. Similarly, at least one of said hotel and/or an entity other than said hotel may deliver to at least one of said first or second customers, at one or more times, one or more terms and conditions associated with said first or second option, respectively. There may or may not be any payment transaction between the hotel, an entity other than the hotel, and at least one of said first and/or second customer.

Business Model to Implement ARO in the Hotel Industry

Different business models may be used to implement an ARO VOF. For example, a hotel may choose to implement an ARO VOF individually or in conjunction with one or more partners and/or other companies. As mentioned in the sections above, in another implementation of ARO, a hotel may allocate some room inventory to another entity. The term "allocation of room(s)" or "allocation of room inventory" implies, without limitation, assigning one or more rooms of one or more hotels to an entity for any purpose or use by the entity either exclusively or non-exclusively. For example, an entity may use the allocated rooms to offer ARO to customers and/or to sell the rooms as regular rooms. The allocation of room may be conditional. For example, one of the conditions may require a return of at least one allocated room after a specified time period and/or other consideration(s).

The customer may select or purchase one or more rooms from the hotel and/or said entity and then interact with said entity to select (purchase) one or more ARO Rooms in relation to said (already purchased) rooms. Said entity may also receive room allocation from more than one hotel/hotel chain, and thus, offer rooms from multiple hotels/hotel chains to a single customer during the Initial Transaction for ARO.

The OA may use those rooms and operate a service to offer AROs to the hotel customers. As explained above in FIG. 13A, a customer may select one or more rooms from the OA, and then receive an ARO on those selected rooms from the OA. Another approach would be for a customer to select one or more rooms from the hotel and then receive an ARO option on those selected rooms from the OA. In another example, a customer may select one or more rooms from both the hotel and the OA, and then receive the ARO option on those selected rooms from the OA. It is also possible that the customer receives an ARO from the hotel or both from the hotel and the OA on a given set of selected rooms.

The OA and the hotel may simultaneously offer AROs to the hotel customers, i.e., a customer may either approach the hotel or the OA to receive an ARO on desired rooms. In another model, the OA may operate as the sole provider of the ARO to all the customers of a hotel. In a yet another model, the OA and the hotel may choose to work together and jointly offer AROs to the hotel customers. The OA or the hotel may offer and sell AROs to customers using either or both of the Sequential or the Concurrent Buy ARO processes.

As explained in FIG. 13A above, an OA may be able to offer ARO on rooms from one or multiple hotels. An OA may receive allocation of rooms from two or more hotels. A customer may purchase one or more rooms from one or more hotels and/or from the OA, and then receive an ARO option on those selected rooms from the OA. Even if the OA may not be entitled to or does not receive room allocation from a hotel, it may still be able to formulate an agreement with that hotel to offer AROs on the rooms of that hotel. Thus, a customer may be able to receive an ARO on rooms from multiple hotels, giving the customer more flexibility and variety to choose from. For example, a customer may receive an ARO on two rooms from two different hotels and can choose to use either of them within the terms and conditions of the option contract. This may provide a lot of flexibility for the customers, especially when the customer trip includes destinations only served by a few hotels which may be preferred by the customers. An OA may be able to thus create a multi-hotel ARO VOF Framework, which may tremendously enhance the flexibility for the customers. All the participating hotels that allocate rooms to and/or partner with the OA to offer ARO may also gain from an overall increase in the total spending by the consumers, enhanced overall customer satisfaction and/or other operational benefits. Either or both of the OA and the hotel may process the reservations for the Chosen Rooms associated with an ARO purchased by the customer. A customer may receive reservations from the OA or the hotel for the rooms related to the ARO grant. An entity (the OA and the hotel) may process reservations for the rooms offered only by that entity or by either of the two entities.

The OA and the hotel may engage in a business agreement to implement an ARO program. The business agreement may divide the total benefit generated by the ARO program between the two parties using any mechanism or criteria as desired. The total ARO Revenue Benefit may be shared between the two parties. The hotel may allocate rooms to the OA. One or more hotels may allocate only few or may allocate their entire room inventory to the OA to offer those rooms to the customers by way of regular and/or ARO rooms. The OA may offer those rooms as ARO Rooms to customers. In return, the OA may offer a lending revenue or fee to the hotel for all or a portion of the rooms allocated. This lending fee may be given only for the rooms that the OA is able to utilize or for all the allocated rooms. The lending fee may be a lump sum amount, may depend upon the number of rooms allocated or may depend on one or more factors as desired. The agreement may include a provision where the OA may return the allocated rooms back to the hotel at a certain time and date. There may be one or more conditions associated with the return of unused ARO rooms and/or rooms from the Released Rooms, including, but not limited to, returning the same room, returning a higher value room and so on.

The ARO VOF may include different conditions imposed on the customer regarding the payments related to the ARO. For example, a customer may be asked to make payments only to the hotel even if he/she is receiving rooms and/or options from the OA. Similarly, the customer may be required only to pay to the OA even if he or she selected the rooms and/or received the options from the hotels. The condition may also be set to ask a customer to make one or more payments to the hotels for the rooms and/or options received from that hotel, and to make one or more payments to the OA for the rooms and/or options received from that OA. The condition may allow the customer to make partial payments to the hotel and the rest to the OA or vice versa, the basis of which distribution may depend upon various factors, including, but are not limited to, the factors of hotel's choosing, the arrangement between the OA and the hotel and so on. In another example, the customer may be required to pay to a third party or may be required to pay to any of the combination of the entities mentioned above.

Information Technology System for the ARO VOF in the Hotel Industry

As discussed earlier as well, a client-server architecture may be used to implement the ARO VOF. However, a hotel may use a computer hardware and software infrastructure of its choosing to implement an ARO VOF.

The ARO VOF may be best implemented using one or more computer-implemented methods to operate a computer-implemented service to offer AROs to the customers, that includes, but not limited to, recording the information pertaining to the offered and/or sold AROs in a database. It may also include operating a computer-implemented service (and/or system) or other service (and/or system) to define the Chosen Rooms, and recording said Chosen Rooms (or defined rooms) and all the rooms related to an ARO in a database.

For the stage one (i.e., to formulate the ARO VOF), an application server may be used along with a database (e.g., a relational database) that stores all the information relevant to the hotel and the customer. The database may include all the relevant information sufficient to identify rooms the hotel chooses to make eligible for ARO. One or more users (e.g., a business analyst or manager) may have full access to this server through Intranet or highly secured VPN environment to design an optimal value option framework. The database shall also store all the information pertaining to all the acts (in stage one) used by a hotel while formulating the ARO VOF.

A similar or a different application server and/or a cluster of application servers (functioning concurrently) along with one or more web servers and a set of one or more database servers may be used for the Buy ARO as explained in FIG. 13D above and CN (Customer Notification) processes in the stage two of the ARO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Buy ARO process and the CN process may be computer-implemented as explained and discussed above in FIGS. 13D and 13E. All the customer interactions and the related information such as customer needs, inputs, payment transactions etc. are stored in this database, including information pertaining to the interactions with those customers who may not purchase and/or receive ARO. The systems for stage two and stage one may be maintained in a synchronized environment so that each system has access to the most current information and can communicate with each other.

As discussed above, there may be other ways for implementing the ARO VOF which may depend upon including, but not limited to, the scale of the implementation, business requirements and number of entities involved. The entities may interact through a series of hardware products and services with the OA/hotel server(s). The OA may or may not be different than the hotel and the OA server may be the same as that of the hotel server. The information technology and network system to implement ARO VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, the hotel may have one or more separate temporary database structure wherein the entries are updated and stored until the final update is made in one or more main databases. One the final update is done, the entries in these temporary databases may be removed.

The entire system may run at the premises of OA, hotel and/or any third entity or any combination thereof. It may also be possible to run a part of the system at one place and rest at one or more other places. The system may also be implemented even if one or more servers may be kept off-shore locations and may be accessed remotely. The geographical locations of one or more hardware product and/or services may be different depending upon including, but not limited to, the factors of hotel's choice, ease of accessibility, infrastructure facilities. The structure or the interaction architecture of the system may vary depending on factors including, but not limited to, the set up of the hotel, changes in the technology and with the introduction of new and better technology enhancing the interaction process.

A customer may interact with the Buy ARO and/or the CN process either directly or indirectly using a local or a remote terminal (e.g., a computer with a browser and an access to the Internet) that is able to access the web server(s) that host the Buy ARO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one may be hosted and run by a hotel, an OA, a third party service provider or any combination of the above. Similarly, the system for the stage two may be hosted by a hotel, an OA, a third party service provider or any combination of the above. In the model, where the OA receives room allocation from the hotel and offers ARO to the customers directly, the web server, application server and database for both stage one and stage two shall be managed by the OA. The OA may also have partial (or complete) access to the hotel database and systems through a highly secured environment (for example, a virtual private network). In the model, when an OA and a hotel tie-up together to provide ARO, all the computer hardware and software infrastructure for both stage one and stage two may be hosted by and/or property of either or both (mutually) of the sides depending upon the business agreement between them.

Alternate Flight Option (AFO) Value Option Framework in the Airline Industry

As explained above, an APO VOF can be implemented in any industry. The implementation of APO in the airline industry is discussed herein. Within the airline industry, the customer need for travel flexibility (defined below) is used as the targeted value element. With respect to the selected value element (i.e., customer need for travel flexibility) in the airline industry, the APO VOF may be appropriately termed Alternate Flight Option (AFO) VOF.

The first stage in the AFO VOF involves steps (or acts) of: capturing customer dynamics, assessing airline operations and economic factors, integrating customer dynamics with airline economic factors, formulating the VOF and optimizing the VOF. The second stage involves carrying out a dynamic interaction with the customer and then executing an Event Optimizer process. The specific detailed steps with respect to the AFO VOF will now be discussed.

Figure 76:
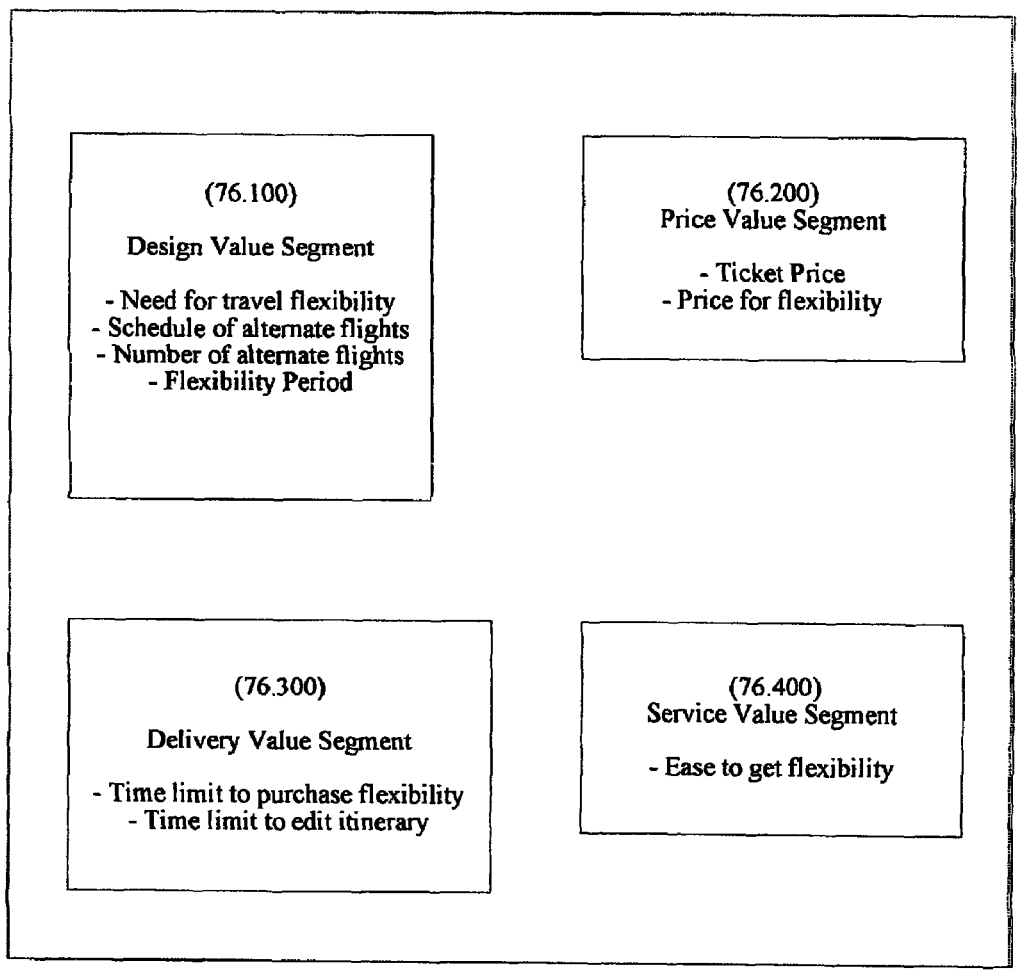
FIG. 76 is a diagrammatic illustration of an exemplary set of value segments and their value elements in the context of AFO-VOF in the airline industry.

First Stage: Formulation of AFO Value Option Framework in the Airline Industry (1) Capturing Customer Dynamics FIG. 76 shows an analysis of the value elements that are believed to matter to customers in relation to an AFO in the airline industry. In the design value segment, shown in Box 76.100, important value elements may include, but are not limited to, need for travel flexibility, time and schedule of alternate flights, flexibility period and number of alternate flights allowed on a given ticket. In the price value segment, shown in Box 76.200, important value elements may include, but are not limited to, Ticket Price and cost to receive a desired level of flexibility. In the delivery value segment, shown in Box 76.300, important value elements may include, but are not limited to, how close to scheduled departure the customer may edit his/her Itinerary easily and favorably, and how long before departure the ticket must be purchased to obtain flexibility. In the service value segment, the important value elements may include, but are not limited to, the ease of getting desired flexibility as shown in Box 76.400. It may be important to estimate the relative preferences and utilities of these value elements to different types of customers.

The customer need for travel flexibility is subjective in terms of the length of the "flexibility period" and the "travel plan variation". The term "flexibility period" refers to the time period during which a customer wants to keep his plans flexible. Some customers may desire a flexibility period that extends up to a few hours before the earliest intended departure, whereas, some others may only want it up to a few days or weeks before the desired travel date. The term "travel plan variation" refers to the extent to which a customer expects the travel plan to change. It may be expressed in terms of potential time periods for departure, arrival and stay, range of depart and/or arrival cities, flight services/amenities needed during travel and so forth. Customers are concerned of change/cancellation fees, unavailability of desired flights, the efforts required and the hassles involved in making Itinerary changes. Full fare tickets do allow changes at no cost to the customer, but only a few customers can afford to buy them or are willing to pay for them. Also, full fares do not guarantee an alternate flight and a customer may still be constrained by unavailability of a desired other flight. Many customers would be willing to pay for flexibility. However, the price a customer can pay or is willing to pay is subjective and may differ from customer to customer; or even for the same customer, may differ from one trip (or circumstance) to another.

(2) Assessment of Airline Economics

An assessment of the crucial economic factors of an airline, as indicated in Box 77.100, may reveal the factors to include, but not be limited to, high fixed costs, reduced load factors, the low capacity utilization (load factors) across a number of airline flights, the perishable nature of airline seats, the expected value of seats in different flights, the broad spectrum of time period over which the seats in a flight are sold, increased competition from low cost carriers, the need to develop competitive advantages against low cost carriers, customer attrition rate, and commoditization of the airline industry.

An assessment of the crucial economic factors of an airline may be performed, to determine the factors that affect the profitability, growth and goals of the airline. It might be beneficial if an airline utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information).

(3) Integration of Customer Dynamics with the Airline Economic Factors

Figure 77:
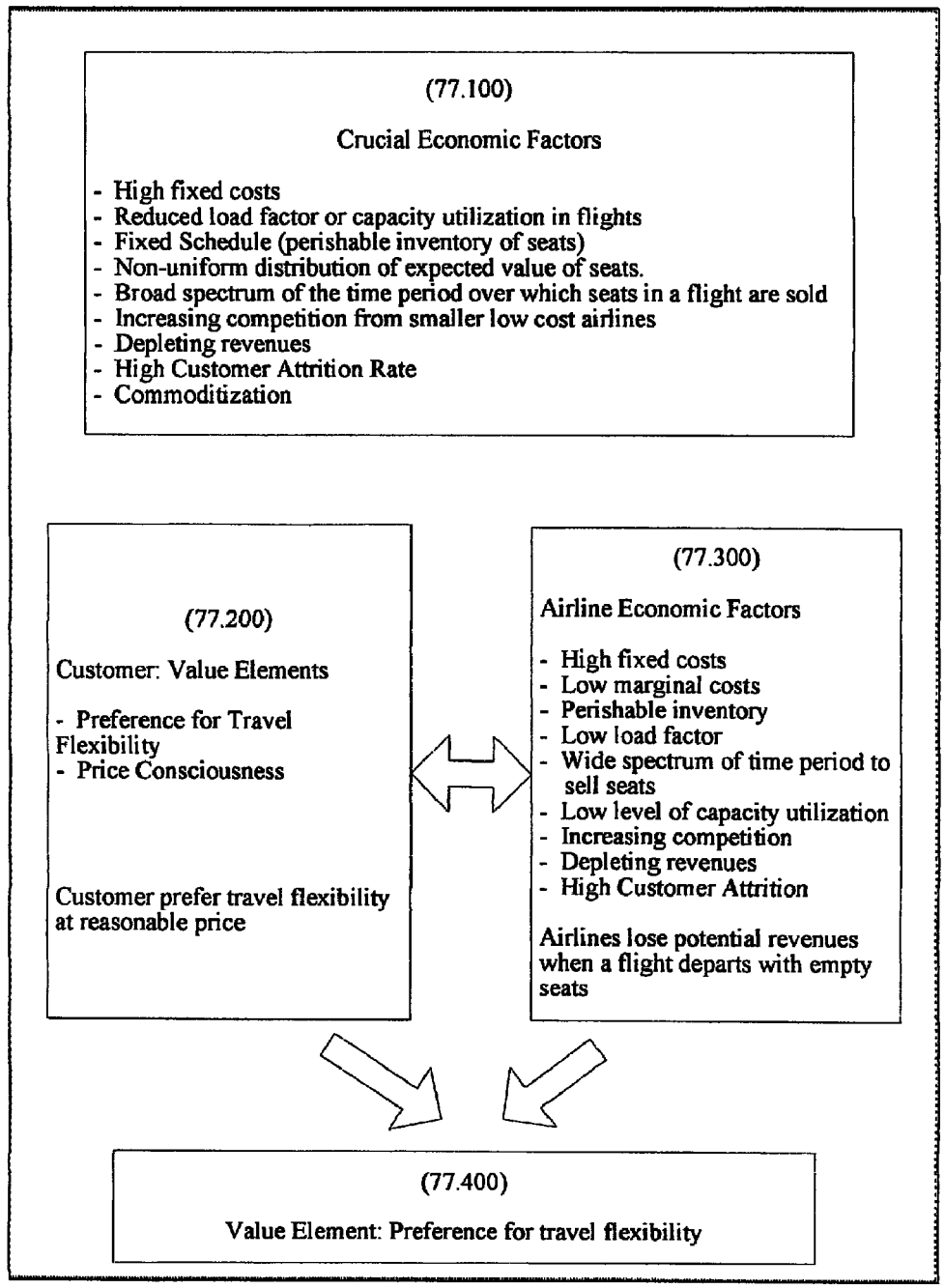
FIG. 77 is a diagrammatic illustration of airline economic factors and mapping between customer dynamics and airline economic factors.

FIG. 77 also illustrates an example of how a mapping can be done, between customer and airline profiles, for the AFO VOF in the airline industry. On one hand, there is a preference for travel flexibility among customers. On the other hand, if a flight takes off with one or more empty seats, that condition probably represents the loss of potential revenue for that airline. This is true even though no other potential customers have been turned away, simply because there may be one or more customers on other flights (of the same or different airline) willing to shift/switch to take those unfilled seats in the flight (in question) at appropriate price/terms. But, today they are not able to do so for one or more reasons mentioned above. An opportunity thus exists to concurrently generate an incremental revenue benefit for the airline from consumer surplus, and to maximize the purchase utilities for the customers. The AFO framework is created based on a value element "Preference for travel flexibility". More specifically, as shown in the interaction between the Box 77.200 and Box 77.300, a mapping is performed between important customer value elements and airline economic factors. The value element "Preference for travel flexibility" is extracted, as shown in Box 77.400 and an AFO Value option framework is created.

(4) Formulating the "AFO" Value Option Framework in the Airline Industry

Structure of AFO Value Option Framework in the Airline Industry

Figure 78:
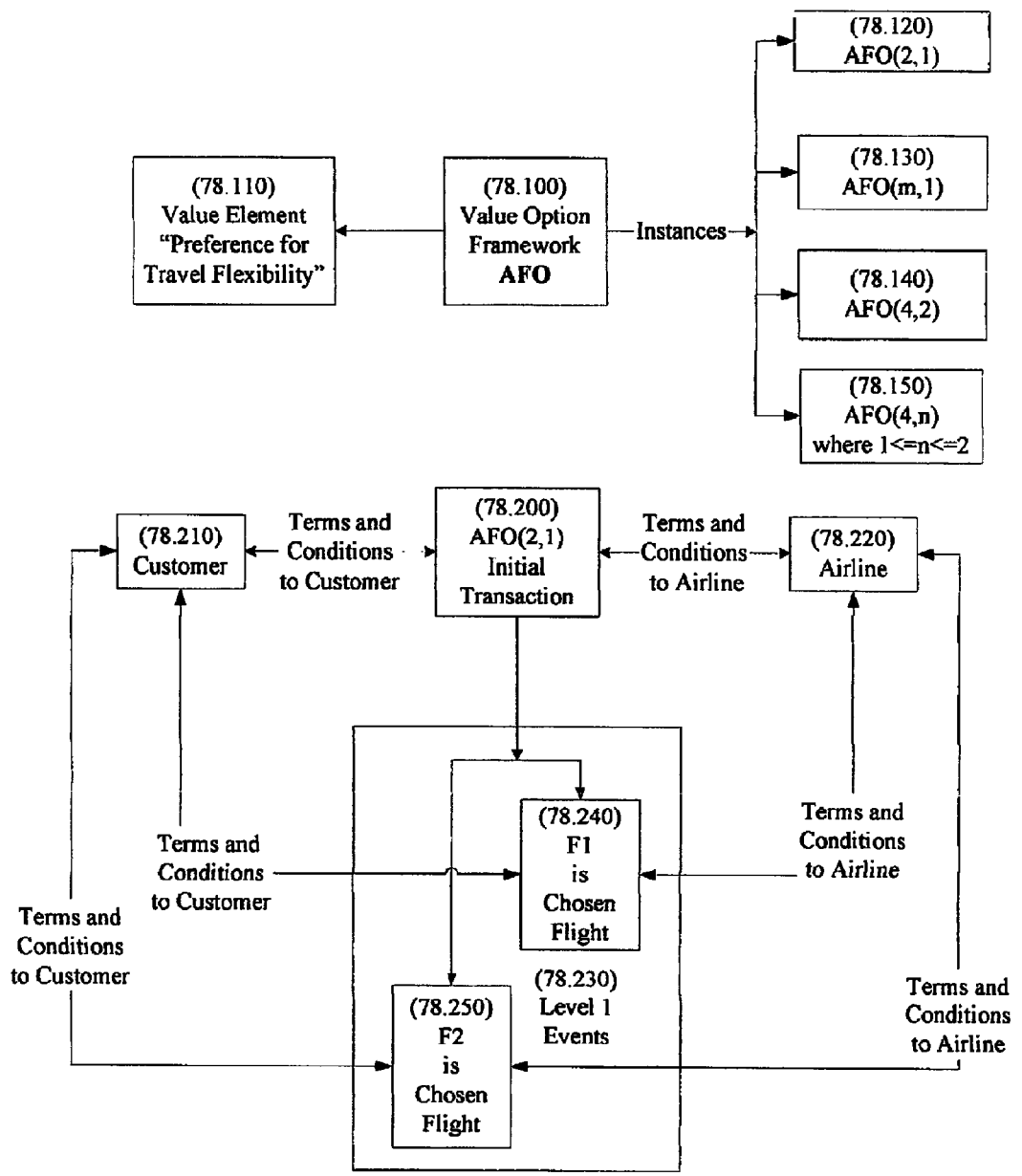
FIG. 78 is a partially-diagrammatic, partially-flow diagram representing the structure for creating an AFO Value Option Framework.

FIG. 78 displays the structure of an AFO value option framework (shown in Box 78.100) in the airline industry. The AFO value option framework is related to the value element "Preference for travel flexibility", as shown in Box 78.110.

The first event in the AFO VOF is referred to as "Initial Transaction", shown by Box 78.200, in which the customer (shown by Box 78.210) and the airline (shown by Box 78.220) transact on an AFO value option. There may be one or more Events (shown by Box 78.230) that follow the Initial Transaction.

In a successful Initial Transaction for an AFO, the customer receives an option to choose up to 'n' out of 'm' selected flights (said 'm' flights termed "AFO Flights."). The 'n' flights that are finally selected are termed "Chosen Flights". After each of the 'n' Chosen Flights is defined (or selected or chosen), the customer has the right to utilize (or can utilize) said Chosen Flight. Apart from the 'n' Chosen Flights, the remaining 'm-n' flights are termed "Released Flights". The Released Flights (if any, that were probably held or blocked for said customer) may be sold to other customers as normal flights or AFO Flights or used for other purposes. The Released Flights in relation to said option may be reused by the airline before, after, at or any combination thereof, the time the Released Flights and/or Chosen Flights are defined (or selected).

Numerically, the value of 'm' is greater than or equal to 1 and the value of 'n' may vary from '0' to 'm' depending upon the specific implementation of the AFO framework. The value of 'm' and/or may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'n' Flights may be defined in one or more transactions. The value of 'm' and/or 'n' may be defined and/or re-defined, at one or more times, by the airline, the customer, another entity or any combination thereof. For example, the value of n may not be defined at the time of Initial Transaction. In case the value of m is redefined after being defined at least once before, the new value of 'm' may be greater than or less than the older value of cm'. Similarly, if the value of 'n' is redefined after being defined at least once before, the new value of 'n' may also be greater than or less than the older value of 'n'. In some of the cases, the value of new 'n' may be even greater than the older value of 'm'. The 'n' Chosen Flights may include one or more flights other than said 'm' flights.

The airline may award two or more confirmed flights to a customer, where in said customer is allowed to fly on fewer and/or lesser than the awarded flights. The term confirmed here may imply that the airline has booked/reserved the seat in the name of said customer and he/she may be allowed to fly on that flight subject to terms and conditions of the option contract. Booking here may include, but not be limited to, blocking of the seat on that flight, holding of the seat on that flight, reserving the seat on that flight, formal acknowledgement of receipt, or anything else signifying similar meaning or interpretation. The term confirmation may allow the customer to fly on said confirmed flight subject to the fulfillment of the terms and conditions, if any, in the option contract.

The time when an Initial Transaction is completed (i.e., the customer receives the AFO option on said m Products) is referred to as the Initial Transaction Time (or ITT, in short). One or more of said m Flights may be selected, at one or more times, before, after, during, or any combination thereof, the Initial Transaction and/or the time said option is delivered to the customer (or the customer receives said option) or any combination thereof. All the AFO Flights may be selected concurrently (i.e., all together in one transaction) or sequentially (i.e., in multiple transactions).

The delivery of an option may include, but is not limited to, electronic delivery of the option, physical delivery of the option, any other mode of delivery or any combination thereof. Once said option is delivered, one or more of m flights may be available for use by the airline, an entity other than the airline and/or any combination thereof. The value of 'n' may be defined before, after or any time, the option being delivered to the customer. The delivery of option may occur in relation to the customer purchasing ticket for at least one flight. The delivery of option may also occur in relation to the customer purchasing a ticket for the flight other than the flight on which the option may be delivered. The customer may purchase a ticket for a flight other than the flight on which the option is delivered to the customer.

The Initial Transaction may comprise one or more acts. The customer may select (or purchase) all APO Flights concurrently (i.e., all together in one transaction) or sequentially (i.e., in multiple transactions). In the sequential case, a customer may select one or more flights in one or more transactions just before or much before (a few days/weeks/months) the Initial Transaction for AFO begins. Said selected flight(s) (let's say X number of them), thus, may be considered as part of said m AFO Flights of the AFO (m, n) transaction, and the customer may select only the remaining (m-X) number of AFO Flights during the Initial Transaction. All the transactions used to select all the AFO Flights of an AFO (m, n) instance are related to each other, and hence, are considered as related transactions (as defined earlier).

In an AFO VOF, the sequential process may comprise a number of related transactions when all the AFO Flights are purchased one after another by paying a price in each (or some) transaction(s) or act(s). The transactions may be related due to a relationship during the Initial Transaction, one or more of the previously executed transactions, any other transaction or any combination thereof. In the related transactions, 'n' may be equal to 'm' when there may be at least one payment transaction between the airline and the customer related to the flights wherein such payment is made after the option has been granted. Said payment transaction may be one more transaction apart from the initial interaction and/or Initial Transaction in the event said customer utilizes all the 'm' flights. The customer may select flights prior to utilizing the penultimate flight. The airline, an entity other than said airline and/or any combination thereof may reserve the right to limit the customer to 'n' flights on before, on or before, after, on or after or any combination thereof, a stated notification deadline date.

The time when an Initial Transaction is completed (i.e., the customer receives the AFO option) is referred to as the Initial Transaction Time (or ITT, in short). One or more of said m flights may be selected, at one or more times, before, after, during, or any combination thereof, the Initial Transaction and/or the time said option is delivered to the customer (or the customer receives said option).

An airline may choose to create one or more instances of an AFO VOF based on factors including, but not limited to, number of AFO Flights, Chosen Flights or Released Flights, pre-determination of a number of Chosen Flights or Released Flights, flight schedule, other factors or any combination of the above. For example, an AFO formulation based on a combination of the number of AFO Flights (or m) and Chosen Flights (or n) would be AFO (m, n). Some AFO instances are shown in Boxes 78.120, 78.130, 78.140 and 78.150. In case the number of Chosen Flights is pre-determined, the AFO (4, 2) instance may imply that the customer selects 4 AFO Flights, on the condition that the customer may choose any two out of those four flights. When the number of Chosen Flights is not pre-determined, the AFO (4, 2) instance may imply that the customer selects four AFO Flights, on the condition that the customer may choose zero, one or 2 flights as Chosen Flights. There may also be a minimum limit on n. For example, the AFO (4, n) (where 1<=n<=2) instance limits the customer to choose a minimum of 1 and maximum of 2 Chosen Flights out of the 4 selected AFO Flights.

The AFO (2, 1) instance, two AFO Flights and one Chosen Flight, is used here as an example to demonstrate the details of the structure of an AFO VOF. Box 78.200 refers to the Initial Transaction between the customer and the airline, in which they transact on an AFO (2, 1) value option. In a successful Initial Transaction for the AFO (2, 1), the customer selects two AFO Flights and can choose to utilize any 'one' of those two flights. The flight selected is the Chosen Flight and the one not selected is the Released Flight.

The Initial Transaction may have terms and conditions applicable to the customer or the airline or both. These terms and conditions may be set, preferably, to concurrently benefit both parties. The connections between Box 78.200 and 78.220, and Box 78.200 and 78.210 refer to the terms and conditions to the airline and the customer, respectively.

The AFO VOF may or may not include any constraints related to schedule or any other parameter of AFO Flights. For example, an airline may want to restrict AFO applicability and availability on flights that satisfy specific criteria.

In the context of the airline industry, the parameters/characteristics of a flight may include, but are not limited to, airline related parameters, departure/arrival parameters, services and other miscellaneous parameters. The airline related parameters may include, but are not limited to, operating carrier entity (i.e, the airline that operates the flight), marketing carrier (an airline that sells the flight), any other carrier or intra/inter-carrier flight groups associated with the flight or any combination of the above. The departure/arrival parameters may include, but are not limited to, an airport and its location (city, state, country), date and time, seasonality, weather and other operational conditions, number of stops/connections, and so forth. The service and other miscellaneous parameters may include, but are not limited to, type of aircraft, flight duration, in-flight or other services such as number of cabins, types of seats, meal selection, check-in and luggage options, airport lounges and other facilities, and so forth.

The two APO Flights may or may not include practically constrained flights. Practical constraints may include one or more constraints that will prevent a customer to utilize one or more given flights. Such practical constraints may include, but are not limited to, schedule conflicts, time constraints, location constraints and so forth. The time constraints may include, but not are limited to, constraints from departure and/or arrival times of the two AFO Flights. The location constraints may include, but are not limited to, due to the distance between the location of the departure and/or arrival airports of the two AFO Flights. In other words, it may or may not be practically possible for one customer to utilize one or more of the selected flights due to at least one practical constraint. For example, one flight may be scheduled to be airborne when the other flight is scheduled to depart, thus not allowing any customer on the former flight to take the latter flight, or the distance between the departure airports of the two flights may prevent customers from flying on both flights (that depart within hours of each other). For example, a customer may receive an AFO to utilize each of the m selected flights that include at least one practically constrained flight, where it will not be possible for the customer to utilize all the m selected flights.

The two selected flights may or may not have the same origin and/or destination airports (or location). A customer may receive an AFO to utilize each of the m selected flights that include at least one practically constrained flight, where it may not be possible for the customer utilize all the m selected flights. For example, the two selected flights may or may not be in the same city.

The AFO VOF may or may not include any constraints on the AFO Flights based on their Ticket Prices. For example, the airline may offer only those flights as AFO Flights whose Ticket Prices at or before the ITT are less than a specified value, or may add a constraint on the maximum difference between the highest and the lowest Ticket Prices across a set of AFO Flights offered within a specific AFO.

The AFO Flights may be selected by the airline, the customer, another entity or any combination thereof. The AFO VOF may enable a customer to have flexibility by selecting m Flights and use said travel flexibility to satisfy his/her needs. Therefore, the customers would usually have the right to select (or define) the Chosen Flights. However, in different implementations of AFO VOF, the airline, the customer, another entity or any combination thereof may select one or more of the Chosen Flights related to an AFO. The AFO Flights and the Chosen Flights may be selected by the same entity, different entities or any combination thereof. The airline may incorporate the customer information and the data related to the AFO into the sales, production, inventory, other database or information system or any combination of the above.

A customer may select AFO Flights in several ways; through mutual agreement (i.e., during a direct interaction such as a flight reservation), or the airline may grant the AFO Flights to the customer without soliciting their interest or permission. For example, to enhance customer satisfaction or for any other purpose, an airline may grant AFO Flights to customers based on the past customer behavior, interaction and so on.

The Initial Transaction may impose one or more conditions on the customer. A customer may be required to explicitly notify the airline prior to or no later than a given date and time (referred to as the Notify Deadline) regarding the Chosen Flight. If there is no such explicit notification condition, the act of the customer boarding (or checking-in for) either of the two flights may serve as an implicit notification to the airline or the AFO Flights may be decided as per the terms and conditions of the option contract. In either case (explicit or implicit notification) the date and time when the Chosen Flight is selected is referred to as the Customer Notification Time (or the CNT, in short). In the current discussion, the explicit notification condition is assumed unless specifically mentioned otherwise.

An airline may determine one or more Notify Deadlines for a flight at one or more times (e.g., before, during, after the Initial Transaction or any combination thereof) using factors including, but not limited to, customer needs, expected seat value, airline profitability goals, any other factors or a any combination of the above. Customer factors may also be considered in determining the Notify Deadlines, such as the flexibility periods desired by customers, picking easy times (like 6:00 pm instead of 6:32 pm) to help the customer remember the deadline(s) or any other factor that may affect the behavior of a customer. The AFO VOF may or may not include any constraints on the AFO Flights.

The AFO VOF may impose additional terms and conditions on the customer. The airline and/or an entity other than the airline may receive from customer, at one or more times, an indication of one or more terms and conditions associated with said option in the AFO VOF. Similarly, at least one of said airline and/or an entity other than said airline may deliver to said customer, at one or more times, one or more terms and conditions associated with said option in the AFO VOF. A customer may or may not have to pay any price for receiving AFO Flights (i.e., there may or may not be any payment transaction related to the Initial Transaction and/or other event related to the AFO). There may be one or more prices related to the AFO. A customer may be required to pay a price or fee related to AFO at one or more times. A price may include, but is not limited to, a set of one or more Ticket Prices, a set of one or more AFO Prices or any combination of the above. An airline may use the method of its choosing to decide on all the Flight Prices for AFO.

The customer may be required to pay one or more prices during the Initial Transaction (which payment is referred to as an Initial Price), at the CNT (which payment is referred to as an Exercise Price) and/or at the time of checking-in or at any other time, which may or may not be pre-determined between the customer and the airline. The price may be a function of number of AFO Flights and/or Chosen Flights, specific flights selected for AFO Flights and/or Chosen Flights, Notify Deadline, one or more Ticket Prices and/or expected value of the AFO Flights, any other factors of airline's choosing or any combination of the above.

The price may include, but is not limited to, a monetary value or a soft/non-monetary value (e.g., discount vouchers, travel coupons or exchange of another service, other benefits such as frequent flyer miles, other forms or any combination of the above) or other consideration. The AFO Price may be fixed or variable, with or without bounds. The airline may set permissible range(s) or boundary limit(s) within which the AFO Price can vary, or it may offer the customer a set of prices to choose from. Since price conditions may depend upon various factors, which may or may not be variable, the same may be decided at anytime. The price conditions may be determined by the customer, the airline, a third entity, or any combination thereof at one or more times. One or more prices (Initial or Exercise or any other price) may be a negative value, which reflects that instead of the customer paying the airline, the airline shall pay a price to the customer.

Different price strategies may be implemented in the AFO (2, 1) instance. For example, a single Initial Price could make it attractive and easy for the customer to feel free to choose any flight as the Chosen Flight without worrying about any additional costs later. One or more of the AFO prices may be embedded with the Ticket Price by using a special fare class or enhancing features on a currently existing fare class. A customer may be presumed to accept the AFO offer while displaying the Ticket Price (that has the AFO Price embedded in it). These presumptions may or may not include soliciting prior interest of the customer regarding the AFO offer. In case, the AFO price is merged with the Ticket Price, and where such price may or may not be separately identifiable, the customer may or may not be required to pay a separate price for AFO.

The Notify Deadline may be pre-determined or may be determined later (i.e., after AFO grant) by the airline, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be charged if the customer notifies the airline of the Chosen Flight anytime before the first Notify Deadline. The price associated to the second Notify Deadline (i.e., the second earliest among the Notify Deadlines) may be charged if the customer notifies the airline of the Chosen Flight after the first Notify Deadline and before the second Notify Deadline. Similarly, different prices may be associated with other Notify Deadlines.

The terms and conditions of the AFO VOF may not allow the customer to notify the airline after the last Notify Deadline (i.e., the latest among the Notify Deadlines). This is done to facilitate the selection of the Chosen Flight before the last Notify Deadline. As an operational measure, a condition may be imposed that if the customer fails, unintentionally or intentionally, to notify the airline or an entity other than the airline before the last Notify Deadline, then the airline may treat either of the two flights as the Chosen Flight. Another approach may be (e.g., for airline/customer) to designate one of the two flights as a Default Flight (during or after the AFO purchase) that will be selected as the Chosen Flight if the customer fails to notify the airline of the Chosen Flight before the last Notify Deadline. Any entity (e.g., the airline or the customer) may (or may not) be allowed to change the Default Flight once it is selected. The Exercise Price (if any) in the Default case may or may not be equal to the Exercise Price for the Default Flight for the last Notify Deadline. In the current discussion, a single Notify Deadline is considered.

The exercise price may be a function of the Notify Deadline, Chosen Flight, any other factor or any combination thereof. In such situations, a customer may have to pay a unique price to select a particular flight as the Chosen Flight at a given time.

The AFO VOF may also include conditions imposed on or assumed by the airline. For example, the airline may be under a mandatory condition to hold a confirmed booking for the customer on both flights until the CNT passes to allow the customer to select either of the two flights as the Chosen Flight.

An airline may determine customer preferences, either explicitly or implicitly, regarding utilization of up to n of m selected Flights. The preferences may include, but not limited to, customer preferences for various flights and services, needs, associated relative utilities, flexibilities, preferences regarding choice of Flights, quality of Flights, acceptable delays (relative) to receive different Flights and so forth. The airline, one or more entities other than the airline or any combination thereof may seek customer preferences.

An airline may also offer AFO options to one or more customers on the basis of customer preferences, so obtained or collected. The airline may offer said AFO options based on the dynamics of the airline including, but not limited to, inventory, operational data, revenue management data, cost data, financial data, accounting data, any other internal data, any combination thereof and so on.

An airline may seek such preferences from the customers prior, during or after the customer has purchased the Flight or any combination thereof. These customer preferences may help the airline to perform concurrent optimization of value for the airline, the customers, one or more entities other than the airline or any combination of two or more of the above. The customers may also include the customers whose preferences have not been determined or collected to perform concurrent optimization. The data pertaining to the airline, customers, one or more entities other than the airline, any combination thereof, may be integrated to concurrently optimize the value for at least any two of said entities. There may or may not be any payment transaction between the airline, one or more other entities and/or the customers regarding seeking such customer preferences, delivering AFO options, customer participation in AFO and so on.

An airline may operate one or more systems and/or services to monitor the airline dynamics. Monitoring may include, but is not limited to, monitoring of capacity, days to utilization, return and/or potential return of Flights, flexible inventory that may be created in relation to said obtained preferences, analyzing various cost, revenue, operational or any other internal data and so on. The airline may have one or more systems and/or services to analyze such data on a real-time or quasi real-time basis and draw conclusions on the basis of such analysis. Any of the systems and/or services may be operated by the airline, one or more entities other than the airline or any combination thereof.

An airline may operate a system that defines customer preferences regarding at least utilizing up to n of m selected flights, and n is less than m, operate a system that enables use of said preferences to optimize value for at least one of customers, said airline and an entity other than said airline. An airline may concurrently optimize value for at least two of customers, said airline and at least one entity other than said airline.

An airline may offer AFO to all customers or any selected customers, such selection may be based on any criterion including, but not limited to, such as those who have expressed their relative preferences, those who have not expressed any preferences. By integrating the airline dynamics and collected customer preferences, an airline may offer appropriate incentives and terms and conditions for AFO to generate desired participation.

Once the Initial Transaction is successful, there may be at least two possible related events, as shown by Box 78.230. The two events are (1) that F1 is the Chosen Flight (as shown by Box 78.240) and (2) that F2 is the Chosen Flight (as shown by Box 78.250). Each of these two events may be associated with various terms and conditions on the customer and/or the airline. As explained above, the events may take place in two ways: either the customer selects the Chosen Flight according to his/her utility, or the airline selects the Chosen Flight based on pre-determined rules (e.g., if the customer fails to notify the airline before the Notify Deadline). In both situations, once the chosen Flight is selected, the airline is free to reuse the seat in the Released Flight for potential revenue. Said seat may be re-used or resold by adding them back to the airline's inventory. The airline may sell these released seats as normal seats, may again offer them as AFO Flights or may choose to do both or may use for any other purpose.

The airline may offer incentives to the customers to motivate them to choose one or more flights as Chosen Flights among the AFO Flights that may be more optimal for the airline. An airline may formulate one or more such offer (may referred to as Chosen Flight Incentive Offers) and may send them to customers who have purchased AFO but not yet selected their Chosen Flight is email, phone, mail or any other communication channel. Thus, such customers may be persuaded to select said optimal flight in lieu of incentives.

The customer may have to pay an additional exercise price at the CNT depending on the terms and conditions of the option contract. Once the Chosen Flight is selected, the airline and/or the customer may not change the Chosen Flight except within the bounds of the terms and conditions in the option contract. The airline or customer may have the right to enforce the Chosen Flight on the other party as per the terms and conditions of the option contract.

The seat in the Released Flight may be blocked for the period between the ITT and the CNT. This period is termed the "Blocking Period". If there is more than one Notify Deadline, the exact length of the Blocking Period is unknown, but the minimum and maximum lengths are known to be between the ITT and the first Notify Deadline and between the ITT and the last Notify Deadline, respectively.

The airline may generate revenue from the seat in the Released Flight without utilizing seat in the Released Flight. The Ticket Price of the seat in the Released Flight may be varied in such a way that may increase the demand of one or more other flights offered by the same airline, any other entity apart from said airline, or any combination thereof. The variation in the Ticket Price of the seat in the Released Flight may cause a spilled demand for this flight but may create a surge in demand of one or more other flights in the same or different flight segments of the same airline, any other airline apart from said airline or any combination thereof.

The above terms and conditions of the AFO VOF may be set in a way to concurrently benefit at least two of the customer, the airline, any other entity or any combination thereof. The customer receives additional utility from the flexibility to choose a desired flight from among alternatives. The airline benefits from enhanced customer satisfaction (loyalty and repeat business), incremental revenue from the AFO Price and selling (reusing) the Released Flights, generating revenues from Released Flights without actually reusing the Released Flights and other operational benefits.

An AFO VOF may include a right for the customer to utilize each of the m selected AFO Flights, along with a right for the airline to the flights (to fewer than m) which the customer can utilize if the airline notifies the customer on a stated Notify Deadline. Said on a stated Notify Deadline may include, but not limited to, on and/or before the stated Notify Deadline, on and/or after the stated Notify Deadline, any combination thereof. The right may include the condition that the airline may notify the customer prior to or at the, prior to the, at or after the or after the stated Notify Deadline (which may be determined by the airline and/or the customer during or after the Initial Transaction). To provide flexibility to the customers, the airline may offer (or allow) the customer to express their preferences regarding the Chosen Flight(s) before the stated Notify Deadline. If the customer fails to do so, the airline may or may not exercise their right to limit the customer to utilize fewer than (for example, at least one less) the earlier selected flights (i.e., m flights). The right may include the condition that the airline may limit the customer after the customer expresses his/her preference for the Chosen Flights. The airline and/or an entity other than the airline may have said limitation on at least one flight. There may be a condition imposed on the customer to make at least one payment to the airline when the customer expresses his or her preferences for the Chosen Flights. The airline and/or an entity other than the airline may allow the customers to define said 'n' flights on or before a stated date. The airline and/or an entity other than the airline may reserve the right to take back any 'm' minus 'n' flights after the stated date. The customer, the airline, an entity other than the airline and/or any combination thereof may determine the notification date.

An AFO VOF may include an option for the customer to utilize up to n of the m selected AFO Flights, where n<m, along with a condition that the customer may be able to utilize all the m selected flights if there is at least one payment transaction between the airline and customer in relation to said AFO grant, and that such payment is made after the AFO is granted to the customer. This may provide additional flexibility to the customer. The customer may be limited to take the decision regarding utilizing all the m flights before the departure of the penultimate flight. Said payment may be made in a separate transaction executed at any time after the Initial Transaction. The timing of said payment may be predetermined. The customer may be able to select all the m flights together in one transaction.

The costs, revenues, benefits, terms and conditions shown here are for illustration purposes only and actual values could be different depending upon specific values selected by the airline for value options, customer behavior, airline characteristics, Notify Deadline(s) and other relevant factors.

Example of AFO VOF (2, 1) Structure in the Airline Industry

FIGS. 79 and 80 demonstrate an illustrative practical example of using the AFO (2, 1) instance in the airline industry. Consider a customer who interacts with an airline to get an AFO. Per Act 78.200, an Initial Transaction takes place between the airline and the customer. FIG. 79 displays some of the details of the Initial Transaction. The customer selects two AFO Flights, F1 (shown in Box 79.100) and F2 (shown in Box 79.200), and can choose to utilize either of them but not both (i.e., select either of them as the Chosen Flight). The airline is under the condition to hold confirmed reservation for the customer on both F1 and F2 until the Chosen Flight is selected.

The customer pays an amount of $45 as the Initial AFO Price and $500 as the Ticket Price to the airline as part of the Initial Transaction. The Initial Transaction takes place on the $15^{th}$ $14^{th}$ day of April (i.e., the ITT, shown in the second row of the Box 79.300). There is an explicit notification condition and the customer has to pick and notify the airline regarding the Chosen Flight.

The following text presents different cases to illustrate different types of terms and conditions that may be associated with the purchased AFO. Three different scenarios are considered with different conditions (shown in FIG. 80). In all the scenarios, the Notify Deadline is expressed in terms of the number of days to departure (DTD) of F1, the earlier of the two flights.

The first scenario, as demonstrated in the Box 80.100, displays a condition of the explicit notification without any exercise price. The customer needs to notify the airline regarding the Chosen Flight before 3 DTD (as shown by the Notify Deadline). The AFO Price charged during the Initial Transaction serves as the total direct incremental revenue for the airline and as the direct cost to the customer. There is no exercise price if the customer defaults.

The second scenario, as demonstrated by Box 80.200, displays a condition of the explicit notification with an exercise price that is a function of the Chosen Flight. The Notify Deadline is 3 DTD. If F1 is the Chosen Flight, then customer has to pay $10 as the exercise price, as shown in the second column of the second row in the Box 80.200. If F2 is the Chosen Flight, then the customer has to pay $20 as the exercise price, as shown in the second column of the third row in the Box 80.200. The total AFO Price charged to the customer (i.e., the direct incremental revenue to airline) may turn out to be $55 or $65 depending on the Chosen Flight.

The third scenario, as demonstrated in the Box 80.300, displays a condition of the explicit notification with an exercise price that is a function of the Notify Deadline. There are four Notify Deadlines associated with the AFO. The exercise price increases from $0 (for the first Notify Deadline of 30 DTD) to $40 (for the last Notify Deadline of 1 DTD). If the CNT is before 30 DTD, then the customer pays nothing more to the airline as shown in the second column of the second row in the Box 80.300. If the CNT is after 30 DTD and before 7 DTD, then the customer pays $20 as the exercise price (shown in the third column of the second row in Box 80.300). Similarly, the customer pays an exercise price of $30, if the CNT is after 7 DTD and before 3 DTD, and an exercise price of $40, if the CNT is after 3 DTD and before 1 DTD (as shown by the next two cells in the Box 80.300). If the customer fails to notify before 1 DTD (the last Notify Deadline), then the Default Flight F1 (shown in Box 80.300) will be selected as the Chosen Flight at an exercise price of $40.

5) Optimization of AFO VOF in the Airline Industry

As mentioned earlier (shown in FIG. 7), in the form of an optional last step in the First stage, a financial analysis may be performed using the existing airline and customer data to determine the optimal terms and conditions of the AFO VOF. 'What-if' scenarios may be executed to determine an optimal pricing strategy. The airline may want to divide customers using one or more criteria and design separate AFO VOF for each customer segment.

Second Stage: Using the AFO Value Option Framework in the Airline Industry

After completing the first stage of the method, the airline has created an AFO VOF and specific options within that framework. The airline may have also segmented customers and designed options accordingly. The airline is fully prepared to use a structured format comprising one or more AFO value options to interact with its customers in real time to generate benefits for both the airline and its customers. The second stage of the AFO VOF is now presented.

Figure 81:
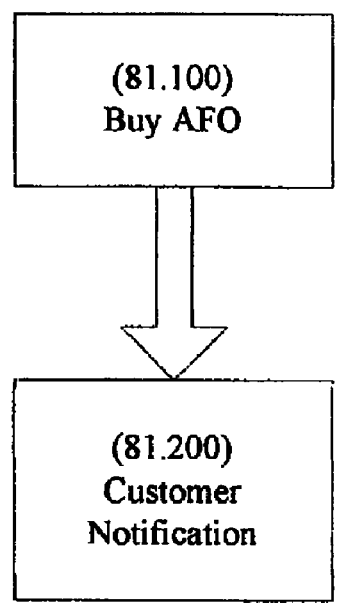
FIG. 81 is a diagrammatic illustration, in a high level flowchart, of a process for AFO VOF implementation.

The implementation of the AFO VOF between the airline and its customer takes place through two high level acts, as shown in FIG. 81. In Act 81.100, the 'Buy AFO' process, an interactive event between the customer and the airline's web server, runs to carry out the Initial Transaction of the AFO VOF. In this Act, a number of algorithms, may be executed (e.g., availability, AFO Price, Ticket Price and Notify Deadlines) on the airline's server to optimally calculate the terms and conditions of the AFO VOF to concurrently benefit at least two of the airline, the customer, any other entity and/or any combination thereof. In Act 81.200, the customer notification process (explained later) is executed. In this process, the customer selects the Chosen Flight. The process may also comprise one or more event optimizer algorithms that may help to optimally select the Chosen Flight and/or to optimally reuse the Released Flight.

Figure 89:
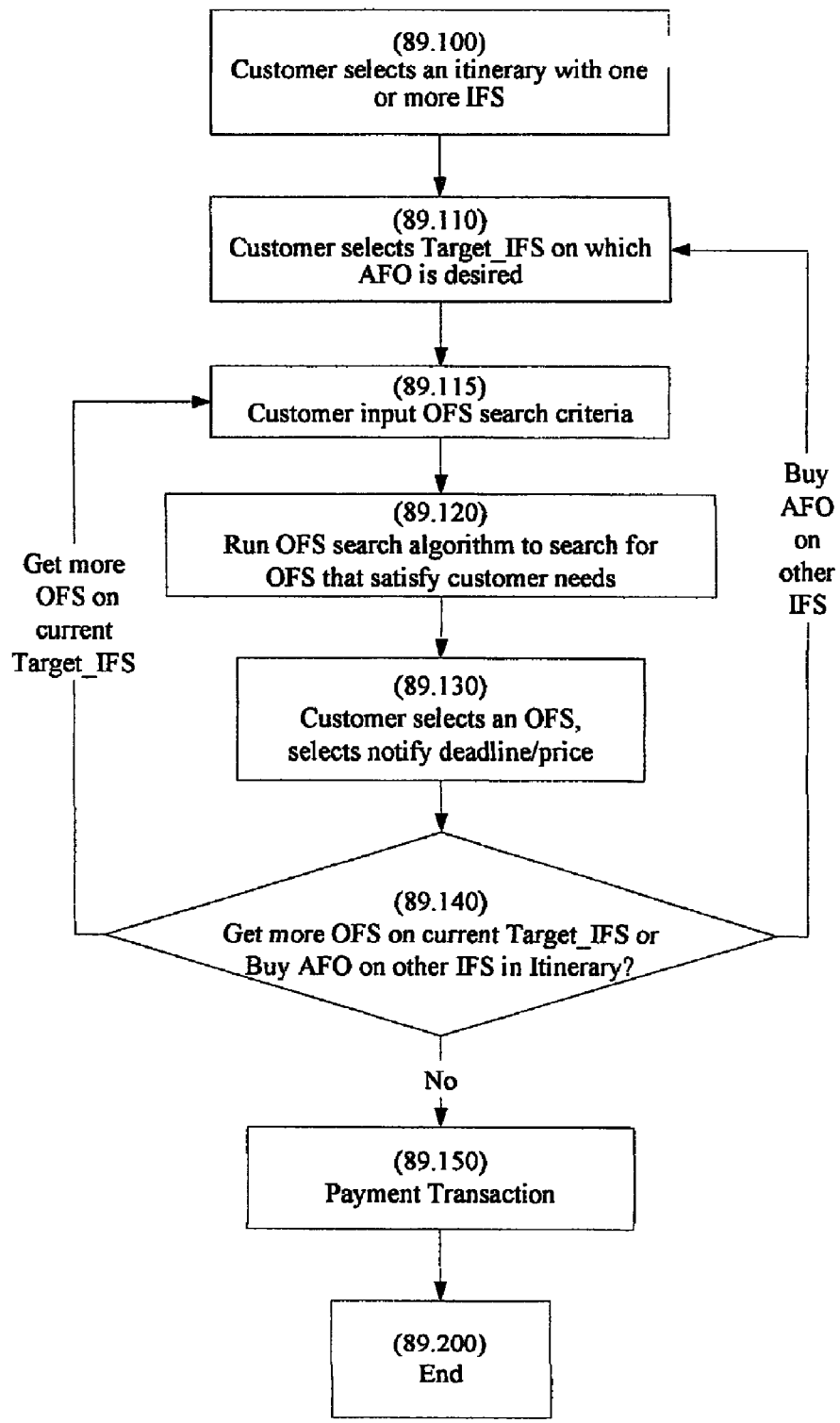
FIG. 89 is a flowchart that expands Act 100 of FIG. 81, illustrating a high level algorithm for the "Sequential Buy AFO" process.
Figure 91:
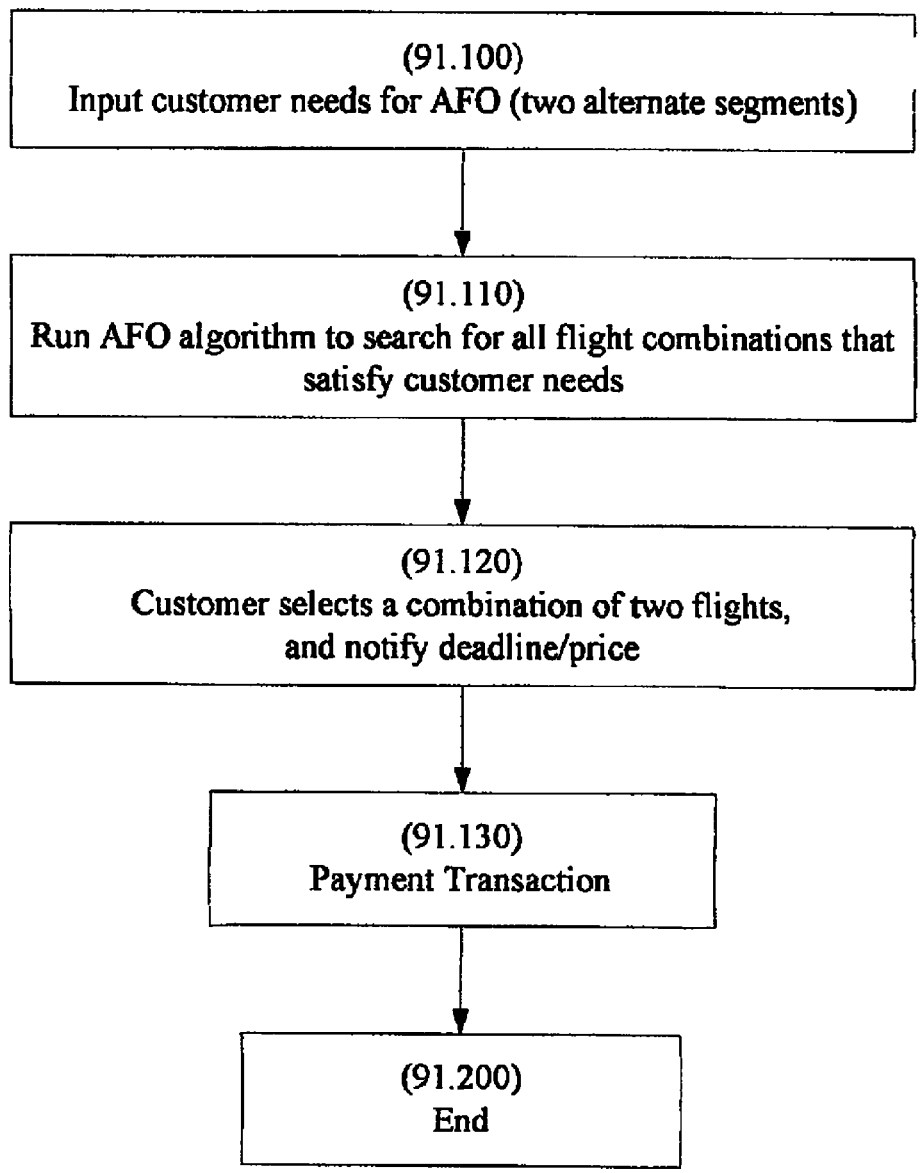
FIG. 91 is a flowchart of an algorithm for the "Concurrent Buy AFO" process, an alternative process to FIG. 89.

As explained above, the Buy AFO process may be implemented via the Sequential (shown in FIG. 89) or the Concurrent (shown in FIG. 91) process. There are many ways to do the Sequential process. As an example of the Sequential process, a customer may select (or purchase) seat(s) on a flight or an Itinerary with one or more Segments (each with one or more Legs) before the Initial Transaction begins. Said flight may also be referred to as the Initial Flight. Said Itinerary may be referred to as the Initial Itinerary. The Segments within the Initial Itinerary may be referred to as the Initial Segments or the Initial Flight Segments (or IFS, in short). The Legs within each IFS may be referred to as the Initial Legs or the Initial Flight Legs (or IFL, in short). A customer may purchase an AFO (i.e., purchase one or more AFO Flights) on said Initial Flight. Similarly, the customer may purchase an AFO (i.e., purchase one or more AFO Itineraries) on the Initial Itinerary. The customer may purchase an AFO on any Initial Flight Segment (or IFS), i.e., purchase one or more AFO Segments (also referred to as the Option Flight Segments or OFS, in short). The customer may purchase an AFO on any Initial Flight Leg (or IFL), i.e., purchase one or more AFO Legs (also referred to as Option Flight Leg or OFL, in short). The two events (one for the Initial Flight and the other for the Initial Transaction) may be executed with a minimal (one just after another) or a significant time gap (e.g., few minutes, hours, days and so forth) in between them.

The AFO VOF may be implemented at different levels including, but not limited to, Itinerary, Segment and Leg. Illustration of these three levels in the airline industry is given as an example as shown in FIGS. 82, 83 and 84 respectively.

When implementing an AFO (2, 1) at the Itinerary level, the customer selects two separate itineraries and has the option to choose either of them as the Chosen Itinerary (equivalent to Chosen Flight). FIG. 82 displays a practical example. A customer may select two itineraries as part of an AFO, shown in Boxes 82.100 and 82.200. In AFO Itinerary 1, the customer leaves on the $2^{nd}$ and returns on the $6^{th}$ of May as shown in Box 82.100. In AFO Itinerary 2, the customer leaves on the $4^{th}$ and returns on the $7^{th}$ of May as shown in Box 82.200. The customer may choose either of the two itineraries as the Chosen Itinerary.

When implementing an AFO (2, 1) at the Segment level, the customer selects two separate Flight Segments and has the option to choose either of them as the Chosen Flight Segment (or CFS, in short, equivalent to Chosen Flight). FIG. 83 displays a practical example. A customer purchases a round-trip Itinerary with two IFS as shown in Boxes 83.100 and 83.200. After purchasing the ticket, the customer buys an AFO on the Onward Journey (from BOS to LAX, i.e., the first Initial Flight Segment), as shown in Box 83.120. As per the IFS, the customer departs on the $2^{nd}$ of May (shown in Box 83.110), whereas in the associated OFS, the customer departs on the $3^{rd}$ of May (shown in Box 83.120). So, the customer may select either the IFS or the related OFS as the Chosen Flight Segment for the onward journey.

When implementing an AFO at the Leg level, the customer selects two separate Flight Legs and has the option to choose either of them as the Chosen Flight Leg (or CFL, in short, equivalent to Chosen Flight). FIG. 84 displays a practical example. Consider an Itinerary with two Segments, onward journey and return journey, as shown in Boxes 84.100 and 84.300, respectively. The customer purchases an AFO (i.e., gets one OFL) on the Leg2, shown in Box 84.200, in the onward journey. The IFL for Leg2 departs at 1:00 PM and the OFL for Leg2 departs at 6:00 PM on the $2^{nd}$ of May (shown in Box 84.210 and 84.220, respectively). Thus, the customer may select either the IFL or the associated OFL as the Chosen Flight Leg (or CFL, in short) for Leg2 in the onward journey.

An airline may choose to implement an AFO at any level(s). In a specific AFO interaction between a customer and the airline, the implementation level should be the same for all AFO Flights, Chosen Flights and Released flights. For example, if AFO is implemented at the Itinerary level, then all the AFO Flights would refer to AFO Itineraries; Chosen Flights would refer to Chosen Itineraries; and Released Flights would refer to Released Itineraries.

1. 'Buy AFO'—Dynamic Interaction to Capture Customer Demand in the Airline Industry In the Buy AFO process, a customer interacts with an airline's server to buy an AFO. The interaction may take place (for example) via phone, in-person or on a website. The Sequential Buy AFO Process is presented first along with its detailed algorithms, followed by a short summary of the Concurrent Buy AFO Process.

Sequential Buy AFO Process in the Airline Industry

There are several ways to implement the Sequential process. The following presents an example of the Sequential Buy AFO Process when an AFO is bought at the Segment level. It is also assumed here that the customer first purchases an Initial Itinerary with one or more IFS, and then opts to buy an AFO to select one or more OFS (Option Flight Segments) on the desired IFS.

As an instance of the Sequential Buy AFO process, a customer has purchased an Itinerary (with one or more flights) and then selects an AFO through the interactive interface of the web pages as shown in FIGS. 85, 86, 87 and 88. FIG. 85 displays the summary of the purchased Itinerary, which comprises two Segments: BOS to ATL (onward journey) and ATL to BOS (return journey). Clicking on the marketing banner representing "Buy AFO", the customer is linked to the web page shown in FIG. 86 and a Buy AFO interaction begins.

The series of web pages in FIGS. 86, 87 and 88 may (for example) be displayed in a customer's browser by an airline's web server, to facilitate the interaction between the customer and the airline when the customer comes to select (purchase) an AFO (during or after the Initial Itinerary is purchased and/or selected). The Initial Itinerary and two corresponding IFS are displayed in FIG. 86. The customer may choose to purchase an AFO on any IFS by entering the search criteria for OFS in the "Search AFO Section" (shown in FIG. 86) and then clicking on the "Search AFO Flights" button. After the click, the Buy AFO algorithm running "behind the scenes" on a server of the airline qualifies the availability, applicability and price conditions on all the OFSs (Option Flight Segments) available and displays them in the screen as shown in FIG. 87. For each of the OFSs, a set of one or more Notify Deadlines and the corresponding AFO Prices are shown in the form of "Select" buttons (shown in the "AFO Notify Deadline/AFO Price" section in FIG. 87). The customer may select any desired OFS (along with the Notify Deadline and AFO Price) by clicking on a "Select" button associated with any of the Notify Deadlines displayed in the corresponding row.

Once the customer clicks the "Select" button, he/she is hyperlinked to the web page as shown in FIG. 88, where the summary of the IFS and the selected OFS is shown.

Next, the customer may choose to select (purchase) more OFS on the same IFS or to get an AFO on another IFS in the Initial Itinerary. To purchase another OFS on the current IFS, the customer may click on "Add more AFO Flights" button and the customer may repeat the OFS search process for this. Once all the desired OFSs have been selected, the customer clicks the "Save & Purchase" link (shown in FIG. 88), and a payment transaction is executed to complete the purchase.

The following presents an algorithmic illustration of the Sequential Buy AFO process mentioned above. Consider FIG. 89. In Act 89.100, the customer selects (and/or purchases) an Itinerary (with one or more IFS). Next, in Act 89.110, the customer reaches an interactive interface of the airline's web server to a Buy AFO page, where the customer selects an IFS (referred to as Target_IFS) on which an AFO is desired. Next, the customer inputs the OFS search criteria for the current Target_IFS in Act 89.115.

Next, on clicking the "Search AFO Flights" button, control goes to Act 89.120, where the OFS search algorithm is executed to search for one or more OFS. The OFS search algorithm returns a list of valid OFSs, along with a list of Comb_NDs and associated AFO Prices. The details of the OFS search algorithm are presented later. Next, the search results are displayed for the customer, who then selects the desired OFS and one or more associated Comb_ND(s)/AFO Price(s), as shown in Act 89.130.

Next, in Act 89.140, a test is performed to determine whether the customer wants to select more OFSs on the current Target_IFS or on another IFS. IF the customer wants to get an OFS on another IFS, control loops back to Act 89.110, where the customer selects another IFS as the Target_IFS, and then the process is repeated again For the new Target_IFS. If the customer wants to get more OFSs on the current Target_IFS, control loops back to Act 89.115, where the customer enters the OFS search criteria, and then the process is repeated for the new OFS search criteria. If the customer does not want to buy any more OFSs, control goes to Act 89.150, where a payment transaction (if needed) may be executed. For example, a customer may need to pay a price for the Flight after taking into consideration the Initial AFO Price (if any) using a credit card, direct bank account debit or any other payment transaction mechanism. Next, the algorithm ends in Box 89.200. The computation may be performed using a processor that may calculate results in optimal time.

OFS Search

Figure 90:
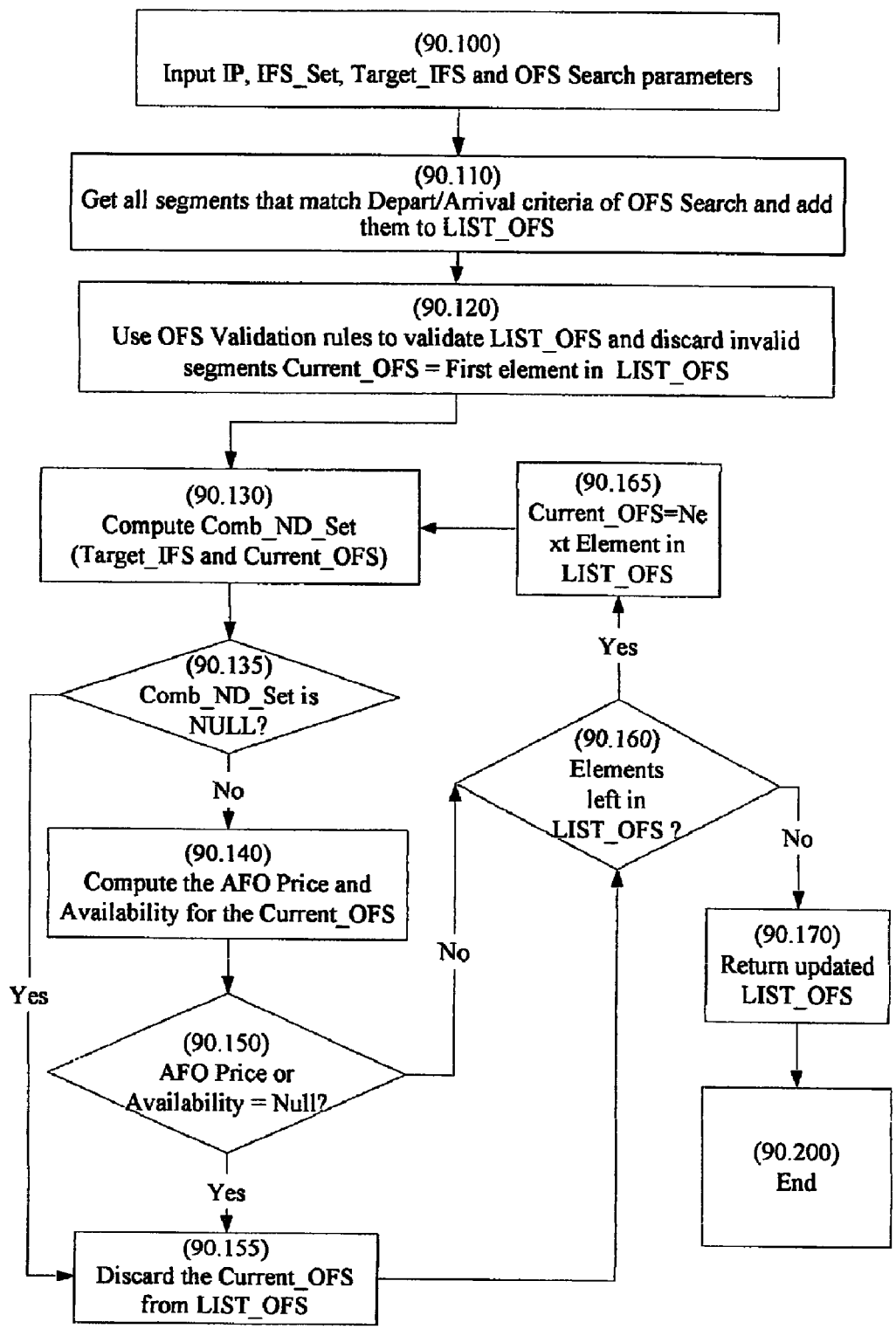
FIG. 90 is a flowchart that expands Act 120 of FIG. 89, illustrating an algorithm to search for APO Flights (or Option Flight Segments)

The following algorithm (shown in FIG. 90) determines and validates an OFS for a given set of conditions including, but not limited to, availability, Notify Deadline and AFO price. One of the ways of implementation of the OFS Search has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 90.100, the number of customers (IP), IFS_Set (containing all the IFS in the Initial Itinerary, and all the OFSs, (if any) already selected/purchased along with Comb_ND_Set(s) and Comb_OP_Set(s), for each IFS), Target_IFS and the OFS Search parameters are input to the system. The OFS search parameters include, but are not limited to, and airport/city (location) for departure and arrival, number of connections, class of service, Notify Deadline, AFO Price and so forth. A customer may be allowed to input Notify Deadline and/or AFO Price on the basis of which valid OFSs (that satisfy the given criteria of Notify Deadline and/or AFO Price) may be searched for and displayed for the customer. the origin and destination related parameters, and then a set of Notify Deadlines and AFO Prices may be computed for the flights that match the given criteria. In yet another example, a customer may input both the origin and destination and Notify Deadline and/or AFO Price inputs and then a search may be performed for valid OFSs. In another example, a customer may input to the system, one or more flights, and/or inputs to search for one or more additional flights (e.g., origin and destination, price etc.) to search for OFS that may be combined with one or more input flights (by the customer) to constitute the total set of flights for an AFO. In some situations, an airline may also validate the flights input by the customer to determine if said flights are eligible to be AFO Flights.

Next, control goes to Act 90.110, where an OFS Search is performed for the given criteria. The search may be best performed using a processor that may calculate results in optimal time. The order in which search parameters are executed may be optimized to reduce the search time, however, it may or may not affect the final outcome. An airline may select any order of its choosing.

In Act 90.110, Flight Segments are determined that match the search and the resulting Flight Segments are added to a list termed LIST_OFS. Next, in Act 90.120, a list of OFS validation rules is obtained from the airline's AFO VOF database and the rules are used to validate all the Flight Sets in the LIST_OFS list. Flight Segments that do not satisfy the rules are discarded. Validation rules may include, but are not limited to, a Maximum Connection Rule, a Maximum Ticket Price Rule, a Time Synchronization Rule, and so forth. For example, a Maximum Connection Rule discards the Segments that have more connections than specified. A Maximum Ticket Price Rule discards the Segments for which the available Ticket Prices are higher than the Ticket Price paid by the customer for the Target_IFS. A Time Synchronization Rule validates the Segments on the basis of departure and arrival times. For example, when a Target_IFS is for the onward journey of a round-trip Itinerary, this rule only validates those Segments, which arrive at least X minutes before the departure of the earliest Segment (among IFS and all associated OFS) for the return journey. An airline may implement any validation rule of its choosing to further qualify the Flight Segments in the LIST OFS list. As a last Act in Act 90.120, the first element in the updated LIST_OFS is designated as the Current_OFS.

Next, control goes to Act 90.130, where a group of Comb_NDs is computed for the combination of the Target_IFS, all the existing OFS of the Target_IFS and the Current_OFS, and added to a set called Comb_ND_Set. Next, in Act 90.135, a test is performed to determine whether the Comb_ND_Set obtained in the previous Act is Null. If so, control goes to Act 90.155. If not, control goes to Act 90.140, where the AFO availability and AFO Price for the Comb_ND_Set are determined. Next, in Act 90.150, another test is performed to determine whether the AFO Availability or the AFO Price is Null. If so, control goes to Act 90.155. If not, control goes to Act 90.160.

In Act 90.155, the Current_OFS is discarded from the LIST_OFS list, and control goes to Act 90.160, where another test is performed to determine if more elements are left in the LIST_OFS list. If so, control goes to Act 90.165. If not, control goes to Act 90.170.

In Act 90.165, the next element in the LIST_OFS list is designated as the Current_OFS and control loops back to Act 90.130 to repeat the process for the new Current OFS. In Act 90.170, the updated LIST_OFS list is returned as the search result, and the algorithm ends in Box 90.200.

Computation of Notify Deadlines in the Airline Industry

An airline may set one or more Notify Deadlines of its choosing for its Flight Leg. Once the Notify Deadlines have been set for each Flight Leg, the next Act is to create a framework to compute Notify Deadlines for a group of flights Products (such as a Segment, an Itinerary or any other group). The following sections present an example of a framework that may be used to obtain a set of Notify Deadlines applicable to a group of flights. An airline may use any framework and algorithm of its choosing to obtain the same.

A set of Notify Deadlines associated with a Flight Leg, a Flight Segment and a combination of two or more Flight Segments is called Leg_ND_Set, Seg_ND_Set and Comb_ND_Set, respectively. Each element in the Leg_ND_Set, Seg_ND_Set and Comb_ND_Set is termed Leg_ND, Seg_ND and Comb_ND, respectively. The Comb_ND_Set may be computed by combining the Seg_ND_Sets of all the given Flight Segments. A Seg_ND_Set is computed by combining the Leg_ND_Sets of all the Flight Legs under that Flight Segment. The Notify Deadlines may be computed based on various parameters and factors of the airline choosing. One example to compute a Comb_ND_Set is as follows. First compute Seg_ND_Set for all Flight Segments. A Seg_ND_Set is computed by first selecting earliest of the Notify Deadlines of each Flight Leg within the concerned Flight Segment, and then picking the latest of those Deadlines, and noting that as the Target_Deadline. Next step is to pick all those Notify Deadlines that fall after the Target_Deadline. Notify Deadlines thus obtained may be validated using various validation rules based on airline factors such as customer utility, flight parameters and so forth. Similarly, the Comb_ND_Set may thus be computed by repeating the above process for Seg_ND_Sets, thus obtained for each Flight Segment.

Available Capacity Check in the Airline Industry

The AFO available capacity for an OFS may depend on one or more factors including, but not limited to, Notify Deadline, AFO Prices, expected seat value and so forth. An airline may use any method of its choosing to determine AFO capacity of a Flight. For example, an airline may choose to have a fixed AFO capacity for one or more of its Flight Legs.

An instance to compute AFO capacity is discussed below. Consider the case, when AFO Capacity is dependent on Notify Deadline. In such situation, the objective is to determine those Comb_NDs within the Comb_ND_Set on which AFO is available for the given OFS. The AFO Capacity and the Used AFO Capacity (the total number of Flight Legs on which AFO has been sold but not exercised) may be calculated for each Comb ND within the Comb_ND_Set. Available Capacity (AC) would then be the difference of AFO Capacity and Used AFO Capacity for the given Flight Leg. If the AC is greater than or equal to the number of incoming customers desiring an AFO, then the AFO capacity is available at a given Comb_ND for the given OFS. The process may be repeated for all Notify Deadlines within Comb_ND_Sets. An AFO may be made available on a given OFS for a given Comb_ND, if AFO is available on all the Flight Legs of OFS for the given Comb_ND.

AFO Price Calculation

An airline may set AFO Prices for a Flight Leg using any method of an airline's choosing. Once the AFO Prices have been set for each Flight Leg, the next Act is to create a framework to compute AFO Prices for a group of flights (such as a Flight Segment, an Itinerary or any other group) by using AFO Prices for each of the Flight Legs in the group.

The parameters Leg_OP refer to an AFO Price (may or may not be corresponding to a Notify Deadline) associated with a Flight Leg. Similarly, Seg_OP and Comb_OP refer to AFO Price (may or may not be corresponding to a Notify Deadline) associated with a Segment and a combination of two or more Segments, respectively. A set of Leg_OPs, Seg_OPs and Comb_OPs is termed Leg_OP_Set, Seg_OP_Set and Comb_OP_Set, respectively. The Comb_OP_Set is computed by combining the Seg_OP_Sets of the IFS and all the OFSs (existing and new). A Seg_OP_Set is computed by combining the Leg_OP_Sets of all the Flight Legs under that Flight Segment.

One or more Seg_OP_Rules may be read from the airline's database and applied to calculate Seg_OP_Set for each input Flight_Segment (IFS and all OFSs) using the Leg_OP_Sets of all the Flight_Legs of said Flight_Segment. An airline may use any Seg_OP_Set Rule of its choosing. Seg_OP_Rules may be defined to calculate Seg_OP as the sum, average, highest, lowest or any other function of Leg_OPs of all the Flight Legs at a given Comb_ND. Similarly, a Comb_OP_Set comprises one or more Comb_OPs, and is calculated using one of the pre-determined rules, termed Comb_OP_Rules, to combine the Seg_OPs of all the Flight Segments in the combination. An airline may use a Comb_OP_Rule of its choosing. Comb_OP_Rules may be defined similar to the Seg_OP_Rules.

Concurrent Buy AFO Process in the Airline Industry

As explained above, in the Concurrent Buy AFO process, a customer selects all the AFO Flights concurrently in one transaction. An algorithmic illustration of an example of the Concurrent Buy AFO process is displayed in FIG. 91. An AFO (2, 1) instance is assumed here as an example. Consider a customer who wants flexibility in his/her trip and wants two AFO Flight Segments. In Act 91.100, the customer needs for AFO are input, including, but not limited to, search criteria for two Flight Segments according to customer's utility (may be similar to the search criteria defined above for the Sequential Buy AFO process).

Next, in Act 91.110, the AFO algorithm is run to determine the combinations of two Flight Segments that satisfy inputs. A list of such search results is displayed for the customer along with the associated terms and conditions including, but not limited to, Notify Deadlines, AFO Price and Ticket Price for each such combination. The AFO algorithms defined above for the Sequential Buy AFO process (defined above) may also be used for the Concurrent Buy AFO process.

Next, in Act 91.120, the customer selects a desired combination of two flights and the associated conditions such as AFO Price/Notify Deadline. Next, in Act 91.130, a payment transaction is executed, if needed. For example, the customer pays the Ticket Price for AFO (if any) using a credit card, direct bank account debit or any other payment transaction mechanism. Next, the algorithm ends in Box 91.200. The computation may be performed using a processor that may calculate results in optimal time.

(2) Event Optimizer in the Airline Industry

After the completion of the Buy AFO process, the next stage is the Event Optimizer. In this stage, the customer notification (or CN, in short) process as shown in Act 81.200 is executed. In this process, a customer selects a Chosen Flight. The process may also comprise one or more event optimizer algorithms that may help to optimally select the Chosen Flight and/or to optimally reuse the seat in the Released Flight. The details of the CN process are provided later. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E.

AFO Exercise Process in the Airline Industry

In the Customer Notification (or CN, in short) process, a customer interacts with an airline's server to select the Chosen Flight. The interaction may take place (for example) via phone, in-person, on a website or via any other communication mechanism. The Customer Notification process may be performed using any rule/method as desired.

Customer Notification (or CN) Process in the Airline Industry

The primary objective of the CN process is to select (or define) the Chosen Flight. In the CN process, a decision for the Chosen Flight is notified to the airline. As mentioned earlier, the Chosen Flight may be defined by the airline, the customer, another entity or any combination thereof. The customer interacts with an airline server that runs the CN process, to select the Chosen Flight. If the customer fails to notify the airline of the Chosen Flight before the Notify Deadline, the Chosen Flight is decided based on the terms and conditions set before in the Initial Transaction of the AFO purchased by the customer.

Figure 92:
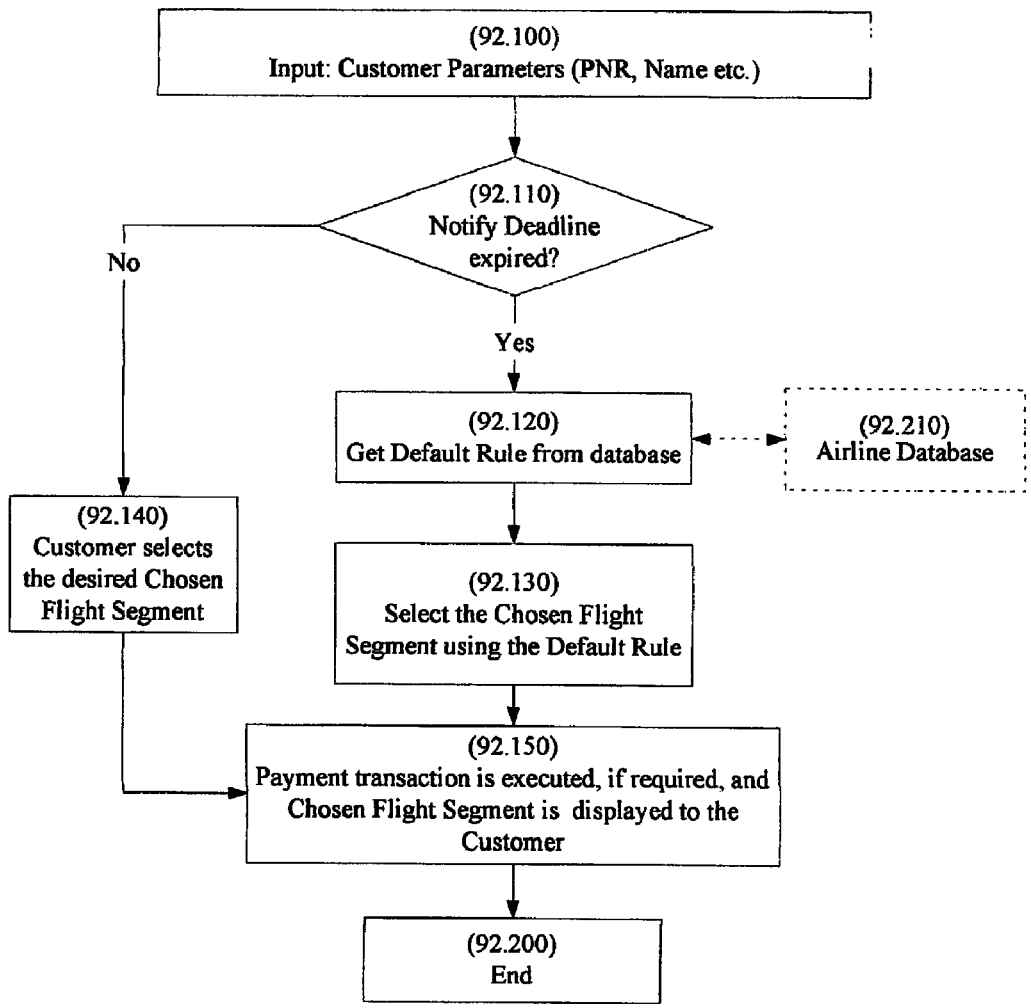
FIG. 92 is a flowchart that expands Act 200 of FIG. 81, illustrating an algorithm for the "Customer Notification" process.

FIG. 92 displays an example of an algorithm that may be used to execute the Customer Notification process. In Act 92.100, a customer enters input parameters, such as PNR, Last Name, purchase date and so forth to retrieve the data from the airline database for the Initial Itinerary and AFO Flights. Next, in Act 92.110, a test is performed to determine whether the Notify Deadline has expired or not. If so, then control goes to Act 92.120. If not, then control goes to Act 92.140.

In Act 92.120, a Default Rule is read from the airline's database (Box 92.210). A Default Rule defines criteria to select the Chosen Flight if the customer fails to provide a timely notification (i.e. before the Notify Deadline) to the airline regarding his/her decision of the Chosen Flight. An airline may use a Default Rule of airline's choosing. An airline may use a rule to choose a flight with the lower expected value, earlier departure date, lower load factor or any other factor. Next, in Act 92.130, the Default Rule, thus obtained, is used to select the Chosen Flight Segment, and then control goes to Act 92.150. In Act 92.140, the customer selects the desired Chosen Flight. Next, control goes to Act 92.150.

In Act 92.150, a payment transaction (if any) is executed, and then the Chosen Flight is displayed to the customer. The payment transaction may be related to the AFO purchased by the customer (such as a payment of an AFO Exercise Price). The algorithm, then ends in Box 92.200. The computation may be performed using a processor that may calculate results in optimal time.

Implementation of AFO VOF in Conjunction with Other VOFs in the Airline Industry AFO VOF may be used in conjunction with one or more other VOFs, For example, the FRO (Flexibility Reward Option) VOF. A customer who receives an AFO is termed "A" type of customer. An airline may form a group of one or more AFO customers and one or more FRO customers, where the options (AFO and FRO) obtained by the group members are complimentary in nature. As an example, consider an A customer who bought an AFO to choose either of flight F1 or flight F2 as the Chosen Flight, and consider a Y customer who received a FRO and is flexible to take any of F1 and F2 as the Chosen Flight. Thus, if A decides to choose F1 as the Chosen Flight, the airline may assign F2 as the Chosen Flight for Y, and vice versa. The customers A and Y have taken complimentary options and may form a group. The airline may need to hold only one unit of inventory in F1 and F2 to satisfy the needs of both A and Y (assuming each A and Y only need one unit of seat). Such a combination of complimentary options or VOFs may improve efficiency and concurrently enhance value for all the parties involved (in the context of the current example, enhance value for A, Y and the airline).

The implementation of the grouping of A type and Y type of customers may be done in one or more ways. One way to implement such grouping is to first have one or more Y type of customers and based on such customer(s), the airline may offer complimentary AFOs to customers to make groups. In another implementation, the airline may first offer AFO and based on such AFO customer(s), airline offers complimentary FROs to customers to make groups. In yet another implementation, the airline may offer AFO and FRO separately and then define a process to make complimentary groups of A and Y customers (such groups termed "AY_Groups").

An airline may choose to create AY_Groups at various group levels such as implementation of grouping at Level 1, Level 2 and so on. In Level 1 grouping, an AY_Group involves one each of A and Y type of customers. An example of Level 1 grouping has already been given above (the two customer, A and Y, example).

In Level 2 grouping, the grouping involves making complimentary groups for more than 2 customers. As an example, consider an A customer who bought an AFO to choose either flight F1 or flight F3 as the Chosen Flight, a Y1 customer who received a FRO and is flexible to take any of flight F1 and flight F2 as the Chosen Flight and a Y2 customer who has also received a FRO and is flexible to take any of F2 and F3 as the Chosen Flight. A notation A-Y1-Y2 represents this example. Thus, if A decides to choose F1 as the Chosen Flight, the airline may assign F2 as the Chosen Flight for Y1 and F3 as the Chosen Flight for Y2. Alternatively, if A decides to choose F3 as the Chosen Flight, the airline may assign F1 and F2 as the Chosen Flights for Y1 and Y2, respectively.

It is assumed that a "unit" represents one unit of seat (or flight capacity) and each customer needs only one unit of a seat. Continuing with the above example, if the airline were to not consider the complimentary nature of options obtained by A, Y1 and Y2 customers, the airline may need to hold (or block) a total of 4 units of capacity (seats) to ensure complete satisfaction of needs of A, Y1 and Y2, i.e., 2 units for A (1 unit each of F1 and F3 as A could choose any flight), 1 unit (seat) for Y1 (either F1 or F2) and 1 unit for Y2 (either F2 or F3). This implies, to satisfy a total need of 3 units of flights, the airline may need to hold (or block) 4 units (seats) of flight capacity, creating a redundant capacity of 1 unit that the airline may not be able to use otherwise. By creating a complimentary group of A-Y1-Y2, the airline needs to only hold (or block) 3 units of capacity (1 unit each in F1, F2 and F3), thus, freeing up 1 unit of redundant capacity. Thus, an AY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-Y1-Y2-Y3.

An airline may choose to implement grouping at various flight levels such as Flight Leg, Flight Segment and Itinerary. An airline may also change terms and conditions of one or more option contracts of one or more FRO and/or AFO customers (for e.g., price, notify deadline and so on) to solicit customer participation in FRO/AFO to create more AY_Groups. The airline may also offer incentives to customers to choose complimentary FRO/AFO offerings to enable the airline to create more AY_Groups. The implementation methods mentioned above for grouping are for illustration purposes only and an airline may choose to implement grouping in one or more other ways or by combining above said methods or by combining one or more other ways along with one or more above said methods.

Figure 93:
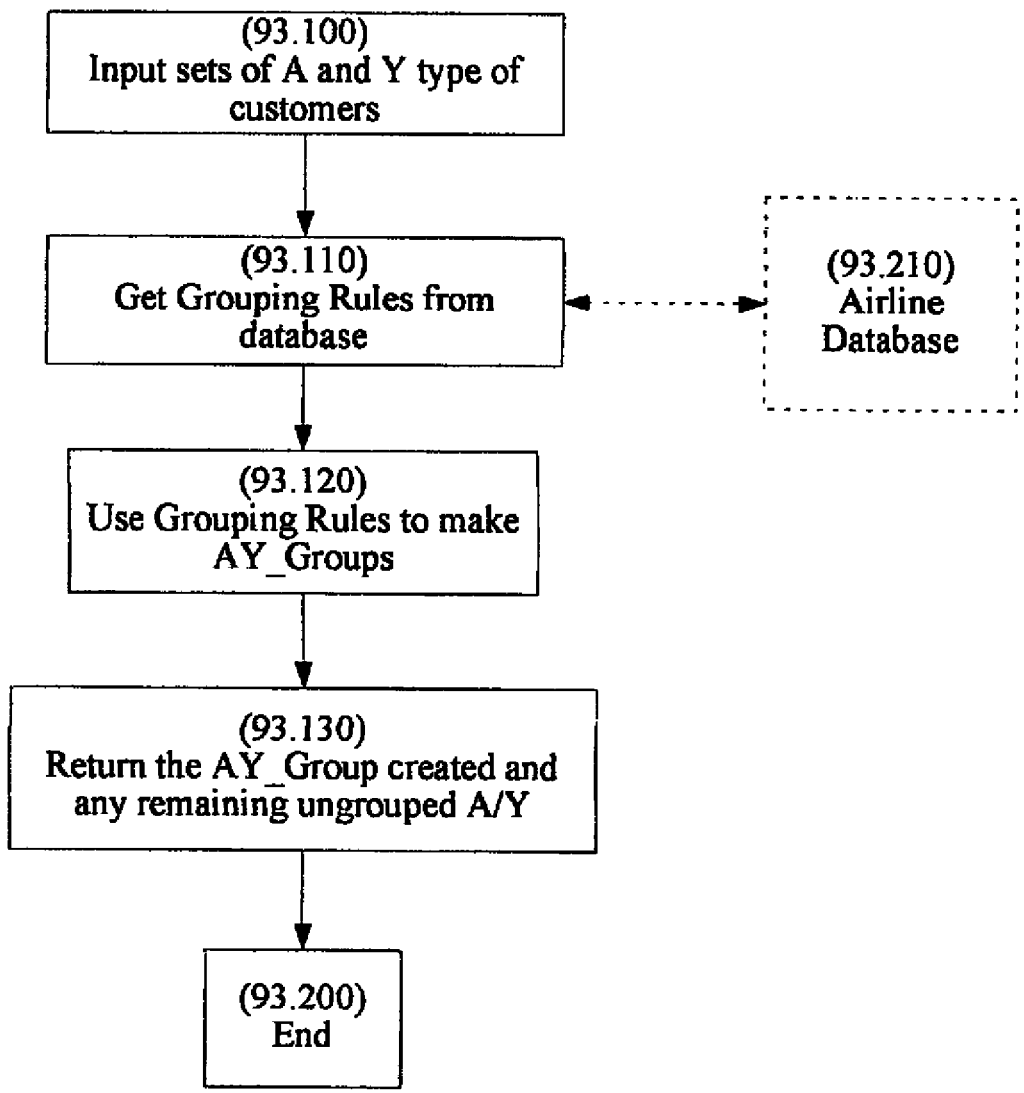
FIG. 93 is a flowchart illustrating an example of an algorithm to implement grouping of A and Y type of customers in context of the airline industry.

FIG. 93 displays a flow chart that illustrates one way of implementing grouping of A and Y type of customers. In Act 93.100, sets of A and Y customers are taken as input. Next, in Act 93.110, a set of one or more Grouping Rules is read from the airline's database (93.210). A grouping rule may depend upon the number of A and/or Y type of customers, desired capacity redundancy in the system, the permissible time factor to create AY_Groups, any other rule of airline's choosing, any combination thereof and so on. For example, an airline may choose a Grouping Rule whereby new groups are created by first ungrouping one or more of the AY_Groups (created earlier but unexercised, for example, groups for which the customer has not been notified, or if notified, the customer has not utilized the flight and the terms of option contract allows for a change in the Chosen Flight). A Grouping Rule may create groups of only those A and Y type or customers who have yet to be grouped and discarding all A/Y customers, which have already been grouped. An airline may implement any Grouping Rule to formulate AY_Groups. The choice to Grouping rules may enhance the overall value for the airline (for example, reduce the total capacity required to satisfy flight needs for all A and Y customers). Theoretically, the number of units of the seats required (or blocked) should be equal to the number of customers buying the seat (assuming each customer wants one unit of seat). Thus, by implementing the grouping and with the help of appropriate Grouping Rules, the airline may attempt to achieve such theoretical minima.

Next, in Act 93.120, the Grouping Rules, so obtained from the airline's database, are used to make AY_Groups. Next, in Act 93.130, the AY_Groups so created are returned along with ungrouped A/Y, if any, and the process then ends in Box 93.200.

The grouping may enhance customers' experience, and may comprise operating a system that delivers a FRO to at least a "first customer" to utilize up to n of m selected flights for said first customer, and n is less than or equal to m; operating a system that delivers an AFO to at least a "second customer" to utilize up to k of p selected flights, and k is less than or equal to p; operating a system to define each of the k Chosen Flights, whereby after each of the k Chosen Flights is defined, said "second customer" can utilize said Chosen Flight; operating a system wherein an airline defines t Chosen Flight(s) for said "first customer" after each of said k Chosen Flights is defined, wherein after each of said t flights is defined, said first customer can utilize said defined flight, where t is less than or equal to n. Said t flights may be a subset of n flights, m flights or both. Said t flights or n flights or both may also include one or more flights not included in said m selected flights. Similarly, k flights may be a subset of p flights, or may include one or more flights other than said p flights. The grouping may be performed for a multiplicity of at least one of said first or second customers and may combine together at least one of each of said first and second customers to formulate at least one group with at least one complementary set of options. The grouping may enable an airline, an entity other than said airline and/or any combination thereof to utilize at least one of said m or p flights at least after delivery of any of said first or second options. The airline and/or an entity other than said airline may implement AFO VOF where in the first and/or second customer in said grouping may be same. The notification conditions may be different, same or any combination thereof for the first and second option.

Said first and/or second option may or may not include any notification deadline condition. The airline, the second customer, an entity other than said airline and/or any combination thereof may define, at one or more times, at least one of said k Chosen Flights. The airline, the first customer, an entity other than said airline and/or any combination thereof may define, at one or more times, at least one of said p Chosen Flights. The first customer may select, at one or more times, at least one of said m flights. The second customer may select, at one or more times, at least one of said p flights. The airline and/or an entity other than the airline may receive from at least one of said first or second customer, at one or more times, an indication of one or more terms and conditions associated with said first or second options, respectively. Similarly, at least one of said airline and/or an entity other than said airline may deliver to at least one of said first or second customers, at one or more times, one or more terms and conditions associated with said first or second option, respectively. There may or may not be any payment transaction between the airline, an entity other than the airline, and at least one of said first and/or second customer.

AFO VOF may be used in conjunction with one or more other VOFs, for example, the UFO (Upgrade Flight Option) VOF. A customer who received an AFO is termed "A" type of customer. An airline may form a group of one or more AFO customers and one or more UFO customers, where the options (AFO and UFO) obtained by the group members are complimentary in nature. As an example, consider two customers A(F1, F2) and U[up(F2), base(F1)]. The notation A(F1, F2) implies a customer A who has received an AFO and has the flexibility to choose either F1 or F2 as the Chosen Flight. The notation U[up(F2), base(F1)] implies a customer U who received a UFO and wishes to get an upgrade from F1 (i.e., the base flight) to F2 (i.e., the up flight). Thus, if A decides to choose F1 as the Chosen Flight, the airline may upgrade U to F2. If A decides to choose F2 as the Chosen Flight, the airline may not upgrade U and hence U gets F1. The customers A and U have taken complimentary options and may form a group. The airline may need to hold only one unit of inventory each in F1 and F2 to satisfy the needs of both A and U (assuming each A and U only need one unit of seat). Such a combination of complimentary options or VOFs may improve efficiency and concurrently enhance value for all the parties involved (i.e., in the context of the current example, enhance value for A, U and the airline).

The implementation of the grouping of A type and U type of customers may be done in one or more ways. One way to implement such grouping is to first offer and secure one or more U type of customers and based on such customer(s), the airline may offer complimentary AFOs to other customers to make groups. In another implementation, the airline may first offer and secure AFO customers and based on such AFO customer(s), airline offers complimentary UFOs to other customers to make groups. In yet another implementation, the airline may offer AFO and UFO separately and then define a process to make complimentary groups of A and U customers (such groups termed "AU_Groups").

An airline may choose to create AU_Groups at various group levels such as implementation of grouping at Level 1, Level 2 and so on. In Level 1 grouping, an AU_Group involves one each of A and U type of customers. An example of Level 1 grouping has already been given above (the two customer, A and U, example).

In Level 2 grouping, the grouping involves making complimentary groups for more than 2 customers. As an example, consider three customers A(F1, F2, F3), U1[up(F2, F3), base (F1)] and U2[up(F1, F3), base(F2)]. The notation A(F1, F2, F3) implies a customer A who received an AFO on F1, F2 and F3 (Flexibility to choose any one of F1, F2 or F3 as Chosen Flight). The notation U1[up(F2, F3), base(F1)] implies a customer U1 who received a UFO and wishes to get an upgrade from F1 (base flight) to either F2 or F3 (any of the two up flights), and U2[up(F1, F3), base(F2)] implies a customer U2 who received a UFO and wishes to get an upgrade from F2 (base flight) to either F1 or F3 (any of the two up flights). An airline may group these three customers together. If A decides to choose F1 as the Chosen Flight, the airline may upgrade U1 to F2 and U2 to F3. Alternatively, if A decides to choose F2 as the Chosen Flight, the airline may upgrade U1 to F3 and U2 to F1. In the third case, if A decides to choose F3 as the Chosen Flight, the airline may upgrade U1 to F2 and U2 to F1. Thus by grouping them together, the airline needed to hold only one unit of inventory in each of the three flights F1, F2 and F3 to satisfy needs for all three customers in all different situations.

It is assumed that a "unit" represents one unit of seat (or flight capacity) and each customer needs only one unit of a seat. Continuing with the above example, if the airline were to not consider the complimentary nature of options obtained by A, U1 and U2 customers, the airline may need to hold (or block) a total of 5 units (seats) of capacity to ensure some level of satisfaction of needs for A, U1 and U2, i.e., 3 units for A (1 unit each of F1, F2 and F3 as A could choose any flight), 1 unit for U1 in F1 (base flight) and 1 unit for U2 in F2. Even by blocking (or holding) 5 units (seats), there may be no guarantee that the airline would be able to satisfy upgrade needs for U1 or U2 (in the event they are not grouped together). This implies, to satisfy a total need of 3 units of flights, the airline may need to hold (or block) 5 units (seats) of flight capacity, creating a redundant capacity of 2 units (seats) that the airline may not be able to use otherwise. By creating a complimentary group of A-U1-U2, the airline needs to only hold (or block) 3 units (seats) of capacity (1 unit each in F1, F2 and F3), thus, freeing up 2 units (seats) of redundant capacity. Thus, an AU_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A1-U1-U2-U3.

An airline may choose to implement grouping at various flight levels such as Flight Leg, Flight Segment and Itinerary. An airline may also change terms and conditions of one or more option contracts of one or more UFO and/or AFO customers (for e.g., price, notify deadline and so on) to solicit customer participation in UFO/AFO to create more AU_Groups. The airline may also offer incentives to customers to choose complimentary UFO/AFO offerings to enable the airline to create more AU_Groups. The implementation methods mentioned above for grouping are for illustration purposes only and an airline may choose to implement grouping in one or more other ways or by combining above said methods or by combining one or more other ways along with one or more above said methods.

Figure 94:
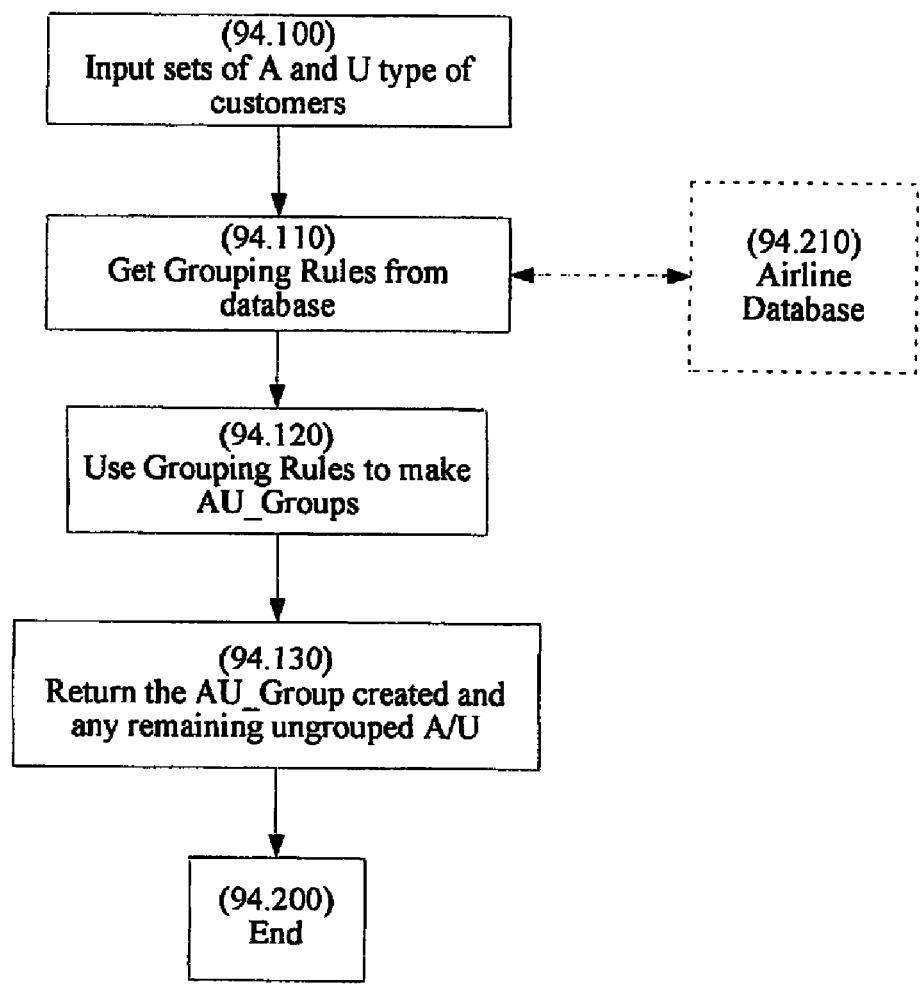
FIG. 94 is a flowchart illustrating an example of an algorithm to implement grouping of A and U type of customers in context of the airline industry.

FIG. 94 displays a flow chart that illustrates one way of implementing grouping of A and U type of customers. In Act 94.100, sets of A and U customers are taken as input. Next, in Act 94.110, a set of one or more Grouping Rules is read from the airline's database (94.210). A grouping rule may depend upon the number of A and/or U type of customers, desired capacity redundancy in the system, the permissible time factor to create AU_Groups, any other rule of airline choosing, any combination thereof and so on. For example, an airline may choose a Grouping Rule whereby new groups are created by first ungrouping one or more of the AU_Groups (created earlier but unexercised, for example, groups for which the customer has not been notified, or if notified, the customer has not utilized the flight and the terms of option contract allows for a change in the Chosen Flight). In another example, a Grouping Rule may create groups of only those A and U type of customers who are yet to be grouped and discarding all A/U customers, which have already been grouped. An airline may implement any Grouping Rule to formulate AU_Groups. The choice to Grouping rules may enhance the overall value for the airline (for example, reduce the total capacity required to satisfy flight needs for all A and U customers). Theoretically, the number of units of the seat required (or blocked) should be equal to the number of seats the customers shall be eventually utilizing. Thus, by implementing the grouping and with the help of appropriate Grouping Rules, the airline may attempt to achieve such theoretical minima.

Next, in Act 94.120, the Grouping Rules, so obtained from the airline's database, are used to make AU_Groups. Next, in Act 94.130, the AU_Groups so created are returned along with ungrouped A/U, if any, and the process then ends in Box 94.200.

The grouping may enhance customers' experience, and may comprise operating a system that delivers a URO to at least a "first customer" to utilize up to n of m selected flights for said first customer, and n is less than or equal to m; operating a system that delivers an AFO to at least a "second customer" to utilize up to k of p selected flights, and k is less than or equal to p; operating a system to define each of the k Chosen Flights, whereby after each of the k Chosen Flights is defined, said "second customer" can utilize said Chosen Flight; operating a system wherein an airline defines t Chosen Flight(s) for said "first customer" after each of said k Chosen Flights is defined, wherein after each of said t flights is defined, said first customer can utilize said defined flight, where t is less than or equal to n. Said t flights may be a subset of n flights, m flights or both. Said t flights or n flights or both may also include one or more flights not included in said m selected flights. Similarly, k flights may be a subset of p flights, or may include one or more flights other than said p flights. The grouping may be performed for a multiplicity of at least one of said first or second customers and may combine together at least one of each of said first and second customers to formulate at least one group with at least one complementary set of options. The grouping may enable an airline, an entity other than said airline and/or any combination thereof to utilize at least one of said m or p flights at least after delivery of any of said first or second options. The airline and/or an entity other than said airline may implement AFO VOF where in the first and/or second customer in said grouping may be same. The notification conditions may be different, same or any combination thereof for the first and second option Said first and/or second option may or may not include any notification deadline condition. The airline, the second customer, an entity other than said airline and/or any combination thereof may define, at one or more times, at least one of said k Chosen Flights. The airline, the first customer, an entity other than said airline and/or any combination thereof may define, at one or more times, at least one of said p Chosen Flights. The first customer may select, at one or more times, at least one of said m flights. The second customer may select, at one or more times, at least one of said p flights. The airline and/or an entity other than the airline may receive from at least one of said first or second customer, at one or more times, an indication of one or more terms and conditions associated with said first or second options, respectively. Similarly, at least one of said airline and/or an entity other than said airline may deliver to at least one of said first or second customers, at one or more times, one or more terms and conditions associated with said first or second option, respectively. There may or may not be any payment transaction between the airline, an entity other than the airline, and at least one of said first and/or second customer.

Business Model to Implement AFO in the Airline Industry

Different business models may be used to implement an AFO VOF. For example, an airline may choose to implement an AFO VOF individually or in conjunction with one or more partners and/or other companies. As mentioned in the sections above, in another implementation of AFO, an airline may allocate some seat inventory to another entity. The term "allocation of seat(s)" or "allocation of seat inventory" or "allocation of flight(s)" implies, without limitation, assigning one or more seats of one or more flights of one or more airlines to an entity for any purpose or use by the entity either exclusively or non-exclusively. For example, an entity may use the allocated seats to offer AFO to customers and/or to sell the seats as regular seats. The allocation of seat may be conditional. For example, one of the conditions may require a return of at least one allocated seat after a specified time period and/or other consideration(s).

The customer may select or purchase one or more flights from the airline and/or said entity and then interact with said entity to select (purchase) one or more AFO Flights in relation to said (already purchased) flights. Said entity may also receive seat allocation from more than one airline, and thus, offer flights from multiple airlines to a single customer during the Initial Transaction for AFO.

The OA may use those seats and operate a service to offer AFOs to the airline customers. As explained above in FIG. 13A, a customer may select one or more flights from the OA, and then receive an AFO on those selected flights from the OA. Another approach would be for a customer to select one or more flights from the airline and then receive an AFO option on those selected flights from the OA. In another example, a customer may select one or more flights from both the airline and the OA, and then receive the AFO option on those selected flights from the OA. It is also possible that the customer receives an AFO from the airline or both from the airline and the OA on a given set of selected flights.

The OA and the airline may simultaneously offer AFOs to the airline customers, i.e., a customer may either approach the airline or the OA to receive an AFO on desired flights. In another model, the OA may operate as the sole provider of the AFO to all the customers of an airline. In a vet another model, the OA and the airline may choose to work together and jointly offer AFOs to the airline customers. The OA or the airline may offer and sell AFOs to customers using either or both of the Sequential or the Concurrent Buy AFO processes.

As explained in FIG. 13A above, an OA may be able to offer AFO on flights from one or multiple airlines. An OA may receive allocation of flights (seats) from two or more airlines. A customer may purchase one or more flights from one or more airlines and/or from the OA, and then receive an AFO option on those selected flights from the OA. Even if the OA may not be entitled to or does not receive seat allocation from an airline, it may still be able to formulate an agreement with that airline to offer AFOs on the flights of that airline. Thus, a customer may be able to receive an AFO on flights from multiple airlines, giving the customer more flexibility and variety to choose from. For example, a customer may receive an AFO on two flights from two different airlines and can choose to utilize either of them within the terms and conditions of the option contract. This may provide a lot of flexibility for the customers, especially when the customer itineraries include destinations only served by a few airlines. An OA may be able to thus create a multi-airline AFO VOF Framework, which may tremendously enhance the flexibility for the customers. All the participating airlines that allocate seats to and/or partner with the OA to offer AFO may also gain from an overall increase in the total spending by the consumers, enhanced overall customer satisfaction and/or other operational benefits. Either or both of the OA and the airline may process the tickets for the chosen Flights associated with an AFO purchased by the customer. A customer may receive tickets from the OA or the airline for the flights related to the AFO grant. An entity (the OA and the airline) may process tickets for the flights offered only by that entity or by either of the two entities.

The OA and the airline may engage in a business agreement to implement an AFO program. The business agreement may divide the total benefit generated by the AFO program between the two parties using any mechanism or criteria as desired. The total AFO Revenue Benefit may be shared between the two parties. The airline may allocate seats to the OA. One or more airlines may allocate only few or may allocate their entire seat inventory to the OA to offer those seats to the customers by way of regular and/or AFO seats. The OA may offer those seats as AFO seats to customers. In return, the OA may offer a lending revenue or lee to the airline for all or a portion of the seats allocated. This lending fee may be given only for the seats that the OA is able to utilize or for all the allocated seats. The lending fee may be a lump sum amount, may depend upon the number of seats allocated or may depend on one or more factors as desired. The agreement may include a provision where the OA may return the allocated seats back to the airline at a certain time and date. There may be one or more conditions associated with the return of unused AFO seats and/or seats from the Released Flights, including, but not limited to, returning the same seat, returning a higher value seat and so on.

The AFO VOF may include different conditions imposed on the customer regarding the payments related to the AFO. For example, a customer may be asked to make payments only to the airline even if he/she is receiving flights and/or options from the OA. Similarly, the customer may be required only to pay to the OA even if he or she selected the flights and/or received the options from the airlines. The condition may also be set to ask a customer to make one or more payments to the airlines for the flights and/or options received from that airline, and to make one or more payments to the OA for the flights and/or options received from that OA. The condition may allow the customer to make partial payments to the airline and the rest to the OA or vice versa, the basis of which distribution may depend upon various factors, including, but are not limited to, the factors of airline's choosing, the arrangement between the OA and the airline and so on. In another example, the customer may be required to pay to a third party or may be required to pay to any of the combination of the entities mentioned above.

Information Technology System for the AFO VOF in the Airline Industry

As discussed earlier as well, a client-server architecture may be used to implement the AFO VOF. However, an airline may use a computer hardware and software infrastructure of its choosing to implement an AFO VOF.

The AFO VOF may be best implemented using one or more computer-implemented methods to operate a computer-implemented service to offer AFOs to the customers, that includes, but not limited to, recording the information pertaining to the offered and/or sold AFOs in a database. It may also include operating a computer-implemented service (and/or system) or other service (and/or system) to define the Chosen Flights, and recording said chosen Flights (or defined flights) and all the flights related to an AFO in a database.

For the stage one (i.e., to formulate the AFO VOF), an application server may be used along with a database (e.g., a relational database) that stores all the information relevant to the airline and the customer. The database may include all the relevant information sufficient to identify flights the airline chooses to make eligible for AFO. One or more users (e.g., a business analyst or manager) may have full access to this server through Intranet or highly secured VPN environment to design an optimal value option framework. The database shall also store all the information pertaining to all the acts (in stage one) used by an airline while formulating the AFO VOF.

A similar or a different application server and/or a cluster of application servers (functioning concurrently) along with one or more web servers and a set of one or more database servers may be used for the Buy AFO as explained in FIG. 13D above and CN (Customer Notification) processes in the stage two of the AFO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Buy AFO process and the CN process may be computer-implemented as explained and discussed above in FIGS. 13D and 13E. All the customer interactions and the related information such as customer needs, inputs, payment transactions etc. are stored in this database, including information pertaining to the interactions with those customers who may not purchase and/or receive AFO. The systems for stage two and stage one may be maintained in a synchronized environment so that each system has access to the most current information and can communicate with each other.

As discussed above, there may be other ways for implementing the AFO VOF which may depend upon including, but not limited to, the scale of the implementation, business requirements and number of entities involved. The entities may interact through a series of hardware products and services with the OA/airline server(s). The OA may or may not be different than the airline and the OA server may be the same as that of the airline server. The information technology and network system to implement AFO VOF may include tools, without limitation, such as one or more CPUs, Hard Disk Drives. RAM, one or more series of Routers, Internet. Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, the airline may have one or more separate temporary database structure wherein the entries are updated and stored until the final update is made in one or more main databases. One the final update is done, the entries in these temporary databases may be removed.

The entire system may run at the premises of OA, airline and/or any third entity or any combination thereof. It may also be possible to run a part of the system at one place and rest at one or more other places. The system may also be implemented even if one or more servers may be kept off-shore locations and may be accessed remotely. The geographical locations of one or more hardware product and/or services may be different depending upon including, but not limited to, the factors of airline's choice, ease of accessibility, infrastructure facilities. The structure or the interaction architecture of the system may vary depending on factors including, but not limited to, the set up of the airline, changes in the technology and with the introduction of new and better technology enhancing the interaction process.

A customer may interact with the Buy AFO and/or the CN process either directly or indirectly using a local or a remote terminal (e.g., a computer with a browser and an access to the Internet) that is able to access the web server(s) that host the Buy AFO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one may be hosted and run by an airline, an OA, a third party service provider or any combination of the above. Similarly, the system for the stage two may be hosted by an airline, an OA, a third party service provider or any combination of the above. In the model, where the OA receives seat allocation from the airline and offers AFO to the customers directly, the web server, application server and database for both stage one and stage two shall be managed by the OA. The OA may also have partial (or complete) access to the airline database and systems through a highly secured environment (for example, a virtual private network). In the model, when an OA and an airline tie-up together to provide AFO, all the computer hardware and software infrastructure for both stage one and stage two may be hosted by and/or property of either or both (mutually) of the sides depending upon the business agreement between them.

While the invention has been described with respect to a limited number of embodiments, those skilled in the art, having benefit of this disclosure, will appreciate that other embodiments can be devised within the spirit and scope of the invention.

Brief description of APO VOF in the Car Rental Industry

APO VOF in the car rental industry may be termed as ACO (Alternate Car Option). In a successful Initial Transaction for an ACO, a customer receives an option to choose up to 'n' out of 'm' selected Cars (said 'm' Cars termed "ACO Cars"). The 'n' Cars that are finally selected are termed 'Chosen Cars'. After each of the 'n' Chosen Cars is defined (or selected or chosen), the customer has the right to utilize (or can utilize) said Chosen Car. Apart from the 'n' Chosen Cars, the remaining 'm-n' Cars are termed "Released Cars". The Released Cars (if any, that were probably held or blocked for said customer) may be rented to others or used for other purposes. The Released Cars in relation to said option may be reused by the car rental company before, alter, at or any combination thereof, the time the Released Cars and/or Chosen Cars are defined (or selected).

Numerically, the value of 'm' is greater than or equal to 1 and the value of 'n' may vary from '0' to 'm' depending upon the specific implementation of the ACO framework. The value of 'm' and/or 'n' may be known (or defined and/or re-defined) before, during or after the Initial Transaction and/ or any combination thereof. The value of n may be limited to less than the value of m, or n<m (i.e., n<=m−1); however, in some situations, n may be equal to m. The value of 'n' may or may not be known (or defined or re-defined) at the time of the Initial Transaction. The value of 'm' and/or 'n' may be defined and/or re-defined by the car rental company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'in'.

The Initial Transaction may consist of one or more acts. The customer may select (or book) all ACO Cars concurrently (i.e., all together in one transaction) or sequentially (i.e., in multiple transactions). In the sequential case, a customer may select one or more Cars in one or more transactions just before or much before (a few days/weeks/months) the Initial Transaction for ACO begins. Said selected Car(s) (let's say X number of them), thus, may be considered as part of said m ACO Cars of the ACO (m, n) transaction, and the customer may select only the remaining (m-X) number of ACO Cars during the Initial Transaction. All the transactions used to select all the ACO Cars of an ACO (m, n) instance may be related to each other, and hence, are considered as related transactions.

The ACO Cars may be selected by the car rental company, the customer, another entity or any combination thereof. The ACO VOF may enable a customer to have flexibility by selecting m Cars and use said flexibility to satisfy his/her needs. Therefore, the customers would usually have the right to select (or define) the Chosen Cars. However, in different implementations of ACO VOF, the car rental company, the customer, another entity or any combination thereof may select one or more of the Chosen Cars related to an ACO. The ACO Cars and the Chosen Cars may be selected by the same entity, different entities or any combination thereof. The car rental company may incorporate the customer information and the data related to the ACO into the sales, production, inventory, other database or information system or any combination of the above.

A customer may select ACO Cars in several ways; through mutual agreement (i.e., during a direct interaction such as a Car purchase), or the car rental company may grant the ACO Cars to the customers without soliciting their interest or permission. For example, to enhance customer satisfaction or for any other purpose, a car rental company may grant ACO Cars to customers based on the past customer behavior, interaction and so on.

For an example, a customer may desire travel flexibility and may be willing to pay for it accordingly. On the other hand, if a car rental company has surplus Cars or rental capacity, that condition probably represents the loss of potential revenue (and/or opportunity cost) for that car rental company. This is true even though no other potential customers have been turned away, simply because there may be one or more customers willing to switch to the unused surplus cars (or capacity) at appropriate price/terms. An opportunity thus exists to concurrently generate an incremental revenue benefit for the car rental company from consumer surplus, and to maximize the car renting utilities for the customers.

Brief description of APO VOF in the Travel Industry

APO VOF in Travel industry may be termed as ATO (Alternate Travel Package Option). In a successful Initial Transaction for an ATO, a customer receives an option to choose up to 'n' out of 'm' selected Travel Packages (said 'm' Travel Packages termed "ATO Travel Packages"). The 'n' Travel Packages that are finally selected are termed "Chosen Travel Packages". After each of the 'n' Chosen Travel Packages is defined (or selected or chosen), the customer has the right to utilize (or can utilize) said Chosen Travel Package. Apart from the 'n' Chosen Travel Packages, the remaining 'm-n' Travel Packages are termed "Released Travel Packages". The Released Travel Packages (if any, that were probably held or blocked for said customer) may be sold to others or used for other purposes. The Released Travel Packages in relation to said option may be reused by the travel company before, after, at or any combination thereof, the time the Released Travel Packages' and/or Chosen Travel Packages are defined (or selected).

Numerically, the value of 'm' is greater than or equal to 1 and the value of 'n' may vary from '0' to 'm' depending upon the specific implementation of the ATO framework. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined or re-defined) at the time of the Initial Transaction. The value of 'm' and/or 'n' may be defined and/or re-defined by the travel company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The Initial Transaction may consist of one or more acts. The customer may select (or purchase) all ATO Travel Packages concurrently (i.e., all together in one transaction) or sequentially (i.e., in multiple transactions). In the sequential case, a customer may select one or more Travel Packages in one or more transactions just before or much before (a few days/weeks/months) the Initial Transaction for ATO begins. Said selected Travel Package(s) (let's say X number of them), thus, may be considered as part of said m ATO Travel Packages of the ATO (m, n) transaction, and the customer may select only the remaining (m-X) number of ATO Travel Packages during the Initial Transaction. All the transactions used to select all the ATO Travel Packages of an ATO (m, n) instance may be related to each other, and hence, are considered as related transactions.

The ATO Travel Packages may be selected by the travel company, the customer, another entity or any combination thereof. The ATO VOF may enable a customer to have flexibility by selecting m Travel Packages and use said flexibility to satisfy his/her needs. Therefore, the customers would usually have the right to select (or define) the Chosen navel Packages. However, in different implementations of ATO VOF, the travel company, the customer, another entity or any combination thereof may select one or more of the Chosen navel Packages related to an ATO. The ATO Travel Packages and the Chosen navel Packages may be selected by the same entity, different entities or any combination thereof. The travel company may incorporate the customer information and the data related to the ATO into the sales, production, inventory, other database or information system or any combination of the above.

A customer may select ATO Travel Packages in several ways; through mutual agreement (i.e., during a direct interaction such as a Travel Package purchase), or the travel company may grant the ATO Travel Packages to the customers without soliciting their interest or permission. For example, to enhance customer satisfaction or for any other purpose, a travel company may grant ATO Travel Packages to customers based on the past customer behavior, interaction and so on.

For an example a customers may desire travel flexibility and may be willing to pay for it accordingly. On the other hand, if a travel company has surplus Travel Package capacity, that condition probably represents the loss of potential revenue (and/or opportunity cost) for that travel company. This is true even though no other potential customers have been turned away, simply because there may be one or more customers willing to take that unused surplus Travel Packages at appropriate price/terms. An opportunity thus exists to concurrently generate an incremental revenue benefit for the travel company from consumer surplus, and to maximize the purchase utilities for the customers.

Brief description of APO VOF in the Cruise Industry

In a successful Initial Transaction for an APO VOF between the cruise company and the customer, a customer receives an option to choose up to 'n' out of 'm' selected Cruise Packages (said 'm' Cruise Packages termed "APO Cruise Packages"). The 'n' Cruise Packages that are finally selected are termed "Chosen Cruise Packages". After each of the 'n' Chosen Cruise Packages is defined (or selected or chosen), the customer has the right to utilize (or can utilize) said Chosen Cruise Package. Apart from the 'n' Chosen Cruise Packages, the remaining 'm-n' Cruise Packages are termed "Released Cruise Packages". The Released Cruise Packages (if any, that were probably held or blocked for said customer) may be sold to other customers as normal Cruise Packages or APO Cruise Packages or used for other purposes. The Released Cruise Packages in relation to said option may be reused by the cruise company before, after, at or any combination thereof, the time the Released Cruise Packages and/or Chosen Cruise Packages are defined (or selected).

Numerically, the value of 'm' is greater than or equal to 1 and the value of 'n' may vary from '0' to 'm' depending upon the specific implementation of the APO frame work. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'm' and/or 'n' may be defined and/or re-defined by the cruise company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The Initial transaction may comprise one or more acts. The customer may select (or purchase) all APO Cruise Packages concurrently (i.e., all together in one transaction) or sequentially (i.e., in multiple transactions). In the sequential case, a customer may select one or more Cruise Packages in one or more transactions just before or much before (a few days/weeks/months) the Initial Transaction for APO begins. Said selected Cruise Package(s) (let's say X number of them), thus, may be considered as part of said m APO Cruise Packages of the APO (m, n) transaction, and the customer may select only the remaining (m-X) number of APO Cruise Packages during the Initial Transaction. All the transactions used to select all the APO Cruise Packages of an APO (m, n) instance may be related to each other, and hence, are considered as related transactions.

The APO Cruise Packages may be selected by the cruise company, the customer, another entity or any combination thereof. The APO VOF may enable a customer to have flexibility by selecting m Cruise Packages and use said flexibility to satisfy his/her needs. Therefore, the customers would usually have the right to select (or define) the Chosen Cruise Packages. However, in different implementations of APO VOF, the cruise company, the customer, another entity or any combination thereof may select one or more of the Chosen Cruise Packages related to an APO. The APO Cruise Packages and the Chosen Cruise Packages may be selected by the same entity, different entities or any combination thereof. The cruise company may incorporate the customer information and the data related to the APO into the sales, production, inventory, other database or information system or any combination of the above.

Various algorithms, processes discussed earlier including, but not limited to, Sequential Buy APO, OPS search, Concurrent Buy APO, Customer Notification, implementation of APO in conjunction with other VOFs may be implemented in the cruise industry.

As an example in the cruise industry, cruise companies usually have a higher aggregate capacity than aggregate demand. However, the demand is non-uniform and often leads to fixed and variable costs, increased competition from competitors across different parameters, desire to reach out for newer market segments, the broad spectrum of time period over which the Cruise Packages are sold, a need to develop competitive advantage, and customer attrition rate. On one hand, the customers desire flexibility and are willing to pay for it accordingly. On the other hand, if a cruise company has surplus Cruise Packages or capacity, that condition probably represents the loss of potential revenue (and/or opportunity cost) for that cruise company. This is true even though no other potential customers have been turned away, simply because there may be one or more customers, who have purchased other Cruise Packages of the same or a different cruise company and may be willing to switch to the unused surplus Cruise Packages (or capacity) at appropriate price/terms. But, today they are not able to do so for one or more reasons mentioned above. An opportunity thus exists to concurrently generate an incremental revenue benefit for the cruise company from consumer surplus, and to maximize the purchase utilities for the customers.

For example a customer wants to take a Cruise Package from Honolulu to Maui but he is uncertain whether to travel on $22^{nd}$ May or $25^{th}$ May. Since the customer is unsure of his exact travel plans at the time of purchase and he may not want to wait until the last minute (or till he determine his exact plans) to book Cruise Package as the Cruise Package may become unaffordable or unavailable as the departure date approaches. Thus, the cruise company may offer him an APO for a small price, where in the customer may inform the cruise company on $20^{th}$ May regarding his Chosen Cruise Package (i.e., chosen Departure Date, in this case).

Brief Description of APO VOF in the Entertainment Industry

In a successful Initial Transaction for an APO VOF between the entertainment company and the customer, a customer receives an option to choose up to 'n' out of 'm' selected Entertainment Packages (said 'm' Entertainment Packages termed "APO Entertainment Packages"). The 'n' Entertainment Packages that are finally selected are termed "Chosen Entertainment Packages". After each of the 'n' Chosen Entertainment Packages is defined (or selected or chosen), the customer has the right to utilize (or can utilize) said Chosen Entertainment Package. Apart from the 'n' Chosen. Entertainment Packages, the remaining 'm-n' Entertainment Packages are termed "Released Entertainment Packages". The Released Entertainment Packages (if any, that were probably held or blocked for said customer) may be sold to other customers as normal Entertainment Packages or APO Entertainment Packages or used for other purposes. The Released Entertainment Packages in relation to said option may be reused by the entertainment company before, after, at or any combination thereof, the time the Released Entertainment Packages and/or Chosen Entertainment Packages are defined (or selected).

Numerically, the value of 'm' is greater than or equal to 1 and the value of 'n' may vary from '0' to 'm' depending upon the specific implementation of the APO framework. The value of 'm' and/or 'n' may be known (or defined and/or re-defined) before, during or after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'm' and/or may be defined and/or re-defined by the entertainment company, the customer, another entity or any combination thereof. For example, the value of n may not be defined at the time of Initial Transaction. In case the value of m is redefined after being defined at least once before, the new value of 'in' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The Initial transaction may comprise one or more acts. The customer may select (or purchase) all APO Entertainment Packages concurrently (i.e., all together in one transaction) or sequentially (i.e., in multiple transactions). In the sequential case, a customer may select one or more packages in one or more transactions just before or much before (a few days/weeks/months) the Initial Transaction for APO begins. Said selected package(s) (let's say X number of them), thus, may be considered as part of said m APO Entertainment Packages of the APO (in, n) transaction, and the customer may select only the remaining (m-X) number of APO Entertainment Packages during the Initial Transaction. All the transactions used to select all the APO Entertainment Packages of an APO (m, n) instance may be related to each other, and hence, are considered as related transactions.

The APO Entertainment Packages may be selected by the entertainment company, the customer, another entity or any combination thereof. The APO VOF may enable a customer to have flexibility by selecting m Entertainment Packages and use said flexibility to satisfy his/her needs. Therefore, the customers would usually have the right to select (or define) the Chosen Entertainment Packages. However, in different implementations of APO VOF, the entertainment company, the customer, another entity or any combination thereof may select one or more of the Chosen Entertainment Packages related to an APO. The APO Entertainment Packages and the Chosen Entertainment Packages may be selected by the same entity, different entities or any combination thereof. The entertainment company may incorporate the customer information and the data related to the APO into the sales, production, inventory, other database or information system or any combination of the above.

The entertainment industry comprises of several industries including, without limitation, performing arts entertainment (including, without limitation, music theatre, vaudeville, comedy, film, music, dance, drama, opera, magic, concerts), exhibition entertainment (including, but not limited to, museum, wax museums, amusement park, trade and other shows, fairs, themed retails, busking), mass media entertainment (including, but not limited to, film, film studios, movie theatres, cinemas, television broadcasting, radio broadcasting, recording companies, discotheques, news media), electronic entertainment (including, but not limited to, computer games, video games, sms, internet), sporting entertainment events (including, but not limited to, tickets for baseball games, boxing matches, hockey matches, football games), advertisement slots in any of the above mentioned industries and/or companies and so forth. The APO VOF may be implemented in one or all of the industries mentioned above. Companies and/or customers in each of the industries mentioned above, and others not specifically mentioned above, may generate benefit from the APO VOF.

Various algorithms, processes discussed earlier including, but not limited to, Sequential Buy APO. OPS search, Concurrent Buy APO, Customer Notification, implementation of APO in conjunction with other VOFs may be implemented in the entertainment industry.

As an example in the entertainment industry, entertainment companies usually have a higher aggregate capacity than aggregate demand. However, the demand is non-uniform and often leads to fixed and variable costs, increased competition from competitors across different parameters, desire to reach out for newer market segments, the broad spectrum of time period over which the Entertainment Packages are sold, a need to develop competitive advantage, and customer attrition rate. On one hand, the customers desire flexibility and are willing to pay for it accordingly. On the other hand, if an entertainment company has surplus packages or capacity, that condition probably represents the loss of potential revenue (and/or opportunity cost) for that entertainment company. This is true even though no other potential customers have been turned away, simply because there may be one or more customers, who have purchased other Entertainment Packages of the same or a different entertainment company and may be willing to switch to the unused surplus Entertainment Packages (or capacity) at appropriate price/terms. But, today they are not able to do so for one or more reasons mentioned above. An opportunity thus exists to concurrently generate an incremental revenue benefit for the entertainment company from consumer surplus, and to maximize the purchase utilities for the customers.

For example, a customer plans to watch a movie and but he is uncertain about the times, i.e., either to watch a 6:30 PM or a 9:30 PM show. Since the customer is unsure of his plans at the time of purchase and he may not want to wait until the last minute (or till he determine his exact plans) to book the ticket as the ticket may become unaffordable or unavailable as the show date and time approaches. Thus, the entertainment company (i.e., the theatre company, in this case) may offer him an APO for a small price, where the customer may inform the theatre company by 5:30 PM regarding his Chosen Show.

Brief Description of APO VOF in the Event Management Industry

In a successful Initial Transaction for an APO VOF between the event management company and the customer, a customer receives an option to choose up to 'n' out of 'm' selected Packages (said 'm' Packages termed "APO Packages"). The 'n' Packages that are finally selected are termed "Chosen Packages". After each of the 'n' Chosen Packages is defined (or selected or chosen), the customer has the right to utilize (or can utilize) said Chosen Package. Apart from the 'n' Chosen Packages, the remaining 'm-n' Packages are termed "Released Packages". The Released Packages (if any, that were probably held or blocked for said customer) may be sold to other customers as normal Packages or APO Packages or used for other purposes. The Released Packages in relation to said option may be reused by the event management company before, after, at or any combination thereof, the time the Released Packages and/or Chosen Packages are defined (or selected).

Numerically, the value of 'm' is greater than or equal to 1 and the value of 'n' may vary from '0' to 'm' depending upon the specific implementation of the APO framework. The value of and/or 'n' may be known (or defined and/or re-defined) before, during or after the Initial Transaction and/or any combination thereof. The value of n may be limited to less than the value of m, or n<m (i.e., n<=m-1); however, in some situations, n may be equal to m. The value of 'n' may or may not be known (or defined and/or re-defined) at the time of the Initial Transaction. The value of 'm' and/or 'n' may be defined and/or re-defined by the event management company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'm'. In some of the cases, the value of new 'n' may be even greater than the older value of 'm'.

The Initial Transaction may comprise one or more acts. The customer may select (or purchase) all APO Packages concurrently (i.e., all together in one transaction) or sequentially (i.e., in multiple transactions). In the sequential case, a customer may select one or more packages in one or more transactions just before or much before (a few days/weeks/months) the Initial Transaction for APO begins. Said selected package(s) (let's say X number of them), thus, may be considered as part of said m APO Packages of the APO (m, n) transaction, and the customer may select only the remaining (m-X) number of APO Packages during the Initial Transaction. All the transactions used to select all the APO Packages of an APO (m, n) instance may be related to each other, and hence, are considered as related transactions.

The APO Packages may be selected by the event management company, the customer, another entity or any combination thereof. The APO VOF may enable a customer to have flexibility by selecting m Packages and use said flexibility to satisfy his/her needs. Therefore, the customers would usually have the right to select (or define) the Chosen Packages. However, in different implementations of APO VOF, the event management company, the customer, another entity or any combination thereof may select one or more of the Chosen Packages related to an APO. The APO Packages and the Chosen Packages may be selected by the same entity, different entities or any combination thereof. The event management company may incorporate the customer information and the data related to the APO into the sales, production, inventory, other database or information system or any combination of the above.

Event management comprises of several industries including, without limitation, social and cultural events, festivals, sporting events (for example, including, but not limited to, baseball, hockey, football, cricket, basketball), corporate events (including, but not limited to, product launches, press conferences, corporate meetings, conferences), marketing programs (including, but not limited to, road shows, grand opening events), special events (including, but not limited to, concerts, award ceremonies, film premieres, launch/release parties, fashion shows, private (personal) events such as weddings and bar parties, so forth). The APO VOF may be implemented in one or all of the industries mentioned above. Companies and/or customers in each of the industries mentioned above, and others not specifically mentioned above, may generate benefit from the APO VOF.

Various algorithms, processes discussed earlier including, but not limited to, Sequential Buy APO, OPS search, Concurrent Buy APO, Customer Notification, implementation of APO in conjunction with other VOFs may be implemented in the event management industry.

As an example in the event management industry, event management companies usually have a higher aggregate capacity than aggregate demand. However, the demand is non-uniform and often leads to fixed and variable costs, increased competition from competitors across different parameters, desire to reach out for newer market segments, the broad spectrum of time period over which the packages are sold, a need to develop competitive advantage, and customer attrition rate. On one hand, the customers desire flexibility and are willing to pay for it accordingly. On the other hand, if an event management company has surplus packages or capacity, that condition probably represents the loss of potential revenue (and/or opportunity cost) for that event management company. This is true even though no other potential customers have been turned away, simply because there may be one or more customers, who have purchased other event management packages of the same or a different event management company and may be willing to switch to the unused surplus event management packages (or capacity) at appropriate price/terms. But, today they are not able to do so for one or more reasons mentioned above. An opportunity thus exists to concurrently generate an incremental revenue benefit for the event management company from consumer surplus, and to maximize the purchase utilities for the customers.

For example, a customer wants to organize a dance party for the employees of his company but he is uncertain right now whether to arrange the same on $24^{th}$ December or $26^{th}$ December since it depends upon his travel plans which are uncertain at this time. But the customer may not want to wait until the last minute (or till he determine his exact travel plans) to book the venue as the charges for booking may become unaffordable or the booking may become unavailable as the event date approaches. Thus, an event management company may offer him an APO for a small price, where in the customer may inform the event management company by $20^{th}$ December regarding his Chosen Package (i.e. Chosen Booking Date, in this case).

Cyclic Buy Option (CBO) Value Option Framework

The creation and utilization (in two stages or acts) of another value option framework will now be discussed. This is the Cyclic Buy Option (CBO) VOF. A company may implement the CBO VOF in any industry. The customers' cyclic need for product utilization (defined below) is used as the targeted value element. A detailed demonstration of the CBO VOF is presented followed by a few examples of applying the CBO VOF within other industries.

The first stage in the CBO VOF involves steps (or acts) of capturing customer dynamics, assessing company operations and economic factors, integrating customer dynamics with company economic factors, formulating the VOF and optimizing the VOF. The second stage involves carrying out a dynamic interaction with the customer and then executing an Event Optimizer process. The specific detailed steps with respect to the CBO VOF will now be discussed.

Figure 95:
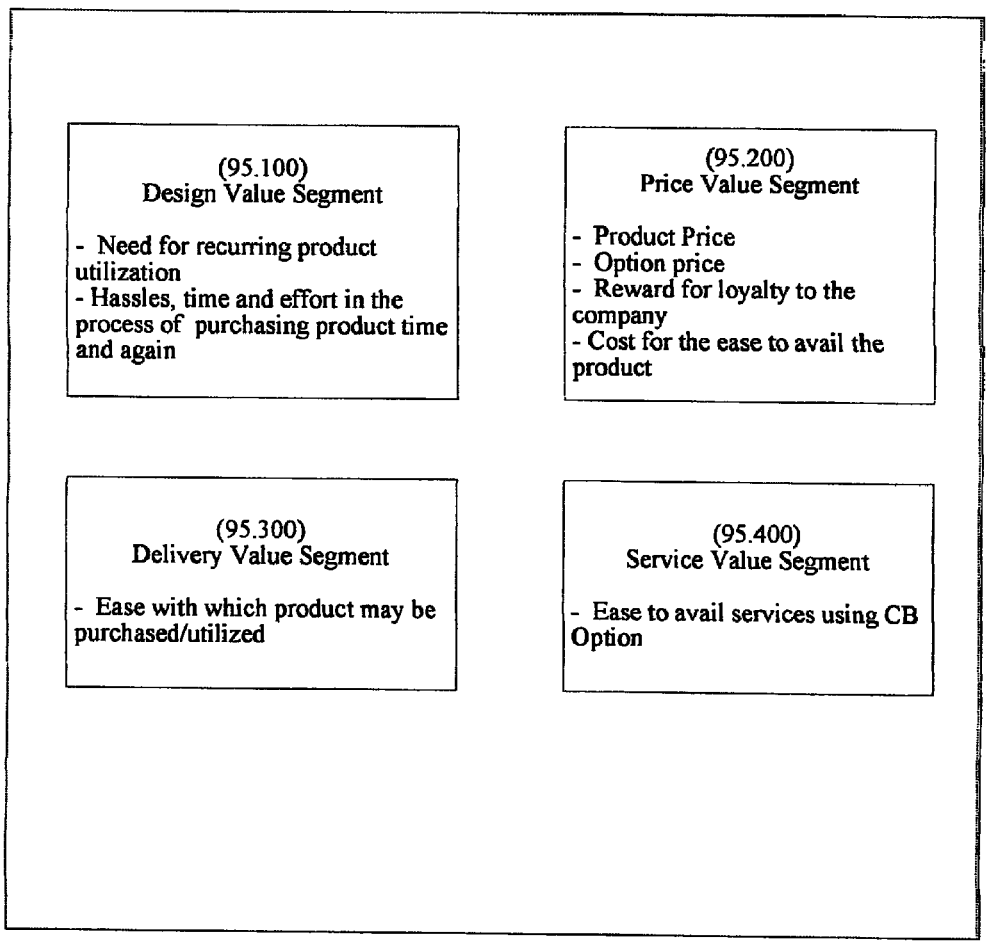
FIG. 95 is a diagrammatic illustration of an exemplary set of value segments and their value elements in the context of CBO VOF.

First Stage: Formulation of CBO Value Option Framework (1) Capturing Customer Dynamics FIG. 95 shows an analysis of the value elements that are believed to matter to customers in relation to a CBO VOF. In the design value segment, shown in Box 95.100, important value elements may include, but are not limited to; the customers' cyclic need for product utilization, time, effort and hassles involved in the process of searching and/or purchasing product repeatedly. In the price value segment, shown in Box 95.200, important value elements may include, but are not limited to, Product Price, option price and reward for customer loyalty and/or cost for the ease to avail the product. In the delivery value segment, shown in Box 95.300, important value elements may include, but are not limited to, ease with which the products may be searched, purchased and/or utilized using the option i.e., reduced hassles, reduced time and energy. In the service value segment, the important value elements may include, but are not limited to, the ease with which CB option could be used to avail facilities using the CB option.

The customers' "cyclic need for product utilization" is subjective in terms of "Cyclic Buy period", "frequency of utilization", "fixed aspects" and "variable aspects" of the need and/or the option. The term "Cyclic Buy period" refers to the time period for which customer may express his or her need to utilize the product. The term "frequency of utilization" refers to number of time for which customer may utilize the product in the given Cyclic Buy period. The term "fixed aspects" may refer to known, defined parameters of the need and/or option. The fixed aspects may be considered as the constant aspects relating to the need and/or the option. Normally, the fixed aspects may remain constant and may not change. However, the fixed aspects may not remain constant over a period of time. The "variable aspects" may refer to the unknown, undefined parameters and/or variables of the need and/or the option. The variable aspects may be completely unknown at the time of buying the option or may comprise of less-known preferences of the customer on basis of which the option is constructed. However, the completely unknown and undefined variables (parameters, preferences) may have a defined range within which they are variable. The Cyclic Buy period, frequency of utilization, type of services required, fixed and variable aspects of the need and/or the option may be subjective and may differ from customer to customer, or even for the same customer, may differ from one situation to another.

(2) Assessment of Company Economics

An assessment of the crucial economic factors of a company, as indicated in Box 96.100, may reveal the factors to include, but not be limited to, incremental revenue generation, cost incurred in maintaining customer loyalty, uncertainty of future demands, customer dissatisfaction over lengthy and/or time consuming search, purchase and/or utilization processes, fixed and variable costs, loss due to future demand shortages, need to develop competitive advantage, customer attrition rate.

An assessment of the crucial economic factors of a company may be performed, to determine the factors that affect the profitability, growth and goals of the company. It might be beneficial if a company, utilizing the inventive system and method, were able to express cost elements in a real-time or quasi-real-time (i.e., up to date) dynamic fashion so that such information may then be used to assess the profitability or contribution of each product sale opportunity, and to facilitate the operation of the Event Optimizer (so that offers and actions may be based on real-time or near-real-time information).

(3) Integration of Customer Dynamics with Company Economic Factors

FIG. 96 also illustrates an example of how a mapping may be done, between the customer and company profiles, for the CBO VOF in any industry. On one side, there are customers who may have a cyclic need for product utilization and they may desire to avoid hassles (including, but not limited to, reduction in time, effort and money involved) every time while searching, purchasing and/or utilizing the product. However, customers may also be concerned about problems that may relate to any future commitment made in advance including, but not limited to, lack of service, lack of dynamism with respect to changing needs that one may go through if they agree to participate in such an option (pass). On the other side, a company faces an uncertainty of future demands, possibility of customer attrition. It would be certainly very helpful for a company to know the future needs of customers to optimize its business dynamics.

The CBO VOF may thus, be created based on the value element "cyclic need for product utilization". More specifically, as shown in the interaction between the Box 96.200 and Box 96.300, a mapping is performed between important customer value elements and the company economic factors. The value element "cyclic need for product utilization" is extracted, as shown in Box 96.400 and a CBO value option framework is created.

(4) Formulating the "CBO" Value Option Framework

Structure of CBO Value Option Framework in Any Industry

FIG. 97 displays the structure of a CBO value option framework (shown in Box 97.100) in any industry. The CBO value option framework is related to the value element "cyclic need for product utilization", as shown in Box 97.110.

Consider a company that has one or more products and each product is uniquely defined by a set of at least k different types of value elements or parameters. Thus, a specific value or definition of each of such k parameter is needed to completely define a specific product.

In the "Initial Transaction" for CBO, shown by Box 97.200, a customer (shown by Box 97.210) and a company (shown by Box 97.220) transact on the CBO value option. There may be one or more Events (shown by Box 97.230 and Box 97.240) that follow the Initial Transaction.

In a successful Initial Transaction for a CBO option, the customer may express his/her need to utilize a product more than once and may receive an option to utilize up to 'n' out of 'm' selected products (said 'm' products termed "CBO Products"). A CBO option, for at least a product associated with k value elements, may consist of a set of "f" Fixed Parameters and "v" Variable Parameters (where k is equal to the sum of f and v). The 'f' fixed parameters, which are known or defined before and/or during the Initial Transaction, are referred to as "Fixed Parameters" of the CBO option, while the other remaining 'v' variable parameters, which are undefined or partially defined at the time of Initial Transaction, are termed as "Variable Parameters" of the CBO option. Usually, the Variable Parameters are partially defined during the Initial Transaction and may only take a value within a specified range or set of values. The exact value of such Variable Parameters may be defined at any time after the Initial Transaction either by the company, the customer or an entity designated by the company or the customer or any combination thereof.

In a given CBO option, a customer receives an option to utilize up to n out of m selected products, where for each said product a set of f Fixed Parameters and v Variable Parameters are defined. There may be a set of one or more conditions associated with the CBO option that allows an entity to define the v Variable Parameters. After the Initial Transaction, there shall be one or more events and during each event one or more of the following act may take place, including, but not limited to, an entity defining one or more Variable Parameters, utilization of one or more products, change in one or more conditions of the CBO option or execution of one or more conditions associated with said CBO option and so forth.

During the Initial Transaction and/or at one or more of the subsequent events (related to the CBO VOF), the CBO VOF may enable to concurrently optimize the benefit and/or value for at least two or more of the customer, the company, or another entity or any combination thereof.

Said Variable Parameters of the option may be defined before and/or during utilization of the product. Variable Parameters of the product and/or option may be defined and or redefined by the customer, company and or an entity other than the company or any combination thereof, before and/or during utilization of CBO Product. The parameters may also be defined before the customer utilizes the product. Frequency of utilization and Cyclic Buy period along with the value of 'm' and 'n' may be defined as a part of Fixed and Variable Parameters.

The 'n' products that are finally selected are termed 'Chosen Products'. After each of the 'n' Chosen Products is defined (or selected or chosen or received), the customer has the right to utilize (or can utilize) said Chosen Product. Apart from the 'n' Chosen Products, the remaining 'm-n' products are termed "Released Products". The Released Products (if any, that were probably held or blocked for said customer) may be sold to other customers as normal products or CBO Products or used for other purposes.

Numerically, the value of 'm' and 'n' may vary depending upon the specific implementation of the CBO framework. The value of 'm' and/or 'n' may be known (or defined and/or re-defined) before, during or after the Initial Transaction and/ or any combination thereof. The value of 'n' may or may not be known (or defined and/or re-defined) at the time of the Initial Transaction. The value of 'n' may be defined in one or more transactions. The value of 'n' may be defined (and/or re-defined), at one or more times, by the company, the customer, another entity or any combination thereof. For example, the value of n may be defined at the time of Initial Transaction. In case the customer needs to change his/her needs regarding the product and/or the option, the value of n may be redefined after being defined at least once before, the new value of 'n' may be greater than or less than the older value of 'n'.

The number of products (i.e., n) that the customer may utilize may depend on a time limit, usage limit, another condition (for example, a CBO option offered by an airline may allow a customer to fly on any flight with a load factor less than 85% at 3 days before departure) or any combination thereof.

The CBO Products may be defined by the company, the customer, another entity or any combination thereof. The CBO VOF may enable a company and/or an entity other than the company or any combination thereof, to obtain possible details of the cyclic need of the CBO customers (i.e., those who opted for CBO) and use said needs to create a CBO option for the customer and/or for a customer other than the customer who has opted for the CBO option. Therefore, the company would usually have the right to create (or define) the CBO option. However, in different implementations of CBO VOF, the company, the customer, another entity or any combination thereof may select one or more of the "Fixed Parameters" and "Variable Parameters" of the CBO option. The Fixed and Variable Parameters of the CBO option may also consist "Cyclic Buy period" and "Frequency of utilization" among them. The Fixed Parameters and the Variable Parameters may be selected by the same entity, different entities or any combination thereof. For example, the customer may give an idea of the "Fixed Parameters" and the company may define the "Variable Parameters" during and/or before the product utilization. The company may incorporate the customer information and the data related to the CBO into the sales, production, inventory, other database or information system or any combination of the above.

The time when an Initial Transaction is completed (i.e., the customer receives the CBO option) is referred to as the Initial Transaction Time (or ITT, in short). One or more of said Fixed Parameters may be defined, at one or more times, before, after, during, or any combination thereof, the Initial Transaction and/or the time said option is delivered to the customer (or the customer receives said option) or any combination thereof. Said Variable Parameters may be defined at one or more times before, during, after product utilization or any combination thereof.

The delivery of an option may include, but not limited to, electronic delivery of the option, physical delivery of the option, any other mode of delivery or any combination thereof. The value of m, n, f and v may be defined before, after or any time, the option being delivered to the customer. The delivery of option may occur in relation to the customer purchasing at least one product. However, in some case, the delivery of option may occur even in relation to the customer purchasing no product.

A customer may select one or more options in relation with one or more products that he/she has selected prior to selecting the CBO option. Said selected Product(s) (let's say X number of them), thus, may be considered as part of said CBO option. The customer may select only the remaining (m-X) number of products for the CBO option, during the Initial Transaction. All the transactions used to select (or receive) the CBO option instance are related to each other, and hence, are considered as "related transactions" (as defined earlier).

A CBO VOF may consist of a number of "related transactions" when all the CBO Products are received one after another by paying/receiving a price in one or more transactions or acts. The price may include, but is not limited to, a monetary value, coupons, discount vouchers, other benefits such as loyalty program benefits, or any combination of the above. The transactions may be related due to a relationship during the Initial Transaction, one or more of the previously executed transactions, any other transaction or combination thereof. Said payment transaction(s) may be one more transaction apart from the initial interaction and/or Initial Transaction. In another implementation of the CBO VOF, the payment transaction may be the Initial Transaction only. The customer may define the "Variable Parameters" while and/or before utilizing the CBO option and/or the CBO product. The company, an entity other than said company and/or any combination thereof may reserve the right to define the "Variable Parameters", before, on or before, after, on or after or any combination thereof, a stated notification deadline date. The customer may relinquish his/her right to choose and/or define the product and/or one or more of the option parameters.

A company may choose to create one or more instances of the CBO VOF based on factors including, but not limited to, Fixed Parameters and Variable Parameters of the cyclic need of the customer, Frequency of the utilization, the period for which the option is required, other factors or any combination thereof. For example, a CBO VOF based on a combination of the number of Fixed Parameters (or f) and Variable Parameters (or v) would be CBO (f, v). Some CBO instances are shown in Boxes 97.120, 97.130, 97.140 and 97.150. For example, when the number of Variable Parameters is predetermined, the CBO (4,2) instance may imply that the customer and/or the company defines 4 Fixed Parameters, and according to the terms and conditions of the CBO VOF, the company and/or the customer may define remaining 2 (two) Variable Parameters during and/or before the utilization of CBO Product. Said example of CBO VOF may be further extended for a wide range of Fixed Parameters and Variable Parameters.

The CBO (3,2) instance, three Fixed Parameters and two Variable Parameters, is used here as an example to demonstrate the details of the structure of a CBO VOF. Box 97.200 refers to the Initial Transaction between the customer and the company, in which they transact on a CBO (3,2) value option. In a successful Initial Transaction for CBO (3,2), the customer and/or the company defines three Fixed Parameters and later, during and/or before the product utilization, the customer and/or the company may define two Variable Parameters as per the terms and conditions of the option contract.

The Initial Transaction may have terms and conditions applicable to the customer or the company or both. These terms and conditions may be set, preferably, to concurrently benefit both parties and/or another entity or any combination thereof. The connections between Box 97.200 and 97.220, and Box 97.200 and 97.210 refer to the terms and conditions to the company and the customer, respectively.

The CBO VOF may or may not include any constraints on the CBO Products. For example, a company may restrict CBO Option applicability and availability on the Products that satisfy specific criteria. A CBO option constituting one or more CBO Products may or may not include restricted CBO Products. Said restriction may prevent the CBO Product to be included in the CBO Option that is constructed on the basis of preferences and/or in formations and/or "defined" and Variable Parameters and Fixed Parameters provided by the company, customer, an entity other than the company and/or any combination thereof.

A customer may select (or receive) CBO option and/or CBO Products) in several ways; through mutual agreement (e.g., during a direct interaction such as a Product purchase), or the company may grant the CBO Option to the customer without soliciting their interest or permission. For example, to enhance customer satisfaction or for any other purpose, a company may grant CBO Option to customers based on the past customer behavior, interaction and so on.

The Initial Transaction may impose one or more conditions on the company. A company may be required to explicitly notify the customer prior to or no later than a given date and time (referred to as the Notify Deadline) regarding the Variable Parameters of the CBO option. In one of the implementations, where customer has the right to finalize the Variable Parameters, the customer may be required to explicitly notify the company prior to or no later than a given date and time (referred to as the Notify Deadline) regarding the Variable Parameters of the CBO option. For simplicity, it is assumed that whenever the term Notify Deadline is used in the following sections, the condition requires notification prior to the Notify Deadline. If there is no such explicit notification condition, the Variable Parameters may be decided as per the terms and conditions of the option contract. In either of the cases, (explicit or implicit notification), the date and time, when the finalization of Variable Parameters is notified to and/or by the customer, is referred to as the Customer Notification Time (or CNT, in short). In the current discussion, the explicit notification condition is assumed unless specifically mentioned otherwise.

A company, customer, an entity other than the company or any combination thereof may determine one or more Notify Deadlines for a CBO Product at one or more times (e.g., before, during, after the Initial Transaction or any combination thereof) using factors including, but not limited to, customer needs, customer's flexibility with respect to the notification period, one or more of the option parameters and/or features, company profitability goals, any other factors or any combination of the above. Customer factors should also be considered in determining the Notify Deadlines, such as the flexibility trade-in periods desired by customers, or any other factor that may affect the behavior of a customer. A CBO product, which may or may not be a part of the CBO option may or may not have a notification deadline condition. The CB option itself may or may not have a notification deadline condition.

In the context of the CBO VOF, the term "price" normally refers to the price which the customer may pay to the customer in relation to the CB option. However, in some of the implementations of CBO VOF, the company may also offer a price to the company in relation to the CB option and/or product, which may be referred as "reward" or "discount". The terms "reward" and "discount" may be used interchangeably as and when the context requires.

The CBO VOF may impose additional terms and conditions on the customer. The company and/or an entity other than the company may receive from customer, at one or more times, an indication of one or more terms and conditions associated with said option in the CBO VOF. Similarly, at least one of said company and/or an entity other than said company may deliver to said customer, at one or more times, one or more terms and conditions associated with said option in the CBO VOF. There may or may not be any payment transaction related to the Initial Transaction and/or other event related to the CBO VOF. There may be one or more prices related to the CB Option. There may also be one or more rewards and/or discounts related to the CBO option. A price may include, but is not limited to, a set of one or more Product Prices, a set of one or more rewards to the customer, price paid by the customer to the company for fulfillment of his/her cyclic needs with ease or any combination of the above. A company may choose to implement CBO Option Prices in many ways. For example, a customer may pay the entire CBO Option Price for all the CBO Products he/she is intending to use in the "Cyclic Buy Period" in advance. In another implementation of the CBO VOF, the customer may pay the CBO option Price in installments. A company, an entity other than the company or any combination thereof may use the method of its choosing to decide on all the CBO Option Prices.

The customer may receive one or more rewards and/or discounts during the Initial Transaction (which is referred to as an Initial Price), at the CNT (which is referred to as an Exercise Price) and/or at any other time, which may or may not be pre-determined between the customer and the company. The reward may be a function of number of "Frequency of utilization", "Cyclic Buy period", "Fixed Parameters" and/or "Variable Parameters" one or more Product Prices, any other factors of company's choosing or any combination of the above.

The price may consist of a monetary value or a soft/non-monetary value (e.g., benefits, coupons or exchange of another service) or other consideration. The CBO Option Price may be fixed or variable, with or without bounds. The company may set permissible range(s) or boundary limit(s) within which the CBO Option Price may vary, or it may offer the customer a set of prices to choose from. Since price conditions may depend upon various factors, which may or may not be variable, the same may be decided at anytime. The price conditions may be determined by the customer, the company, another entity, or any combination thereof at one or more times. One or more prices (CBO Option Initial or CBO Option Exercise or any other price) may be a negative value, which reflects that instead of the customer paying the company, the company shall reward the customer.

The Notify Deadline for each CBO Product may be predefined or may be defined/redefined later (i.e., for example, before or during the product utilization by the customer) by the company, the customer or mutually by both. In one or more implementations of the CBO VOF, the Notify Deadline may be part of the "Variable Parameters" while in other implementations, Notify Deadline may belong to the set of "Fixed Parameters". There may be one or more Notify Deadlines, where each Notify Deadline may have a different price associated to it.

The Variable Parameters may be undefined and/or tentatively defined at the time of Initial Transaction between the customer and the company. The customer may have the right to finalize one or more of the Variable Parameters related to the CBO Option. There may be one or more conditions relating to the Variable Parameters and the Notify Deadline. The option contract may include one or more terms and conditions that may not allow the company to notify the customer and vice versa after the predefined No Deadline. As an operational measure, a rule may be set that if the company (and/or an entity other than the company) or the customer fails to notify the customer or the company (and/or an entity other than the company) respectively before the predefined Notify Deadline, the customer or the company or an entity other than the company may have the right to define the Variable Parameters regarding utilization of the said "CBO Product". Another approach may be (e.g., for customer/company) to designate a set of default rules for the said Variable Parameters (during or after receiving the CB Option). If the company (and/or an entity other than the company) or the customer fails to notify the customer or the company respectively of the final set of Variable Parameters, the default rules should derive the final Variable Parameters. The default rules may be redefined by the company, the customer and or an entity other than the company after said default rules has been defined one or more time. The price of the CBO Product in case of application of the default rules may or may not be equal to the exercise price for the original CBO Product. While one or more conditions included in the option contract may or may not include the Notify Deadline itself in the Variable Parameters.

The CBO option and/or the CBO option price may be a function of Fixed Parameters and Variable Parameters of the CBO option, Notification Deadline for the CBO product/option, price of individual product price that constitute CBO option. number of Products, Frequency of Utilization, Cyclic Buy Period or any combination thereof. In one or more situations, the company may choose to pay a price to the customer based on the selection of the CBO Product at a given time.

The CBO VOF may also include conditions imposed on the customer. A customer may be under a mandatory condition to accept the Variable Parameter once it is selected (for e.g., by the company, an entity other than the company or any combination thereof).

A company may determine customer preferences, either explicitly or implicitly, regarding utilization of said CBO Products. The preferences may also include, but not limited to, customer preferences for various products and services, needs, associated relative utilities, flexibilities, preferences regarding choice of Products, quality of Products, acceptable delays (relative) to receive different Products and so forth. A company may seek customer preferences on his/her cyclic need to utilize products which may reduce or eliminate the customer from the hassles involved in searching and purchasing the product time and again, any other parameters or any combination thereof. The company, one or more entities other than the company or any combination thereof may seek customer preferences.

A company may also offer CBO options to one or more customers on the basis of customer preferences, so obtained or collected. The company may offer said CBO options based on the dynamics of the company including, but not limited to, inventory, operational data, revenue management data, cost data, financial data, accounting data, any other internal data any combination thereof and so on.

A company may seek such preferences from the customers prior, during or after the customer has purchased the Product or any combination thereof. These customer preferences may help the company to perform concurrent optimization of value for the company, the customers, one or more entities other than the company or any combination of two or more of the above. The customers may also include the customers whose preferences have not been determined or collected to perform concurrent optimization. The data pertaining to the company, customers, one or more entities other than the company, any combination thereof, may be integrated to concurrently optimize the value for at least any two of said entities. There may or may not be any payment transaction between the company, one or more other entities and/or the customers regarding seeking such customer preferences, delivering CBO options, customer participation in CBO and so on.

The company may operate one or more systems and/or services to monitor the company dynamics. Monitoring may include, but is not limited to, monitoring of capacity, optimization of future inventory with future demand predictions, return and/or potential return of Products, flexible inventory that may be created in relation to said obtained preferences, analyzing various cost, revenue, operational or any other internal data and so on. The company may have one or more systems and/or services to analyze such data on a real-time or quasi real-time basis and draw conclusions on the basis of such analysis. Any of the systems and/or services may be operated by the company, one or more entities other than the company or any combination thereof.

A company may operate a system that defines customer preferences regarding said CBO Products and Fixed Parameters of the option. Said system may define tentative customer preferences regarding Variable Parameters of the option. The company may operate a system that enables use of said preferences to optimize value for at least one of customers, said company and an entity other than said company. Said system may be used to enhance future product selling capacity and may generate upfront revenue for the company. The company may use such preferences to offer CBO. A company may concurrently optimize value for at least two of customers, said company and at least one entity other than said company.

The company may utilize such preferences to gather information regarding possible future demands and may accordingly estimate current and future inventory requirement to optimize the business dynamics of the company. These customer preferences may enable the company to optimize the capacity for its products in present and/or in the future. The company may have an idea of the probable future demands and may accordingly optimize its capacity. The CBO option may also enable the company to instantly increase company's revenue whenever company opts for the implementation. Such preferences may help the company to allay fears of customer attrition and may help in maintaining customer loyalty. Thus, it may eventually allow the company to capture future demand that may otherwise, have been spilled and thereby enhancing its revenues through gaining more customer satisfaction and loyalty.

A company may offer CBO option to all customers or any selected customers, such selection may be based on any criterion including, but not limited to, such as those who have expressed their relative preferences, those who have not expressed any preferences. By integrating the company dynamics and collected customer preferences, a company may offer appropriate incentives and terms and conditions for CBO to generate desired participation. A company may exercise its right (from CBO) to define the Variable Parameters for one or more CBO customers depending on company's requirement regarding said product's capacity, other company economics, any other factor of company's choosing and so forth. A company may be in a better position to offer appropriate CBO offers at a later stage due to many factors including, but not limited to, the company having better knowledge of internal and external dynamics, a relatively better knowledge of the customer dynamics i.e. Design Value, Price Value, Delivery Value and Service Value regarding the product and so on.

Consider an example. Once the Initial Transaction is successful, there may be at least two possible related events, as shown by Box 97.230. The two events are (1) that A11 is finalized as the Variable Parameter A1 (as shown by Box 97.2310) and (2) that A12 is finalized as the Variable Parameter A1 (as shown by Box 97.2320). Each of these two events may be associated with various terms and conditions on the customer and/or the company. This event may be followed by another event, where the second Variable Parameter A2 has to be decided (as shown in Box 97.240), which again may be followed by two events. The two events are (1) that A21 is finalized as the Variable Parameter A2 (as shown by Box 97.2410) and (2) that A22 is finalized as the Variable Parameter A2 (as shown by Box 97.2420). As explained above, the events may take place in a combination of ways where the company, the customer, an entity other than the company or any combination thereof may finalize the Variable Parameter based on the pre-defined rules. Once the Variable Parameter is finalized, the company and/or the customer may not change the finalized Variable Parameter except within the bounds of the terms and conditions in the option contract. The company or the customer may (or may not) have the right to enforce the final Variable Parameter on the other party as per the terms and conditions of the option contract.

The company may offer incentives to the customers to motivate them to define one or more Parameters as final Variable Parameters of the CBO option that may be more optimal for the company. A company may formulate one or more such offer (may referred to as Chosen Product Incentive Offers) and may send them to customers who have purchased CBO but not yet finalized their Variable Parameters via email, phone, mail or any other communication channel as per the terms and conditions of the option contract. Thus, such customers may be persuaded to select said optimal Parameters in lieu of incentives if the terms and conditions of option contract provide so.

A customer who receives a CBO option is termed as "C". The company may tentatively assign various products to the CBO Customer depending upon his/her preferences for the Variable Parameters. These products may be termed as C1, C2 . . . and so on. Upon finalization of the Variable Parameter regarding the said CBO product, one of these products may become the final product. The company may utilize remaining products.

The above terms and conditions of the CBO VOF may be set in a way to concurrently benefit the customer, the company, any other entity apart from said company involved and/or any combination thereof. The company may benefit from the customer loyalty, predictability of future product demands. The customer may get rid of the hassles and difficulties involved in searching and purchasing the product from same (and/or different) company repeatedly. The company may also benefit from enhanced customer satisfaction, incremental revenue from the upfront money payment by the customer while purchasing the product, incurring lower product selling costs in future and other operational benefits.

A CBO VOF may include a right for the customer to define each of the f Fixed Parameters, and a right for the company to limit the number of v Variable Parameters of the CBO option that the customer may finalize, if the company notifies the customer on a stated Notify Deadline. Said on a stated Notify Deadline may include, but not limited to, on and/or before the stated Notify Deadline, on and/or after the stated Notify Deadline, any combination thereof. The right may include the condition that the company may notify the customer before, at or after the stated Notify Deadline or any combination thereof. The company may offer (or allow) the customers to express their preferences regarding the Variable Parameters before the stated Notify Deadline. The company may or may not exercise their right to limit the customer within the bounds of Variable Parameters while utilizing the said CBO Products. The right may include a condition that the company may limit the customer after the customer expresses his/her preference for the Variable Parameters. The company and/or an entity other than the company may have said limitation on at least one product. There may be a condition imposed on the customer to make at least one payment to the company when the customer expresses his or her need to utilize one of the CBO Products. The company and/or an entity other than the company may allow the customers to define said v Variable Parameters on or before a stated date.

A company may choose to define all the Variable Parameters at one or more times. All Notify Deadlines may or may not be associated with each of the related CBO Products. For example, a Notify Deadline may be after the time when the Product would have been utilized or the company may choose not to offer a Notify Deadline on a specific Product due to one or more reasons. A company may define the Variable Parameters prior to a Notify Deadline.

The costs, revenues, benefits, terms and conditions shown here are for illustration purposes only and actual values could be different depending upon specific values selected by the company for value options, customer behavior, company characteristics, Notify Deadline(s) and other relevant factors.

The CBO VOF structure may be implemented in several ways depending upon the terms and conditions associated with the CBO contract. The CBO VOF structure presented above for the CBO (3,2) instance can be extended to implement any other CBO instance.

The CBO concurrently optimizes value for both the company and its customers. The customer may get rid of the recurring hassles and difficulties involved in searching and purchasing product, which may or may not belong to the same company. The company may get an estimate of future product demands, decisive and or tentative, through the preferences provided by a range of the customers. The presumption here is that customers make a logical decision to take part in the CBO value option framework if they have a cyclic need for the product utilization. The company may also benefit from higher customer loyalty and repeat business and may optimize its profitability through cyclic utilization of the product by the customer.

In one of the implementation of the CBO VOF, a customer may have certain known parameters defined for his or her cyclic need to utilize the product. The customer may want to utilize a certain product on any specific time/time period that is known in advance. In a given implementation of the CBO VOF, a customer may be willing to utilize any of said product(s), which may be defined by the company, customer, another entity or any combination thereof. On the basis of information provided by the customer, the company, another entity and/or both may be able to create an option for said customer, which may fulfill his/her cyclic need to utilize said product.

Here is an example of using the CBO VOF in the movie industry. Sam wants to get movie tickets on some weekends in the next 6 month period. He could use the normal tradition process to purchase a movie ticket every week he wishes to see a movie. However, that process has limitations including, but not limited to, time required and hassle to purchase ticket every time, no guarantee of availability at desired times, and so forth. The movie company may offer CBO to Sam where, Sam pays a small fixed amount upfront and a fixed amount every time Sam wishes to see a movie in the next 6 months. Sam picks his desired list of movie stars and a desired notify deadline of 6 hrs. Now if there is a movie shown by the cinema company on any of its cinema complexes (pre-selected by Sam) that feature Sam's desired movie stars, he can notify the cinema company any time up to 6 hrs prior to his desired movie show time and the company shall provide a guaranteed ticket availability to Sam (along with a companion pass for Sam's friend at a pre-defined rate). The cinema company may block two tickets for Sam (and his companion) for every potential target movie up to 6 hrs prior to show time to ensure availability for Sam, and may release those blocked tickets to other last minute customers if Sam does not express willingness to use those tickets before his notify deadline. In this way Sam gets additional comfort and convenience and saves himself the hassle of buying tickets or dealing with unavailability and can even make an impression on his girl friend every time he takes her to a movie date. On the other hand, the cinema company gets a loyal customer who is much more likely to spend his movie dollars with them every time (or at least more than what he may with no existing CBO), leading to enhanced revenues, lower customer acquisitions costs and enhanced customer satisfaction. Plus, the cinema company gets to learn the specific preferences of its customers (Sam) and may send special promotions to Sam in case Sam does not choose to notify for a specific movie that features his desired list of movie stars. As explained above, there could be many other variations of this example and such may be defined by the cinema company, the customer or an entity other than these two entities. For example, Sam may have to pay up front for a minimum number of movies, or the cinema company may instead have the right to allot a show time within x hrs of the desired show time desired by Sam. In another implementation, the company, another entity and/or both may keep the right of notification to itself. In another implementation, Sam may be allowed to pick the weekend and the cinema company may pick the show time and for such flexibility, the cinema company may offer a reward to Sam.

In another implementation of the CBO VOF, the customer may be given an option of canceling the option at any time with a full and/or partial payment back for the remaining products. This may generate additional customer goodwill for the company and may be able to create additional upfront revenue for the company, as more number of customers may agree to buy an option which they can return if they are not willing to continue and may claim the refund as per the terms and conditions of the option contract. For example. Jon wants to utilize airline flights for next one year, one day before each of the public holiday. Jon may opt for the CBO option, which may allow him to fly one day before every public holiday. Jon selects a desired list of destination cities he wishes to travel and a set of public holidays when he would want to visit each of those desired destinations (for example, either Las Vegas or Orlando on the Labor Day weekend, and any one of New York. Boston or Chicago on the Memorial Day weekend). The airline may charge a fixed upfront amount to Jon (say $100) and he shall pay a variable price structure for each trip depending on the notify deadline and flight offered by the airline at that time. The airline reserves the right to offer a set of at least 3 flight (the arrival/departing airport, the timings of flight) to Jon. The airline is also under the obligation to notify such offer to Jon at least 3 days before each public holiday and to ensure that each such offered flight is to at least one of the desired destinations for the selected public holiday. Jon is under the obligation to select any of those flights offered within 24 hrs of receiving the offered flights, and in case Jon fails to notify within that time period, the airline may select a default flight based on its choice and charge the associated price on the pre-stored Jon's credit card. To reward Jon for sharing his flexibility and future needs and agreeing to travel repeatedly on the same airline, the airline offers a much lower rate (pre-agreed for each destination) to Jon. In this fashion, using CBO, Jon shares his cyclical future needs and his preferences and flexibilities with the airline, and in return, the airline offers a far better rate, confirmed availability and ease of ticket purchase and travel to Jon. The airline may offer Jon the ability to opt out of the CBO option at any time by paying a fixed amount of fee. There can be several variations of the above example. For example, the airline may charge a much higher price upfront, e.g., $3000 for the 10 trips in next year. And if Jon is not willing to fly with said airline after utilizing the option for at least 6 times, he can cancel the option and get back a prorated amount of his money. The option provides for cancellation charge of $200 in the event Jon cancels the option after flying 6 or more times but less than 10 times. In the event that the airline sees very heavy demand at very high prices for its flights on the routes desired by Jon, the airline may send instead an incentive (a cash reward or other benefit) to Jon to cancel the option and thus instead of selling its flights at cheaper price to Jon the airline can sell those seats to higher revenue paying customers. Since Jon is flexible any way, he may also be willing to accept the cancellation offer incentive, thus, concurrently optimizing value for the airline, Jon and even for the new higher revenue paying customers who fly on the seats that would be otherwise used by Jon (as even those customers receive higher utility by receiving desired flights that may otherwise be unavailable). In the event the airline does not see higher demand for its seats, it may continue to service the CBO with Jon by offering those seats to Jon at pre-agreed lower prices. In another variation of the example, instead of cancellation offer, the airline may send an incentive to Jon to change one or more destinations in the desired list of destinations to try to motivate Jon to pick destinations where the airline could easily satisfy Jon's needs (for example, to travel to Las Vegas on the Labor Day weekend instead of the pre-agreed memorial day weekend).

The airline chooses to include Las Vegas trip on the Labor Day because it knows all of the following facts, a) Jon wishes to travel to Las Vegas this year, b) Jon did not visit Las Vegas on Memorial Day as he instead took the Orlando trip at that time with the same airline, and c) Jon desires to make another trip on the Labor Day weekend. The CBO VOF enables such (otherwise complex) transactions that are customized for the individual customers by a large company based on individual customer needs of that hour. This is because of the merit of CBO to enabled customers (Jon in this example) to share their current/future cyclical needs, preferences and relative utilities with the company (the airline in this example) and the airline uses the CBO VOF to concurrently optimize value for itself, the CBO Customer (Jon in this example) and even other customers (of the company like those that use the seats made available by Jon opting out of the option) by dynamically choosing the CBO conditions (and parameter values) based on the pre-stored customer preferences, current operational dynamics, company economics and other parameters of its choosing. The terms and conditions for canceling the option or changing one or more conditions of the CBO option may be governed and/or determined by the company, the customer, an entity other than said company and/or any combination thereof. The company and/or an entity other than the company may refund the amount for the unused portion of the option as per the terms and conditions of the option contract. The price and conditions described in this example are for illustration purpose only, however in actual situations, the price and conditions may be determined by the company, the customer, an entity other than said company and/or any other combination thereof.

In yet another implementation of the CBO VOF, a customer may ask the company to reward his/her flexibility, which may coincide with his/her cyclic need to utilize the product. The product may be defined by the company, another entity, the customer or any combination thereof. This can be illustrated by an example. Man is willing to fly one or two day before every public holiday, but he is flexible to fly at any time on any of those two days. He authorizes the airline to notify him about his flight timings, four days in advance. Airline may choose to reward Matt for his flexibility in his cyclic needs.

In yet another implementation of the CBO VOF, the customer may have unknown but cyclic needs for product utilization. The customer may also seek from the company to choose any notification deadline as per his/her needs and/or utility. The customer may inform the company about his/her needs at any time before utilizing the product (or any time before the minimum possible notification date which may defined by the company, the customer, another entity or any combination thereof). For example, Tom wishes to book a hotel-room with ABC hotel, five times in next three months but he is not sure of the exact dates when he needs the room. Tom may buy the CBO option at the price of $800 (wherein the average charges for the room are $150). The hotel may charge Tom for his undefined needs, surety in room availability any time in the next 3 months. Using this CBO option, Tom may notify to the hotel anytime before the pre-defined notification period. Thus, the CBO option allows Tom with a luxury that he may use the hotel room at any time he wants and there is no risk of non-availability of the room. Said notification deadline may be defined by the customer, the hotel, an entity other than said hotel and/or any combination thereof. In another variation of the same example, the CBO option may include that Tom gets to decide the date he wishes to stay and the hotel reserves the right to select the specific room and the specific hotel property within 10 miles of pre-defined locations, and for this CBO, Tom shall have to pay only $650 for five trips. Thu, Tom enjoys confirmed availability at his desired dates at a much lower price and the hotel gets to optimally allocate rooms and hotel properties to Tom to maximize their overall revenues from other customers. Since Tom is flexible in terms of choosing specific room type or hotel property within the defined parameters, he may be happy to sign up for the CBO option. On the other hand, the hotel gets confirmed revenues from a customer and also gets the option to dynamically decide closer to check-in night and thus optimize their revenues. By sharing a $150 reward ($800-$5650=$150) with Tom, the hotel may be able to sell that particular room (that Tom would other otherwise booked at the regular rate) at a much higher price to customer who derives a much higher utility from the room and is therefore willing to pay a lot higher for that. Thus, CBO enables to concurrently optimize value for Sam, the hotel and other customer who chooses to take the room (otherwise would have been used up by Sam). In yet another variation, the CBO offer may include both of the above conditions, that either Sam could choose the exact property, room type and check-in/check-out date at the pre-defined price of $800 (for 5 trips) or he could receive a $30 rebate per trip if he chooses to take the property/room selected by the hotel for that stay.

In another implementation of the CBO VOF, a customer may have cyclic needs to utilize the products. This derived value may be matched with his/her desire to get an upgrade on preferential basis whenever there may be a possibility to get an upgrade. For example, Michael prefers to fly in Coach cabin due to high cost difference with respect to business or higher cabins. But if given a chance to avail an upgrade by paying an additional small price in comparison to the price difference, lie is ready to be upgraded. So, the airline may offer an option to the Michael, where Michael has to pay $150 in advance, and the option gives him the right to be automatically upgraded for the next 10 times he fly, if there is a possibility to be upgraded in the business class and he may have to pay an additional upgrade exercise cost at the time of upgrade. Hence, the option provides a preference to Michael to be upgraded to business class, whenever there is a possibility of being upgraded. The airline may or may not charge any exercise price for giving upgrades to the customers.

In yet another implementation of the CBO VOF, the company may provide an option to the customer, which may have one or more Variable Parameters. The company and/or an entity other than said company may optimize the customer's specific needs regarding the product utilization to create such an optimized value option framework. The option may constitute one or more predefined features while one or more other features may be decided at the time customer utilizes said product and/or said option. The features may be defined and/or predefined and/or redefined by the company, the customer, an entity other than said company and/or any combination thereof. In doing so the company may be able to create a real dynamic value option framework, which may have one or more customized features that optimizes the customers' specific needs. The specific need of the customers mentioned herein may vary from customer to customer. The CBO VOF may help to create and/or provide real dynamic, customized options to the customers that may cater to their defined (and/ or known) and/or undefined (and/or unknown) needs and may help in concurrently optimizing benefits for at least two of the company, customers, another entity and/or any combination thereof. One example of such a customized CBO option is illustrated herein. Don residing in Boston may have his office in New York. He may, thus, want to fly on every Monday morning flight from Boston to New York and to fly back from New York to Boston on every weekend. Don wants to get an option, which enables him to fly to and fro between Boston and New York on every Monday and weekend for next 6 months. For his specific needs, the airline may offer Don an option in which he can fly from Boston to New York on every Sunday evening or Monday morning flight and from New York to Boston either on Friday evening/night or Saturday morning. The option provides the airline to select the timings of the flights from Boston to New York and Don can select the timings of the flights for the return journey (i.e., New York to Boston). The airline charges Don $6,000 for the option (on the basis of estimated number of flights to be used by Don in next 6 months). In this case, the Fixed Parameters of the customized option may be considered as the duration for which option is required, number of times Don wants to fly, the time when he wants to fly from Boston to New York (i.e., every Monday morning flight). The Variable Parameters of the option may be the timing of return flight from New York to Boston (which may depend upon factors including, without limitation, the time he would be leaving his office on weekend, whether or not it's a long weekend and so on). Thus, the airline by creating a customized option, the airline may be able to create customer loyalty of Don. The airline may or may not choose to reward the customer for his loyalty as such an option may not only create a loyal customer for the airline but may also allow the customer to get rid of the hassles in booking for the airline ticket each and every time, relieves the customer of the uncertainty in confirmed availability of the ticket as per as his needs ad so forth. And on the other hand, such a dynamic CBO option shall enable an airline to assign appropriate flight to Dan for his New York to Boston flight and thus optimize its load factor and revenues.

In yet another implementation of the CBO VOF, a customer may provide to the company, an estimation of his/her future needs and may pay to the company upfront for the same. This may lead to incremental revenue generation for the company and may insure customer loyalty to the company. The customer may seek one or more rewards for his/her loyalty to the company. Such rewards may include, but are not limited to, monetary reward, additional facilities, elite customer treatment and so forth.

The CBO VOF may also be referred to as a dynamically customized pass (customized at an individual customer level based on dynamic assessment of the company economics and customer needs, utilities and preferences at that time) that concurrently optimizes value for at least two of the customer, the company, an entity other than the company or any combination thereof.

The CBO option may also be implemented as a combination of two or more of APO, FRO, UPO or other VOFs, where two or more of these VOFs are combined to create a unique CBO for the customer for his cyclical needs. Some of the examples given above provide this view. For example, the Don (Boston-New York) example may be viewed to be created as a unique combination of the APO and the FRO VOFs and the Michael example may be viewed to be created as a unique combination of the UPO VOF. Some of the detailed methodologies and system mentioned with the various VOFs, including, without limitation, the APO, FRO, UPO VOFs, may also be used in the CBO VOFs.

The CBO VOF may be implemented in one or more of the industries including, but not limited to, automobile sales, real estate, financial services, hotels, travel, car rental, airlines, cruise, computer and other retail sales, and other industries.

Similar applications of CBO exists in the entertainment industry including, but not limited to, performing arts entertainment (including, without limitation, music theatre, vaudeville, comedy, film, music, dance, drama, opera, magic, concerts), exhibition entertainment (including, but not limited to, museum, wax museums, amusement park, trade and other shows, fairs, themed retails, busking), mass media entertainment (including, but not limited to, film, film studios, movie theatres, cinemas, television broadcasting, radio broadcasting, recording companies, discotheques, news media), electronic entertainment (including, but not limited to, computer games, video games, sms, internet, sporting entertainment events (including, but not limited to, tickets for baseball games, boxing matches, hockey matches, football games), advertisement slots in any of the above mentioned industries and/or companies and so forth.

Thus, the dynamic nature of CBO Options as illustrated in the above mentioned illustrations may differentiate the option from other currently existing static options/passes which caters the customers at mass level and does not provide a tailor-made services to the customer as per as their needs. In traditional passes, a perception of presumed mass needs may be imposed on the customer while creating such passes. So constructing such a CBO option for the customer based upon his/her specific needs may concurrently optimize the customer and company values.

5) Optimization of CBO VOF

As mentioned earlier (shown in FIG. 7), in the form of an optional last step in the first stage, a financial analysis may be performed using the existing company and customer data to determine the optimal terms and conditions of the CBO VOF. 'What-if' scenarios may be executed to determine an optimal pricing strategy. The company may want to divide customers using one or more criteria and design separate CBO VOF for each customer segment.

Second Stage: Using the CBO Value Option Framework

After completing the first stage of the method, the company has created a CBO VOF and specific options within that framework. The company may have segmented customers and designed options accordingly. The company is fully prepared to use a structured format comprising one or more CBO value options to interact with its customers in real time to generate benefits for both the company and its customers. The second stage of the CBO VOF is now presented. One or more of the processes and algorithms discussed above including, but not limited to, price, capacity, availability, Buy_N and so forth may be executed in the CBO as well. These processes and algorithms may be used separately and/or in conjunction with the other CBO processes and algorithms mentioned below.

Figure 98:
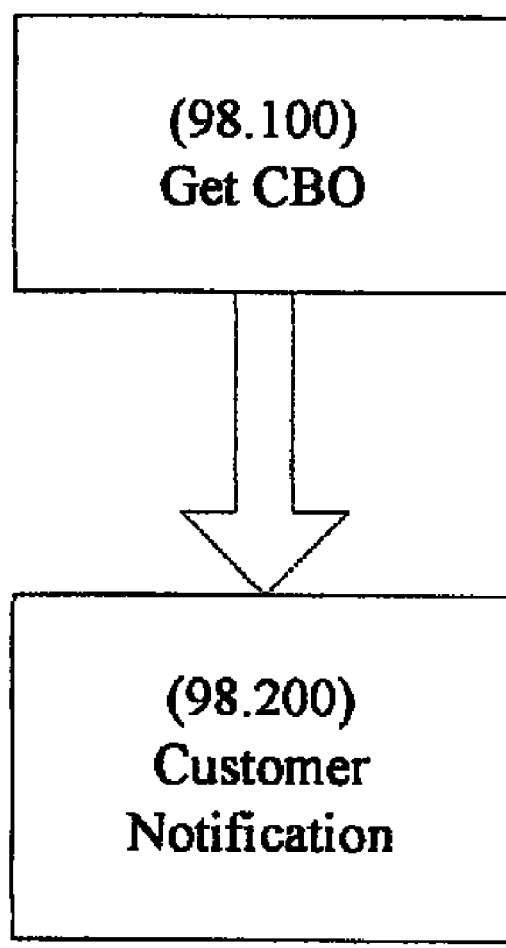
FIG. 98 is a diagrammatic illustration, in a high level flowchart, of a process for CBO VOF implementation.

The implementation of the CBO VOF between the company and its customer takes place through two high level acts, as shown in FIG. 98. In Act 98.100, the 'Get CBO' process, an interactive event between the customer and the company's web server, runs to carry out the Initial Transaction of the CBO VOF. In this Act, a number of algorithms, may be executed (e.g., availability, CBO Price, Product Price, Notify Deadline, and so forth) on the company's server to optimally calculate the terms and conditions of the CBO VOF to concurrently benefit both the company and the customer. In Act 98.200, the Customer Notification process (explained later) is executed. In this process, the Chosen Product is notified to the customer. The process may also comprise one or more event optimizer algorithms that may help to optimally select the Chosen Product and/or to optimally use (or reuse) the Released Product.

1. 'Get CBO'—Dynamic Interaction to Capture Customer Demand

In the Get CBO process, a customer interacts with the company's server to receive a CBO. The interaction may take place (for example) via phone, in-person or on a website.

Get CBO Process

Figure 99:
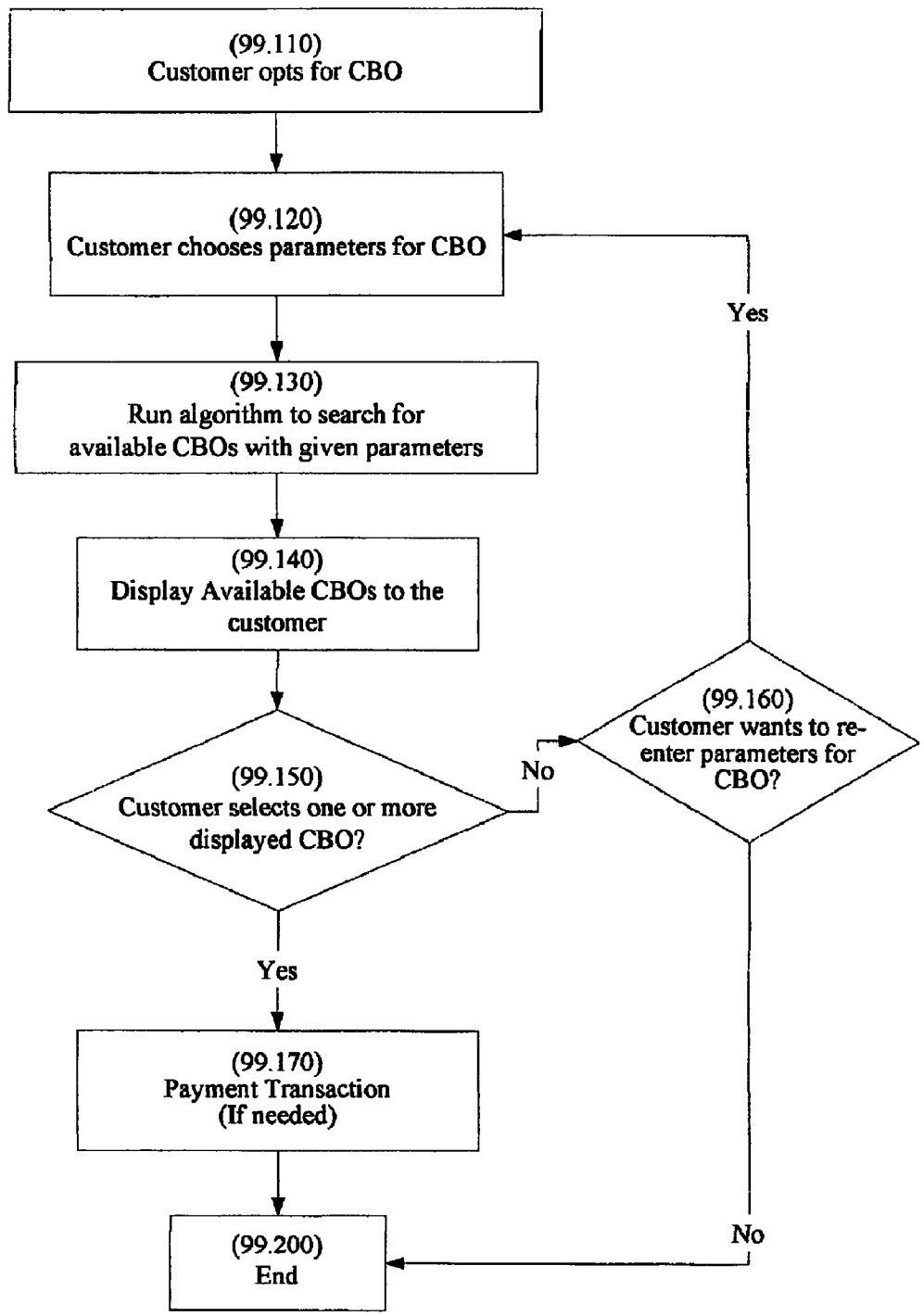
FIG. 99 is a flowchart that expands Act 100 of FIG. 98, illustrating a high level algorithm for the "Get CBO" process.

There are several ways to implement the Get CBO process. The following presents an algorithmic illustration of the Get CBO process. Consider FIG. 99. In Act 99.110, the customer reaches an interactive interface of the company's web server to Get CBO page, where the customer opts for CBO. Next, the customer inputs/chooses the CBO Search parameters/criteria in Act 99.120.

Next, on clicking the "Search CBO" button, control goes to Act 99.130, where the CBO search algorithm is executed to search for a CBO. Various algorithms and processes discussed above including, but not limited to, Sequential Buy APO Process, OPS Search, Notification Deadlines, Available Capacity Check, APO Price Calculation and so forth may be executed. The CBO search algorithm returns a list of valid CBOs, along with a list of Notification Deadlines and associated CBO Prices. The details of the CBO search algorithm are presented later. Next, the search results are displayed for the customer, as shown in Act 99.140. Next, in Act 99.150, a test is performed to determine whether the customer selects one or more of the displayed CBO.

If the customer does not select one or more displayed CBO, another test is performed to determine whether the customer wants to re-enter/modify one or more parameters for CBO, as shown in Act 99.160. If the customer wants to re-enter/modify one or more parameters for CBO, control loops back to Act 99.120, where the customer inputs/chooses the CBO Search parameters, and then the process is repeated again for the Get CBO. If the customer does not want to re-enter/modify one or more parameters for CBO, the algorithm exits as shown in Act 99.200.

If the customer selects one or more of the displayed CBOs, control goes to Act 99.170, where a payment transaction (if needed) may be executed. For example, a customer may need to pay a price using a credit card, direct bank account debit or any other payment transaction mechanism. Next, the algorithm ends in Box 19.200. The computation may be performed using a processor that may calculate results in optimal time.

CBO Search

Figure 100:
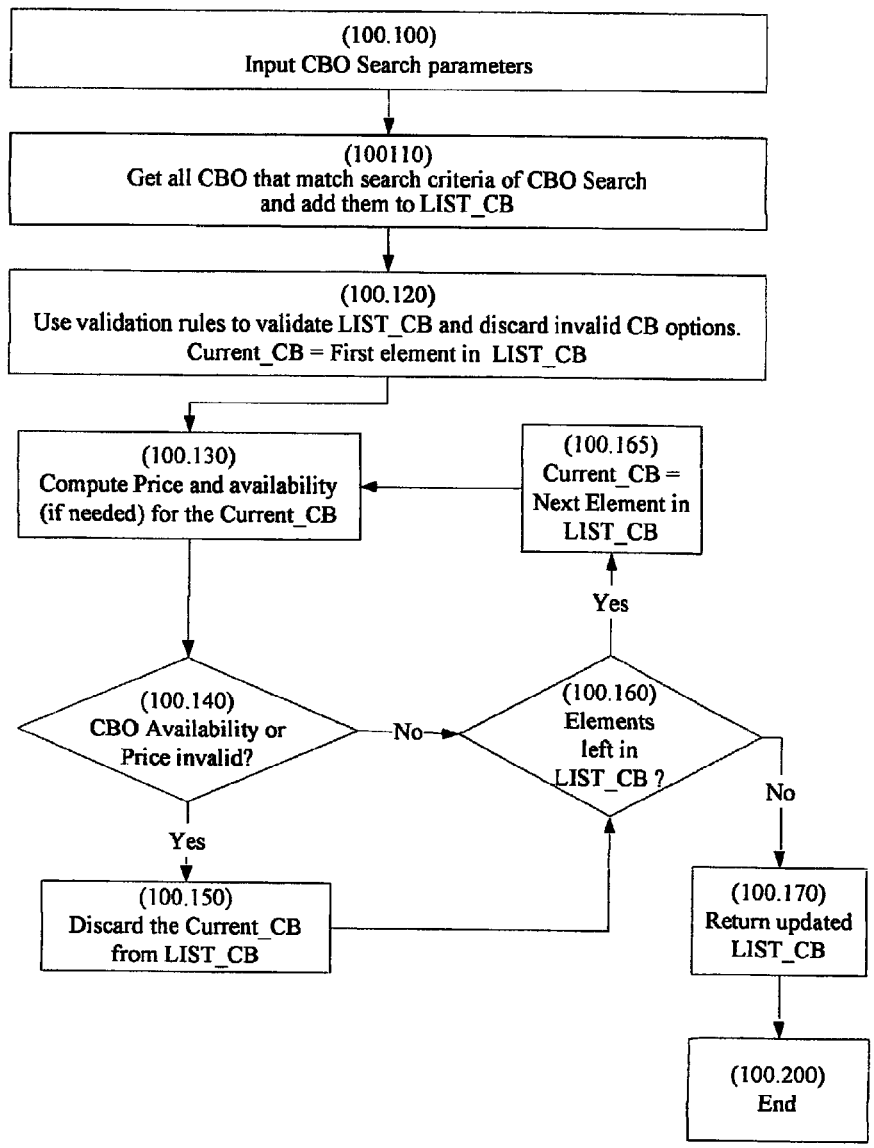
FIG. 100 is a flowchart that expands Act 130 of FIG. 99, illustrating an algorithm to search for CBO.

The following algorithm (shown in FIG. 100) determines and validates a CBO for a given set of conditions/parameters including, but not limited to, availability, Notify Deadline and CBO Price. One of the ways of implementation of the CBO Search has already been discussed above along with various information technology and networking tools including, but not limited to, one or more servers, database, load balancers, firewall, routers, Internet, highly secured VPN. Intranet, RAM, hard disk drives, CPUs, monitors as shown by FIG. 13D.

In Act 100.100, CBO Search parameters are input to the system. The OPS search parameters may include, but are not limited to, date, time and location, number of Products per Set. Notify Deadline, CBO Price, number of payments, other terms and conditions and so forth as appropriate for a given product in a given industry. A customer may be allowed to input Notify Deadline and/or CBO Price on the basis of which valid CBOs (that satisfy the given criteria of Notify Deadline and/or CBO Price) may be searched for and displayed for the customer. For example, a customer may be asked to input one or more parameters, and then a set of Notify Deadlines and CBO Prices may be computed for the Products that match the given criteria. In another example, a customer may input both one or more parameters and Notify Deadline and/or CBO Price as inputs and then a search may be performed for valid CBOs.

Next, control goes to Act 100.110, where a CBO Search is performed for the given criteria. The search may be best performed using a processor that may calculate results in optimal time. The order in which search parameters are executed may be optimized to reduce the search time, however, it may or may not affect the final outcome. A company may select any order of its choosing.

In Act 100.110, all CBOs are determined that match the search criteria and the resulting CBOs are added to a list termed LIST_CB. Next, in Act 100.120, a list of CBO validation rules is obtained from the company's CBO VOF database and the rules are used to validate all the CBOs in the LIST_CB list. CBOs that do not satisfy the rules are discarded. Validation rules may include, but are not limited to, Maximum Number of Payments, a Maximum Product Price Rule and so forth. For example, a Maximum Product Price Rule discards the CBOs that have more Products with more than Product Price specified. A company may implement any validation rule of its choosing to further qualify the CBOs in the LIST_CB list. As a last Act in Act 100.120, the first element in the updated LIST_CB list is designated as the Current_CB.

Next, control goes to Act 100.130, where the CBO availability and CBO Price for the Current_CB are determined. Next, in Act 100.140, a test is performed to determine whether the CBO Availability or the CBO Price is invalid. A company may implement any validation rule of its choosing to validate the CBO Availability and/or the CBO Price. If so, control goes to Act 100.155. If not, control goes to Act 100.160.

In Act 100.155, the Current_CB is discarded from the LIST_CB list_and control goes to Act 100.160, where a test is performed to determine if more elements are left in the LIST_CB list. If so, control goes to Act 100.165. If not, control goes to Act 100.170.

In Act 100.165, the next element in the LIST_CB list is designated as the Current_CB and control loops back to Act 100.130 to repeat the process for the new Current_CB. In Act 100.170, the updated LIST_CB list is returned as the search result, and the algorithm ends in Box 100.200.

2. Event Optimizer

After the completion of the Get CBO process, the next stage is the Event Optimizer. In this stage, the Customer Notification (or CN, in short) process as shown in Act 98.200 is executed. In this process, one or more decisions on the selection of Chosen Product(s) is notified to the customer, to the company, an entity other than said company or any combination thereof within the terms and conditions of the option contract. The details of the CN process are provided below. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E.

Customer Notification Process

In the customer notification (CN) process, a decision for the Chosen Product is notified to the customer, the company, an entity other than the company or any combination thereof as per the terms and conditions of the option contract. As mentioned earlier, the Chosen Product may be defined by the company, the customer, another entity or any combination thereof. In one of the ways of implementation of the CBO VOF, the company may have the right to select (or define) one or more Chosen Products and the customer may also have the right to select (or define) one or more Chosen Products.

Figure 101:
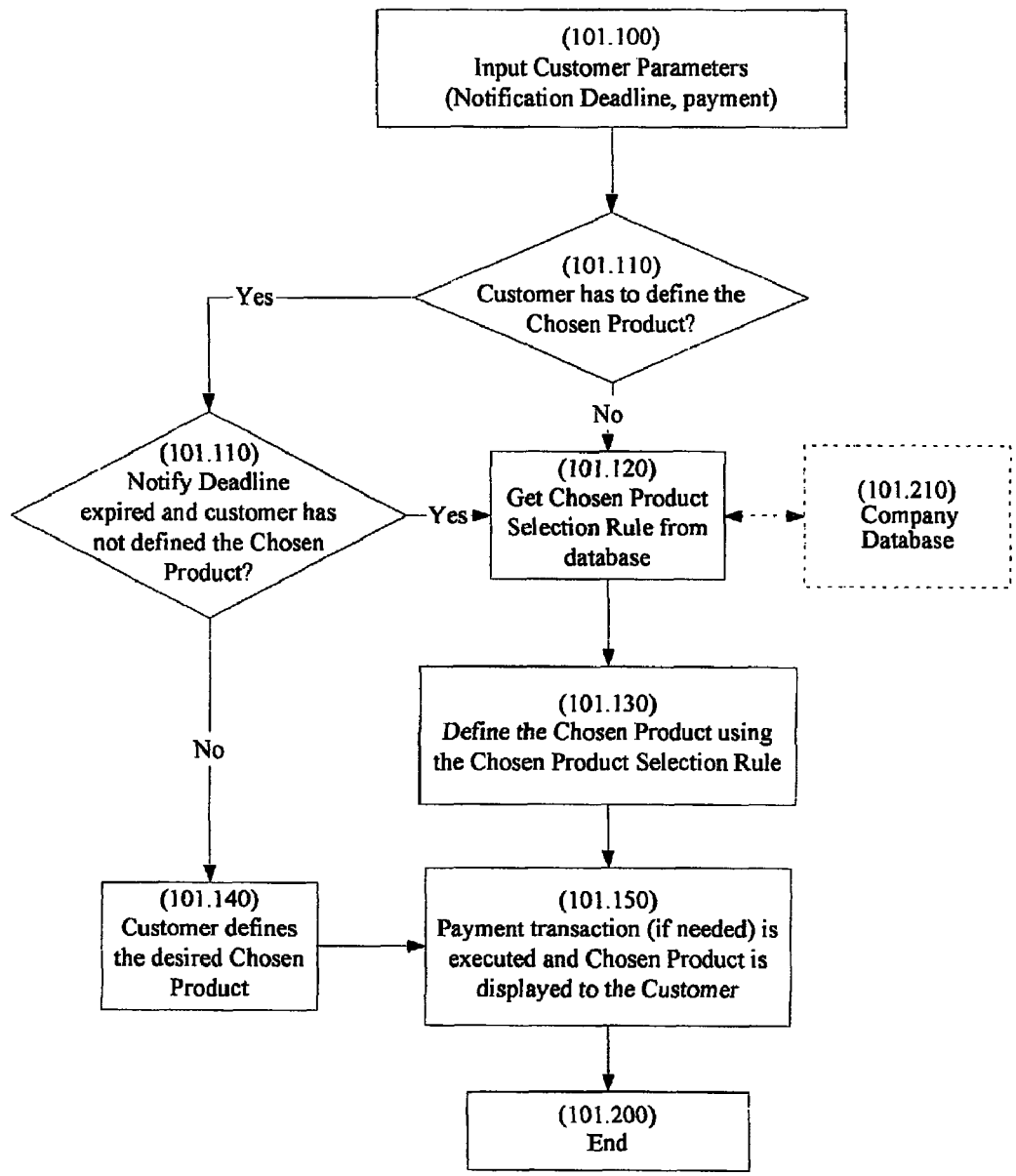
FIG. 101 is a flowchart that expands Act 200 of FIG. 98, illustrating an algorithm for the "Customer Notification" process.

FIG. 101 displays an example of an algorithm that may be used to execute the Customer Notification process. In Act 101.100, customer parameters including, but not limited to, Notification Deadline, payment and so forth are taken as inputs. Next, in Act 101.110, a test is performed to determine whether the customer has to defined the Chosen Product. If not, control goes to Act 101.120. If the customer has to define the Chosen Product, another test is performed to determine whether the Notification Deadline has expired and the customer has not selected the Chosen Product. If not, control goes to Act 101.140. If so, control goes to Act 101.120.

In Act 101.120, Chosen Product Selection Rule may be obtained from the company database (Box 101.210). A set of one or more Chosen Product Selection Rules may be used to define the Chosen Product. A company may choose any Chosen Product Selection Rule of its choosing. The Chosen Product Selection Rules may depend upon expected value of the Product, expected sales volume, availability and so forth. For example, a company may choose a Chosen Product Selection Rule which selects the Product with the higher value as the Chosen Product. Alternatively, a rule may be chosen which selects the Product with the lower value as the Chosen Product Next, in Act 101.130, the Customer Notify Rules, thus obtained from the company's database, are used to define Chosen. Product(s). Next, control goes to Act 101.150.

In Act 101.140, the customer defines the desired Chosen product and control goes to Act 101.150.

In Act 101.150, a payment transaction (if needed) is executed and Chosen Product(s) is displayed, and the algorithm then ends in Box 101.200.

CBO Modification Process

Figure 102:
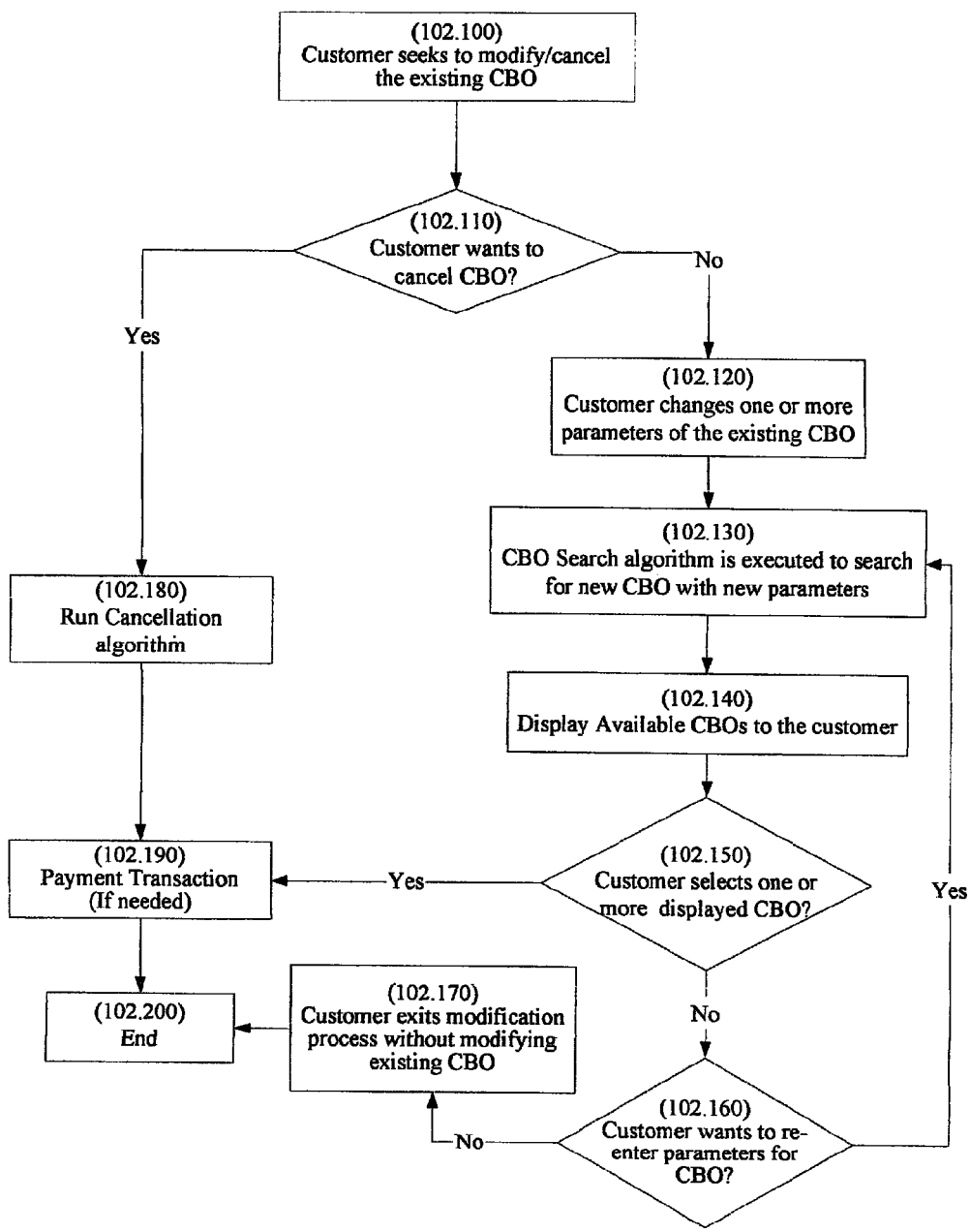
FIG. 102 is a flowchart of an algorithm for the CBO Modification Process.

As discussed above, a CBO is a highly customized dynamic option for the customers. Once a customer has opted for a CBO, he/she may modify/cancel the CBO as per the terms and conditions of the option contract. A customer may change or modify the existing parameters of the CBO at any time and at one or more times so long as the same is within the terms and conditions of the option contract. The following algorithm (shown in FIG. 102) is one of the example to illustrate CBO Cancellation/Modification Process. Customer may seek to modify/cancel the existing CBO, as shown in Act 102.100. Next, in Act 102.110, a test is performed to determine whether the customer wants to cancel the CBO. If the customer wants to cancel the CBO, control goes to Act 102.180, else control goes to Act 102.120. In Act 102.180, the CBO Cancellation algorithm is executed at the company's server as per the terms and conditions of the option contract.

In Act 102.120, the customer may change one or more parameters of the existing CBO. The customer may enter/input one or more new inputs/parameters/criteria for the CBO. Next, in Act 102.130, CBO Search algorithm is executed to search for new CBO with the new and/or changed parameters. Details of CBO Search has already been discussed above.

Next, in Act 102.140, all the available CBOs are displayed to the customer. In Act 102.150, a test is performed to determine whether the customer has selected one or more of the displayed CBOs. If so, control goes to Act 102.200. If not, another test is performed to determine whether the customer wants to re-enter one or more parameters for CBO. If so, control loops back to Act 102.130, where CBO Search algorithm is executed to search for new CBO with the new and/or changed parameters. If not, the customer exits the CBO Modification Process without modifying the existing CBO, as shown in Act 102.170.

In Act 102.190, a payment transaction (if needed) may be executed. For example, a customer may need to pay a price using a credit card, direct bank account debit or any other payment transaction mechanism. The algorithm ends in Box 102.200. The computation may be performed using a processor that may calculate results in optimal time.

Business Model to Implement CBO

Different business models may be used to implement a CBO VOF. The business models mentioned below, without limitation, may be used to implement the CBO VOF in any industry. As an example, a company may choose to implement a CBO VOF individually or in conjunction with one or more partners and/or other companies.

As mentioned in the above sections, for example, an entity may use the allocated products to offer CBO to customers and/or to sell the products as regular products. The allocation of product may be conditional. For example, one of the conditions may require a return of at least one allocated product within a specified time period and/or other consideration(s).

The customer may select or purchase one or more products from the company and/or said entity and then interact with said entity to receive one or more CBO Products in relation to said (already purchased) products. Said entity may also receive product allocation from more than one company, and thus, offer products from multiple companies to a single customer during the Initial Transaction for CBO.

The OA may use those products and operate a service to offer CBO to the customers. As explained above in FIG. 13A, a customer may select one or more products from the OA, and then receive CBO on those selected products from the OA. Another approach would be for a customer to select one or more products from the company and then receive CBO on those selected products from the OA. In another example, a customer may select one or more products from both the company and the OA, and then receive the CBO option on those selected products from the OA. It is also possible that the customer receives CBO from the company or both from the company and the OA on a given set of selected products.

The OA and the company may simultaneously offer CBO to the customers, i.e., a customer may either approach the company or the OA to receive CBO on desired products. In another model, the OA may operate as the sole provider of CBO to all the customers of a company. In yet another model, the OA and the company may choose to work together and jointly offer CBO to the customers.

As explained in FIG. 13A above, an OA may be able to offer CBO on products from one or multiple companies. An OA may receive allocation of products from two or more companies. A customer may purchase one or more products from one or more companies and/or from the OA, and then receive CBO on those selected products from the OA. Even if the OA may not be entitled to or does not receive product allocation from a company, it may still be able to formulate an agreement with one or more companies to offer CBO on the products of said companies. Thus, a customer may be able to receive CBO on products from multiple companies, giving the customer more value to trade-in their flexibility and variety to choose from. For example, a customer may receive CBO on two products from two different companies, and the OA and/or any one or all of the companies will then notify the customer about the Chosen Product within the terms and conditions of the option contract. This may provide a lot of value to the customers. An OA may be able to thus create a multi-company CBO VOF Framework, which may tremendously enhance the value to the customers. All the participating companies that allocate products to and/or partner with the OA to offer CBO may also gain from the CBO network (benefits include reduced revenue spill, higher revenues, enhanced overall customer satisfaction and/or other operational benefits). Either or both of the OA and the company may process the Chosen Products associated with CBO received by the customer. A customer may receive products from the OA or the company for the products related to the CBO grant. Any entity (the OA and the company) may process products offered only by that entity or by either of the two entities.

The OA and the company may engage in a business agreement to implement the CBO program. The business agreement may divide the total benefit generated by the CBO program between the two parties using any mechanism or criteria as desired. The total CBO Revenue Benefit may be shared between the two parties. The company may allocate products to the OA. One or more companies may allocate only part of or their entire product inventory to the OA to offer those products to the customers by way of regular and/or CBO Products. In return, the OA may offer some revenue or fee to the company for all or a portion of the products allocated. This fee may be given only for the products that the OA is able to utilize or for all the allocated products. The lending fee may be a lump sum amount, may depend upon the number of products allocated or may depend on one or more factors as desired. The agreement may include a provision where the OA may return the allocated products back to the company at a certain time and date. There may be one or more conditions associated with the return of unused CBO products and/or products from the Released Products, including, but not limited to, returning the same product, returning a higher value product and so on. The company may allot OA at least one product and said OA may deliver CBO on at least one of said allocated products. The OA may or may not enter into an agreement with the company to provide such option on its products. The OA may sell back at least one allocated product to said company or to at least one entity other than the company or both.

Information Technology System for CBO

A client-server architecture may be used to implement the CBO VOF. However, a company may use a computer hardware and software infrastructure of its choosing to implement a CBO VOF.

The CBO VOF may be best implemented using one or more computer-implemented methods to operate a computer-implemented service to offer CBO to the customers, that includes, but not limited to, recording the information pertaining to the offered and/or used CBO in a database. It may also include operating a computer-implemented service (and/or system) or other service (and/or system) to define the Chosen Products, and recording said Chosen Products (or defined Products) and all the Products related to a CBO in a database.

For the stage one (i.e., to formulate the CBO VOF), an application server may be used along with a database (e.g., a relational database) that stores all the information relevant to the company and the customer. The database may include all the relevant information sufficient to identify Products the company chooses to make eligible for CBO. One or more users (e.g., a business analyst or manager) may have full access to this server through Intranet or highly secured VPN environment to design an optimal value option framework. The database shall also store all the information pertaining to all the acts (in stage one) used by the company while formulating the CBO VOF.

A similar or a different application server and/or a cluster of application servers (functioning concurrently) along with one or more web servers and a set of one or more database servers may be used for the Get CBO as explained in FIG. 13D above and CN (Customer Notification) processes in the stage two of the CBO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Get CBO process and the Event Optimizer processes may be computer-implemented as explained and discussed above in FIGS. 13D and 13E. All the customer interactions and the related information such as customer needs, inputs, payment transactions etc. are stored in this database, including information pertaining to the interactions with those customers who may not receive CBO. The systems for stage two and stage one should be maintained in a synchronized environment so that each system has access to the most current information and can communicate with each other.

As discussed above, there may be other ways for implementing the CBO VOF which may depend upon including, but not limited to, the scale of the implementation, business requirements and number of entities involved. The entities may interact through a series of hardware products and services with the OA/company server(s). The OA may or may not be different than the company and the OA server may be the same as that of the company server. The information technology and network system to implement CBO VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, the company may have one or more separate temporary database structure wherein the entries are updated and stored until the final update is made in one or more main databases. One the final update is done, the entries in these temporary databases may be removed.

The entire system may run at the premises of OA, company and/or any third entity or any combination thereof. It may also be possible to run a part of the system at one place and rest at one or more other places. The system may also be implemented even if one or more servers may be kept off-shore locations and may be accessed remotely. The geographical locations of one or more hardware product and/or services may be different depending upon including, but not limited to, the factors of company's choice, ease of accessibility, infrastructure facilities. The structure or the interaction architecture of the system may vary depending on factors including, but not limited to, the set up of the company, changes in the technology and with the introduction of new and better technology enhancing the interaction process.

A customer may interact with either one or more of the Get CBO, the CN processes either directly or indirectly using a local or a remote terminal (e.g., a computer with a browser and an access to the Internet) that is able to access the web server(s) that host the Get CBO and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one and/or stage two may be hosted and run by the company, an OA, a third party service provider or any combination of the above. In the model, where the OA receives Product allocation from the company and offers CBO to the customers directly, the web server, application server and database for both stage one and stage two shall be managed by the OA. The OA may also have partial (or complete) access to the company database and systems through a highly secured environment (for example, a virtual private network). In the model, when an OA and a company tie-up together to offer CBO, all the computer hardware and software infrastructure for both stage one and stage two may be hosted by and/or property of either or both (mutually) of the sides depending upon the business agreement between them.

The above system and architecture may be explained and used for any industry. Each company using the system and method taught herein can make its own choices as to how extensively to deploy the method. For example, a company can implement as few or as many of the foregoing options as it desires; or it may perceive and implement one or more other options.

Some Other VOF Examples

As a case in point, let us consider the airline industry. A company may implement one or more of the below mentioned VOFs in any industry. The airline industry is assumed herein to demonstrate the system and methodology of the below mentioned VOFs. Selection of an industry provides a context and makes the understanding smoother and easier. In order to reduce costs and increase operational efficiency, airlines have traditionally focused on optimizing within the boundaries of their internal operations. To increase revenues, airlines have employed indirect means of advertising, frequent flyer programs and blanket promotions, and have used gross demand based yield management systems to influence the customer demand indirectly at the gross level. End-customer demand has never been considered a factor that could be optimized to reduce costs or to increase revenues. End-customers have been treated as a distinct and detached entity, creating demand at a gross level, rather than as an integrated participant.

The above-discussed method concentrates on the overall value of the transaction for the parties involved, rather than simply on the specific product or service, and can optimize value across airline operation (i.e., costs, capacities and constraints) and passengers (i.e., demand, preferences and relative utilities) to maximize value for both.

Airlines have developed certain static on-demand solutions such as e-tickets, e-check-in, kiosks and Internet ticketing. These solutions speed up the processes and reduce costs but fail to integrate the customer in a dynamically optimized and more meaningful way. Under the here-in described method, the airline negotiates in real time with the customer and is able to estimate the airline's needs under optimal financial conditions (i.e., having the flexibility to achieve lowest cost, best utilization). Thus, the airline can alter demand by offering incentives or by modifying its offering to sell a seat that might otherwise go unfilled.

The new method allows an airline to accomplish some or all of the following:
- Attract more passengers at higher margins (revenue management)
- Offer better value-added services to customers (to increase yield, customer satisfaction, customer retention and customer base)
- Efficiently manage flight disruptions such as cancellations, delays and overbooking to reduce disruption costs and avoid passenger dissatisfaction)
- Improve load balancing and operational efficiency (to reduce operational costs and increase margins)
- Improve security environment by reducing airport congestion and overcrowding (to reduce security delays and costs)

Currently, in the event of a flight cancellation or other disruption, customers barrage travel agents and airline telephone operators with calls, and flock to customer service desks where they are processed sequentially to satisfy customer needs, without much concern for the overall resulting cost. With the above-described method, the airline flight booking system is programmed in advance to deal automatically with re-bookings in the event of a disruption. Customers then can be processed automatically by the airline reservation system, based upon the participating customer's preference profile, selected incentive schedule, seat availability and seat cost. A new boarding pass and itinerary can be picked up at a kiosk in the airport. Human agents may still be needed to make adjustments for some customers, but the overall need for expensive customer service intervention is greatly reduced. Customers gain greater certainty in and control over their travel schedules and airlines avoid an overwhelming critical mass of customers standing in lines grumbling and generating ill-will, while reducing costs.

Airlines and channel partners can use at least the following options to learn about customer demand and preferences and then integrate that data with their internal operations to maximize profits and revenues. The options for airlines are divided into three categories: (A) event management options, (B) accessory options, and (C) purchasing options. These options will now be described in detail.

(A) Event Management Options include (1) flight cancellation options. (2) flight delay options, (3) flight overbooking options, and (4) buy-back options.

(1) Flight Cancellation Options: Airlines can use a Flight Cancellation option to have the passenger express his/her preference in case of a flight cancellation. Currently, whenever a flight is cancelled, airlines face a costly, time-consuming task of rebooking all the passengers. They don't know which passengers absolutely have to travel that same day and which can wait, and so forth, until they have talked to almost all of them. That process takes time, resulting in longer queues, and anxious, frustrated, angry customers trying to get their situations resolved. Ultimately, the airline expends resources (staff, hotel, food, alternate flights on other airlines, overhead, transportation), loses revenue (to other airlines) and generates ill will in resolving that situation.

Using the method taught herein, the airline will encourage as many passengers as possible to express their preference and choose from different options regarding flight cancellation before their ticket purchases. (The actual number and types of options could vary. This is for example only.) The STS value options have been described in detail above, as well. Another set of STS value options is provided below. For example, the options shown in Table I could be available for a particular flight

TABLE I

| S (i.e., Option) No. | Option Name | Option Description | Option Costs ($X) or Savings ($Y) for Customers |
|---|---|---|---|
| 1 | Next Flight | Get the next flight | $X_1$ |
| 2 | 4 Hr | Get a flight within 4 Hrs | $X_2$ |
| 3 | 8 Hr | Get a flight within 8 Hrs | $X_3$ |
| 4 | 8 Hr + Food Coupon | Get a flight within 8 Hrs and a Meal Voucher | $X_4$ |
| 5 | Same Day | Get a flight within the same day | $X_5$ |
| 6 | Same Day + Meal Voucher | Get a flight within the same day and a Meal Voucher | $X_6$ |
| 7 | 24 Hr + Meal and Hotel Voucher + Transport | Get a flight within 24 Hrs and Meal, Transport and Hotel Vouchers | $Y_1$ |
| 8 | 24 Hr | Get a flight within 24 Hrs | $Y_2$ |
| 9 | 48 Hr + Meal and Hotel Voucher + Transport | Get a flight within 48 Hrs and Meal, transport and Hotel Vouchers | $Y_3$ |
| 10 | 48 Hr | Get a flight within 48 Hrs | $Y_4$ |

Using the Table I options, the airline can achieve substantial benefit.

If a flight is cancelled, the airline will experience the following result. Passengers who chose options S=7, 8, 9, or 10 have already been given instructions in case of flight cancellation to return home and wait for the airline's email/fax or other notification of their alternative flights. So, these passengers simply leave the airport. Passengers with options S=1 to 6 simply go to a kiosk and print their new boarding passes. Once they have new boarding passes, these passengers proceed to their flights. A few passengers may have urgent needs (outside of options they had earlier selected). So a small queue of such passengers may be formed at the airport check in counter. The on-duty airline staff is sufficient to take care of these passengers within their normal work hours with no overtime paid, and no need for any additional staff. The airline will have generated additional revenue from those passengers who paid up front to buy options S=1 to 6 and it saved costs for passengers who elected options S=7-10, while increasing the satisfaction of all.

(2) Flight Delay Options: Similar to the above category, an airline can also experience flight delays, which may result in increased costs, ill will and dissatisfied customers. As in the case of flight cancellation explained above, an airline can make available the following options for flight delays and program their computers to fill orders starting with option S=1 and moving through increasing option numbers:

TABLE II

| S (i.e., Option) No. | Option Name | Option Description | Option Costs ($X) or Savings ($Y) for Customers |
|---|---|---|---|
| 1 | 1-2 Hr delay-Next Flight | Get the next flight if the original flight is delayed by 1-2 hrs | $X_1$ |
| 2 | 2-4 Hr delay-Next Flight | Get the next flight if the original flight is delayed by 2-4 hrs | $X_2$ |
| 3 | 4-6 Hr delay-Next Flight | Get the next flight if the original flight is delayed by 4-6 hrs | $X_3$ |
| 4 | More than 6 Hr delay-Next flight | Get the next flight if the original flight is delayed by more than 6 hrs | $X_4$ |
| 5 | Up to 12 Hr Delay-Regular and Food | Travel with the same flight if the flight is delayed by up to 12 Hrs and get food coupons. Alternate flight for more than 12 Hr delay | $X_5$ |

(3) Flight Overbooking Options: In case of flights being overbooked, an airline experiences problems in getting everybody on board, resulting in flight delays, increased costs, ill will and dissatisfied customers. As in the case of flight cancellation explained above, airlines can make available the options shown in Table in (or similar) for overbooking:

TABLE III

| S (i.e. Option No. | Option Name | Option Description | Option Costs ($X) or Savings ($Y) for Customers |
|---|---|---|---|
| 1 | Next Flight | In case of overbooking, airline can ask you to take the next flight | Save Y1 now and Y2 later if flight changes |
| 2 | 6 Hr | In case of overbooking, airline can ask you to take another flight within the next 6 hrs | Save Y3 now and Y4 later if flight changes |
| 3 | 24 Hr-Food and Hotel | In case of overbooking, airline can ask you to take another flight within 24 Hrs and provide food and hotel | Save Y5 now and Y6 later if flight changes |
| 4 | No-Overbook | You have the right to board the same flight: can't be asked to take another flight | X1 |

(4) Buy Back Options: Sometimes an airline can benefit by buying back booked tickets back from customers. For example, some customers may have more urgent need than others to get on that plane. Using the method taught herein, an airline can buy back tickets from some of its customers who had announced their schedule flexibility; those passengers might also be given a discounted ticket price. The airline could have the options of Table IV for buying the tickets back:

TABLE IV

| S (i.e. Option) No. | Option Name | Option Description | Option Costs ($X) or Savings ($Y) for Customers |
|---|---|---|---|
| 1 | 7 Day Buy-1 Day Alternate | Airline can buy back the ticket up to 7 days before the travel date, and provide alternate flight within 1 day | Save Y1 now and Y2 later if event occurs |
| 2 | 3 Day Buy-1 Day Alternate | Airline can buy back the ticket up to 3 days before the travel date, and provide alternate flight within 1 day | Save Y3 now and Y4 later if event occurs |
| 3 | 12 hrs Buy-1 Day Alternate | Airline can buy back the ticket up to 12 hrs before the travel time and provide alternate flight within 1 day | Save Y5 now and Y6 later if event occurs |

(B) Accessory Options: An airline could make available accessory options to take advantage of the flexibility and needs of customers for their accessory needs.

(1) AlternateDate Option: Customers who are not sure about their travel dates could use this option to get confirmations on multiple, alternative flight dates. Once the customer has bought a confirmed flight, he/she can buy options for confirmed seats on other flights between the same cities on other dates, or between different cities on the same dates. This option would provide additional flexibility to passengers and generate additional revenue for airlines. Examples of some of these options are shown in Table V below:

TABLE V

| S (i.e. Option) No. | Option Name | Option Description | Option Costs ($X) or Savings ($Y) for Customers |
|---|---|---|---|
| 1 | Alternate Flight Confirmation-Diff. Date/2 Day | Get confirmation on the same flight for another date-Need to choose one at least 2 days before the earlier flight | Pay X1 now and X2 later if event occurs |
| 2 | Alternate Flight Confirmation-Diff. Flight/2 Day | Get confirmation on another flight on the same date-Need to choose one at least 2 days before the earlier flight | Pay X3 now and X4 later if event occurs |

(2) Modify Date Option: An airline could allow passengers to buy these options to maintain their flexibility to change their flight dates. Currently passengers have to pay a fixed, substantial fee for any changes they make on most flight fares. Using these options, a passengers can pick and choose the option that suits him/her the most. This option would provide additional flexibility to customers and generate additional revenue for the airline. Since these would be prices at low rates, more customers would be willing to pay for these options. Some examples of such options are shown in Table VI below:

TABLE VI

| S (i.e. Option) No. | Option Name | Option Description | Option Costs ($X) or Savings ($Y) for Customers |
|---|---|---|---|
| 1 | $X1-Fare Diff. Later | To get the option to change your flight: Pay $X1 now and Fare difference later when you change | Pay $X now and fare diff later if event occurs |
| 2 | $X2-$X3 Later | To get the option to change your flight: Pay $X2 now and $X3 later when you change | Pay X2 now and X3 later if event occurs |
| 3 | $X4 Now | To get the option to change your flight: Pay $X4 now and you can make one change to your flight at no additional cost | Pay X4 now only |
| 4 | $X5 Now | Pay $X5 now and your ticket is 100% refundable | Pay X5 now only |
| 5 | $Zero Now-$X6 later | Pay nothing extra now and pay $X6 later if you want to make one change to your flight | Pay X6 later only if event occurs |
| 6 | Save $Y Now | Save $Y now and your ticket cannot be changed or refunded back | Save Y now |

(3) Luggage Options: Some passengers want to travel with very little, some with a lot of luggage. Passengers can use these options to save them costs and help airlines better manage their operations. Examples of some of these options are shown in Table VII below:

TABLE VII

| S (i.e. Option) No. | Option Name | Option Description | Option Costs ($X) or Savings ($Y) for Customers |
|---|---|---|---|
| 1 | Only 1 carry one piece | You can take only 1 carry-on piece (less than p pounds) with no checked in bags. | Save $Y1 now |
| 2 | 2 Check-in bags and 1 carry-on | You can take up to 2 check-in bags and 1 carry-on piece | No costs or benefits |
| 3 | 1 Additional Bag Option | You can take 1 additional check-in bag on top of 2 check-in bags and 1 carry-on piece | Pay X1 now and X2 later if event occurs |
| 4 | 2 Additional Bags Option | You can take 2 additional check-in bag on top of 2 check-in bags and 1 carry-on piece | Pay X3 now and X4 later if event occurs |

(4) Customer Service Options: Some passengers want to get more help from customer service than others. Those who commit to taking little or no additional help from the customer service center represent a cost-savings opportunity for the airline, which savings can be absorbed or shared with the passenger. An airline can offer a limited number of customer service options per each flight, to manage the airline's customer service center load. Passengers can use these options to save them costs and help the airlines better manage their operations. Some of these options are shown in Table VIII:

TABLE VIII

| S (i.e. Option) No. | Option Name | Option Description | Option Costs ($X) or Savings ($Y) for Customers |
|---|---|---|---|
| 1 | Online or Automated Customer Service only | You can take only online or automated customer service help and no live phone support is available | Save $Y1 now |
| 2 | Silver Phone Support | You can get basic live phone support and online support | No additional costs or benefits |
| 3 | Platinum Phone Support | You get superior live phone support (special 800 number) no wait time, plus online support | Pay X1 now |

(5) DirectFly Option: Direct flights (with no connection) between two cities are often priced quite a bit more than flights with one or more connections. For example, direct flight from Boston to Denver was priced over $500 round trip by three major shortly before the filing date hereof. On the other hand, flights with one or more connections were priced as low as $143 round trip for the same situation. Airlines adopt this practice to generate more revenue from people who value direct flights and are ready to pay a higher price for the same. Many times, this leads to the situation that airlines can't sell their direct flights fully as several people who cannot afford to pay $500 or more take connecting flights. A Direct-Fly Option (DFO) aims to solve this problem. Among the passengers who can't afford to pay $500 but who want to take direct flights, there are several who would pay maybe $200 or $250 (i.e., an amount higher than that charged for a connecting flight rate). The DFO helps to capture this additional revenue and provide better service to passengers. While buying connecting flight tickets, passengers are offered the DFO at particular price. If the direct flight does not get sold, then the airline provides the Direct Flight seat to a passenger who had chosen the DFO at a pre-determined cost (far lower than the normal direct flight price). Passengers may pay a very low price (for example, $1 or $2) initially to buy the option and may pay an increment such as $100 or so later, if the airline offers them a direct flight upgrade and the passenger decides to take it. The airline could let the passenger know some hours or a day before the intended departure time. Since there would be no guarantees to get the direct flight upgrade, a passenger who definitely wants to take a direct flight would not be likely to use DFO. There could be more aspects to developing this value option. For example, an airline may offer a probability associated with a DFO offer. For example, it might announce that if the passenger takes the option, there is a 30% chance that he would get the direct flight upgrade. To implement this forecasting, airline could use a software tool to calculate and keep track of an individual passenger who has bought a DFO previously to ensure that he gets a direct flight upgrade at least once in a predetermined number of times. Offering direct flights to passengers (who would have otherwise flown on connecting flights) would save an airline the cost of flying the passenger on fewer flights for the same trip, and generate higher revenues through option premiums. An example of a DFO is provided below.

TABLE IX

| S (i.e. Option) No. | Option Name | Option Description | Option Costs ($X) or Savings ($Y) for Customers |
|---|---|---|---|
| 1 | DirectFly Option | You may be offered to take direct flight between two cities if available provided you bought a connecting flight ticket between the same cities. You would be informed if a direct flight upgrade is available z hrs before the original departure time. | Pay $X1 now and $X2 later if direct flight is offered and accepted |

(6) TicketClassUpgrade Option: Similar to the DirectFly Option, is the TicketClassUpgrade (TCU) option. Business and First class seats are priced quite a bit high as compared to coach class seats. However, often business/first class seats are not filled completely as airlines can't find enough passengers to pay those high prices. However, there are several other passengers in lower ticket class segments who may be willing to pay extra (less than the normal difference between business and coach class seats) to take those vacant business class seats. Airlines can offer a TCU option to passengers when they buy coach class seats. Then if the business class seats are available up to a particular time before departure time, the airline could offer those seats to these passengers (who bought the TCU option) at a pre-determined price (which may be expressed in monetary or non-monetary terms, such as frequent flier miles). To restrict any misuse, an airline can put restrictions on the option and chose when to make this option available and at what price. The following scheme presents one particular example to implement this option:

TABLE X

| S (.i.e. Option) No. | Option Name | Option Description | Option Costs ($X) or Savings ($Y) for Customers |
|---|---|---|---|
| 1 | TicketClassUpgrade Option | You may be offered an upgrade to business/first ticket class between two cities if available provided you bought a coach/business ticket between the same cities. You would be informed if ticket class upgrade is available z hrs before the original departure time. | Pay $X1 now and $X2 later if ticket class upgrade is offered and accepted |

(C) Purchase Options: These options may be used by an airline to cater to the different customer preferences and demand in purchasing their original tickets.

Passengers with varying needs and flexibilities can choose the options that suit them the most and in turn, increase efficiency and revenues and profits for the airline. Many categories of such options are possible, examples being expanded below in detail:

(1) Target Price Options: For passengers who are very flexible with their travel date, an airline may provide a target price option. Passengers select their preferred dates within a specific block of time and establishing relative utilities associated with their dates by setting a target price. If the target price is above a particular number, the airline accepts it. The Airline then comes back at least 2-3 times within that block of time with confirmed flights for passengers (e.g., 3 or 7 days before the flight time). Two types of target options are described in Table XI.

TABLE XI

| S (i.e. Option) No. | Option Name | Option Description | Option Costs ($X) or Savings ($Y) for Customers |
|---|---|---|---|
| 1 | Variable Target Price Range | You select preferred dates within a specific block of time, and provide your relative utilities with each date, a target price range (minimum Z dollar range). The airline confirms a flight within that target price range, on the preferred dates. You have the choice to take the flight or not. Airline gives you at least 2-3 confirmed flights with in your preferred dates and lets you know at least 3 or 7 days before the actual flight. | Pay $ 5-10 now and pay target price later if you want to take the flight |
| 2 | Fixed Target Price | You select preferred dates within a specific block of time, and provide a fixed target price. If airline accepts that price, you pay the price now. Then the airline comes back to you with a confirmed flight for that target price, on your preferred dates. You get only 2-3 chances and you have to accept one of them to not lose your money. Airline lets you know at least 7 days before the actual flight. You get flights at cheaper rate than the variable target price option. | Pay $ target price now only |

In each of the above option, whenever the airline presents to the passenger a confirmed flight at any particular time, the airline can also mention other alternate flights at slightly different prices and times, to increase the flexibility for the passenger.

(2) CyclicBuy Price Option: As discussed above, passengers who travel often between two particular cities can use these options to maximize their value. The passenger and airline enter into a pre-determined price agreement and the passenger uses the same airline to fly a particular number of times between two cities within a specified amount of times. The airline benefits from additional confirmed future revenues and profits. The passenger saves time and the headache of researching flight tickets each time he/she travels between those two cities. There are two exemplary types of cyclic buy price options described in Table XII.

TABLE XII

| S (i.e. Option) No. | Option Name | Name Description | Option Costs ($X) or Savings ($Y) for Customers |
|---|---|---|---|
| 1 | CyclicBuy-7 day confirmation | Choose a time limit (3, 6 or 12 months), specify the number of flights you want to take. Airline gives you a good single price for all those flights. You can get a confirmed seat (up to 1/2 days before or after your travel date) if you let airline know at least 7 days in advance. You deposit advance of 1 ticket price with airline. | Pay twice the cyclic price for the first flight and then pay the cyclic price with every flight. Don't pay anything for the last flight |
| 2 | CyclicBuy-2 Day Confirmation | Choose a time limit (3, 6, 12 or more months), specify the number of flights you want to take. Airline gives you a good single price for all those flights. You can get a confirmed seat (up to 1/2 days before or after your travel date) if you let airline know at least 2 days in advance. You deposit advance of 1 ticket price with airline. | Pay twice the cyclic price for the first flight and then pay the cyclic price with every flight. Don't pay anything for the last flight |

Airlines might limit the second cyclical buy option to only selected groups of cyclic travel (for example with more than z flights in t amount of time).

(3) FutureBuy Price Option: An airline can make this option available to passengers who plan to take more than one flight within a specified time, to generate higher value for these passengers. Unlike the cyclic buy price option, above, the future buy price option does not require travel between the same cities. Passengers buy miles that can be used to travel on any route instead of a specific departure/destination route. Using this option, passengers can get better pricing, and save time and the headache of researching flight tickets each time they travel. Airlines benefit from additional confirmed future revenues and profits. There are two types of exemplary future buy price options described in Table XIII.

TABLE XIII

| S (i.e. Option) No. | Option Name | Name Description | Option Costs ($X) or Savings ($Y) for Customers |
|---|---|---|---|
| 1 | Future Buy-2T | You use this option for two tickets (one current and one future travel ticket). Specify the first flight you want to take. Specify travel cities (departure and destination) for future flight (within a specified time 3, 6 or 12 months). Airline gives you a good price for your current ticket and a price range for future flight. Get a confirmed seat on your future flight (up to 3 days before or after your intended travel date) if you let airline know at least 7 days in advance. You pay current ticket price and mid-value of future ticket price range at the start. | Pay Current ticket price and mid-value of future ticket price range now. Pay the difference of actual future ticket price later. |
| 2 | Future Buy-2T Open Ticket (within regions) | You use this option for two tickets (one current and one future travel ticket). Specify the first flight you want to take. Don't need to specify the future travel cities (timeline is required, within a specified time 3, 6 or 12 months). Airline gives you a good price for your current ticket and a deposit amount for future flight. Get a confirmed seat on your future flight (up to 3 days before or after your intended travel date) if you let airline know at least 10 days in advance. You pay current ticket price and deposit for future travel at the start. | Pay Current ticket price and future ticket deposit now. Pay the difference of actual future ticket price later. |

An airline can limit the availability of these options to a select group of itinerary requests, to maximize the airline's returns.

(4) TIP (ticket-in-progress) Buy Price Option: An airline can present to passengers who are flexible enough to entertain delay in getting ticket and price confirmation for their travel plans an option to gain such benefits. Using this option, passengers can get better pricing, and save time and the headache of researching flight tickets each time they travel. The airline benefits by allocating profitable passengers to low-load factor flights, and from additional confirmed future revenues and profits. There are two types of TIP buy price options described in Table XIV.

TABLE XIV

| S (i.e. Option) No. | Option Name | Option Description | Option Costs ($X) or Savings ($Y) for Customers |
|---|---|---|---|
| 1 | TIP-3 day | Submit your travel needs (cities, pref date) to the airline. Customers or airlines specifies a price range (which other party accepts) and airline guarantees travel within 1-2 day before or after your travel date. Airline will let you know 3 day before the actual flight the exact price and time of travel. You have the option to take the ticket or not. You pay a small dollar fee at the start and actual price if you take the flight. | Pay small $X1 at the beginning and actual price if the event occurs. |
| 2 | TIP-7 day | Submit your travel needs (cities, pref date) to the airline. Customers or airlines specifies a price range (which other party accepts) and airline guarantees travel within 1-2 day before or after your travel date. Airline will let you know 7 day before the actual flight the exact price and time of travel. You have the option to take the ticket or not. You pay a small dollar fee at the start and actual price if you take the flight. | Pay small $X2 at the beginning and actual price if the event occurs. |

Airline Summary

An airline using the method and one or more options outlined above can improve profitability through some combination of increased load factor, revenue and cost reduction, while improving customer goodwill and creating predictable future business. Consider a flight Y on a future date D for that airline. Using this method, this airline would know some or all of the following about that flight:

For passengers who have already booked their tickets on flight Y on date D, the airline would know (a) booked passengers who definitely plan to take the Y flight and (b) booked passengers who are not sure if they would take the Y flight. For the remaining seats (un-booked) on the flight Y on date D, the airline would know (a) some of those potential passengers who have a plan to fly between similar cities (as flight Y) on Date D within price range $P1-$P2; (b) potential passengers who have a plan to fly between similar cities (as flight Y) on another date around Date D, within price range $P3-$P4; (c) potential passengers who don't have a plan yet to fly on Date D between similar cities (as flight Y) but could be motivated to take the flight Y if available at Price M; and (d) passengers, scheduled on a different flight, who would want to take the flight Y instead at an incremental Price Q (lower than current ticket change penalty).

The above represents just a sample or information and customer inventory that the airline would be able to generate. With the above information, the airline can then use this new method to maximize its load factor, revenue and profitability.

Using the above system and method, an airline can optimize across customer demand and internal capacities to maximize its revenues and profitability. In other words, using this system and method, an airline can manage its customers, just like any other internal resource, to optimize its overall business processes Each company using the system and method taught herein can make its own choices as to how extensively to deploy the method. For example, an airline can implement as few or as many of the foregoing options as it desires; or it may perceive and implement one or more other options.

Similar options can be identified and pricing/service or product alternatives made available in other industries, such as the Hotels Industry, Car Rental and Cruises, and other travel industries as also mentioned in the above paragraphs.

This method of collecting customers' advanced and ongoing preferences and including these preferences (and perhaps intentions and plans) into the optimization process is fundamentally different from other business methods used currently, namely customization, build to order, build to stock or any other conventional business method. Focus groups or surveys have been used to formulate new programs but without similar impacts or ability to provide dynamic customization and optimization. Though history is of value, it is no substitute for "current" preferences at the time the customer is shopping. Integrating customer preferences with company economics (formally and in real-time) permits optimization of returns for both customers and the company. The above-described system and method enables companies to interact and optimize business transactions with large numbers of customers, while treating each as an individual.

The above system and architecture may be explained and used for any industry.

Each company using the system and method taught herein can make its own choices as to how extensively to deploy the method. For example, an airline can implement as few or as many of the foregoing options as it desires; or it may perceive and implement one or more other options.

Similar options can be identified and pricing/service or product alternatives made available in other industries, such as the Hotels Industry, Car Rental and Cruises, travel, media, insurance, automobile, furniture, computer manufacturing, other manufacturing and other industries as also mentioned in the above paragraphs.

While the invention has been described with respect to a limited number of embodiments, those skilled in the art, having benefit of this disclosure, will appreciate that other embodiments can be devised which do not depart from the spirit and scope of the invention as disclosed herein. Accordingly, the scope of the invention should be limited only by the attached claims.

What is claimed is:

1. A computer-implemented method to provide options on products, comprising:
   a. operating a data processor adapted by stored program instructions to receive at least one input in response to which a customer receives an option to utilize up to n of m products selected at the time the option is received, where,
      (1) m and n are integers,
      (2) m is greater than or equal to 2, and
      (3) n is less than m;
   b. recording information defining said option in a computer readable data store;
   c. at some time after acts a and b, and after said n products have been selected by the customer, operating a data processor adapted by stored program instructions to receive at least one input comprising one or more related transactions according to which the customer is allowed to utilize one or more previously unutilized ones of the m-n unselected products provided any specified conditions are satisfied and there is at least one additional payment transaction related to utilization of the one or more of said m-n products; and
   d. recording in a computer-readable data store information defining a selection of ones of the m-n products for utilization.

2. The method of claim 1 wherein the data processor of act a and the data processor of act c are a same processor.

3. The method of claim 1 wherein the data stores of acts b and d are a same data store.

4. The method of claim 1 wherein said customer selects at least one of the m-n products prior to utilizing all but one of the n products.

5. The method of claim 1 further including an act of the company reserving the right to limit the customer to n products on a stated notification date.

6. The method of claim 1 wherein said customer can select any of said m-n products together.

7. The method of claim 1 wherein selection of said n products may be modified prior to their utilization, in one or more further transactions.

8. The method of claim 1 wherein the at least one payment transaction comprises one more transactions distinct from act a.

9. The method of claim 1 wherein at least one of said payment transactions is executed between the customer and an entity other than the company.

10. The method of claim 1 wherein the m-n products are from more than one company.

11. The method of claim 1 wherein the company is not the seller of the n products.

12. The method of claim 1 wherein the utilization of one or more products in addition to the n products occurs only after fulfillment of specified conditions as defined by the company.

13. The method of claim 1 wherein one or more of the m-n products that may be selected is or are permitted to be utilized only after fulfillment of specified conditions as defined by the customer.

14. The method of claim 1 wherein one or more products of the m-n products that may be selected is or are permitted to be utilized only after fulfillment of specified conditions as defined by an entity other than said company and said customer.

15. A computer-implemented system to provide options on products, comprising:
   a. a data processor adapted by stored program instructions to receive at least one input in response to which a customer receives an option to utilize up to n of m products selected at the time the option is received, where
      1. m and n are integers,
      2. m is greater than or equal to 2, and
      3. n is less than m;
   b. a data processor adapted by stored program instructions to record information defining said option in a computer readable data store;
   c. a data processor adapted by stored program instructions to receive at least one input comprising one or more related transactions according to which the customer, pursuant to a right granted by a company, utilizes one or more of the m-n unselected products not selected among the n selected products, in accordance with at least one payment transaction between the company and the customer related to utilization of the one or more m-n products; and
   d. a data processor adapted by stored program instructions to record in a computer readable data store information defining a selection of ones of said m-n products for utilization.

16. The system of claim 15 wherein at least two of the data processors are a same processor.

17. The system of claim 15 wherein both said data store are a same data store.

18. A computer-implemented method to provide options on flights, comprising:
   a. operating a data processor adapted by stored program instructions to receive at least one input in response to which a customer receives an option to utilize up to n of m flights selected at the time the option is received, where,
      a. m and n are integers,
      b. m is greater than or equal to 2, and
      c. n is less than m;
   b. recording information defining said option in a computer readable data store;
   c. at some time after acts a and b, and after said n flights have been selected by the customer, operating a data processor to receive at least one input comprising one or more related transactions according to which an airline allows the customer to utilize one or more of the m-n flights not selected among the n selected flights and there is at least one payment transaction between the airline and the customer related to utilization of the one or more of the m-n unselected flights; and
   d. recording in a computer readable data store information defining a selection of ones of said m-n flights for utilization.

19. The method of claim 18 wherein both said data processors are a same processor.

20. The method of claim 18, wherein the inputs and selections are received via an internet.

21. The method of claim 1 wherein said m-n products include at least one higher ranked product.

22. The method of claim 21 wherein operating a data processor to receive at least one input comprising one or more related transactions further comprises requiring the customer to indicate a price the customer will pay for utilizing the higher ranked product.

23. The method of claim 22 wherein requiring the customer to indicate a price comprises permitting the customer to modify the customer's indication of the price before an indicated notification date.

24. The method of claim 1 further comprising pricing the amount for the additional payment transaction dynamically.

25. The method of claim 23, wherein the amount for the additional payment transaction is determined by bidding from customers.

26. The method of claim 1 wherein operating a data processor to receive at least one input comprising one or more related transactions further comprises requiring that as part of said input the customer indicates the price the customer will pay for utilization of at least one of said m-n products.

27. The method of claim 25 wherein the customer may modify input of the price the customer will pay for utilization of at least one of said m-n products before an indicated notification date.

28. The method of claim 1 wherein said m-n products include at least one practically constrained product.

29. The method of claim 28, wherein said at least one of the practically constrained product cannot be utilized fully.

30. The method of claim 18 wherein said m-n products include at least one higher ranked cabin.

31. The method of claim 30 further including requiring the customer to indicate a price the customer will pay for utilizing the higher ranked cabin.

32. The method of claim 31 wherein the price is modifiable before an indicated notification date.

33. The method of claim 18, further comprising pricing the amount for the payment transaction dynamically.

34. The method of claim 33, wherein the amount for the payment transaction is determined by bidding from customers.

35. The method of claim 18 wherein operating a data processor to receive at least one input comprising one or more related transactions further comprises requiring that as part of said input the customer indicates the price the customer will pay for utilization of at least one of said m-n flights.

36. The method of claim 35 wherein the price is modifiable before an indicated notification date.

* * * * *